United States Patent
Rich et al.

(10) Patent No.: US 12,253,691 B2
(45) Date of Patent: Mar. 18, 2025

(54) OPTICAL PRODUCTS, MASTERS FOR FABRICATING OPTICAL PRODUCTS, AND METHODS FOR MANUFACTURING MASTERS AND OPTICAL PRODUCTS

(71) Applicant: WAVEFRONT TECHNOLOGY, INC., Paramount, CA (US)

(72) Inventors: Christopher Chapman Rich, Rancho Palos Verdes, CA (US); Roger Winston Phillips, Santa Rosa, CA (US); Joel Mikael Petersen, Valley Village, CA (US); John Michael Tamkin, Pasadena, CA (US)

(73) Assignee: WAVEFRONT TECHNOLOGY, INC., Paramount, CA (US)

( * ) Notice: Subject to any disclaimer, the term of this patent is extended or adjusted under 35 U.S.C. 154(b) by 440 days.

(21) Appl. No.: 17/496,581

(22) Filed: Oct. 7, 2021

(65) Prior Publication Data
US 2022/0276501 A1    Sep. 1, 2022

Related U.S. Application Data

(60) Provisional application No. 63/088,944, filed on Oct. 7, 2020.

(51) Int. Cl.
*G02B 30/29*    (2020.01)
*B42D 25/324*   (2014.01)
(Continued)

(52) U.S. Cl.
CPC ............ *G02B 30/29* (2020.01); *G03B 35/24* (2013.01); *H04N 13/305* (2018.05)

(58) Field of Classification Search
CPC ......... G02B 30/29; G02B 27/22; G02B 5/32; B42D 25/324; B42D 25/378; B42D 25/21;
(Continued)

(56) References Cited

U.S. PATENT DOCUMENTS

| 2,278,970 A | 4/1942 | Atwood et al. |
| 2,590,906 A | 4/1952 | Tripp |
| | (Continued) | |

FOREIGN PATENT DOCUMENTS

| AU | 2011348479 A1 | 6/2013 |
| AU | 2014250638 | 11/2014 |
| | (Continued) | |

OTHER PUBLICATIONS

Choi et al., "Image degradation due to surface scatter in the presence of aberrations," Applied Optics, vol. 51, No. 5, pp. 535-546, Feb. 10, 2012.
(Continued)

*Primary Examiner* — Ryan D Howard
(74) *Attorney, Agent, or Firm* — Knobbe, Martens, Olson & Bear, LLP

(57) ABSTRACT

An optical product includes an array of lenses and first and second plurality of portions disposed under the array of lenses. Individual ones of the first plurality of portions can correspond to a point on a surface of a first 3D object, and include first non-holographic features configured to produce at least part of a first 3D image of the first 3D object. Individual ones of the second plurality of portions can correspond to a point on a surface of a second 3D object, and include second non-holographic features configured to produce at least part of a second 3D image of the second 3D object. The optical product can include an interference optical structure disposed with respect to the first and/or second non-holographic features.

15 Claims, 64 Drawing Sheets

(51) Int. Cl.
*G03B 35/24* (2021.01)
*H04N 13/305* (2018.01)
(58) Field of Classification Search
CPC .... B42D 25/22; B42D 25/351; B42D 25/342; B42D 25/373
See application file for complete search history.

(56) References Cited

U.S. PATENT DOCUMENTS

| | | |
|---|---|---|
| 3,338,730 A | 8/1967 | Slade et al. |
| 3,553,001 A | 1/1971 | Kohlschutter et al. |
| 4,124,947 A | 11/1978 | Kuhl et al. |
| 4,186,943 A | 2/1980 | Lee |
| 4,417,784 A | 11/1983 | Knop et al. |
| 4,434,010 A | 2/1984 | Ash |
| 4,534,398 A | 8/1985 | Crane |
| 4,681,451 A | 7/1987 | Guerra et al. |
| 4,705,300 A | 11/1987 | Berning et al. |
| 4,892,336 A | 1/1990 | Kaule et al. |
| 5,059,245 A | 10/1991 | Phillips et al. |
| 5,084,351 A | 1/1992 | Philips et al. |
| 5,105,306 A | 4/1992 | Ohala |
| 5,135,812 A | 8/1992 | Phillips et al. |
| 5,171,363 A | 12/1992 | Phillips et al. |
| 5,276,478 A | 1/1994 | Morton |
| 5,278,590 A | 1/1994 | Phillips et al. |
| 5,291,317 A | 3/1994 | Newswanger |
| 5,600,486 A | 2/1997 | Gal et al. |
| 5,689,340 A | 11/1997 | Young |
| 5,698,268 A | 12/1997 | Takagi et al. |
| 5,699,190 A | 12/1997 | Young et al. |
| 5,877,895 A | 3/1999 | Shaw et al. |
| 5,924,870 A | 7/1999 | Brosh et al. |
| 6,031,653 A | 2/2000 | Wang |
| 6,106,983 A | 8/2000 | Burke |
| 6,114,018 A | 9/2000 | Phillips et al. |
| 6,256,146 B1 | 7/2001 | Merrill et al. |
| 6,351,334 B1 | 2/2002 | Hsieh et al. |
| 6,410,213 B1 | 6/2002 | Raguin et al. |
| 6,424,467 B1 | 7/2002 | Goggins |
| 6,524,381 B1 | 2/2003 | Phillips et al. |
| 6,797,366 B2 | 9/2004 | Hanson et al. |
| 6,817,530 B2 | 11/2004 | Labrec et al. |
| 6,833,184 B2 | 12/2004 | Damnjanovic et al. |
| 6,838,166 B2 | 1/2005 | Phillips et al. |
| 6,875,522 B2 | 4/2005 | Seto et al. |
| 7,047,883 B2 | 5/2006 | Raksha et al. |
| 7,238,424 B2 | 7/2007 | Raksha et al. |
| 7,298,533 B2 | 11/2007 | Petersen et al. |
| 7,333,268 B2 | 2/2008 | Steenblik et al. |
| 7,470,318 B2 | 12/2008 | Cao et al. |
| 7,551,335 B2 | 6/2009 | Schilling et al. |
| 7,729,026 B2 | 6/2010 | Argoitia et al. |
| 7,811,725 B2 | 10/2010 | Chen et al. |
| 8,009,360 B2 | 8/2011 | Steenblik et al. |
| 8,025,239 B2 | 9/2011 | Labrec et al. |
| 8,077,393 B2 | 12/2011 | Steenblik et al. |
| 8,111,462 B2 | 2/2012 | Steenblik et al. |
| 8,120,855 B2 | 2/2012 | Steenblik et al. |
| 8,144,399 B2 | 3/2012 | Steenblik et al. |
| 8,254,030 B2 | 8/2012 | Steenblik et al. |
| 8,284,492 B2 | 10/2012 | Crane et al. |
| 8,310,760 B2 | 11/2012 | Steenblik et al. |
| 8,739,711 B2 | 6/2014 | Cote |
| 8,755,121 B2 | 6/2014 | Cape et al. |
| 8,773,763 B2 | 7/2014 | Steenblik et al. |
| 8,861,055 B2 | 10/2014 | Holmes et al. |
| 8,867,134 B2 | 10/2014 | Steenblik et al. |
| 8,964,296 B2 | 2/2015 | Hoffmuller et al. |
| 8,982,231 B2 | 3/2015 | Vincent |
| 9,016,726 B2 | 4/2015 | Rauch et al. |
| 9,132,690 B2 | 9/2015 | Raymond et al. |
| 9,234,992 B2 | 1/2016 | Hill et al. |
| 9,274,258 B2 | 3/2016 | Fuhse et al. |
| 9,827,802 B2 | 11/2017 | Fuhse et al. |
| 10,252,563 B2 | 4/2019 | Rich et al. |
| 10,525,759 B2 | 1/2020 | Rahm et al. |
| 10,838,218 B2 | 11/2020 | Phillips et al. |
| 10,850,550 B2 | 12/2020 | Rich et al. |
| 10,859,851 B2 | 12/2020 | Rich et al. |
| 11,113,919 B2 | 9/2021 | Rich et al. |
| 11,198,316 B2 | 12/2021 | Phillips et al. |
| 11,221,448 B2 | 1/2022 | Rich et al. |
| 11,590,790 B2 | 2/2023 | Rich et al. |
| 11,618,275 B2 | 4/2023 | Rich et al. |
| 11,675,203 B2 | 6/2023 | Phillips et al. |
| 11,840,112 B2 | 12/2023 | Phillips et al. |
| 11,861,966 B2 | 1/2024 | Rich et al. |
| 2003/0063239 A1 | 4/2003 | Suzuki |
| 2003/0137736 A1 | 7/2003 | Phillips |
| 2003/0179364 A1 | 9/2003 | Steenblik et al. |
| 2003/0183695 A1 | 10/2003 | Labrec et al. |
| 2003/0190473 A1 | 10/2003 | Argoitia et al. |
| 2004/0003758 A1 | 1/2004 | Bruckner et al. |
| 2004/0028905 A1 | 2/2004 | Phillips et al. |
| 2004/0196516 A1 | 10/2004 | Petersen et al. |
| 2004/0240777 A1 | 12/2004 | Woodgate et al. |
| 2005/0180020 A1 | 8/2005 | Steenblik et al. |
| 2007/0058260 A1 | 3/2007 | Steenblik et al. |
| 2007/0098989 A1 | 5/2007 | Raksha et al. |
| 2007/0206249 A1 | 9/2007 | Phillips et al. |
| 2008/0037131 A1 | 2/2008 | Steenblik et al. |
| 2008/0160185 A1 | 7/2008 | Endle et al. |
| 2008/0166505 A1 | 7/2008 | Huang et al. |
| 2008/0212192 A1 | 9/2008 | Steenblik et al. |
| 2008/0212193 A1 | 9/2008 | Steenblik et al. |
| 2008/0258456 A1 | 10/2008 | Rahm et al. |
| 2008/0309063 A1 | 12/2008 | Zintzmeyer |
| 2008/0310005 A1 | 12/2008 | Tonar et al. |
| 2008/0315574 A1 | 12/2008 | Emerich et al. |
| 2009/0021840 A1 | 1/2009 | Steenblik et al. |
| 2009/0034082 A1 | 2/2009 | Commander et al. |
| 2009/0078316 A1 | 3/2009 | Khazeni et al. |
| 2009/0102179 A1 | 4/2009 | Lo |
| 2009/0122412 A1 | 5/2009 | Steenblik et al. |
| 2010/0172000 A1 | 7/2010 | Holmes |
| 2010/0246019 A1 | 9/2010 | Booyens et al. |
| 2010/0308571 A1 | 12/2010 | Steenblik et al. |
| 2011/0019283 A1 | 1/2011 | Steenblik et al. |
| 2011/0036282 A1 | 2/2011 | Cote |
| 2011/0209328 A1 | 9/2011 | Steenblik et al. |
| 2012/0075701 A1 | 3/2012 | Phillips et al. |
| 2012/0099199 A1 | 4/2012 | Vasylyev |
| 2012/0237675 A1 | 9/2012 | Sharp et al. |
| 2012/0242075 A1 | 9/2012 | Lochbihler |
| 2012/0319395 A1 | 12/2012 | Fuhse et al. |
| 2013/0052373 A1 | 2/2013 | Noizet |
| 2013/0099474 A1 | 4/2013 | Fuhse et al. |
| 2013/0106092 A1 | 5/2013 | Holmes |
| 2013/0182300 A1 | 7/2013 | Müller et al. |
| 2013/0193679 A1 | 8/2013 | Fuhse et al. |
| 2013/0266722 A1 | 10/2013 | Hill et al. |
| 2013/0270813 A1 | 10/2013 | Hoffmuller et al. |
| 2014/0151996 A1 | 6/2014 | Camus |
| 2014/0160568 A1 | 6/2014 | Fuhse |
| 2014/0177008 A1 | 6/2014 | Raymond et al. |
| 2014/0184599 A1 | 7/2014 | Quilot et al. |
| 2014/0191500 A1 | 7/2014 | Holmes |
| 2014/0268332 A1 | 9/2014 | Guo et al. |
| 2014/0285892 A1 | 9/2014 | Sauvage-Vincent et al. |
| 2014/0346766 A1 | 11/2014 | Walter et al. |
| 2015/0084324 A1 | 3/2015 | Spehar |
| 2015/0084327 A1 | 3/2015 | Souparis |
| 2015/0198924 A1 | 7/2015 | Woida-O'Brien |
| 2015/0213666 A1 | 7/2015 | Schiffmann et al. |
| 2015/0258838 A1 | 9/2015 | Fuhse |
| 2015/0352884 A1 | 12/2015 | Fuhse et al. |
| 2016/0023495 A1 | 1/2016 | Fuhse et al. |
| 2016/0075164 A1 | 3/2016 | Sarrazin |
| 2016/0075166 A1 | 3/2016 | Ritter et al. |
| 2016/0167421 A1 | 6/2016 | Holmes |
| 2016/0176221 A1 | 6/2016 | Holmes |
| 2016/0178221 A1 | 6/2016 | Thornton |
| 2017/0023711 A1 | 1/2017 | Jiang et al. |

(56) References Cited

U.S. PATENT DOCUMENTS

| | | |
|---|---|---|
| 2017/0068025 A1 | 3/2017 | Ockenfuss |
| 2017/0239972 A1 | 8/2017 | Zhang et al. |
| 2017/0248746 A1 | 8/2017 | Banerjee et al. |
| 2018/0117951 A1 | 5/2018 | Demange et al. |
| 2018/0170094 A1 | 6/2018 | Raksha et al. |
| 2018/0239070 A1 | 8/2018 | England et al. |
| 2018/0272788 A1 | 9/2018 | Bleiman et al. |
| 2019/0225003 A1 | 7/2019 | Raksha |
| 2019/0313086 A1 | 10/2019 | Contreras et al. |
| 2020/0039279 A1 | 2/2020 | Rich et al. |
| 2021/0101402 A1 | 4/2021 | Kohlmann et al. |
| 2021/0271094 A1 | 9/2021 | Phillips |
| 2021/0271105 A1 | 9/2021 | Rich et al. |
| 2021/0347194 A1 | 11/2021 | Rich et al. |
| 2021/0370701 A1 | 12/2021 | Godfrey |
| 2022/0221735 A1 | 7/2022 | Rich et al. |
| 2022/0227159 A1 | 7/2022 | Phillips et al. |
| 2022/0237979 A1 | 7/2022 | Rich et al. |
| 2022/0276502 A1 | 9/2022 | Rich et al. |
| 2023/0264510 A1 | 8/2023 | Rich et al. |
| 2024/0059094 A1 | 2/2024 | Rich et al. |
| 2024/0083189 A1 | 3/2024 | Rich et al. |
| 2024/0343057 A1 | 10/2024 | Phillips et al. |

FOREIGN PATENT DOCUMENTS

| | | |
|---|---|---|
| AU | 2014250641 | 11/2014 |
| CN | 1449942 | 10/2003 |
| CN | 1637078 | 7/2005 |
| CN | 1906547 | 1/2007 |
| CN | 101563640 | 10/2009 |
| CN | 102712206 | 10/2012 |
| CN | 103748284 | 4/2014 |
| CN | 104769490 | 7/2015 |
| CN | 104838304 | 8/2015 |
| CN | 105636798 | 6/2016 |
| CN | 104736346 | 11/2016 |
| CN | 105291630 | 1/2017 |
| CN | 106660385 | 8/2018 |
| CN | 109328314 | 2/2019 |
| CN | 106796306 | 11/2020 |
| DE | 10 2005 061 749 | 7/2007 |
| DE | 10 2015 015 991 | 6/2017 |
| EP | 0 277 423 | 8/1988 |
| EP | 0 323 108 | 7/1989 |
| EP | 2 270 557 | 1/2011 |
| EP | 2 338 692 | 6/2011 |
| EP | 2 365 374 | 9/2011 |
| EP | 2 365 375 | 9/2011 |
| EP | 2 365 378 | 9/2011 |
| EP | 1 776 242 | 10/2011 |
| EP | 2 384 902 | 11/2011 |
| EP | 2 450 735 | 5/2012 |
| EP | 2 461 203 | 6/2012 |
| EP | 2 608 161 | 6/2013 |
| EP | 2 660 070 | 11/2013 |
| EP | 2 708 371 | 3/2014 |
| EP | 2 727 742 | 5/2014 |
| EP | 2 853 411 | 4/2015 |
| EP | 2 860 042 | 4/2015 |
| EP | 2 886 356 | 6/2015 |
| EP | 2 365 376 | 10/2015 |
| EP | 2 400 338 | 12/2015 |
| EP | 3339048 | 6/2018 |
| EP | 3 466 711 | 6/2020 |
| JP | 5132540 | 1/2013 |
| JP | 2013-509312 | 3/2013 |
| JP | 2013-509314 | 3/2013 |
| KR | 10-2010-0052511 | 5/2010 |
| KR | 10-2012-0058726 | 6/2012 |
| KR | 10-1429755 | 8/2014 |
| KR | 10-2015-0077923 | 7/2015 |
| KR | 10-2014-0020961 | 11/2018 |
| KR | 10-2019-0028142 | 3/2019 |
| WO | WO 95/026916 | 10/1995 |
| WO | WO 97/47478 | 12/1997 |
| WO | WO 98/015418 | 4/1998 |
| WO | WO 00/013916 | 3/2000 |
| WO | WO 01/070516 | 9/2001 |
| WO | WO 02/040599 | 5/2002 |
| WO | WO 2005/038136 | 4/2005 |
| WO | WO 2005/106601 | 11/2005 |
| WO | WO 2006/013215 | 2/2006 |
| WO | WO 2006/125224 | 11/2006 |
| WO | WO 2007/020048 | 2/2007 |
| WO | WO 2007/056782 | 5/2007 |
| WO | WO 2007/079851 | 7/2007 |
| WO | WO 2007/131375 | 11/2007 |
| WO | WO 2008/008635 | 1/2008 |
| WO | WO 2009/010714 | 1/2009 |
| WO | WO 2009/126030 | 10/2009 |
| WO | WO 2011/051668 | 5/2011 |
| WO | WO 2011/051670 | 5/2011 |
| WO | WO 2011/066990 | 6/2011 |
| WO | WO 2011/082761 | 7/2011 |
| WO | WO 2011/116425 | 9/2011 |
| WO | WO 2012/027779 | 3/2012 |
| WO | WO 2012/048809 | 4/2012 |
| WO | WO 2012/048847 | 4/2012 |
| WO | WO 2012/055505 | 5/2012 |
| WO | WO 2012/055506 | 5/2012 |
| WO | WO 2012/055537 | 5/2012 |
| WO | WO 2012/055538 | 5/2012 |
| WO | WO 2012/084169 | 6/2012 |
| WO | WO 2012/084182 | 6/2012 |
| WO | WO 2013/007374 | 1/2013 |
| WO | WO 2013/055318 | 4/2013 |
| WO | WO 2013/079542 | 6/2013 |
| WO | WO 2013/091819 | 6/2013 |
| WO | WO 2014/024145 | 2/2014 |
| WO | WO 2014/044402 | 3/2014 |
| WO | WO 2014/060089 | 4/2014 |
| WO | WO 2014/060115 | 4/2014 |
| WO | WO 2014/065799 | 5/2014 |
| WO | WO 2014/095057 | 6/2014 |
| WO | WO 2014/174402 | 10/2014 |
| WO | WO 2015/011494 | 1/2015 |
| WO | WO 2015/078572 | 6/2015 |
| WO | WO 2015/078573 | 6/2015 |
| WO | WO 2016/005158 | 1/2016 |
| WO | WO 2016/065331 | 4/2016 |
| WO | WO 2016/082153 | 6/2016 |
| WO | WO 2017/011476 | 1/2017 |
| WO | WO 2017/184581 | 10/2017 |
| WO | WO 2019/070335 | 4/2019 |
| WO | WO 2019/077419 | 4/2019 |
| WO | WO 2020/205053 | 10/2020 |
| WO | WO 2020/214239 | 10/2020 |
| WO | WO 2022/077011 | 4/2022 |
| WO | WO 2022/077012 | 4/2022 |
| WO | WO 2022/087550 | 4/2022 |

OTHER PUBLICATIONS

"Diffuse reflection." Wikipedia, https://en.wikipedia.org/wiki/Diffuse_reflection, 5 pages, last edited Nov. 15, 2021.
"Korrelation." Wikipedia, https://de.wikipedia.org/wiki/Korrelation; see English Entry "Correlation." Wikipedia, https://en.wikipedia.org/wiki/Correlation, 21 pages, last edited Sep. 5, 2022.
"Light Waves—Reflection of light," BBC Bitesize, https://www.bbc.co.uk/bitesize/guides/z2bwtv4/revision/1#:~: text=If a surface is rough, 4 pages, 2022.
"Specular Reflection." RP Photonics Encyclopedia, https://www.rp-photonics.com/specular_reflection.html, 4 pages, 2022.
"Specular and Diffuse Reflection: 13 Important Concepts," Lambda Geeks, https://lambdageeks.com/specular-and-diffuse-reflection/, 23 pages, 2022.
Communication of a Notice of Opposition received in European Patent Application No. 16825055.3, dated Aug. 6, 2021.
Reply of the Patent Proprietor to the Notice of Opposition in European Patent Application No. 16825055.3, dated Jan. 3, 2022.
Communication of Letter from the Opponent received in European Patent Application No. 16825055.3, dated Mar. 14, 2022.

(56) References Cited

OTHER PUBLICATIONS

Written Submission in Preparation to/during Oral Proceedings in European Patent Application No. 16825055.3, dated Jul. 19, 2022.
Summons to Attend Oral Proceedings and Non-Binding Preliminary Opinion of the Opposition Division in European Patent Application No. 16825055.3, dated Jul. 19, 2022.
Dobrowolski et al., "Research on Thin Film Anticounterfeiting Coatings at the National Research Council of Canada", Applied Optics, Jul. 15, 1989, vol. 28, No. 14, pp. 2702-2717.
European Commission, "Counterfeit and Piracy Watch List", http://trade.ec.europa.eu/doclib/docs/2018/december/tradoc_157564.pdf, 2018, 40 pages.
Glausch et al., "Special Effect Pigments", Vincentz Verlag, Hannover, Germany, 1998, pp. 5-13.
Glausch et al., "Special Effect Pigments", Vincentz Verlag, Hannover, Germany, 1998, pp. 36-39.
"Global Brand Counterfeiting Report, 2018- Research and Markets", https://www.researchandmarkets.com/reports/4438394/global-brand-counterfeiting-report-2018, 3 pages.
Hecht, Eugene, "Optics", Third Edition, Addison-Wesley Publishing Company, Ch. 9.3.1, 1998, pp. 385-392.
"Insights into New OVDs", Presented by Dr. Mark Deakes at the Holography Conference, Nov. 2017, Barcelona, 38 pages.
Leech, Patrick W., "Microrelief Structures for Anti-Counterfeiting Applications", Microelectronic Engineering 65, 2003, pp. 439-446.
Lin et al., "Design and Fabrication of an Alternating Dielectric Multi-Layer Device for Surface Plasmon Resonance Sensor", Sensors and Actuators, B, 113, 2006, pp. 169-176.
"Mosaic", https://web.archive.org/web/20200128063103/http://www.en.wikipedia.org/wiki/Mosaic, as archived Jan. 28, 2020 in 35 pages.
Park et al., "Trans-Reflective Color Filters Based on a Phase Compensated Etalon Enabling Adjustable Color Saturation", Scientific Reports, May 6, 2016, vol. 6, No. 1, pp. 10.
"Positive and Negative Photoresist", https://web.archive.org/web/20151017081844/http://www.ece.gatech.edu:80/research/labs/vc/theory/PosNegRes.html, as archived Oct. 17, 2015 in 1 page.
Program of the Topical Meeting on Optical Interference Coatings, Optical Society of America, Asilomar Conference Grounds, Pacific Grove, California, Feb. 24-26, 1976, 24 pages.
Rancourt, James D., "Optical Thin Films: User's Handbook", Macmillan Publishing Company, 1987, Ch. 4, pp. 110-113.
Sandberg, Howard, "The History of Dichroic Glass", https://web.archive.org/web/20111108142943/http://www.cbs-dichroic.com/Dichro-History.pdf, Nov. 8, 2011, 3 pages.
Van Renesse, Rudolf L., "Optical Document Security", 2nd Edition, 1998, Fig. 4.6, pp. 88-89.
Van Renesse, Rudolf L., "Optical Document Security", 2nd Edition, 1998, pp. 300-303.
Wang, Yu, "Metal/Dielectric-Film Interference Color Filters", NASA Tech Briefs, vol. 23, No. 2, Electronics & Computers, Feb. 1, 1999, 3 pages.
International Search Report and Written Opinion received in PCT Application No. PCT/US2015/057235, dated Feb. 23, 2016 in 12 pages.
International Preliminary Report on Patentability and Written Opinion received in PCT Application No. PCT/US2015/057235, dated May 4, 2017 in 10 pages.
International Search Report and Written Opinion received in PCT Application No. PCT/US2016/041935, dated Nov. 4, 2016 in 12 pages.
International Preliminary Report on Patentability and Written Opinion received in PCT Application No. PCT/US2016/041935, dated Jan. 25, 2018 in 9 pages.
International Search Report and Written Opinion received in PCT Application No. PCT/US2017/028094, dated Aug. 14, 2017 in 14 pages.
International Preliminary Report on Patentability and Written Opinion received in PCT Application No. PCT/US2017/028094, dated Nov. 1, 2018 in 11 pages.
International Search Report and Written Opinion received in PCT Application No. PCT/IB2018/056296, dated Dec. 11, 2018 in 27 pages.
International Preliminary Report on Patentability and Written Opinion received in PCT Application No. PCT/IB2018/056296, dated Apr. 21, 2020 in 24 pages.
International Search Report and Written Opinion received in PCT Application No. PCT/US2020/018913, dated Jun. 16, 2020 in 10 pages.
International Preliminary Report on Patentability and Written Opinion received in PCT Application No. PCT/US2020/018913, dated Oct. 28, 2021 in 8 pages.
International Search Report and Written Opinion received in PCT Application No. PCT/US2021/071246, dated Nov. 30, 2021 in 8 pages.
International Search Report and Written Opinion received in PCT Application No. PCT/US2018/045278, dated Dec. 12, 2018 in 21 pages.
International Preliminary Report on Patentability and Written Opinion received in PCT Application No. PCT/US2018/045278, dated Apr. 16, 2020 in 18 pages.
International Search Report and Written Opinion received in PCT Application No. PCT/US2020/016448, dated Jun. 16, 2020 in 14 pages.
International Preliminary Report on Patentability and Written Opinion received in PCT/US2020/016448, dated Oct. 14, 2021 in 11 pages.
International Search Report and Written Opinion received in PCT Application No. PCT/US2021/071765, dated Jan. 26, 2022 in 10 pages.
International Search Report and Written Opinion received in PCT Application No. PCT/US2021/071763, dated Mar. 21, 2022 in 7 pages.
Yen, Eugene K. et al., "The Ineffectiveness of the Correlation Coefficient for Image Comparisons," http://lib-www.lanl.gov/la-pubs/00418797.pdf, LA-UR-96-2474, 13 pages (1996).
Decision Rejecting the Opposition in European Patent Application No. 16825055.3, dated Jul. 4, 2023.
Notice of Appeal in European Patent Application No. 16825055.3, filed Oct. 26, 2023.
Statement of Grounds of Appeal in European Patent Application No. 16825055.3, dated Jan. 9, 2024.
Reply to Appeal in European Patent Application No. 16825055.3, dated May 14, 2024.
Letter of the Opponent in European Patent Application No. 16825055.3, dated Jul. 8, 2024.
International Preliminary Report on Patentability and Written Opinion received in PCT Application No. PCT/US2021/071765, dated Mar. 28, 2023 in 8 pages.
International Preliminary Report on Patentability and Written Opinion received in PCT Application No. PCT/US2021/071763, dated Mar. 28, 2023 in 5 pages.

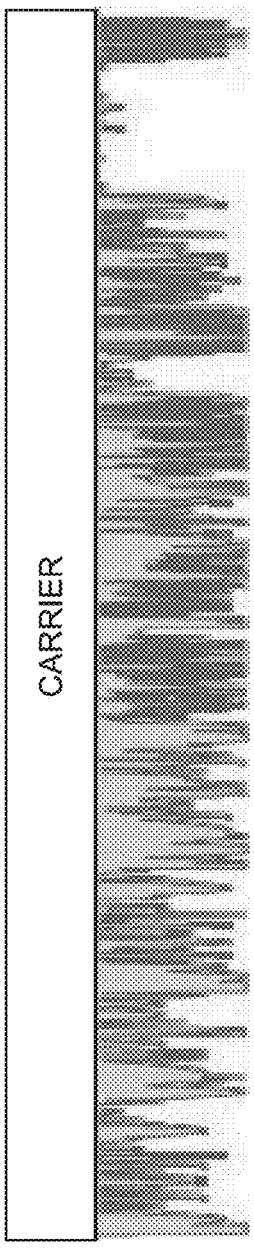
FIG. 1E-1a  100% Diffuse, 0% Specular
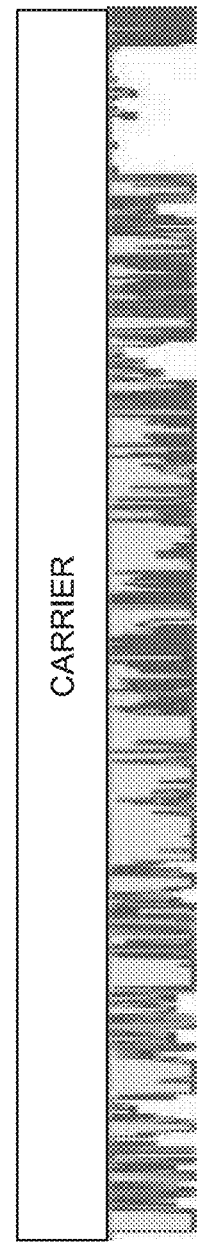
FIG. 1E-1b  70% Diffuse, 30% Specular
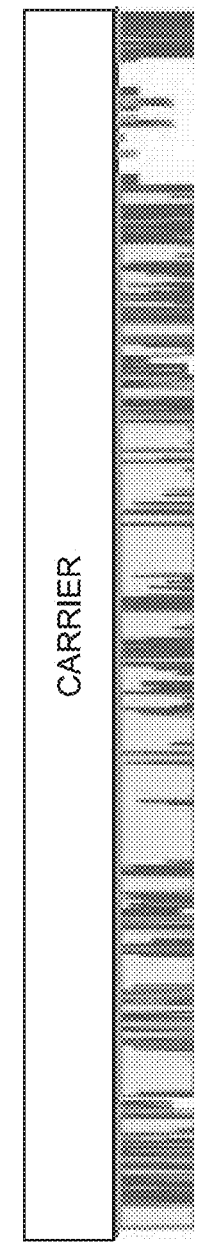
FIG. 1E-1c  40% Diffuse, 60% Specular
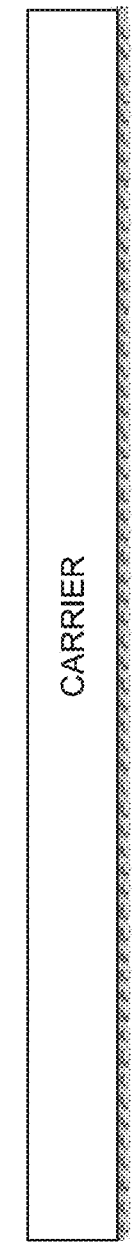
FIG. 1E-1d  0% Diffuse, 100% Specular
VARIABLE SPECULAR REFLECTION FROM A DIFFUSE SURFACE (DASHED LINE INDICATES REFLECTIVE COATING)

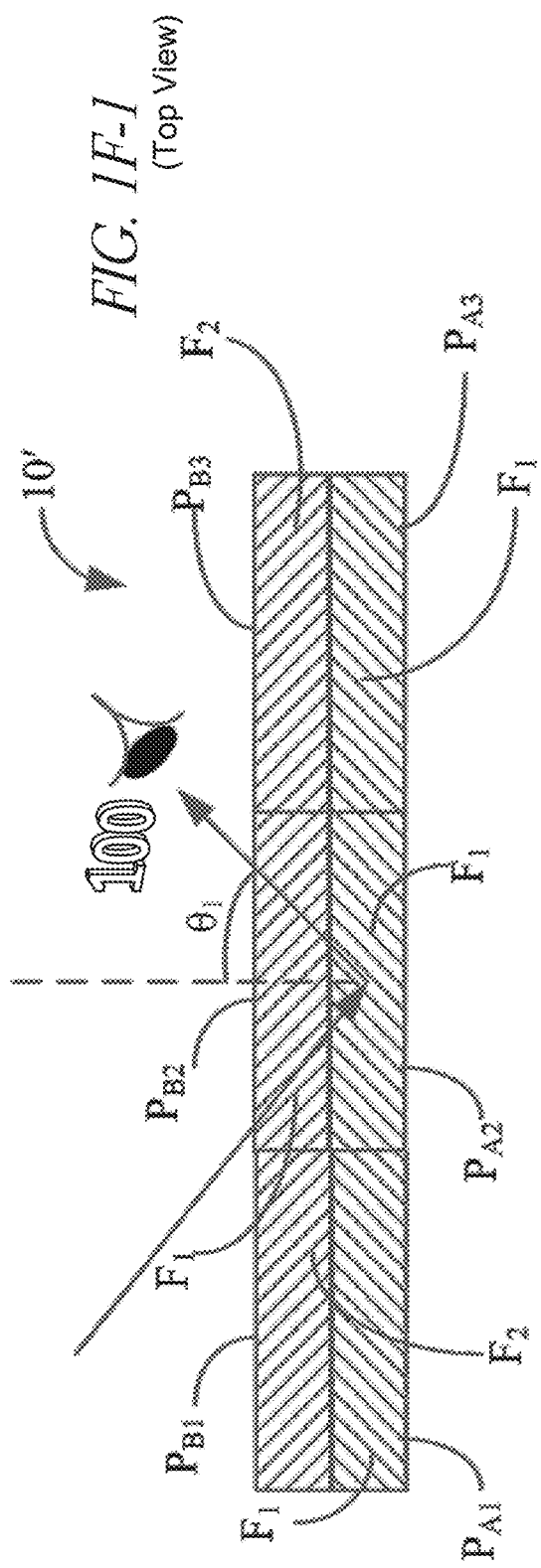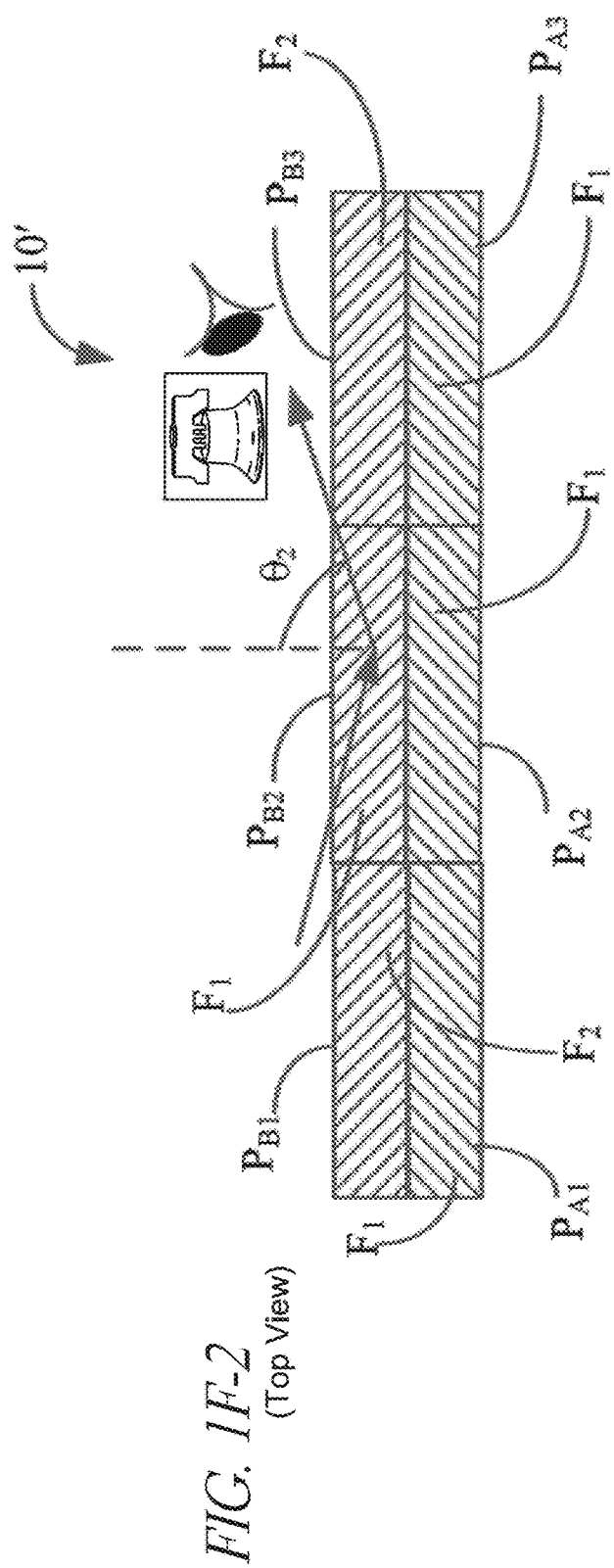

FIG. 1G-1
(Top View)
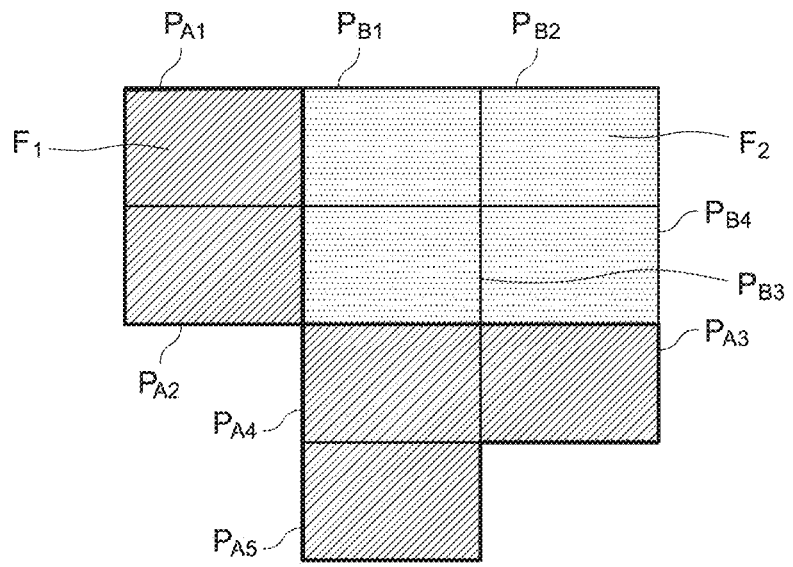
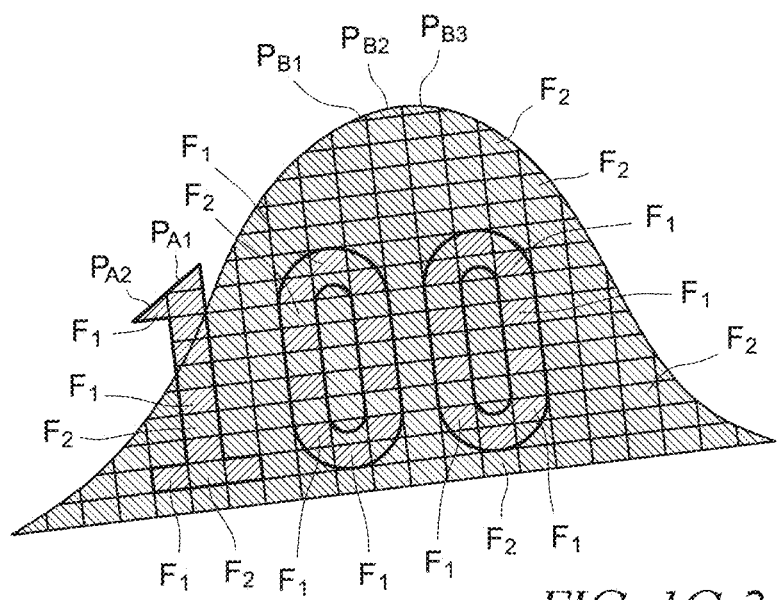
FIG. 1G-2
(Top View)

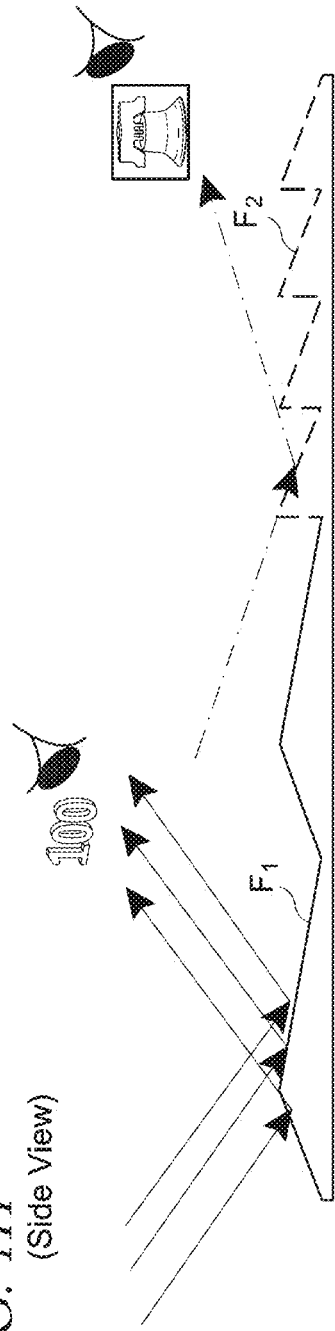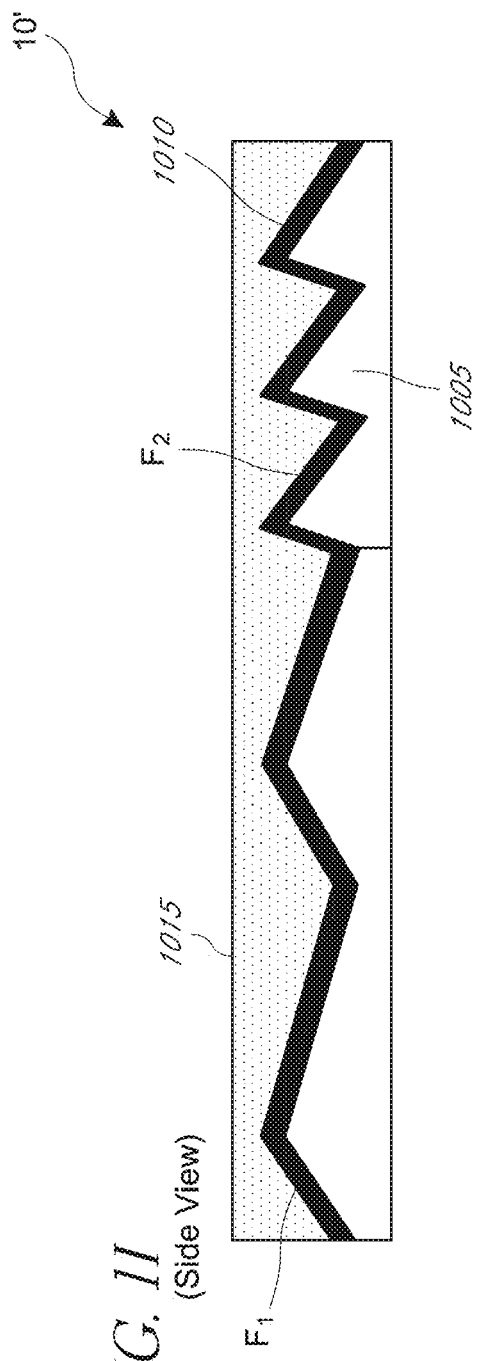
FIG. 1H (Side View)
FIG. 1I (Side View)

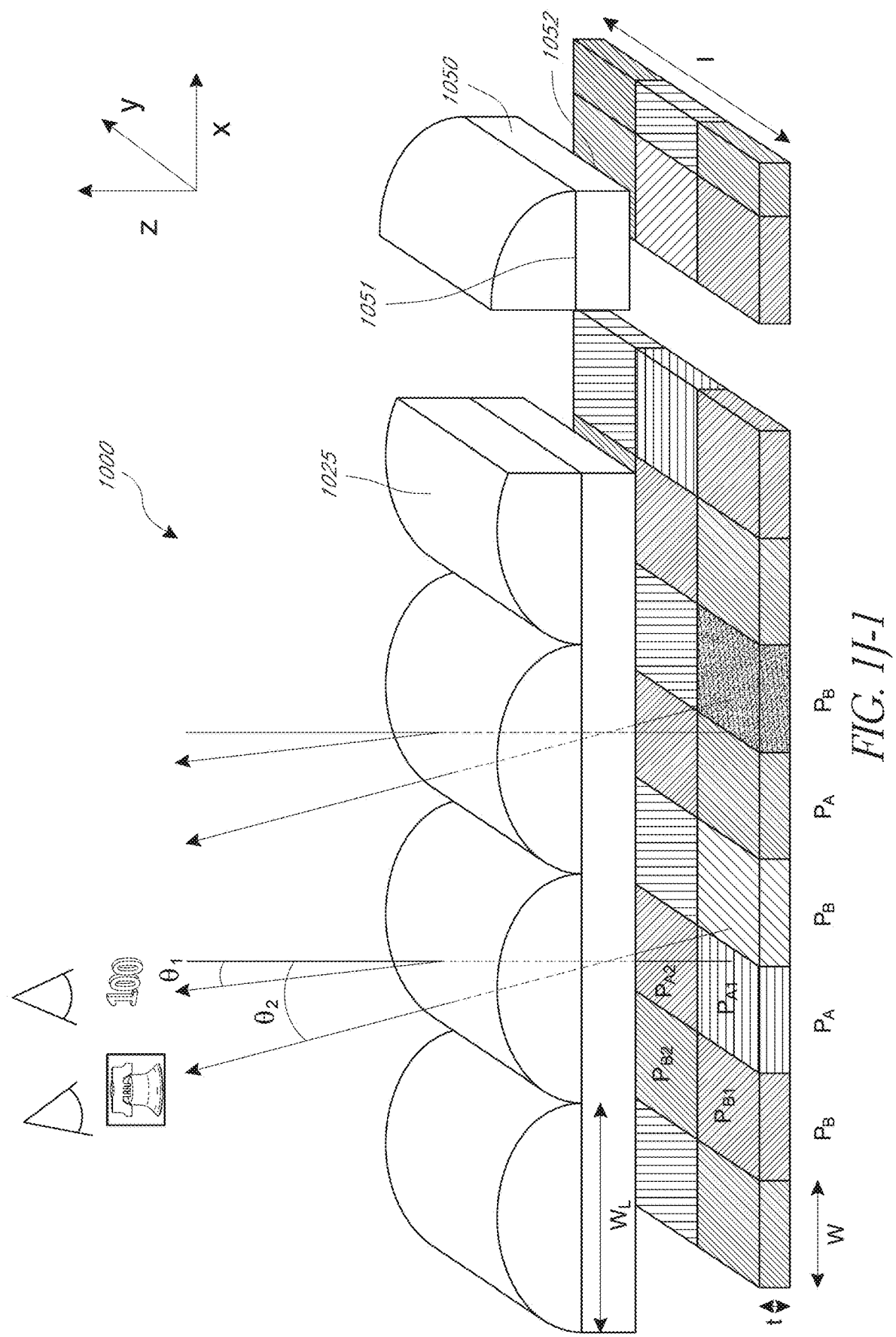

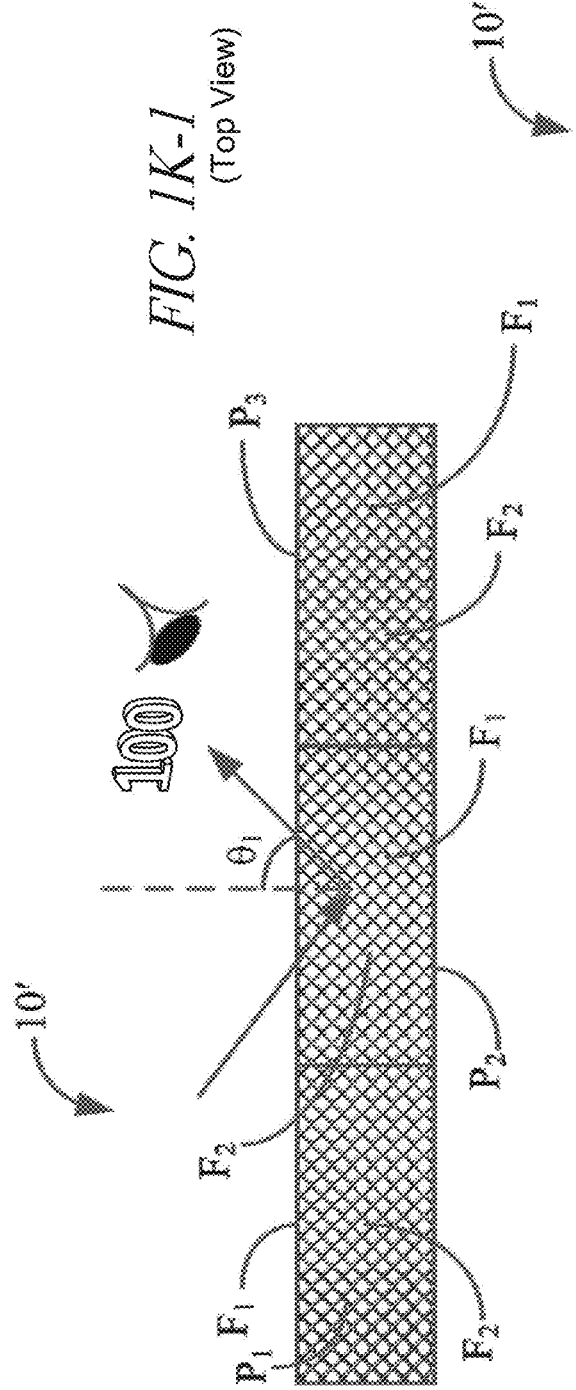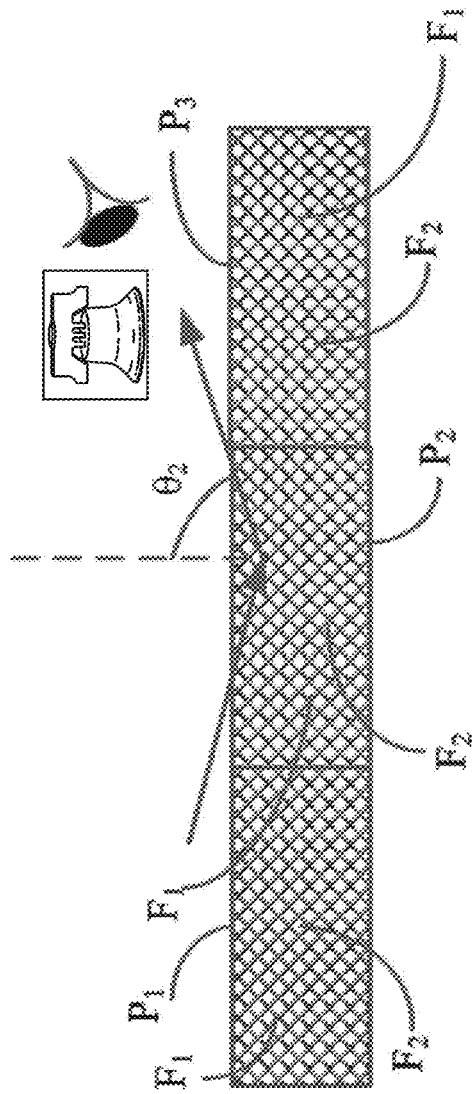

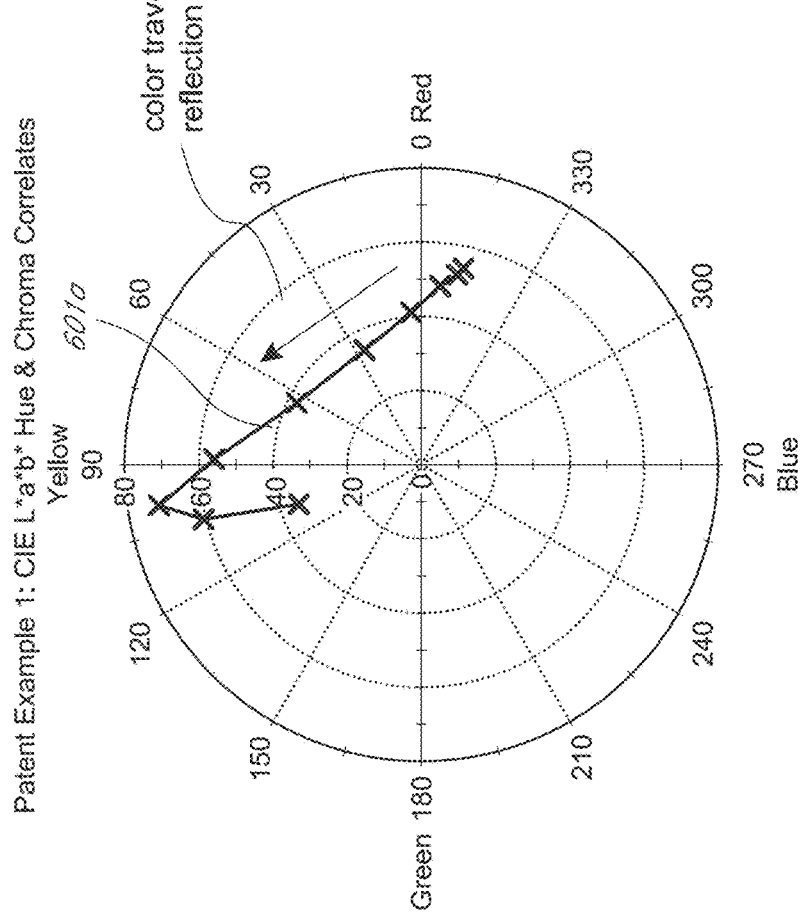
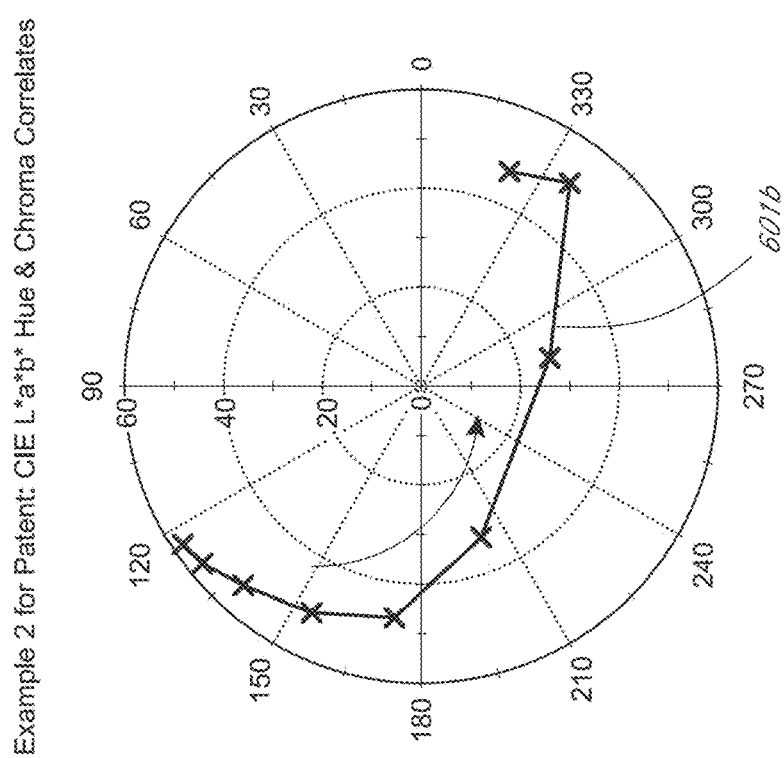
Fig. 16B
Fig. 16A

CIE 1931 Chromaticity Diagram

CIE 1931 Chromaticity Diagram

*CIE 1931 Chromaticity Diagram*

CIE 1931 Chromaticity Diagram

CIE 1931 Chromaticity Diagram

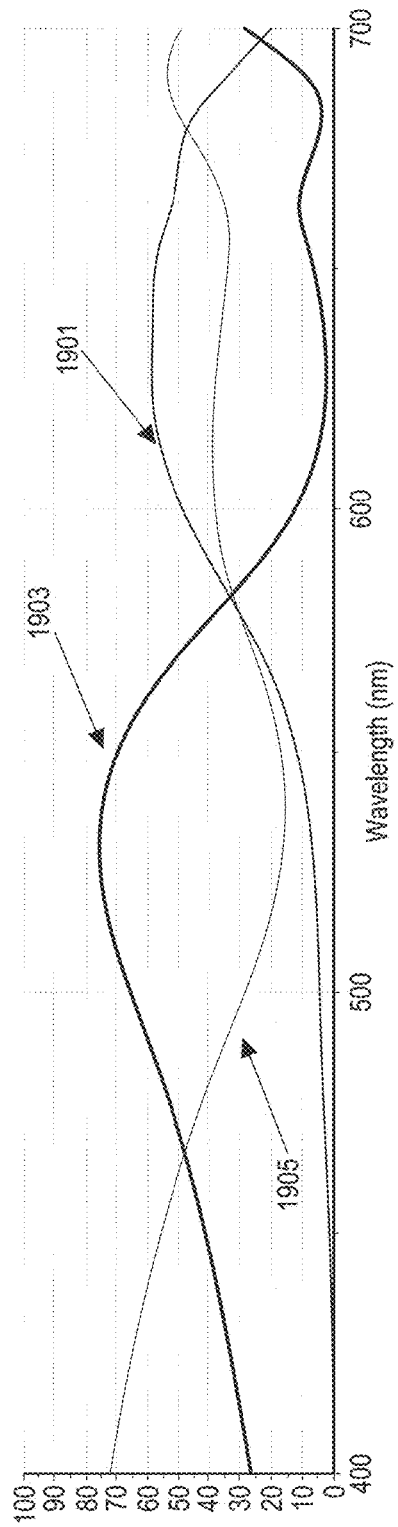
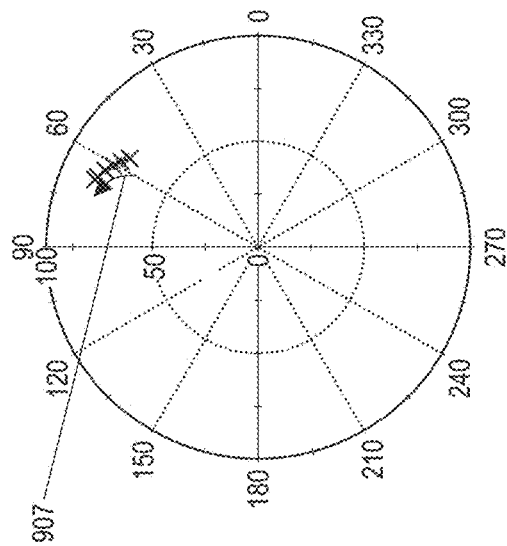
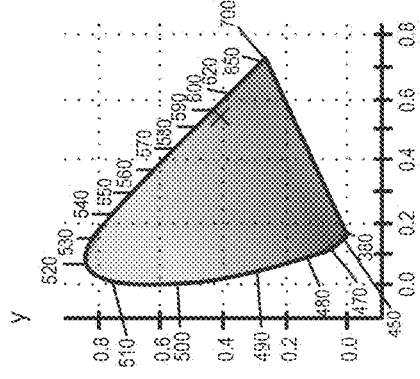
Fig. 29A
Fig. 29C
Fig. 29B

*CIE 1931 Chromaticity Diagram*

CIE 1931 Chromaticity Diagram

CIE 1931 Chromaticity Diagram

OPTICAL PRODUCTS, MASTERS FOR FABRICATING OPTICAL PRODUCTS, AND METHODS FOR MANUFACTURING MASTERS AND OPTICAL PRODUCTS

CROSS-REFERENCE TO RELATED APPLICATIONS

This application claims the benefit of priority to U.S. Provisional Application No. 63/088,944, entitled "OPTICAL PRODUCTS, MASTERS FOR FABRICATING OPTICAL PRODUCTS, AND METHODS FOR MANUFACTURING MASTERS AND OPTICAL PRODUCTS," filed Oct. 7, 2020. The entirety of each application referenced in this paragraph is incorporated herein by reference.

TECHNICAL FIELD

The present application generally relates to optical products, masters (e.g., master and/or daughter shims) for fabricating an optical product, and methods for manufacturing the masters and optical products. In particular, the optical product can be configured, when illuminated, to reproduce by reflected (or refracted) and/or transmitted light, one or more 3D images (e.g., one or more images that appear three-dimensional) of at least a part of one or more 3D objects. In various implementations, the optical product can include lenses to provide an avenue to switch or flip between the images. The optical products can include non-holographic features with thin interference structures, films, coatings, and pigments potentially configured to produce one or more 3D images in color in both reflection mode and transmission mode. These structures, films, coatings, and pigments can possibly exhibit color shifting properties with changes in reflection and/or transmission potentially with a change in the angle of incidence or the viewing angle.

DESCRIPTION OF THE RELATED TECHNOLOGY

Optical products can be used for a variety of purposes such as to reproduce a 3D image. Such products can be placed on decorative signs, labels, packaging, and consumer goods. Counterfeiting continues at a high level and poses risks. Given the level of counterfeiting, an easy identifiable image on a tag or on the actual item is desirable for the public at large so individuals can tell if they are receiving a genuine article or a fake one. Accordingly, some optical products can be used as an anti-counterfeit feature, for example, on goods (e.g., handbags, watches, clothing, cosmetics, pharmaceuticals, etc.) or on currency (e.g., a banknote). Holograms have traditionally been used as a counterfeit deterrent. However, this technology has become so widespread with hundreds if not thousands of holographic shops around the world that holograms are now viewed as having poor security. Optically variable inks and optically variable magnetic inks have also enjoyed for the past decade a high security place on banknotes. However, these products have now been simulated or have been even made from similar materials as the originals that these security elements are now being questioned as a high security feature. Motion type security elements have been adopted into banknotes, but even here, security has been compromised as this feature has also been used on commercial products. Thus, what is needed is a new security feature that the average person readily recognizes, has no resemblance to holograms or inks, is readily verified as to its authenticity, is difficult to counterfeit, is easily manufactured in quantity and can be readily incorporated into an item such as packaging, a tag, a consumer product, or a banknote.

Color shifting features can be used to prevent counterfeiting. The color shifting effect produced by color shifting materials can be easy for the common person to observe. The color shifting effect produced by the color shifting features, however, can be impractical to recreate using counterfeit copies produced by color copiers, printers and/or photographic equipment. Color copiers, printers and/or photographic equipment use pigments based on dyes having absorption and as such the printed colors can be insensitive to a change in the viewing angle. Therefore, the difference between an authentic item comprising color shifting features and a fake one can be detected by tilting the item to observe if there is a color shift. Some color shifting features that are available are opaque and exhibit a color shift for reflection mode. Additionally, counterfeiters have developed sophisticated methods that compromise the effectiveness of the existing reflective color shifting features as counterfeit protection. Thus, a new anti-counterfeit optical product that is difficult to counterfeit and can be readily incorporated into an item such as packaging, a tag, a consumer product, or a banknote is desirable.

Manufacturing such optical products, e.g., in relatively large quantities for commercial use, can utilize a master to fabricate the optical product. A master can be either a negative or positive master. For example, a negative master can form a surface of the optical product that is complementary to the surface of the master. As another example, a positive master can provide a surface for the optical product that is substantially similar to the surface of the master.

BRIEF DESCRIPTION OF THE DRAWINGS

FIGS. 1E-1a, 1E-1b, 1E-1c, and 1E-1d show an example of height modulation to vary the ratio of specular reflecting features to diffusing features in accordance with certain embodiments described herein.

FIG. 1E-2 schematically illustrates an example half-tone pattern and/or screen that can be used in certain embodiments described herein.

FIG. 1E-3 schematically illustrates another example half-tone pattern and/or screen that can be used in certain embodiments described herein.

FIG. 1E-4 schematically illustrates an example greyscale that can be used in certain embodiments described herein.

FIGS. 1F-1, 1F-2, 1G-1 and 1G-2 schematically illustrate top views of an optical product including a plurality of portions, each portion comprising a plurality of optical features that are configured to produce different distinct images when viewed from different directions.

FIG. 1H schematically illustrates an enlarged side view of a portion of an optical product including a plurality of optical features that are configured to produce different distinct images when viewed from different directions.

FIG. 1I schematically illustrates a side view of an embodiment of an optical product including a polymeric substrate comprising a plurality of optical features that are configured to produce different distinct images when viewed from different directions wherein the plurality of optical features are coated with a reflective material and a protective coating.

FIG. 1J-1 schematically illustrates an isometric view of an example optical product including an array of lenses disposed over a plurality of portions having optical features as described herein. The optical product is configured to present different distinct images when viewed from different directions.

FIG. 1J-2 schematically illustrates an isometric view of an example optical product including an array of prisms disposed over a plurality of portions having optical features as described herein. The optical product is configured to present different distinct images when viewed from different directions.

FIG. 1J-3 schematically illustrates a 1D lens array compatible with certain embodiments described herein.

FIG. 1J-4 schematically illustrates a 2D lens array compatible with certain embodiments described herein.

FIG. 1J-5 schematically illustrates a cross-sectional view of a product comprising a plurality of portions including optical features that are configured to produce one or more images, some of which can be viewed by a user at different view angles. FIG. 1J-6 illustrates a cross-sectional view of the product depicted in FIG. 1J-5 including a lenticular element. FIG. 1J-7 depicts a lenticular element disposed over a facet configured to specularly reflect incident light that is capable of magnifying the range of local surface normal.

FIG. 1J-8 illustrates an embodiment of an optical product that is configured to produce a first image viewable from a first direction and a second image viewable from a second direction. The first and the second image can correspond to right side-view and left side-view of an object.

FIG. 1J-9 illustrates a cross-sectional view of a product comprising a plurality of portions including optical features integrated with lenses, mirrors or prisms that are configured to produce different images that can be viewed by a user at different view angles. FIG. 1J-10 illustrates a bottom view of the product illustrated in FIG. 1J-9. FIG. 1J-11 illustrates a bottom view of another embodiment of the product.

FIGS. 1K-1 and 1K-2 schematically illustrate top views of an optical product including a plurality of portions, each portion comprising a plurality of optical features that are configured to produce different distinct images when viewed from different directions.

FIG. 2 illustrates an example method to manufacture a master for fabricating an optical product in accordance with certain embodiments described herein.

FIG. 5 schematically illustrates a cross-sectional view of an example optical product with an interference optical structure disposed on non-holographic features.

FIG. 6 schematically illustrates an example optical product producing colored depth perception in an image.

FIG. 8 shows another example view of a reproduced object and background.

FIG. 9 schematically illustrates an example optical product with an array of lenses.

FIG. 10 schematically illustrates an example optical product with an interference optical structure disposed on lenses.

FIG. 11 schematically illustrates a side view of an optical structure configured to be used as a security feature.

FIGS. 12A-1 and 12A-2 schematically illustrate side views of optical structures configured to be used as a security feature in the form of a platelet encapsulated with an encapsulating layer, comprising, for example, a $SiO_2$ layer and silica spheres.

FIGS. 12B-1 and 12B-2 illustrates a plurality of platelets dispersed in a polymer which can comprise an ink or a paint medium.

FIGS. 16A-16D and 17A-17D are a* b* plots showing the color travel or change in reflection and transmission respectively for four different example optical structures.

FIG. 29A shows the variation of the transmittance, reflectance and absorptance with wavelength for a fifth example of the optical structure shown in FIG. 24A or 24B at a viewing angle of about 0 degrees with respect to a normal to the surface of the optical structure.

FIG. 29B is a CIE 1931 color space chromaticity diagram showing the x and y chromaticity coordinates of light transmitted through the fifth example of the optical structure shown in FIG. 24A or 24B for different viewing angles between 0 degrees and 40 degrees with respect to a normal to a surface of the optical structure.

FIG. 29C illustrates the a*b* values in the CIE L*a*b* color space when the fifth example of the optical structure shown in FIG. 24A or 24B is viewed in the transmission mode at different viewing angles between 0 degrees and 40 degrees with respect to the normal to the surface of the fifth example of the optical structure.

DETAILED DESCRIPTION

Figure 1A:
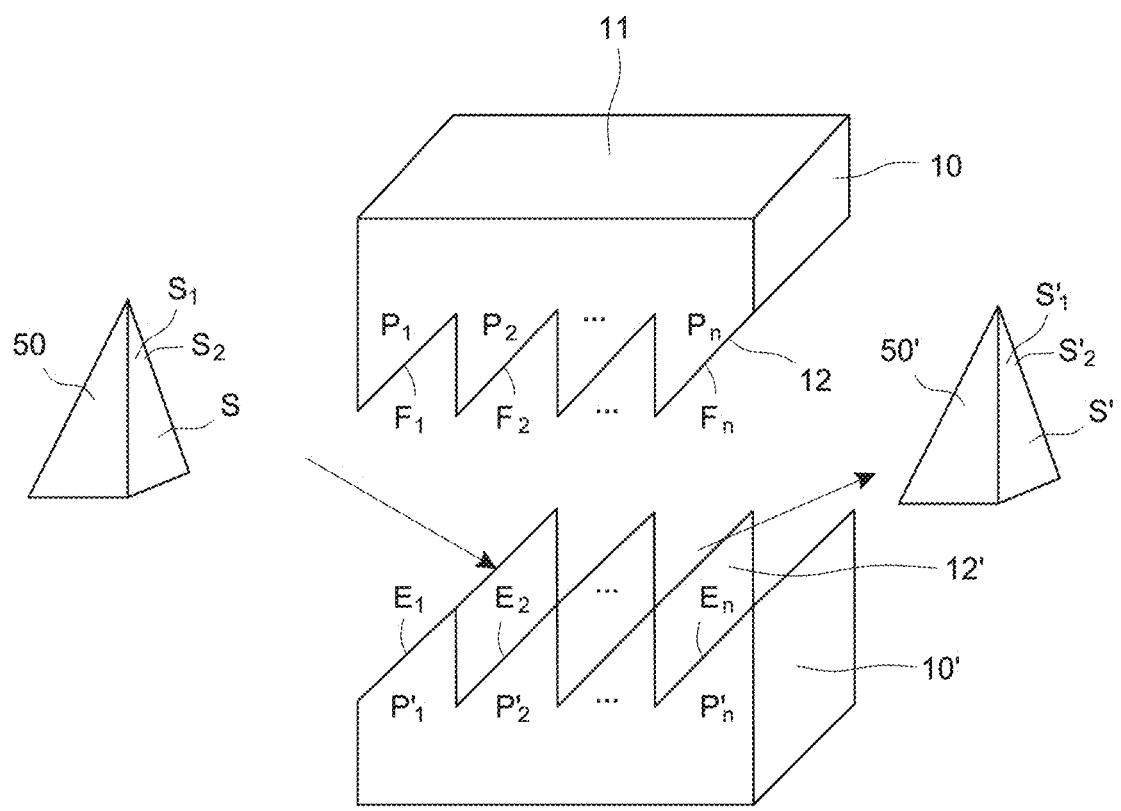
FIG. 1A schematically illustrates an example master and optical product in accordance with certain embodiments described herein.

In various embodiments, a master (e.g., a master and/or daughter shim) for fabricating an optical product is provided. The optical product, when illuminated, can reproduce an overt 3D image (e.g., an image that appears 3D to the naked eye) of a 3D object. Compared to ink printed images, the reflective surface of various embodiments of the optical product can produce a brighter mirror-like image produced by reflecting (or refracting) light incident on the surface. In certain such embodiments, the surface normals of the 3D object are mimicked as surface relief on the master and/or optical product. The surface relief on the master and/or optical product can be thinner than the 3D object, yet produce the same appearance of the 3D object. This property is similar to Fresnel lenses, where the surface relief allows a lens to be produced that is thinner than a comparable non-Fresnel lens. Unlike Fresnel lenses, however, certain embodiments disclosed herein are not limited in the type of 3D object that can be reproduced (e.g., linear and regularly shaped objects). As such, realistic and bright 3D images can be produced on relatively thin films (e.g., 300 μm and less in thickness, 250 μm and less in thickness, 200 μm and less in thickness, 150 μm and less in thickness, 100 μm and less in thickness, 75 μm and less in thickness, 50 μm and less in thickness, 30 μm and less in thickness, 25 μm and less in thickness, 15 μm and less in thickness, or any ranges in between these values or any ranges formed by these values). In various implementations, the optical product can comprise one or more thin films. Thin films may be advantageous for different applications. In addition, special effects can be integrated into the image. In various embodiments described herein, the optical product can advantageously be used in applications for flexible packaging, brand identification, tamper evident containers, currency (e.g., a banknote), decoding messages, authenticity, and security, etc. Some security applications include incorporation of small detailed features, incorporation of non-symmetrical features, incorporation of machine readable features, etc.

In certain embodiments, the optical product can be incorporated into an item as an embedded feature, a laminated feature, a hot stamp feature, a windowed thread feature, or a transparent window feature. For example, on an item such as a banknote, the optical product can be a patch, a window, or a thread. The optical product can have a thickness of less than 350 μm, less than 300 μm, less than 250 μm, less than 200 μm, less than 150 μm, less than 100 μm, less than 75 μm, less than 50 μm, less than 30 μm, less than 25 μm, or less than 15 m or any ranges in between these values or any ranges formed by these values. In various embodiments, the image can appear 3D by the naked eye.

In some embodiments, the image can be seen at a viewing angle between 20 degrees to 160 degrees, between 15 degrees to 165 degrees, between 10 degrees to 170 degrees, between 5 degrees to 175 degrees, or between 0 degrees to 180 degrees relative to the plane of the item (e.g., relative to the banknote plane) as the item is tilted. For example, the image can be viewable within one or more of these viewing angle ranges relative to the plane of the item.

In some embodiments, the image can be seen at a viewing angle between 20 degrees to 90 degrees, between 15 degrees to 90 degrees, between 10 degrees to 90 degrees, between 5 degrees to 90 degrees, or between 0 degrees to 90 degrees relative to the normal of the item as the item is rotated the normal of the item (e.g., in the plane of the item). For example, the image can be viewable and/or visible within one or more of these viewing angle ranges as the item is rotated (e.g., rotated at least throughout the range of 90 degrees, rotated at least throughout the range of 180 degrees, rotated at least throughout the range of 270 degrees, or rotated at least throughout the range of 360 degrees) about the normal of the item (e.g., in the plane of the item).

FIG. 1A schematically illustrates an example master 10 for fabricating an optical product 10' in accordance with certain embodiments described herein. In various embodiments, the master 10 can include a first surface 11 and a second surface 12 opposite the first surface 11. As shown in FIG. 1A, the second surface 12 can include a plurality of portions $P_1, P_2, \ldots P_n$. Each portion $P_n$ can correspond to a plurality of portions $P'_1, P'_2, \ldots P'_n$ on the optical product 10'. The plurality of portions $P'_1, P'_2, \ldots P'_n$ on the optical product 10' can also be referred to as a cell, pixel, or a tile. Each portion $P'_n$ can have a length between 1 μm and 100 μm, between 7 μm and 100 μm, or any range within these ranges (e.g., between 20 μm and 100 μm, between 7 μm and 50 μm, between 7 μm and 35 μm, between 10 μm and 55 μm, between 12.5 μm and 100 μm, between 12.5 μm and 50 μm, between 12.5 µm and 35 µm, between 20 µm and 50 µm, between 35 µm and 55 µm, between 40 µm and 50 µm, etc.). Each portion P'$_n$ can have a width between 1 µm and 100 µm, between 7 µm and 100 µm, or any range within these ranges (e.g., between 20 µm and 100 µm, between 7 µm and 50 µm, between 7 µm and 35 µm, between 10 µm and 55 µm, between 20 µm and 50 µm, between 12.5 µm and 100 µm, between 12.5 µm and 50 µm, between 12.5 µm and 35 µm, between 35 µm and 55 µm, between 40 µm and 50 µm, etc.). Accordingly, in various embodiments, the aspect ratio of each portion P'$_n$ can be 1:1 or 1:1.1.

Each portion P$_{11}$ of the master 10 (and each portion P'$_n$ of the optical product 10') can correspond to a point S$_1$, S$_2$, ... S$_n$ on a surface S of the 3D object 50. Each portion P$_1$ can include features F$_1$, F$_2$, ... F$_n$ corresponding to elements E$_1$, E$_2$, ... E$_n$, e.g., non-holographic elements, on the optical product 10'. A gradient (e.g., slope) in the features F$_1$, F$_2$, ... F$_n$ can correlate to an inclination (e.g., slope) of the surface S of the 3D object 50 at the corresponding point S$_1$, S$_2$, ... S$_n$. For example, in various implementations, for individual ones of the portions, a gradient of the features can correlate to an inclination of the surface of the 3D object at the corresponding point. In addition, an orientation of the features F$_1$, F$_2$, ... F$_n$ can correlate to an orientation of the surface S of the 3D object 50 at the corresponding point S$_1$, S$_2$, ... S$_n$. For example, in various implementations, for individual ones of the portions, an orientation of the features can correlate to an orientation of the surface of the 3D object at the corresponding point. Accordingly, with certain embodiments disclosed herein, an optical product 10' fabricated using the example master 10 can be configured, when illuminated, to reproduce by reflected (or refracted) light, a 3D image 50' (e.g., an image that appears 3D) of at least a part of a 3D object 50. The image can be observed by the naked eye and under various lighting conditions (e.g., specular, diffuse, and/or low light conditions).

In various implementations, the features on the master and/or optical product can be different than the 3D object, yet produce the same appearance of the 3D object. In addition, certain implementations disclosed herein are not limited in the type of 3D object that can be reproduced (e.g., an irregularly shaped object, a regularly shaped object, a non-symmetrical shaped object, a symmetrical shaped object, an object in nature, a man-made object, etc.). In various optical products, the features (e.g., non-holographic elements) can reproduce at least part of the 3D image without use of lenses. In some implementations, as described herein, lenses can be used to improve image/channel separation, contrast and/or sharpness of the image.

The optical product 10' can be used on a variety of products to reproduce a 3D image 50' of at least a part of a 3D object 50. For example, the optical product 10' can be placed on decorative signs, advertisements, labels (e.g., self-adhesive labels), packaging (e.g., consumer paper board packaging and/or flexible packaging), consumer goods, collectible cards (e.g., baseball cards), etc. The optical product 10' can also be advantageously used for authenticity and security applications. For example, the optical product 10' can be placed on currency (e.g., a banknote), credit cards, debit cards, stock certificates, passports, driver's licenses, identification cards, documents, tamper evident containers and packaging, consumer packaging, bottles of pharmaceuticals, etc.

In various implementations, the optical product 10' can be a reflective or transmissive device. For example, the optical product 10' can include reflective material (e.g., reflective metal such as aluminum, copper, or silver disposed on the plurality of elements E$_1$, E$_2$, ... E$_n$, or a transparent, relatively high refractive index material such as ZnS or TiO$_2$ disposed on the plurality of elements E$_1$, E$_2$, ... E$_n$ creating a semi-transmitting/partially reflective boundary). In some instances, the relatively high refractive index material can have a refractive index from 1.65 to 3.0. In some instances, the relatively high refractive index material can have a refractive index from 1.8 to 3.0. Depending on the thickness of the reflective material, the optical product 10' can be reflective or transmissive. Depending on the thickness of the reflective material, the optical product 10' can be partially reflective or partially transmissive. The thickness of the reflective material at which the optical product 10' is reflective or transmissive can depend on the chemical composition of the reflective material.

Accordingly, in some embodiments, the optical product 10' can include a reflective surface 12' from which light can reflect from the elements E$_1$, E$_2$, ... E$_n$ to reproduce the image 50' of the 3D object 50 or at least part of the 3D object 50. For example, the optical product 10' can be made of a reflective metal (e.g., aluminum, copper, or silver), a semi-transparent metal, or a material (e.g., polymer, ceramic, or glass) coated with a reflective metal. Reflective coatings that employ non-metallic material can also be employed.

In some embodiments where the elements E$_1$, E$_2$, ... E$_n$ are coated with a reflective metal, the thickness of the coating layer can be greater than or equal to 45 nm (e.g., 50 nm, 55 nm, 60 nm, etc.) and/or be in a range from 45 nm to 100 nm, or any range within this range (e.g., from 45 nm to 85 nm, from 45 nm to 75 nm, from 50 nm to 85 nm, etc.) such that the layer is opaque. Alternatively, the thickness of the reflective metal can be less than 45 nm (e.g., 10 nm, 15 nm, 20 nm, 25 nm, etc.) and/or be in a range from 10 nm to 44.9 nm, or any range within this range (e.g., from 10 nm to 40 nm, from 10 nm to 35 nm, from 10 nm to 30 nm, etc.) such that the layer is semi-transparent (e.g., 30% transparent, 40% transparent, 50% transparent, 60% transparent, 70% transparent, or any ranges formed by any of these values, etc.). In reflective embodiments, the elements E$_1$, E$_2$, ... E$_n$ can reflect light towards or away from the observer's eye to reproduce the image 50' the 3D object 50. For example, the elements E$_1$, E$_2$, ... E$_n$ can reflect light towards the observer's eye in bright areas, and reflect light away from the observer's eye in dark areas. In some embodiments, the slopes of the elements E$_n$ can be configured to create the 3D depth perception of the image. For example, elements E$_n$ with less steep slopes can cause light to reflect toward the observer's eye creating more brightness, while elements E$_n$ with steeper slopes can cause light to reflect away from the observer's eye creating more darkness.

In some other embodiments (e.g., for a transmissive device), the optical product 10' can include a layer (e.g., a coating) of a transparent, relatively high refractive index material such as, for example, ZnS or TiO$_2$. In some such embodiments, light can transmit through the material and can also reflect at each of the elements E$_1$, E$_2$, ... E$_n$ due to the presence of the relatively high index layer which can create index mismatch and results in Fresnel reflection. The relatively high index material can be up to a full visible wavelength in thickness in some embodiments. If a color tint is used, the relatively high index material can be up to a ¼ of a visible wavelength in thickness in some embodiments.

Furthermore, the optical product 10' can include a protective covering, e.g., an organic resin, to protect the elements E$_1$, E$_2$, ... E$_n$ and/or any coating layer from corrosion from acidic or basic solutions or organic solvents such as gasoline and ethyl acetate or butyl acetate. In various implementations, the protective covering can also provide protection during subsequent processing steps and use of the optical product 10' (e.g., during the manufacturing of currency and/or by general handling by the public).

In various embodiments, the optical product 10' can be placed on or in another surface (e.g., as an embedded feature, a hot stamped feature such as a patch, a windowed thread feature, or a transparent window feature). In other embodiments, the optical product 10' can be placed under another surface (e.g., a laminated feature laminated under a film and/or cast cured). In some embodiments, the optical product 10' can be placed between two other surfaces (e.g., hot stamped on another surface and laminated under a film). Additional features associated with the optical product 10' will become apparent with the disclosure herein of the master 10 for fabricating the optical product 10'.

The image 50' of at least part of the 3D object 50 can be reproduced when the optical product 10' is illuminated. In various embodiments, the image 50' can be reproduced by a multitude of relatively small mirrors (e.g., each of the elements $E_1, E_2, \ldots E_n$ having both a length and width between 7 μm and 100 μm, or any range within this range (e.g., between 7 μm and 50 μm, between 7 μm and 35 μm, between 12.5 μm and 100 μm, between 12.5 μm and 50 μm, between 12.5 μm and 35 μm, between 35 μm and 55 μm, between 40 μm and 50 μm, etc.) which can be curved (e.g., have a freeform curvature) or planar. For example, in some embodiments, a reflective surface of the optical product 10' can provide a surface for specular reflection, such that the image 50' can be produced by the reflected light (e.g., like a mirror). Accordingly, various embodiments can produce a bright, high quality image. Some embodiments can also utilize techniques for producing diffuse reflection, e.g., for special or desired effects. Furthermore, the image 50' can be a substantially similar reproduction (e.g., with similar details), an approximate reproduction (e.g., with less details), a not scaled copy (e.g., not scaled up or down in size), and/or a scaled copy (e.g., scaled up or down in size) of the 3D object 50 or part of the 3D object 50.

In general, the 3D object 50 to be reproduced is not particularly limited and can advantageously include rotationally non-symmetrical and/or irregularly shaped objects, as well as symmetrical and/or regularly shaped objects. For example, the 3D object 50 can include one or more alphanumeric characters and/or symbols. For example, the 3D object 50 can include one or more text, one or more alphabetic characters, one or more numeric characters, one or more letters, one or more numbers, one or more symbols, one or more punctuation marks, one or more mathematical operators, etc. The 3D object 50 can also include one or more graphical images or logos, e.g., a company logo, a team logo, product branding designs, etc. Accordingly, the 3D object 50 can include irregularly shaped features in addition to planar and curved features. In some embodiments, the 3D object 50 can comprise animals, humans, plants or trees, landscapes, buildings, cars, boats, airplanes, bicycles, furniture, office equipment, sports equipment, foods, drinks, personal care items, flags, emblems, symbols like country, company or product symbols including trademarks, or parts thereof or groups or combination of these items with or without other items. The objects may be cartoon or artistic renditions. A wide range of other objects are possible. In some implementations, the produced image can be a Quick Response or QR code.

As set forth herein, in various embodiments, the image 50' can be seen at various viewing angles (e.g., between 20 degrees to 160 degrees, between 15 degrees to 165 degrees, between 10 degrees to 170 degrees, between 5 degrees to 175 degrees, or between 0 degrees to 180 degrees relative to the plane of the item (e.g., relative to the banknote plane). For example, when the example optical product 10' is tilted, upon viewing the example optical product 10' at different viewing angles (or upon different angles of illumination), different sets of elements $E_1, E_2, \ldots E_n$ can be seen by the observer to provide the different images of the 3D object.

In some embodiments, the image can be seen at a viewing angle between 20 degrees to 90 degrees, between 15 degrees to 90 degrees, between 10 degrees to 90 degrees, between 5 degrees to 90 degrees, or between 0 degrees to 90 degrees relative to the normal of the item as the item is rotated about the normal of the item. For example, the image can be viewable within one or more of these viewing angle ranges as the item is rotated (e.g., rotated at least throughout the range of 90 degrees, rotated at least throughout the range of 180 degrees, rotated at least throughout the range of 270 degrees, or rotated at least throughout the range of 360 degrees) about the normal of the item.

Furthermore, in certain embodiments, the image 50' can be substantially without iridescence or change in color with angle. For example, in various embodiments, there are substantially no colors (e.g., rainbow effect), other diffractive colors, or ghosting effects in the image 50'. For example, in various embodiments, the optical product 10' does not provide a color change over an angular range around (e.g., about) a viewing direction over the collection pupil having a size of 4.0 mm or 5.0 mm located at a distance of 24 inches. In some instances, the angular range is 2 degrees, 3 degrees, 4 degrees, 5 degrees, 6 degrees, 7 degrees, 10 degrees, 12 degrees, 15 degrees, 17 degrees, 20 degrees, 25 degrees, or any range between these values. The viewing direction can be from 0 and 90 degrees with respect to a normal to a surface of the product 10', or any range within this range (e.g., from 5 to 85 degrees, from 5 to 75 degrees, from 5 to 60 degrees, from 10 to 60 degrees, from 10 to 55 degrees, etc.).

As one example, in certain embodiments, the size of the portions $P'_1, P'_2, \ldots P'_n$ can have a length and width between 1 μm and 200 μm, between 7 μm and 200 μm, or any range within these ranges (e.g., between 20 μm and 100 μm, between 7 μm and 50 μm, between 7 μm and 35 μm, between 10 μm and 55 μm, between 12.5 μm and 100 μm, between 12.5 μm and 50 μm, between 12.5 μm and 35 μm, between 20 μm and 50 μm, between 35 μm and 55 μm, between 40 μm and 50 μm, between about 65 μm and 80 μm, between about 50 μm and 100 μm, between about 60 μm and 90 μm, between about 100 μm and 200 μm, etc.). In some such embodiments (e.g., between 20 μm and 50 μm), the portions $P'_n$ may be small enough such that the portions $P'_n$ are not resolvable by a human observer under normal viewing conditions (e.g., a reading distance of 18 to 24 inches between the eye and the item to be viewed). In addition, without being bound by theory, the portions $P'_n$ may be big enough such that the cone of light passing through the pupil (e.g., 4 mm or 5 mm in diameter) is small enough such that the eye may see a majority of the colors mixed as white light at a distance of 18-24 inches.

As another example, in some embodiments, a majority (e.g., greater than 50%, greater than 55%, greater than 60%, greater than 65%, greater than 70%, greater than 80%, greater than 90%, and any ranges in between these values) of the plurality of portions $P'_1, P'_2, \ldots P'_n$ on the optical product 10' can include a single non-holographic element $E_1$ (as opposed to a plurality of spaced apart non-holographic elements $E_n$ that may resemble a grating-like feature). Without being bound by theory, grating-like features can cause light to be dispersed with some of the light collected by the pupil of the eye. If the period of the grating-like feature is small enough, the light captured by the pupil may appear as a color. Accordingly, in various embodiments of the optical product 10' that have a majority of the plurality of portions $P'_1, P'_2, \ldots P'_n$ having not more than a single non-holographic reflective or refractive element $E_1$, unwanted color caused by grating-like features may possibly be substantially reduced and/or eliminated. Similarly, color change with angle of tilt can be reduced. In some embodiments, at least 20%, at least 30%, at least 40%, at least 50%, at least 60%, at least 70%, at least 80%, at least 90%, or any ranges in between these values) of the plurality of portions $P'_1, P'_2, \ldots P'_n$ on the optical product 10' can include a single non-holographic element $E_1$. In various embodiments, the single element may be slowly varying and/or substantially flat. In certain embodiments, the maximum average slope per portion with a single feature is less than ½, less than ⅓, less than ¼, less than ⅕, less than ⅙, potentially flat, and any ranges in between these values depending on feature height and width.

In addition, in portions $P'_n$ having a plurality of non-holographic elements $E_1, E_2, \ldots E_n$ (e.g., grating-like features), the elements $E_n$ can be discontinuous and/or have different orientation with non-holographic elements $E_1, E_2, \ldots E_n$ in surrounding adjacent portions $P'_n$. Without being bound by theory, the discontinuity and/or different orientations between grating-like features can cause a lateral shift of the grating-like feature. The lateral shift may cause the color spectrum to shift as well (e.g., from red to blue to green). The colors may combine on the retina providing an average white irradiance distribution. Accordingly, in embodiments of the optical product 10' that have a plurality of portions $P'_1, P'_2, \ldots P'_n$ including a plurality of non-holographic element $E_n$, unwanted color cause by grating-like features may possibly be substantially reduced and/or eliminated. Similarly, color change with angle of tilt can be reduced.

In some implementations, a majority of the portions can comprise non-holographic features with discontinuities. In some instances, a majority of portions can comprise features discontinuous with features in surrounding adjacent portions. In some instances, a majority of features can be discontinuous at boundaries between adjacent portions.

Accordingly, certain embodiments of the optical product 10' can utilize a certain portion $P'_1$ size, a single non-holographic element $E_1$ in a portion $P'_n$, discontinuous and/or differently orientated elements $E_n$ to produce images that may be substantially without iridescence or change in color with angle. The application of these features can be dependent on the image to be formed.

Various embodiments described herein can create a 3D image primarily by the reflection of light without relying on diffraction (e.g., without relying on holographic or grating diffraction). For example, various embodiments include the surface features disclosed herein that produce an image of a 3D object without relying on diffraction and/or phase information.

In other embodiments, the optical product 10' can include surfaces which additionally include features from which light can diffract, e.g., at surface defects, at discontinuities at borders, and/or via incorporation of diffractive or holographic elements. For example, such diffractive or holographic features can be combined with the surface features disclosed herein that produce an image of a 3D object using reflection (or possibly refraction, e.g., in transmission) without relying on diffraction.

In various embodiments, the master 10 can be either a negative or positive master. Whether as a negative or positive master, the method to produce the master 10 is not particularly limited. For example, the features $F_1, F_2, \ldots F_n$ on surface 12 of the master 10 can be produced using any technique known in the art or yet to be developed, including but not limited to photolithography (e.g., UV or visible light), electron beam lithography, and ion beam lithography to name a few. Additionally, the materials that can be used to manufacture the master 10 are not particularly limited and can include glasses, ceramics, polymers, metals, etc.

As a negative master, the master 10 can form a surface 12' of the optical product 10' that is complementary to the surface 12 of the master 10. For example, as shown in FIG. 1A, the features $F_1, F_2, \ldots F_n$ on the surface 12 of the master 10 can be the inverse of the elements $E_1, E_2, \ldots E_n$ on the surface 12' of the optical product 10'. In such embodiments, the master 10 can be used to form the optical product 10'. For example, the master 10 can be used to emboss the elements $E_1, E_2, \ldots E_n$ onto a metal sheet, a polymeric substrate such as a thermoformable polymer, or a UV curable photoresist layer such as a UV curable resin, or to injection mold the elements $E_1, E_2, \ldots E_n$ onto a polymer.

As another example, as a positive master, the master 10 can provide a surface 12' for the optical product 10' that is substantially similar to the surface 12 of the master 10. The features $F_1, F_2, \ldots F_n$ on the surface 12 of the master 10 can be substantially similar to the elements $E_1, E_2, \ldots E_n$ on the surface 12' of the optical product 10'. In some such embodiments, the positive master 10 can provide a model for the optical product 10'. In other such embodiments, the positive master 10 can be used to create an inverse image of the 3D object 50. In addition, the positive master 10 can be used to fabricate one or more negative masters.

Although the master 10 is shown producing a product directly, in certain embodiments the master 10 is employed to produce one or more other masters (e.g., daughter shims) or intermediate surfaces that can in turn be used to produce a product. For example a first negative master can be used to produce a second master that is a positive master. The second positive master can be used to make a third negative master. The third negative master can be used to produce a fourth positive master. The fourth positive master can be used to produce a product. Accordingly, a tooling tree of masters (e.g., four, five, six, etc. generations deep) can be produced.

Certain embodiments of the optical product 10' disclosed herein can be advantageously manufactured on a large industrial scale. Some embodiments can be manufactured by embossing the elements $E_1, E_2, \ldots E_n$ into an UltraViolet (UV) curable resin coated onto various polymeric substrates, such as, for example, polyethylene terephthalate (PET), oriented polypropylene (OPP), biaxially oriented polypropylene (BOPP), low density polyethylene (LDPE), linear low density polyethylene (LLDPE), polypropylene (PP), polyvinyl chloride (PVC), polycarbonate (PC) or any other type of plastic film or carrier. For thermoformable plastics such as PVC and PC, the elements $E_1, E_2, \ldots E_n$ can be embossed directly into the substrate without the UV curable layer. In various embodiments, the polymeric substrate can be clear. The polymeric substrates can have a thickness less than or equal to 300 microns (e.g., less than or equal to 250 microns, less than or equal to 200 microns, less than or equal to 150 microns, less than or equal to 100 microns, less than or equal to 50 microns, less than or equal to 25 microns, less than or equal to 15 microns, etc.). Some such polymeric substrates having elements $E_1, E_2, \ldots E_n$ can be formed into security threads that can be incorporated into a banknote having a paper or polymer thickness of 100 microns, 150 microns, or any thickness up to 300 microns. Other thicknesses are also possible.

Figure 1B:
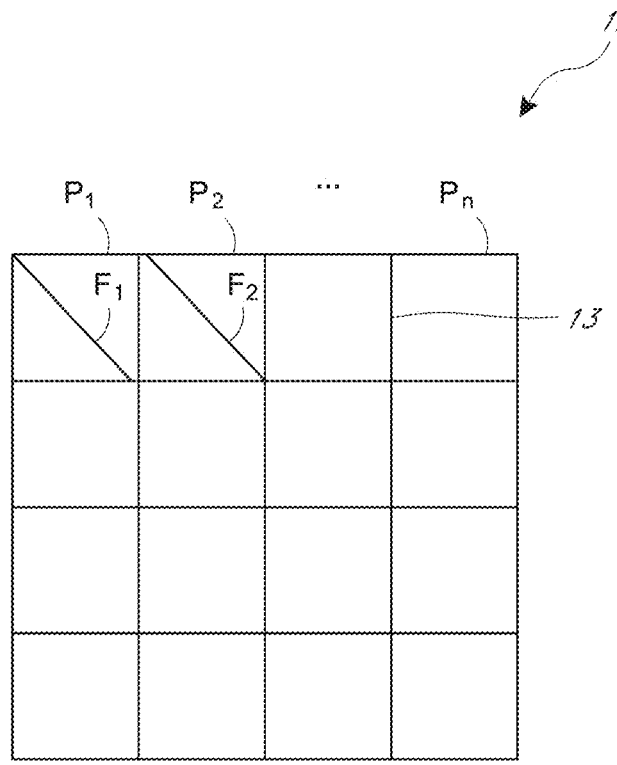
FIG. 1B schematically illustrates a top view of the surface of a master for fabricating an optical product in accordance with certain embodiments described herein.

With continued reference to FIG. 1A, the master 10 can include a first surface 11 and a second surface 12. The first surface 11 is shown for simplicity as a planar surface. However, the shape of the first surface 11 is not particularly limited. The second surface 12 can be opposite the first surface 11. In various implementations, the second surface can be planar. However, the shape of the second surface in not particularly limited. The second surface 12 can include a plurality of portions $P_1, P_2, \ldots P_n$. In some embodiments, the plurality of portions $P_1, P_2, \ldots P_n$ can form a single cell (e.g., a mono-cell). In other embodiments, the plurality of portions $P_1, P_2, \ldots P_n$ can form a plurality of cells. For example, each of the plurality of portions $P_1, P_2, \ldots P_n$ can form a cell of the plurality of cells. The number of cells is not particularly limited and can depend on factors such as size and resolution of the image to be reproduced. In various embodiments, the portions $P_1, P_2, \ldots P_n$ can form a pixelated surface. For simplicity, only one row of portions $P_1, P_2, \ldots P_n$ is shown in FIG. 1A. However, certain embodiments can include additional rows and columns of portions $P_1, P_2, \ldots P_n$. For example, as shown in FIG. 1B, the portions $P_1, P_2, \ldots P_n$ can include a plurality of rows and columns spanning across the surface 12 of the master 10. For simplicity, only the first row is labeled as $P_1, P_2, \ldots P_n$. Furthermore, although FIG. 1B shows a 4×4 array of portions $P_1, P_2, \ldots P_n$, the numbers of rows, columns, and portions $P_1, P_2, \ldots P_n$ are not particularly limited. In some instances, the portions can form at least a 4×4 array of rows and columns. In some instances, the portions can comprise from 10 to 20 portions. In some instances, the portions can comprise more than 20 portions (e.g., up to 50 portions, up to 100 portions, up to 200 portions, up to 300 portions, up to 400 portions, up to 500 portions, etc. or any ranges formed by any of these values).

As also shown in FIG. 1B, in some embodiments, borders 13 can surround at least part of the portions $P_1, P_2, \ldots P_n$. The borders 13 can substantially surround a portion $P_n$, or can surround just part of a portion $P_1$. In some embodiments, discontinuities can extend around all or substantially all of the portion $P_1$. In other embodiments, discontinuities may extend on just a part of the portion $P_1$. In various implementations, the portions can be defined by the borders. The borders 13 can help define the size and shape of the portions $P_1, P_2, \ldots P_n$ in some embodiments. However, the size and shape of the portions $P_1, P_2, \ldots P_n$ are not particularly limited. For example, some of the portions $P_1, P_2, \ldots P_n$ can comprise a symmetrical shape. For example, the symmetrical shape can include a rectangle, a square, a rhombus, an equilateral triangle, an isosceles triangle, a regular polygon (e.g., a regular pentagon, a regular hexagon, a regular octagon, etc.), to name a few. In various instances, the portions can be defined by linear borders. The symmetrical shape can also include curvature, e.g., a circle, an ellipse, etc. In other embodiments, some of the portions $P_1, P_2, \ldots P_n$ can comprise a non-symmetrical shape, e.g., a non-rotationally symmetrical shape, and/or an irregular shape. In some embodiments, some of the portions $P_1, P_2, \ldots P_n$ can have a shape that is substantially the same as other portions $P_1, P_2, \ldots P_n$. In some embodiments, at least 20%, at least 30%, at least 40%, at least 50%, at least 60%, at least 70%, at least 80%, at least 90% (or any range in between these percentages) of the portions $P_1, P_2, \ldots P_n$ can have the same shape, size, or both. In other embodiments, some of the portions $P_1, P_2, \ldots P_1$ can have a shape that is different from other portions $P_1, P_2, \ldots P_n$.

Arrangement of the portions $P_1, P_2, \ldots P_n$ is not particularly limited. For example, whether with or without borders, whether symmetrically shaped or non-symmetrically shaped, or whether regularly or irregularly shaped, the portions $P_1, P_2, \ldots P_1$ can form a periodic array. In other embodiments, whether with or without borders, whether symmetrically shaped or non-symmetrically shaped, or whether regularly or irregularly shaped, the portions $P_1, P_2, \ldots P_n$ can form an aperiodic array. In yet other embodiments, the portions $P_1, P_2, \ldots P_n$ can form a combination of periodic and aperiodic arrays.

With continued reference to FIG. 1A, each portion $P_1$ can correspond to a point $S_1, S_2, \ldots S_n$ on the surface S of the 3D object 50, and each portion $P_1$ can include one or more features $F_1, F_2, \ldots F_n$. For simplicity, the features $F_1, F_2, \ldots F_n$ shown in FIG. 1A appear linear and substantially similar to each other. However, the features $F_1, F_2, \ldots F_n$ can vary in number, size, shape, and orientation.

In certain embodiments, the features $F_1, F_2, \ldots F_n$ can include linear and/or curved features, for example as seen from a top or front view. In some embodiments, the features $F_1, F_2, \ldots F_n$ can include facets, such as linear or curved saw tooth shaped features. The size of the features $F_1, F_2, \ldots F_n$ are not particularly limited. However, from a manufacturing and economic perspective, in some embodiments, a smaller height (e.g., 0 µm to 10 µm) can be advantageous to reduce the amount of material used. Accordingly, in some embodiments, the heights of the features $F_1, F_2, \ldots F_1$ can be from close to 0 µm to 0.1 µm (e.g., 0 nm to 100 nm, 1 nm to 75 nm, or 1 nm to 50 nm), from close to 0 µm to 1 µm (e.g., 0 nm to 1000 nm, or 1 nm to 500 nm), from close to 0 µm to 5 µm (e.g., 1 nm to 5 µm, 10 nm to 5 µm, 50 nm to 5 µm, 75 nm to 5 µm, 0.1 µm to 5 µm, 0.5 µm to 5 µm, or 1 µm to 5 µm), or from close to 0 µm to 8 µm (e.g., 1 nm to 8 µm, 10 nm to 8 µm, 50 nm to 8 µm, 75 nm to 8 µm, 0.1 µm to 8 µm, 0.5 µm to 8 µm, or 1 µm to 8 µm), or from close to 0 µm to 10 µm (e.g., 1 nm to 10 µm, 10 nm to 10 µm, 50 nm to 10 µm, 75 nm to 10 µm, 0.1 µm to 10 µm, 0.5 µm to 10 µm, or 1 µm to 10 µm). In other embodiments, the heights of the features $F_1, F_2, \ldots F_n$ can go up to 15 µm, up to 20 µm, up to 25 µm, or any ranges from 1 µm, 2 µm, or 3 µm up to 25 µm. In yet other embodiments, the heights of the features $F_1, F_2, \ldots F_n$ can go up to 50 µm if needed, e.g., depending on the desired size of the 3D image to be reproduced.

Furthermore, in some embodiments, the lateral dimensions of the features $F_1, F_2, \ldots F_n$ are not particularly limited, but can depend on the details of the 3D object. For example, for text, the lateral dimensions of the features $F_1, F_2, \ldots F_n$ can be less than 1 µm. Accordingly, the lateral dimensions of the features $F_1, F_2, \ldots F_n$ can be from close to 0 µm to 0.1 µm (e.g., 0 nm to 100 nm, 1 nm to 75 nm, or 1 nm to 50 nm), from close to 0 µm to 1 µm (e.g., 0 nm to 1000 nm, or 1 nm to 500 nm), from close to 0 µm to 5 µm (e.g., 1 nm to 5 µm, 10 nm to 5 µm, 50 nm to 5 µm, 75 nm to 5 µm, 0.1 µm to 5 µm, 0.5 µm to 5 µm, or 1 µm to 5 µm), or from close to 0 µm to 8 µm (e.g., 1 nm to 8 µm, 10 nm to 8 µm, 50 nm to 8 µm, 75 nm to 8 µm, 0.1 µm to 8 µm, 0.5 µm to 8 µm, or 1 µm to 8 µm), or from close to 0 µm to 10 µm (e.g., 1 nm to 10 µm, 10 nm to 10 µm, 50 nm to 10 µm, 75 nm to 10 µm, 0.1 µm to 10 µm, 0.5 µm to 10 µm, or 1 µm to 10 µm).

In various embodiments, a lateral distance between two features can be defined in some embodiments as a pitch. In some embodiments, the pitch between features within a portion $P_n$ can be substantially the same within the portion $P_n$. For example, in various embodiments, in portion $P_1$ of the portions $P_1, P_2, \ldots P_n$, the feature $F_1$ can comprise a plurality of features that form a periodic array such that the pitch is substantially the same within portion $P_1$. In addition, in some embodiments, the features $F_1, F_2, \ldots F_n$ among the multiple portions $P_1, P_2, \ldots P_n$, can form a periodic array such that the pitch is substantially the same among the portions $P_1, P_2, \ldots P_n$. In other embodiments, the features could be chirped and form an aperiodic array such that the pitch may be different among multiple portions $P_1, P_2, \ldots P_n$. However, although the pitch may be different for different portions $P_1, P_2, \ldots P_n$, the pitch can be slowly varying (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) among the portions $P_1, P_2, \ldots P_n$. In some embodiments, the pitch may uniformly change across multiple portions $P_1, P_2, \ldots P_n$. In other embodiments, the features could be chirped within a portion $P_1$ such that the pitch may be different within the portion $P_1$. In some such embodiments, the pitch within the portion $P_1$ may slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance). In some embodiments, the pitch may uniformly change with the portion $P_n$. The pitch in certain embodiments can be between 1 μm and 100 μm, between 1 μm and 75 μm, between 1 μm and 50 μm, or between 1 μm and 25 μm.

Figure 1C:
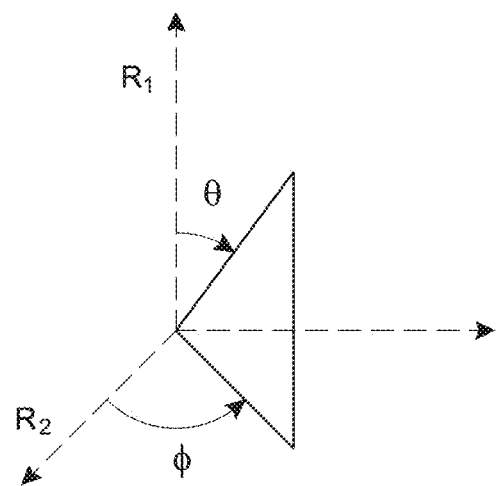
FIG. 1C schematically illustrates the inclination and orientation of a surface of a 3D object at a point on the surface.

With continued reference to FIG. 1A, the features $F_1, F_2, \ldots F_n$ can correspond to elements $E_1, E_2, \ldots E_n$ on the optical product 10', and since the optical product 10' is configured to reproduce the 3D object 50, aspects of the features $F_1, F_2, \ldots F_1$ can correlate to aspects of the surface S of the 3D object 50 at the corresponding point $S_1, S_2, \ldots S_n$. For example, a gradient (e.g., slope) in the features $F_1, F_2, \ldots F_n$ can correlate to an inclination of the surface S of the 3D object 50 at the corresponding point $S_1, S_2, \ldots S_n$. For example, in various embodiments, each feature can include a slope. A slope of the feature $F_1$ can correlate to the inclination of the surface S of the 3D object 50 at the corresponding point $S_1$. As shown in FIG. 1C, the slope of the feature $F_1$ can correlate to the polar angle $\theta_1$ from reference line $R_1$ of the 3D object 50. Accordingly, the slopes of the features $F_1, F_2, \ldots F_n$ can mimic the surface normals of the 3D object 50.

Various embodiments can advantageously have a uniform gradient (e.g., uniform slope) within each portion $P_n$ such that the gradient is a single value (e.g., a single polar angle $\theta_n$) at the corresponding point $S_n$ on the surface S of the 3D object 50. In other embodiments, the feature $F_n$ within a portion $P_n$ includes a plurality of features, and the features within the portion $P_n$ may have more than one gradient (e.g., different slopes). In such embodiments, the average gradient (e.g., average slope) of the features within the portion $P_1$ can correlate to the inclination of the surface S of the 3D object 50 at the corresponding point $S_n$.

In some embodiments, varying the slopes within and/or among portions $P_1, P_2, \ldots P_n$ can create contrast on the surface and therefore, on the image 50'. Furthermore, varying at least one of the height of features, pitch between features (e.g., lateral distance between two features), and slope of the features in one or more portions $P_1, P_2, \ldots P_n$ can be used in authenticity and security applications. For example, one can intentionally vary the pitch within one or more portions $P_n$, but maintain the given slopes. The image 50' of the 3D object 50 would be reproduced, yet upon closer inspection of the presence of the intentional variation within one or more portions $P_1, P_2, \ldots P_n$, authenticity can be verified. Other variations are possible.

In various embodiments, the orientation of features $F_1, F_2, \ldots F_n$ can correlate to an orientation of the surface S of the 3D object 50 at the corresponding point $S_1, S_2, \ldots S_n$. For example, an orientation of the feature $F_1$ can correlate to the orientation of the surface S of the 3D object 50 at the corresponding point $S_1$. As shown in FIG. 1C, the orientation of the feature $F_n$ can correlate to the azimuth angle $\varphi_1$ from reference line $R_2$ of the 3D object 50. Various embodiments can advantageously have a uniform orientation within each portion $P_n$, such that the orientation is a single value (e.g., a single azimuth angle $\varphi_n$) at the corresponding point $S_n$ on the surface S of the 3D object 50. In other embodiments, the feature $F_n$ within a portion $P_n$ includes a plurality of features, and the features within the portion $P_n$ may have more than one orientation (e.g., different orientations). In such embodiments, the average orientation of the features within the portion $P_n$ can correlate to the orientation of the surface S of the 3D object 50 at the corresponding point $S_n$. Furthermore, the orientation of the features within and among the portions $P_1, P_2, \ldots P_n$, can slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) within and among the portions $P_1, P_2, \ldots P_n$.

In some embodiments, where a feature $F_1$ includes multiple features within a portion, the features can appear discontinuous with other features within the portion. In some embodiments where the surface 12 of the master 10 is pixelated (e.g., having a plurality of cells), the features $F_1, F_2, \ldots F_n$ can appear discontinuous with features in surrounding adjacent portions. In other embodiments, the portions $P_1, P_2, \ldots P_n$ can form a single cell or a mono-cell. In some such embodiments, the features $F_1, F_2, \ldots F_n$ can appear continuous and smoothly varying depending on the shape. In other such embodiments, the features $F_1, F_2, \ldots F_n$ can appear discontinuous due to discontinuities in the 3D object 50.

In some instances, the features $F_1, F_2, \ldots F_n$ can comprise one or more linear and/or non-linear features when viewed in a cross-section orthogonal to the first and second surfaces. In some embodiments, the features $F_1, F_2, \ldots F_n$ can comprise linear features corresponding to a substantially smooth region of the surface S of the 3D object 50. The features $F_1, F_2, \ldots F_n$ can also comprise non-linear features, e.g., curved features as seen from a top or front view, corresponding to a curved region of the surface S of the 3D object 50, e.g., instead of flat facets. In some embodiments, features $F_1, F_2, \ldots F_n$ that are linear can be used to correspond to a curved region of the surface S of the 3D object 50. In some such embodiments, linear features on a master 10 can be used to represent a curved region by using a piecewise approximation function (e.g., a piecewise linear function such as a function comprising straight line sections). In some other embodiments, features $F_1, F_2, \ldots F_n$ that are non-linear can be used to correspond to a substantially smooth region of the surface S of the 3D object 50. In some such embodiments, non-linear features on a master 10 can be used to represent smooth regions on the surface S of the 3D object because the features $F_1$, $F_2$, ... $F_n$ can correspond to relatively small sized features on the optical product 10'. For example, the pitch and/or texture on the optical product 10' can be from 1 μm to 100 μm, or any range within this range (e.g., from 1 μm to 75 μm, from 1 μm to 50 μm, from 1 μm to 25 μm, etc.).

With continued reference to FIG. 1A, as described herein, the features $F_1$, $F_2$, ... $F_n$ can correspond to aspects of the surface S of the 3D object 50 and can also correspond to elements $E_1$, $E_2$, ... $E_n$ on the optical product 10' such that the optical product 10' can reproduce an image 50' of the 3D object 50. In various embodiments, the elements $E_1$, $E_2$, ... $E_n$ on the optical product 10' can be non-holographic. For example, the elements $E_1$, $E_2$, ... $E_n$ do not need to rely on holography (e.g., effects based on diffraction and/or based on optical interference) to render a 3D image 50' of the 3D object 50. In some such embodiments, the features $F_1$, $F_2$, ... $F_n$ on the surface 12 of the master 10 can include non-sinusoidal features or non-quasi-sinusoidal features. In general, sinusoidal or quasi-sinusoidal features can be diffractive with +/−orders of equal intensity that generate a twin image. One positive order and one negative order can share the incident light and result in a simultaneous twin image with counter-intuitive movement of one image with respect to the other. Such effects may be non-ideal. In some embodiments that include non-sinusoidal or non-quasi-sinusoidal features, the features $F_1$, $F_2$, ... $F_n$ on the surface 12 of the master 10 can include other shapes, such as saw toothed shapes as described herein.

Although various embodiments described herein do not necessarily rely on holography to reproduce an image, some embodiments can include diffractive or holographic features (e.g., less than or equal to 50% of the surface area, less than or equal to 40% of the surface area, less than or equal to 30% of the surface area, less than or equal to 20% of the surface area, less than or equal to 10% of the surface area, less than or equal to 5% of the surface area, less than or equal to 3% of the surface area, less than or equal to 2% of the surface area, or less than or equal to 1% of the surface area, or any range defined by any of these values) to be used in conjunction with the non-holographic elements $E_1$, $E_2$, ... $E_n$ described herein. For example, in some embodiments, the second surface 12 of the master 10 can further comprise features corresponding to holographic elements on the optical product 10' in one or more portions $P_1$, $P_2$, ... $P_n$. In other embodiments, a holographic layer can be added over or under the surface 12' of the optical product 10'.

Figure 1D:
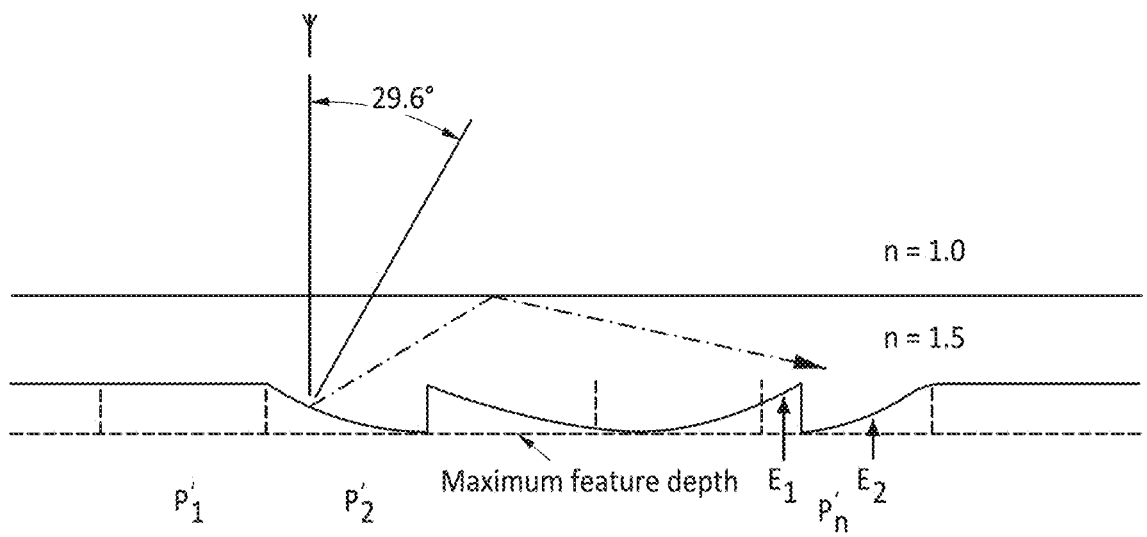
FIG. 1D is another example optical product 10' in accordance with certain embodiments described herein.

FIG. 1D is another example optical product 10' in accordance with certain embodiments described herein. As shown in FIG. 1D, the optical product 10' can include a plurality of portions $P'_1$, $P'_2$, ... $P'_n$. Each portion $P'_1$ can include elements $E_1$, $E_2$, ... $E_n$, e.g., non-holographic elements, on the optical product 10'. In some such embodiments, the elements $E_1$, $E_2$, ... $E_n$ can be embossed on the bottom surface of the substrate, e.g. UV curable resin having a refractive index of 1.5. The elements $E_1$, $E_2$, ... $E_n$ can be coated with a reflective coating. The elements $E_1$, $E_2$, ... $E_n$ may then be embedded between the substrate and the item to which the optical product 10' is attached. As described herein, the slopes of the elements $E_1$, $E_2$, ... $E_n$ can be configured to create the 3D depth perception of the image. For example, elements $E_1$, $E_2$, ... $E_n$ with less steep slopes can cause light to reflect toward the observer's eye creating more brightness, while elements $E_1$, $E_2$, ... $E_n$ with steeper slopes can cause light to reflect away from the observer's eye creating more darkness. In this example of an embedded optical product 10', elements $E_1$, $E_2$, ... $E_n$ with steep enough slopes can cause light to be totally internally reflected within the substrate (which has a higher index than the surrounding medium), and creating even more darkness.

Figure 1E:
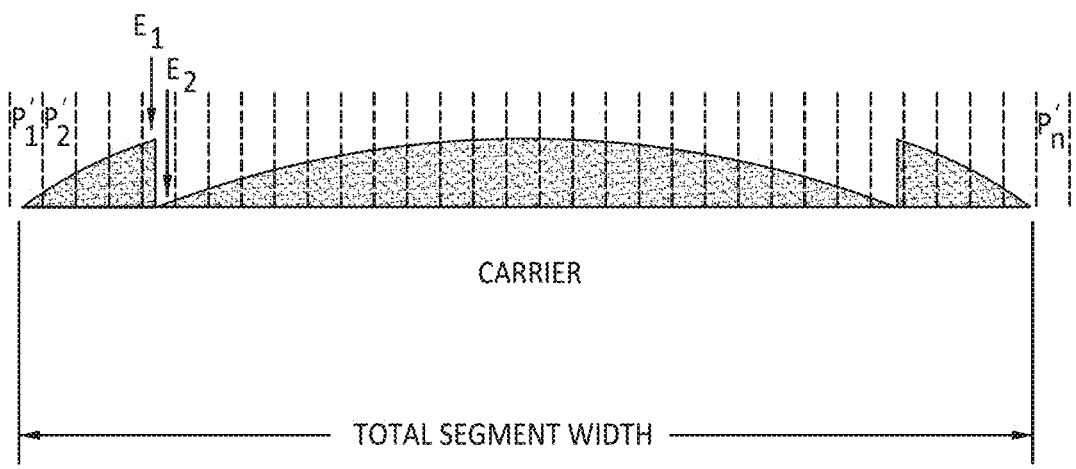
FIG. 1E is another example optical product 10' in accordance with certain embodiments described herein.

FIG. 1E is another example optical product 10' in accordance with certain embodiments described herein. As shown in FIG. 1E, the optical product 10' can include a plurality of portions $P'_1$, $P'_2$, ... $P'_n$. Each portion $P'_1$ can include elements $E_1$, $E_2$, ... $E_n$, e.g., non-holographic elements, on the optical product 10'. As described herein, utilizing embodiments of the optical product 10' having elements $E_1$, $E_2$, ... $E_n$ (or masters having features $F_1$, $F_2$, ... $F_n$) with smaller height can be advantageous to reduce the amount of material used. However in cases where height is less important, certain embodiments can utilize elements $E_1$, $E_2$, ... $E_n$ with slowly varying surfaces (e.g., slopes) creating a substantially contiguous surface from one portion $P'_n$ to another. In various embodiments, the number of substantially contiguous portions can include at least two, three, four, five, eight, ten, fifteen, twenty, or more, or be in any range in between these values.

Referring to FIG. 1A, certain embodiments of a master 10 are configured to fabricate an optical product 10'. The optical product 10' can be configured, when illuminated, to reproduce (e.g., by reflected or transmitted light) a 3D image 50' of at least a part of a 3D object 50. The master 10 or optical product 10' can include features $F_1$, $F_2$, ... $F_n$ or elements $E_1$, $E_2$, ... $E_n$. In various embodiments, such features $F_1$, $F_2$, ... $F_n$ or elements $E_1$, $E_2$, ... $E_n$ (collectively referred to herein as optical features $F_1$, $F_2$, ... $F_n$ for simplicity) can include specular reflecting features and diffusing features that can provide greyscale in the 3D image 50'. The specular reflecting and diffusing features can be provided by a diffuser coated with a reflective material.

In various embodiments, the diffuser can include a micro diffuser (e.g., a tailored micro diffuser). Some such diffusers can be fabricated from polymer materials for example, polyethylene terephthalate (PET), oriented polypropylene (OPP), biaxially oriented polypropylene (BOPP), low density polyethylene (LDPE), linear low density polyethylene (LLDPE), polypropylene (PP), polyvinyl chloride (PVC), polycarbonate (PC), etc. The polymer materials can have a pseudo-random distribution or a tailored distribution of diffusing features. The diffuser can be coating with a reflective material such as aluminum, silver, gold, copper, titanium, zinc, tin, or alloys thereof (e.g., bronze).

In some embodiments, the diffuser has a surface that can receive incident light rays, and can break up an incident ray angle into many angles with a random or a tailored distribution over a wide angle. The shape of the scattered light angular distribution (e.g., Bi-Directional Reflectance Distribution Function or BRDF) can be dependent upon the incident angle and the surface characteristics. In various embodiments, the surface of the diffuser may not completely scatter the light. For example, some such surfaces can have diffusing features (e.g., features that can scatter light) and specular reflecting features (e.g., features that do not scatter light).

Certain embodiments of an optical product 10' can utilize specular reflecting features and diffusing features to vary the brightness (or darkness, e.g., greyness) in a 3D image. Various embodiments utilizing such variation can result in enhanced contrast in the image compared to embodiments not utilizing specular reflecting features and diffusing features. As described herein, the slopes of optical features $F_1$, $F_2, \ldots F_n$ in various portions $P_1, P_2, \ldots P_n$ can create depth perception and contrast in a 3D image as described herein. For example, less steep slopes can cause light to reflect toward the observer's eye, while steeper slopes can cause light to reflect away from the observer's eyes. In certain embodiments, optical features $F_1, F_2, \ldots F_n$ having specular reflecting features and diffusing features can provide additional contrast in the 3D image. In some such embodiments, macro features (e.g., $F_1, F_2, \ldots F_n$) and micro features (e.g., specular reflecting features and diffusing features) can be integrated together.

In various embodiments, the amount of specular reflecting features and diffusing features can be varied in the various portions $P_1, P_2, \ldots P_n$ to control the brightness (or the darkness, e.g., greyness) of an image. For example, the brightness (or darkness, e.g. greyness) as perceived by a viewer of an area can be modulated by the ratio of specular reflecting features to diffusing features. For example, the brightness (or darkness, e.g. greyness) as perceived by a viewer of an area within a portion can be modulated by the ratio of the area (e.g., area of the footprint) of specular reflecting features to the area (e.g., area of the footprint) of the diffusing features. The size, number, and/or distribution of the specular reflecting features relative to the size, number, and/or distribution of the diffuse reflecting features in an area within a portion can likewise be configured to provide the level of brightness, darkness, (e.g., greyness). The images produced can be achromatic. For example, the specular reflecting features and diffusing features can provide no diffractive or interference color (e.g., no wavelength dispersion or rainbows or rainbow effects). Pigment, inks, or other absorptive material can be used to provide color, in which case the relative areas, size, number, and/or distribution of the specular reflecting features relative to that of the diffuse reflecting features would control the perceived brightness or darkness of the hue or color.

In various embodiments, the level of brightness, darkness (e.g., greyness) can be provided by the size and/or number of the specular reflecting features relative to the size and/or number of the diffusing features. As an example, the size and/or number of the specular reflecting and diffusing features can be based on a height and/or width of a top surface (e.g., a flat top surface) of the specular reflecting and diffusing features. Such sizes and/or number can be provided by height (and/or depth) modulation as will be discussed in relation to FIGS. 1E-1a, 1E-1b, 1E-1c, and 1E-1d.

FIGS. 1E-1a, 1E-1b, 1E-1c, and 1E-1d show an example of height modulation to vary the ratio of specular reflecting features to diffusing features in accordance with various embodiments described herein. FIG. 1E-1a schematically illustrates a cross section of a surface having 100% diffusing features and 0% specular reflecting features. In this example, the distribution of the surface feature heights or widths (or a combination thereof) is random. As shown in FIG. 1E-1b, if the top of the surface (e.g., on the side opposite of the carrier) were to be "flattened," then the flat portion of the surface can act as a specular surface resulting in additional specular reflecting features (e.g., 30%) and a reduced amount of diffusing features (e.g., 70%). If more of the surface is "flattened," as shown in FIG. 1E-1c, then less of the surface can act as a diffuse surface resulting is more specular reflecting features (e.g., 60%) and less diffusing features (e.g., 40%). FIG. 1E-1d schematically illustrates a surface having 0% diffusing features and 100% specular reflecting features. The dashed line indicates a reflective coating. Thus, as shown in FIGS. 1E-1a, 1E-1b, 1E-1c, and 1E-1d, by flattening more or less of the surface height, the ratio between specular reflecting features and diffusing features can be modulated. The ratio between such features can correlate to a level of grey or brightness/darkness of hue if colored (e.g., including a tint, an ink, dye, or pigment where absorption can provide color). Utilizing a different ratio between such features in various portions $P_1, P_2, \ldots P_n$ of certain embodiments can produce varying levels of grey or brightness/darkness in the produced image. Thus, by controlling the amount of flattening corresponding to the grey level of a black and white image (or brightness/darkness of hue if colored), certain embodiments can reproduce a black and white image including many shades of grey (or many levels of brightness/darkness of hue if colored).

In various implementations, the portions $P_1, P_2, \ldots P_n$ can include specular reflecting features and diffusing features such that the reproduced image includes an image/object that is specular and a background that is diffuse or vice versa. In some instances, the optical features $F_1, F_2, \ldots F_n$ reproducing the object can comprise specular reflecting features surrounded by diffusing features (e.g., a diffuser as described herein or randomly placed facets to diffusely reflect light) or vice versa.

In various embodiments, the shape of the specular reflecting features and diffusing features, for example, in the area (e.g., area of the footprint) may be square, rectangular, hexagonal, circular, or a wide variety of other shapes. Similarly the specular reflecting features and diffusing features may be packed together in a wide variety of arrangements, e.g., in a square array, triangular array, hexagonally closed packed, or in other arrangements.

Figures 1, 1E, 2:
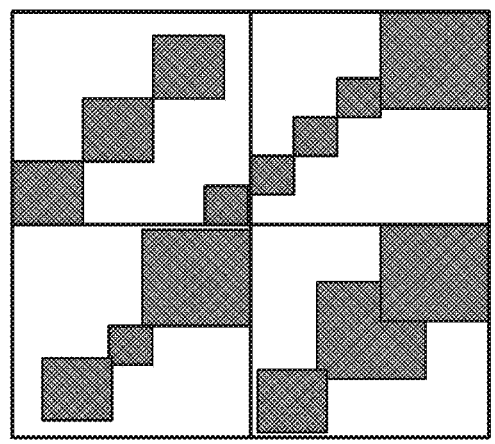
Figures 1, 1E, 2, 3:
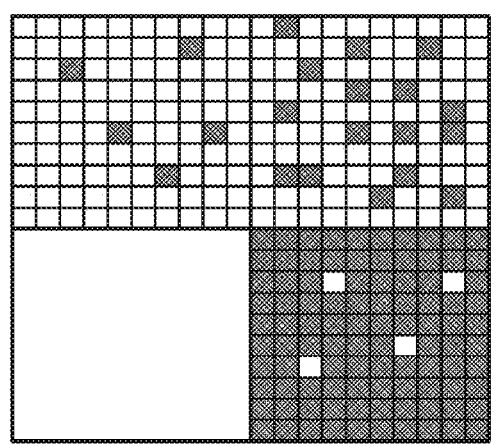
Figures 1, 1E, 2, 3, 4:
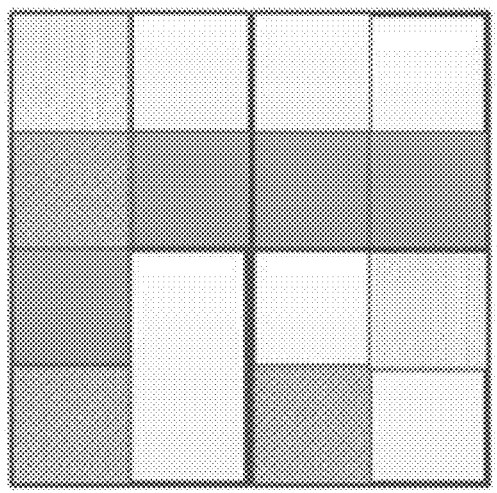

As shown in FIGS. 1E-2, 1E-3, and 1E-4, half-tone patterning or greyscale can be used to control the brightness (or the darkness, e.g., greyness) of an image. FIG. 1E-2 schematically illustrates an example half-tone pattern or screen that can be used in certain embodiments described herein. In FIG. 1E-2, the black areas can represent the specular reflecting features (or the diffusing features), and the white areas can represent the diffusing features (or the specular reflecting features). Varying the size, number, and/or distribution of the specular reflecting features relative to the size, number, and/or distribution of the diffuse reflecting features can be used to provide greyscale (or brightness/darkness of hue) in the produced image. The exact pattern or screen is not particularly limited and can vary according to the desired size, number, and/or distribution.

An un-aided eye typically cannot discern the image as a half-tone image if the half-tone features are less than around 75 microns. Accordingly, in various embodiments, a minimum half-tone feature in the half-tone patterning can be less than or equal to 75 microns (e.g., less than or equal to 65 microns, less than or equal to 50 microns, less than or equal to 30 microns, less than or equal to 10 microns, etc.) and/or be in a range from 0.05 micron to 75 microns (e.g., 0.05 micron to 65 microns, 0.05 micron to 50 microns, 0.05 micron to 30 microns, 0.05 micron to 10 microns, 1 micron to 75 microns, 1 micron to 50 microns, etc.).

FIG. 1E-3 schematically illustrates another example half-tone pattern and/or screen that can be used in certain embodiments described herein. In FIG. 1E-3, the black areas can represent the specular reflecting features (or the diffusing features), and the white areas can represent the diffusing features (or the specular reflecting features). In this example, a single image pixel can be broken into a grid of sub-pixels. To achieve 100 levels of grey, the grid can be provided as 10×10 subpixels. To achieve 50% grey, half of the subpixels represent specular reflecting features, and the remaining subpixels represent diffusing features. The distribution of the subpixels can be a pattern, a screen, and/or a stochastic dither (e.g., a pseudo-random probability distribution) as shown in FIG. 1E-3. In various embodiments, the stochastic dither can be applied to a spatial distribution of a fixed-pattern diffuser and reflective subpixels, or the stochastic dither can be applied in three dimensions to accompany variable height or pattern diffusers. The exact dither is not particularly limited and can vary according to the desired size, number, and/or distribution.

In the examples shown in FIGS. 1E-2 and 1E-3, the black areas can represent 100% specular reflecting features (or 100% diffusing features), and the white areas can represent 100% diffusing features (or 100% specular reflecting features). FIG. 1E-4 schematically illustrates an example grey-scale that can be used in certain embodiments described herein. In some such embodiments the levels of specular reflecting features and diffusing features can be in between 0% and 100% (e.g., 30%, 70%, etc.). For example, as discussed above with regard to FIGS. 1E-1a, 1E-1b, 1E-1c, and 1E-1d, different levels of grey can be provided by different levels of specular reflecting features and diffusing features. FIG. 1E-4 shows an example pixel having 4 cells (e.g., 4 quadrants). There are four possible levels of grey within four cells per pixel. Accordingly, there are 16 possible levels per cell or 64 possible levels per pixel. The exact greyscale is not particularly limited and can vary according to the desired representation.

As discussed above, various embodiments of the optical product 10' can be advantageously used for authenticity and security applications. A recent trend has been to make the holograms used for authenticity and security applications more complicated. However, a disadvantage of using complicated holograms authenticity and security applications is that an average person may be unable to remember what the image is supposed to be. Thus, even if it were possible to make counterfeit copies of such complicated holograms the average person may not be able to distinguish a genuine hologram from the counterfeit hologram from the holographic image alone.

Embodiments of the optical object 10' can include a plurality of optical features that can produce different distinct images when viewed from different directions. Such a configuration can be resistant to photocopying, laser playback into a photoresist from bouncing the beam off of the plurality of optical features to form an original master, or other methods for duplicating. Thus, such objects can be suitable for security and/or authenticity applications. Additionally, the methods and system to manufacture various embodiments of optical objects described herein may not be easily practiced by counterfeiters thus reducing the risk of counterfeiters having the ability to make counterfeit copies of the optical object.

The different distinct images produced by the plurality of optical features included in the various embodiments of optical objects 10' described herein can be viewed from a variety of different viewing directions and can be brightly reflecting. Such embodiments, for example, can be advantageous over objects used in security applications that incorporate optically variable inks and/or magnetic optically variable inks which can have reduced brightness thus making them difficult to see under low light conditions. For example, currency notes including embodiments of optical objects including a plurality of optical features that are configured to produce different distinct images when viewed from different directions can be brighter and more resistant to counterfeiting than currency notes that do not include such optical features and instead rely on optically variable inks and/or magnetically optically variable inks and pigments, which have been used in the banknote industry.

FIGS. 1F-1, 1F-2, 1G-1 and 1G-2 schematically illustrate top views of an optical product 10' including a first plurality of portions, each of the first plurality of portions comprising one or more optical features that are configured to produce at least part of a first 3D image of a first 3D object at a first angle of view. The optical product 10' also includes a second plurality of portions, each of the second plurality of portions comprising one or more optical features that are configured to produce at least part of a second 3D image of a second 3D object at a second angle of view. Each portion of the optical product 10' can also be referred to as a pixel or a tile. The optical product 10' can be configured to produce a first distinct image (e.g., a text, such as, for example, the number "100") when viewed from a first direction and a second distinct image (e.g., an object, such as, for example a bell) when viewed from a second direction. The optical object 10' can be configured such that the first plurality of portions comprise a first set of optical features that contribute to producing the first 3D image and the second plurality of portions comprise a second set of optical features that contribute to producing the second 3D image. These concepts are discussed in detail below with reference to FIGS. 1F-1, 1F-2, 1G-1 and 1G-2.

FIGS. 1F-1 and 1F-2 schematically illustrate top view of an embodiment of an optical object 10' that comprises a first plurality of portions $P_{A1}$, $P_{A2}$ and $P_{A3}$. Each of the first plurality of portions $P_{A1}$-$P_{A3}$ comprises a first set of optical features $F_1$ configured to produce a first distinct image when viewed from a first direction. The optical object 10' also comprises a second plurality of portions $P_{B1}$-$P_{B3}$ that comprise a second set of optical features $F_2$ that are configured to produce a second distinct image when viewed from a second direction. For example, as illustrated by FIG. 1F-1, in a first position of the optical object 10', incident light is reflected at a first angle $\theta_1$ by the first set of optical features $F_1$ such that a viewer perceives the text "100" (without perceiving the liberty bell) and as illustrated by FIG. 1F-2, in a second position of the optical object 10', incident light is reflected at a second angle $\theta_2$ by the second set of optical features $F_2$ such that the viewer perceives a liberty bell (without perceiving the text "100").

FIG. 1G-1 schematically illustrates an embodiment of an optical object 10' that comprises a first plurality of portions $P_{A1}$, $P_{A2}$, $P_{A3}$, $P_{A4}$ and $P_{A5}$. Each of the first plurality of portions $P_{A1}$-$P_{A5}$ comprises a first set of optical features $F_1$ which together are configured to produce a first distinct image when viewed from a first direction. The illustrated embodiment also comprises a second plurality of portions $P_{B1}$, $P_{B2}$, $P_{B3}$ and $P_{B4}$. Each of the second plurality of portions $P_{B1}$-$P_{B4}$ comprises a second set of optical features $F_2$ which together are configured to produce a second distinct image when viewed from a second direction. In various embodiments, the optical features in each of the first plurality of portions can produce a part of the first image of the first 3D object. Although, in the embodiment illustrated in FIG. 1G-1, all the portions of the first plurality of portions $P_{A1}$-$P_{A5}$ are grouped together and all the second plurality of portions $P_{B1}$-$P_{B4}$ are grouped together, in other embodiments the first and the second plurality of portions can be interspersed. For example, the first plurality of portions P1 and the second plurality of portions P2 are interspersed with each to form a checker board pattern. Other patterns and distributions are also possible.

FIG. 1G-2 schematically illustrates a top view of an embodiment of an optical object 10' that comprises a first plurality of portions (e.g., $P_{A1}$, $P_{A2}$) including one or more optical features $F_1$ and a second plurality of portions (e.g., $P_{B1}$, $P_{B2}$, $P_{B3}$) including one or more optical features $F_2$. The optical features $F_1$ in the first plurality of portions (e.g., $P_{A1}$, $P_{A2}$) together contribute to produce a first image (e.g., text "100") when viewed from a first direction and the optical feature $F_2$ in the second plurality of portions (e.g., $P_{B1}$, $P_{B2}$, $P_{B3}$) together contribute to produce a second image (e.g., liberty bell) when viewed from a second direction. It is noted in FIG. 1G-2 that in regions where the first and the second plurality of portions do not overlap, portions that are adjacent to each other have the set of optical features that contribute to form the same image whereas in regions where the first and the second plurality of portions overlap portions that are adjacent to each other have different sets of optical features that contribute to form different images. Although, linear hatch marks of a certain orientation and periodicity (spacing) are used to distinguish in the figure between the first and the second plurality of portions, in various embodiments the orientation and the periodicity of the optical features may vary from portion to portion based on the object shape.

In various embodiments, each of the plurality of portions can be of equal size or shape. Alternately, in other embodiments, some of the plurality of portions can have a different size than some other of the plurality of portions. The optical features $F_1$ and $F_2$ can comprise linear or curved grooves, facets, or other surface relief features. In various embodiments, the optical features $F_1$ and $F_2$ can have a curved cross-sectional shape. The orientation, slope/gradient and other physical attributes of the optical features $F_1$ and $F_2$ are configured such that the intensity of light reflected and/or transmitted through the optical object 10' from the optical features $F_1$ and $F_2$ is varied to form regions of varying brightness and darkness which results in the perception of different images when viewed from different directions. For example, the different sets of optical features can be configured such that light that is retro-reflected appears bright and light reflected at different angles appears black or different shades of grey to give depth perception. This is described in detail with reference to FIG. 1H as well as elsewhere herein.

FIG. 1H schematically illustrates an enlarged side view of a portion of an optical product 10' including a plurality of optical features that are configured to produce different distinct images when viewed from different directions. The first set of optical features $F_1$ is represented by solid line and the second set of optical features $F_1$ is represented by dashed line. The physical attributes of the first set of optical features $F_1$, such as, for example, slope/gradient, orientation is varied such that when the optical object 10' is oriented such that a viewer viewing the optical object 10' along a first direction $\theta_1$ perceives a first image (e.g., the text "100"). The physical attributes of the second set of optical features $F_2$, such as, for example, slope/gradient, orientation, is varied such that when the optical object 10' is oriented such that a viewer viewing the optical object 10' along a second direction $\theta_2$ perceives a second image (e.g., a bell).

The first and the second viewing directions can be oriented (e.g., tilted and/or rotated) with respect to each other by an angle from 10 degrees to 60 degrees or from 10 degrees to 90 degrees. For example, if the optical object 10' is configured as a reflective embodiment, the viewer can switch (or flip) between viewing the first and the second image by tilting the optical object 10' by an angle from 10 to 60 degrees (e.g., 20 degrees or less) about an axis in the plane of the optical object 10'. As another example, if the optical object 10' is configured as a reflective embodiment, the viewer can switch (or flip) between viewing the first and the second image by tilting the optical object 10' by an angle from 10 to 90 degrees (e.g., about 45 degrees) about an axis in the plane of the optical object 10'. As another example, if the optical object 10' is configured as a transmissive embodiment, the viewer can switch (or flip) between the first and the second image by rotating the optical object 10' by an angle from 10 to 60 degrees (e.g., 45 degrees or less).

The optical object 10' can include laminates, films, or layers. The optical object 10' can be manufactured using the methods described herein. For example, the physical attributes (e.g., orientation, slope/gradient) of the different sets of optical features that would produce the different distinct images when viewed from different directions can be determined using an algorithm that can be executed by an electronic processing system and stored in a data file. Using the data file, the different sets of optical features can be disposed on a polymeric substrate using one or more positive/negative masters. In various implementations, reflective material (e.g., aluminum, copper, silver, high refractive index material, such as, for example, $ZnS$ or $TiO_2$ for TIR) can be disposed on the plurality of optical features. Depending on the thickness of the reflective material the optical object 10' can be reflective or transmissive. Depending on the thickness of the reflective material the optical object 10' can be partially reflective or partially transmissive. For example, if the thickness of the reflective material is greater than or equal to 45 nm (e.g., 50 nm, 55 nm, 60 nm, etc.) and/or be in a range from 45 nm to 100 nm, or any range within this range (e.g., from 45 nm to 85 nm, from 45 nm to 75 nm, from 50 nm to 85 nm, etc.), then the optical object 10' can be reflective. As another example, if the thickness of the reflective material is less than 45 nm (e.g., 10 nm, 15 nm, 20 nm, 25 nm, etc.) and/or be in a range from 10 nm to 44.9 nm, or any range within this range (e.g., from 10 nm to 40 nm, from 10 nm to 35 nm, from 10 nm to 30 nm, etc.), then the optical object 10' can be transmissive. The thickness of the reflective material at which the optical object 10' is reflective or transmissive can depend on the chemical composition of the reflective material. The plurality of optical features coated with the reflective material can be protected by a protective polymer coating.

FIG. 1I illustrates an embodiment of the optical object 10' comprising a plurality of optical features $F_1$ and $F_2$ disposed on a polymeric substrate 1005. The polymeric substrate 1005 can include materials, such as, for example, polyethylene terephthalate (PET), oriented polypropylene (OPP), biaxially oriented polypropylene (BOPP), low density polyethylene (LDPE), linear low density polyethylene (LLDPE), polypropylene (PP), polyvinyl chloride (PVC), polycarbonate (PC) or any other plastic film. In various embodiments, the polymeric substrate can be clear. In various embodiments, the polymeric substrates can have a thickness less than or equal to 25 microns. The physical attributes of the plurality of optical features $F_1$ and $F_2$ can be determined from input images that correspond to the images that are desired to be perceived by a viewer. The input images can be three dimensional (3D) images. In some implementations, the input images can be dot matrix images. The physical attributes of the plurality of optical features $F_1$ and $F_2$ that will produce the desired images when illuminated by light can be determined using processes and algorithms that are executed by an electronic processing system. The processes and algorithms can be configured to analyze the input images and determine physical attributes (e.g., orientation, slope/gradient) of the different sets of optical features. The processes and algorithms can be based on equations and phenomena that govern the interaction of light with matter.

The plurality of optical features $F_1$ and $F_2$ are coated with a thickness of a reflective material 1010. As discussed above, depending on the thickness and the composition of the reflective material, the optical object 10' can be reflective or transmissive. A protective covering 1015 is disposed over the reflective material coating 1010 to protect the plurality of the optical features $F_1$ and $F_2$ and/or the reflective material coating 1010 from corrosion from acidic or basic solutions or organic solvents such as gasoline and ethyl acetate or butyl acetate. In various implementations, the protective covering 1015 can also provide protection during subsequent processing steps of the object like manufacturing currency.

In some implementations, the plurality of optical features $F_1$ and $F_2$ can reproduce at least part of the images without the use of lenses. In various implementations, the plurality of optical features $F_1$ and $F_2$ can be integrated with one or more lenses (e.g., a curved lens or a Fresnel lens or a lenticular lens) and/or prisms and/or mirrors. In such embodiments, the focal length of the lens can be approximately equal to the thickness of polymeric substrate 1005. Some such embodiments can present images with higher contrast and sharpness than some embodiments without lenses and/or prisms and/or mirrors. For example, certain embodiments described herein, e.g., referring to FIGS. 1F-1 and 1F-2 for example, are configured to produce by reflected or transmitted light, two distinct images when viewed from different directions. In some such embodiments, the slopes of the optical features $F_1$, $F_2$ within the various portions $P_{An}$, $P_{Bn}$ can create depth perception and contrast in the 3D images as described herein. For two 3D images, the slopes of the optical features $F_1$, $F_2$ can also separate the two distinct images to avoid cross talk and allow the observer to view the images independently from each other at a viewing angle. For example, less steep slopes can cause light to reflect toward the observer's eye, while steeper slopes can cause light to reflect away from the observer's eye. In some such embodiments, because some of the tilt range of the optical features $F_1$, $F_2$ is used to separate the images, the full tilt range would not be used to create the contrast in the images.

Figures 1, 1J, 2, 3, 4, 5, 6:
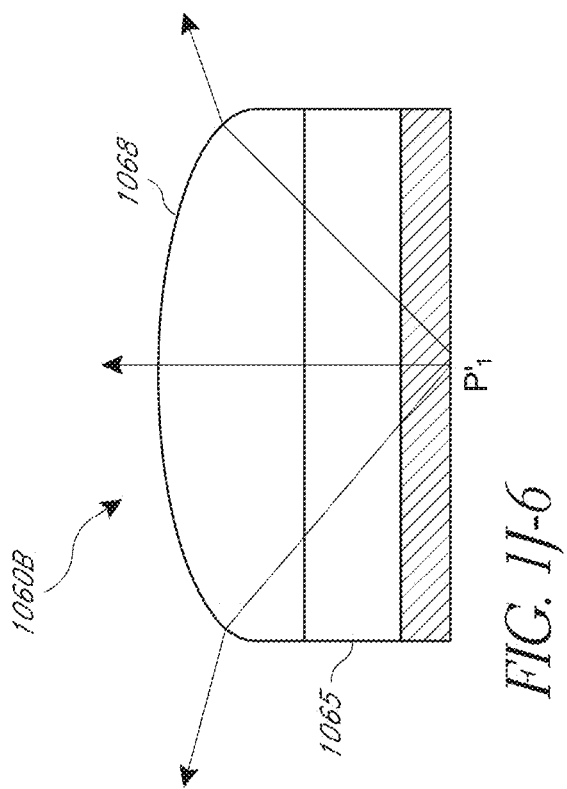
Figures 1, 1J, 2, 3, 4, 5:
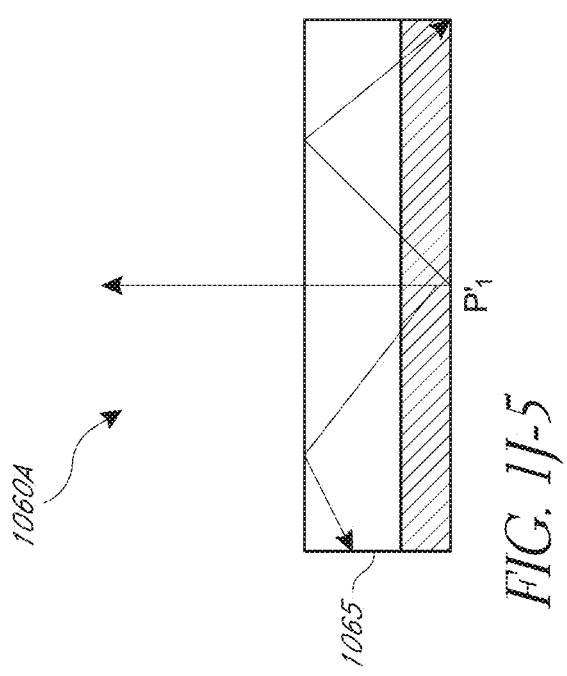

FIG. 1J-1 schematically illustrates an isometric view of an example optical product 1000 including an array 1025 of lenses disposed over a plurality of portions $P_{An}$, $P_{Bn}$ (e.g., having optical features as described herein). The optical product 1000 shown in FIG. 1J-1 is configured to present different distinct images when viewed from different directions. For example, at a first viewing angle $\theta_1$, the array 1025 of lenses can present a first 3D image (e.g., text "100"). At a second viewing angle $\theta_2$, the array 1025 of lenses can present a second 3D image (e.g., liberty bell). In various embodiments, an array of prisms or an array of mirrors (such as mirrors with optical power) can be used in combination with or instead of the lenses. FIG. 1J-2 schematically illustrates an example optical product including an array of prisms. In certain embodiments, the array 1025 of lenses and/or prisms and/or mirrors can be configured to separate the two distinct images so that the images can be viewed independently of each other. Because the lenses and/or prisms and/or mirrors can separate the images, the full tilt range of the optical features $F_1$, $F_2$ can be used to create contrast and sharpness in the images.

In various embodiments, the array 1025 of lenses can include a 1D lens array. As shown in FIG. 1J-3, the lenses can extend in length much longer than shown in FIG. 1J-1. However, the drawings and schematics are merely illustrative. A wide variation in sizes and dimensions are possible. In some embodiments, the array 1025 of lenses can include a number of cylindrical, hemi-cylindrical lenses, truncated hemi-cylindrical lenses, or plano convex cylindrical lenses with one convex surface and one plano surface. In some embodiments, the lenses can have one convex surface and one concave surface.

The array of lenses can include a micro lens array having a pitch (e.g., lateral distance between the centers of two lenses) from 8 microns to 300 microns (such as 8 microns, 12 microns, 15 microns, 20 microns, 25 microns, 30 microns, 42 microns, 50 microns, 62.5 microns, 75 microns, 87.5 microns, 100 microns, 125 microns, 150 microns, etc.) or any ranges within this range (such as 8 microns to 250 microns, 8 microns to 200 microns, 12.5 microns to 250 microns, 30 microns to 300 microns, 30 microns to 250 microns, 62.5 microns to 187.5 microns, 62.5 microns to 175 microns, 62.5 microns to 162.5 microns, 75 microns to 187.5 microns, etc.). In certain embodiments, the pitch can be constant across the array 1025 of lenses. However, in some embodiments, the pitch can vary across the array 1025.

A lens within the array 1025 of lenses can have a width $W_L$ (e.g., along the x-axis). In various embodiments, the width $W_L$ of a lens can be the same as the values of pitch described herein. In certain embodiments, the width $W_L$ of a lens can be the same as the width $W_L$ of another lens in the array 1025 of lenses. However, in other embodiments, the width $W_L$ of a lens can be different than the width $W_L$ of another lens in the array 1025 of lenses.

The radius of curvature of a lens can be from 10 microns to 500 microns (such as 10 microns, 15 microns, 37.5 microns, 50 microns, 62.5 microns, 75 microns, 87.5 microns, or 100 microns) or any ranges within this range (such as 10 microns to 87.5 microns, 10 microns to 75 microns, 37.5 microns to 87.5 microns, 37.5 microns to 75 microns, 50 microns to 87.5 microns, 50 microns to 75 microns, etc.). In some embodiments, the radius of curvature of a lens can be different from the radius of curvature of another lens in the array 1025 of lenses. The curvature can be rotationally symmetrical or can be rotationally asymmetrical. In some embodiments, the radius of curvature of the lens can be greater than 500 microns. Some embodiments may comprise freeform lenslets instead of rotationally symmetric lenslets.

The lenses can be made of various materials such as a polymer. For example, the array 1025 of lenses can be UV casted into a resin layer coated on a polymer substrate. Some example substrate materials can include, but are not limited to, polyethylene terephthalate (PET), oriented polypropylene (OPP), biaxially oriented polypropylene (BOPP), low density polyethylene (LDPE), linear low density polyethylene (LLDPE), polypropylene (PP), polyvinyl chloride (PVC), or polycarbonate (PC). As another example, the array 1025 of lenses can be molded or embossed in a polymer substrate. Moldable and/or embossable substrates can include acrylonitrile butadiene styrene (ABS), polymethyl methacrylate (PMMA), polyethylene (PE), polycarbonate/acrylonitrile butadiene styrene (PC/ABS), and polyethylene terephthalate glycol-modified (PETG). Other methods and materials known in the art or yet to be developed can be used.

In some embodiments, a lens can have a focal length (and corresponding f-number) and be disposed at a distance with respect to the back side of the substrate in comparison to the lens's focal length to focus light on the back side of the substrate. In other embodiments, a lens can have a focal length (and corresponding f-number) and be disposed at a distance with respect to the back side of the substrate in comparison to the lens's focal length to focus light on the front side of the substrate. In yet other embodiments, a lens can have a focal length (and corresponding f-number) and be disposed at a distance with respect to the back side of the substrate in comparison to the lens's focal length to focus light in between the front and back sides of the substrate. Example focal lengths include a number from 10 microns to 300 microns (such as 10 microns, 12.5 microns, 15 microns, 30 microns, 37.5 microns, 62.5 microns, 75 microns, 87.5 microns, 100 microns, 112.5 microns, 125 microns, 137.5 microns, 150 microns, 162.5 microns, 175 microns, 187.5 microns, 200 microns, etc.) or any ranges within this range (such as 10 microns to 250 microns, 12.5 microns to 250 microns, 12.5 microns to 200 microns, 37.5 microns to 187.5 microns, 37.5 microns to 175 microns, 62.5 microns to 187.5 microns, 62.5 microns to 175 microns, etc.). In some embodiments, the focal length (and f-number) of a lens can be different from the focal length (and f-number) of another lens in the array 1025 of lenses.

Although the array 1025 of lenses is illustrated in FIG. 1J-1 as a 1D array of lenses, in some embodiments, the array 1025 of lenses can include a 2D array of lenses. FIG. 1J-4 shows an example 2D array of lenses. A 1D array of lenses (e.g., FIG. 1J-3) can include a series of cylindrical, hemi-cylindrical lenses, truncated hemi-cylindrical lenses, or plano convex cylindrical lenses in a row with power (e.g., curvature) in one direction only, whereas a 2D array of lenses (e.g., FIG. 1J-4) can have power (e.g., curvature) in two directions. In various embodiments, the 2D array comprises lenses having surfaces that are rotationally symmetric surfaces. In some embodiments, the 2D array can comprise lenses having surfaces that are asymmetrical. For example, the lenses can be elliptical in that the lenses are longer in one orthogonal direction compared to the other. The shape and or arrangement of the lenses, however, should not be considered to be limited. As additional examples, the surfaces of the lenses can be convex, aspherical, toroidal, and/or decentered. The lenses may have circular, square, rectangular, hexagonal aperture shape or footprint, or may have other shapes, and the aperture may be truncated. Similarly, the lenses may be arranged in a square array, triangular array, hexagonal closed packed, or arranged otherwise.

In various embodiments, the array 1025 of lenses can include a series of lenses (e.g., a lenticular lens) configured to allow the features disposed under the lenses corresponding to different images to be viewable at different viewing angles. For example, in some cases, the lenses are magnifying lenses to enlarge different features disposed under the lenses corresponding to different images at different viewing angles. As another example, the lenses can provide an avenue to switch between different images through different channels. Thus, the product 1000 can include a first set of portions $P_A$ and a second set of second portions $P_B$ disposed under the array 1025 of lenses.

In FIG. 1J-1, the first plurality of portions $P_A$ and the second plurality of portions $P_B$ are interlaced with each other. At the first viewing angle $\theta_1$, the array 1025 of lenses can be configured to allow the first image (e.g., text "100") to be viewable without allowing the second image (e.g., liberty bell) to be viewable. At the second viewing angle $\theta_2$, the array 1025 of lenses can be configured to allow the second image (e.g., liberty bell) to be viewable without allowing the first image (e.g., text "100") to be viewable. Thus, by tilting the product 1000 from the first viewing angle $\theta_1$ to the second viewing angle $\theta_2$, the array 1025 of lenses can switch between the two images.

Referring to FIG. 1J-1, the first plurality of portions $P_A$ and the second plurality of portions $P_B$ can be disposed under the array 1025 of lenses. In various embodiments, the first plurality of portions $P_A$ and the second plurality of portions $P_B$ can have a width w smaller than the width $W_L$ of a lens in the array 1025 of lenses. In some embodiments, a pair of a first plurality of portions $P_A$ and a second plurality of portions $P_B$ can be aligned under each lens in the array 1025 of lenses. However, a pair of a first plurality of portions $P_A$ and a second plurality of portions $P_B$ need not be exactly aligned under a single lens in the array 1025, but might be offset from such an alignment. For example, a first plurality of portions $P_A$ can be disposed under a single lens in the array, while a portion of plurality of portions $P_B$ can be disposed under parts of two different lenses in the array 1025. Thus, in various embodiments, the pairs of a first plurality of portions $P_A$ and a second plurality of portions $P_B$ under the array 1025 of lenses are not alignment sensitive (e.g., exact alignment of pairs of a first plurality of portions $P_A$ and a second plurality of portions $P_B$ under a single lens in the array 1025 is not necessary).

Although exact alignment of pairs of a first plurality of portions $P_A$ and a second plurality of portions $P_B$ under a single lens in the array 1025 is not necessary, a lens within the array 1025 of lenses can be registered on average to a pair of a first plurality of portions $P_A$ and a second plurality of portions $P_B$. For example, a lens can correspond to a pair of a first plurality of portions $P_A$ and a second plurality of portions $P_B$. Light from a first portion $P_{A1}$ can pass through a first part of a lens and light from a second portion $P_{B1}$ and a second plurality of portions $P_{B1}$ can pass through a separate part of the lens, and corresponding portions of the lens can form the images 110, 120 at two different angles as described herein. On average, most of the lens may be registered with respect to the pair of a first plurality of portions $P_A$ and a second plurality of portions $P_B$.

FIG. 1J-5 illustrates a cross-sectional view of an embodiment of an optical product 1060A comprising a carrier 1065 and a portion $P'_1$ including a plurality of optical features (e.g. $F'_1$) that are configured to produce an image of an object or part thereof. The optical product 1060A can have features/characteristics that are similar to the optical product 10' discussed above. In various embodiments, a reflective material can be disposed over the portion $P'_1$. In some embodiments, the portion $P'_1$ can be formed on a substrate and disposed on the first side of the carrier 1065. The carrier 1065 can have characteristics similar to the various polymeric substrates (e.g., polymeric substrate 1005 of FIG. 1I) described herein. For example, the carrier 1065 can comprise a polymeric material having a refractive index greater than the refractive index of air. Light rays that are incident on the carrier 1065 after being reflected and/or scattered by the plurality of optical features at angles less than the critical angle of the material of the carrier 1065 as measured with respect to a normal to the surface, such as, for example, close to the normal to the surface of the carrier 1065 can exit out of the carrier 1065 as shown in FIG. 1J-5. However, high angle rays that are incident on the carrier 1065 after being reflected and/or scattered by the plurality of optical features at angles greater than the critical angle of the material of the carrier 1065 will be total internally reflected and do not exit out of the carrier 1065 as shown in FIG. 1J-5. Accordingly, the image generated by the plurality of optical features of the product 1060A can only be viewed over an angular range that is less than the critical angle.

A lens element 1068 can be disposed on a second side of the carrier 1065 and registered with the portion P'₁ to increase the angular range over which the image produced by the plurality of optical features can be viewed. The lens element 1068 can be a part of an array of lenses. The lenses in the array can be on average registered with the plurality of portion P$_n$'. The lens element 1068 can advantageously increase the viewing angle over which the image generated by the portion P'₁ can be viewed, in part due to the condition of total internal reflection of high angle rays not being satisfied as explained below with reference to FIGS. 1J-5 and 1J-6.

The lens element 1068 can have a curved surface which can reduce the angle between the high angle rays and the surface normal such that the condition for total internal reflection is not satisfied. The lens element 1068 can be optically transmissive. Accordingly, some of the high angle rays that are incident on the carrier 1065 after being reflected and/or scattered by the plurality of optical features can exit out of the carrier 1065 instead of being total internally reflected. Consequently, the product 1060B including a lens element 1068 can advantageously increase the view angle over which the image produced by the plurality of optical features can be viewed. The lens element 1068 can also provide other advantages including but not limited to improving focus of the different images, increasing the difference between the tilt angles at which the different images can be viewed (also referred to as tilt budget) for embodiments in which multiple sets of portions produce multiple images, increasing depth perception by allowing a viewer to receive light at steeper angles and other advantages discussed herein.

In various embodiments of the product including a reflective surface disposed over the plurality of optical features, the lens element 1068 can increase the range of local surface normal as shown in FIG. 1J-7. For example, consider rays of light that are emitted from different points of the surface of the facet along a normal direction as illustrated in FIG. 1J-7. Each of the rays will be refracted out of the lens element 1068 in various directions depending on the curvature of the lens element at the point where each of the normal rays of light intersects the lens element. In this manner, the angular range of rays that are emitted along a normal direction to the surface is expanded. The lens element 1068 can be lenticular in some embodiments. In some other embodiments, the lens element 1068 can be, a spherical lens and/or a rotationally symmetric aspheric lens. In some embodiments, the lens element 1068 can be a part of a 1-D array of lenses as shown in FIGS. 1J-3. In some other embodiments, the lens element 1068 can be a part of a 2-D array of lenses as shown in FIG. 1J-4. In some embodiments, the lens element 1068 can be a microlens. The array of lenses can be a rectangular array, a square array, a triangular array, a hexagonal close packed array or an irregular array.

As discussed above and illustrated in FIG. 1J-1, individual lenses of the array 1025 of lenses can be disposed over a plurality of portions P$_{An}$, P$_{Bn}$ (e.g., having optical features as described herein) that are configured to produce a plurality of images or parts thereof. For example, an individual lens of the array 1025 of lenses can be disposed over at least a first plurality of portions P$_A$ configured to produce image A and a second plurality of portions P$_B$ configured to produce image B. In the embodiment 1080 of the product illustrated in FIG. 1J-8, the first plurality of portions P$_A$ can be configured to produce a first image or part thereof and the second plurality of portions P$_B$ can be configured to produce a second image or part thereof. The array 1025 of lenses can be configured such that a viewer may be able to view the first or the second image by flipping or tilting the product 1080 about an axis as discussed above with reference to FIG. 1J-1. The array 1025 of lenses disposed over the plurality of portions P$_{An}$, P$_{Bn}$ having different sets of optical features as described herein with reference to FIG. 1J-1 can also provide the advantage of increased field of view and other advantages discussed above.

In some embodiments, the first image produced by the first plurality of portions P$_A$ can correspond to a first stereoscopic version of an image corresponding to a right eye perspective of the an object and the second image produced by the second plurality of portions P$_B$ can be configured to produce a second stereoscopic version of an image corresponding to a left eye perspective of the object. The lenses of the array 1025 of lenses can be configured to direct light from the first plurality of portions P$_A$ towards the right eye of a viewer and light from the second plurality of portions P$_B$ towards the left eye of the viewer thereby generating 3D images (e.g., autostereoscopic images) which produce the perception of depth. The optical features, such as are described herein, included in the plurality of portions P$_{An}$, P$_{Bn}$ can have facets that are tilted progressively as depicted in the inset of FIG. 1J-8 which illustrates a cross-sectional view along axis X-X' of one of the second plurality of portions P$_B$.

In various embodiments, the array of optical element (e.g., lenses, prisms or mirrors) can be integrated or combined together in one surface with the optical features that are included in the plurality of portions P$_{An}$, P$_{Bn}$ (e.g., having optical features as described herein) that are configured to produce a plurality of images or parts thereof. FIG. 1J-9 illustrates a cross-sectional view of a product 1085 comprising a first plurality of portions P$_{A1}$, P$_{A2}$, ... P$_{An}$. Each portion P$_{An}$ can include optical features (e.g., optical features F₁, F₂, ..., F$_n$) or facets that can produce a first image. The product 1085 also includes a second plurality of portions P$_{B1}$, P$_{B2}$, ... P$_{Bn}$ which produce a second image. The second plurality of portions P$_{B1}$, P$_{B2}$, ... P$_{Bn}$ which are illustrated in the bottom view of the product 1085 shown in FIG. 1J-10. As noted in FIG. 1J-10, the carrier can include a plurality of portions configured to produce at least a first image of a first object and a second image of the second product. The combined surface 1095 of the plurality of portion combined with the optical elements (e.g., lenses, mirrors or prisms) is illustrated in FIG. 1J-10. Various embodiments, can include a plurality of elongate cylindrical lenses or mirrors 1097 that extend over the multiple portions as depicted in FIG. 1J-11 instead of the plurality of optical elements 1090.

The surfaces of the optical features or facets can be slowly varying (e.g., sloped) such that the surface across some or all plurality of portions P$_{A1}$, P$_{A2}$, ... P$_{An}$ is substantially continuous as discussed above with reference to FIG. 1E. The product 1085 further comprises optical elements 1090 such as lenses, prisms or mirrors (e.g., curved mirrors) integrated (e.g., monolithically integrated) with the optical features or facets. The optical elements 1090 can include powered elements such as lenticular elements, microlenses, concave mirrors, cylindrically shaped concave mirrors, rotationally symmetric curved surfaces, elongate cylindrical surfaces, spherical or toroidal surfaces, prisms, diffractive features, etc. In some embodiments, the optical elements 1090 can be superimposed on the shape of the optical features or facets to form an aggregate surface which includes shape contribution from both the optical elements (e.g., lenses, prisms or mirrors) as well as the features and/or facets in the plurality of portions, as depicted in FIG. 1J-9. In the embodiment illustrated in FIG. 1J-10 the optical elements 1090 are superimposed on the first and the second plurality of portions. However, in some other embodiments, a first set of optical elements can be integrated with and/or superimposed on the optical features of the first plurality of portions and a second set of optical elements can be integrated with and/or superimposed on with the optical features of the second plurality of portions.

Embodiments in which the optical features of the first and the second plurality of portions are combined with optical elements (e.g., lenses, mirrors or prisms) have a first curvature/gradient that is configured to produce the desired first and/or the second image and a second curvature corresponding to the curvature of the optical elements 1090 configured to provide additional optical power, improve contrast ratio and/or diffusive effects. The optical elements 1090 can be superimposed on the surface of the optical features or facets on a side opposite the carrier 1050. In such embodiments, the exposed portions of the optical elements 1090 can include a reflective surface (e.g., metallized) to reflect light out of the carrier 1050. Accordingly, the optical element may comprise a mirror with optical power (e.g., a concave mirror). The reflective surface can be partially transmissive in some embodiments. In various embodiments, the mirror can comprise curved surfaces formed in a material having refractive index higher than refractive index of the surrounding material such that light is reflected due to total internal reflection.

To manufacture the product 1085 the aggregate surface profile which includes shape contribution from both the optical elements (e.g., lenses, prisms or mirrors) as well as the features and/or facets in the plurality of portions stored in a data file can be used to replicate the aggregate surface profile on a polymeric substrate. For example, the aggregate surface profile can be embossed into an UltraViolet (UV) curable resin coated onto various polymeric substrates, such as, for example, polyethylene terephthalate (PET), oriented polypropylene (OPP), biaxially oriented polypropylene (BOPP), low density polyethylene (LDPE), linear low density polyethylene (LLDPE), polypropylene (PP), polyvinyl chloride (PVC), polycarbonate (PC) or any other type of plastic film or carrier. For thermoformable plastics such as PVC and PC, the aggregate surface profile can be embossed directly into the substrate without the UV curable layer. This method can be used to manufacture the product 1085 on a large industrial scale Integrating on a single surface, the optical elements 1090 with the optical features or facets included in the plurality of portions $P_{An}$, $P_{Bn}$ can advantageously simplify manufacturing by removing the need to provide structures on 2-sides or surfaces of the carrier 1050. Accordingly, manufacturing costs can be reduced since only one side or surface of the carrier 1050 undergoes a process of replication (e.g., embossing) to provide optical features or facets. Additionally, since, the optical elements (e.g., lenses, prisms or mirrors) are integrated with the optical features or facets, for example in a data file, a separate process need not be required to separately register or align the optical elements (e.g., lenses, prisms or mirrors) with the optical features or facets. This can additionally improve ease of manufacturing and help reduce Moire effects due to misalignment between the optical elements (e.g., lenses, prisms or mirrors) and the corresponding optical features or facets. In some embodiments, the lenses or mirrors may be configured to provide additional optical power to the optical features or facets and/or provide diffusion effects. Integrating the optical elements (e.g., lenses, mirrors or prisms) with the optical features or facets can further provide directional reflection which can help in steering images formed by the different plurality of portions in the desired direction.

The optical products similar to product 1085 include macro features (e.g., features F1, F2, . . . , Fn) that are configured to produce an image of a 3D object superimposed with micro features (e.g., microlenses, lenticular elements, prisms, mirrors). As discussed above, these optical products can be configured to provide switching between different images. In some embodiments, the micro features can also comprise diffractive features that can increase contrast. The optical products including macro features (e.g., features F1, F2, . . . , Fn) that are configured to produce an image of a 3D object combined with micro features (e.g., microlenses, lenticular elements, prisms, mirrors) can be manufactured using a replication process (e.g., embossing). The micro features superimposed on the macro features can be substantially achromatic. For example, the combined macro and micro features can provide no diffractive or interference color (e.g., no wavelength dispersion or rainbows or rainbow effects). In some cases, the combined macro and micro features can be colored. For example, the non-holographic features can comprise a tint, an ink, dye, or pigment where absorption can provide color. As discussed above, the macro features and the micro features can be integrated together and a combined surface profile can be stored in a data file which can be used to replicate the combined surface profile on the optical product. The optical product including the combined surface profile can be applied to a surface of a product using different technologies including but not limited to hot stamping, cold foil, lamination and transfer or any other technology.

As described above, in certain embodiments, the optical product 10' can provide a stereoscopic view or a 3D effect. For example, the first and second portions can correspond to portions of a right side and left side view of the 3D object respectively. In some such embodiments, the lenses in the array of lenses, array of prisms, array or curved mirrors or array of mirrors (and the first and second portions) can have a longitudinal axis disposed in the vertical direction (e.g., cylindrical lenses or mirrors with more curvature in the horizontal direction). When tilting the device about the longitudinal axis of the lenses, the array of lenses, prisms or mirrors can be configured to present the right and left side views of the object for a stereoscopic view of the object. As disclosed herein, the first and second portions can include the optical features $F_1$, $F_2$, . . . $F_n$ or elements $E_1$, $E_2$, . . . , $E_n$ described herein. In various embodiments, the optical product 10' can further comprise more than two portions disposed under the array of lenses or mirrors. These additional portions can correspond to portions of one or more additional side views of the image (e.g., 3, 4, 5, 6, 7, 8, 9, 10, 15, 17, 20, etc.). For example, the views of the object can include images as seen from 0 degrees, 5 degrees, 10 degrees, 15 degrees, 20 degrees, 30 degrees, 40 degrees, 45 degrees, 50 degrees, 60 degrees, 70 degrees, etc. with respect to the front forward direction of the object. These additional side views can include different perspectives of the object as if rotating about the object.

A first plurality of portions $P_A$ and/or a second plurality of portions $P_B$ can have a length 1 (along the y-axis), width w (along the x-axis), and thickness t (along the z-axis). The length 1, width w, and thickness t are not particularly limited, and can be based on the application. In various embodiments, the first plurality of portions $P_A$ and/or the second plurality of portions $P_B$ can include multiple portions (e.g., $P_{A1}, P_{A2}, \ldots P_{An}$ and/or $P_{B1}, P_{B2}, \ldots P_{Bn}$ respectively) long the length 1. In some embodiments, the width w of a first plurality of portions $P_A$ and/or a second plurality of portions $P_B$ can be based on the size of the lenses in the array 1025 (e.g., approximately half of the pitch of the lens) or vice versa.

In various embodiments, the array 1025 of lenses can be disposed on a first side 1051 of a substrate or carrier 1050. The first plurality of portions $P_A$ and/or a second plurality of portions $P_B$ can be disposed on the second side 1052 opposite the first side 1051 of the substrate 1050. The first plurality of portions $P_A$ and/or the second plurality of portions $P_B$ can include the optical features $F_1$, $F_2$ or elements $E_1, E_2, \ldots, E_n$ as described herein.

After the product 1000 is formed, some such products 1000 can be incorporated into a banknote having a paper or polymer thickness from 90 microns to 300 microns (e.g., 90 microns, 95 microns, 98 microns, 100 microns, 105 microns, 107 microns, 150 microns, 200 microns, 300 microns etc.), or any range within this range or any range formed by any of these values (e.g., 90 microns to 105 microns, 95 microns to 105 microns, 90 microns to 200 microns, etc.). The product 1000 can be formed into security threads in banknotes. A security thread can be a polymeric film interwoven into the banknote paper or polymer as it is being made such that portions of it are visible at the surface and some portions are not. The product 1000 can be a hot stamp feature, an embedded feature, a windowed feature, or a laminated feature. A hot stamp feature can be transferred to a banknote surface using a release substrate upon which may be located a security feature, e.g., a hologram, using heated die and pressure. A patch is generally hot stamped to a banknote surface. An embedded feature can be affixed within a depression, e.g., formed during the paper or polymer making process, in the banknote. In some embodiments, this feature can keep the banknote surface flat. A windowed feature can allow one to view the product in transmission. A windowed feature can include a security thread interwoven into the banknote paper or polymer. A laminated feature can be affixed to the surface of the banknote by means of an adhesive. A laminated strip can include a flat polymer film with built in optical security devices. This flat polymer film can be attached to a banknote across its width (e.g., narrow dimension) using adhesive on the banknote surface. In some embodiments, the product 1000 can be configured to provide authenticity verification on an item of security (e.g., currency, a credit card, a debit card, a stock certificate, a passport, a driver's license, an identification card, a document, a tamper evident container or packaging, consumer packaging, or a bottle of pharmaceuticals).

It is contemplated that other variations are also possible. For example, in various implementations, the first and the second set of optical features $F_1$ and $F_2$ can be superimposed or interspersed within a portion such that they overlap with each other in the portion. Such an embodiment is illustrated in FIGS. 1K-1 and 1K-2 which schematically illustrate a top view of an embodiment of an optical object 10' that comprises three portions $P_1$, $P_2$, and $P_3$. Each portion $P_1$-$P_3$ in the group shown comprises a first set of optical features $F_1$ configured to produce a first distinct image when viewed from a first direction and a second set of optical features $F_2$ that are configured to produce a second distinct image when viewed from a second direction.

Various methods can be used to manufacture the master 10 for fabricating an optical product 10'. An example method 100 is shown in FIG. 2. As shown in operational block 110, the method 100 can include providing a data file, e.g., a 2D data file, configured to describe, characterize, and/or record features the 3D object and/or 3D image 50'. The data file can provide the pattern of the features $F_1, F_2, \ldots F_n$ on the surface 12 of the master 10.

For example, the data file can comprise a plurality of portions (as will be described further herein). Each portion can correspond to one or more points on a surface S of the 3D object 50. Each portion can comprise features of intensity corresponding to non-holographic elements on the optical product 10'. A gradient in intensity can correlate to an inclination of the surface S of the 3D object 50 at the one or more corresponding points. In addition, an orientation of the features can correlate to an orientation of the surface S of the 3D object 50 at the one or more corresponding points. As shown in operational block 120, the method 100 can further include manufacturing the master 10 based at least in part on the 2D data file.

Figure 2:
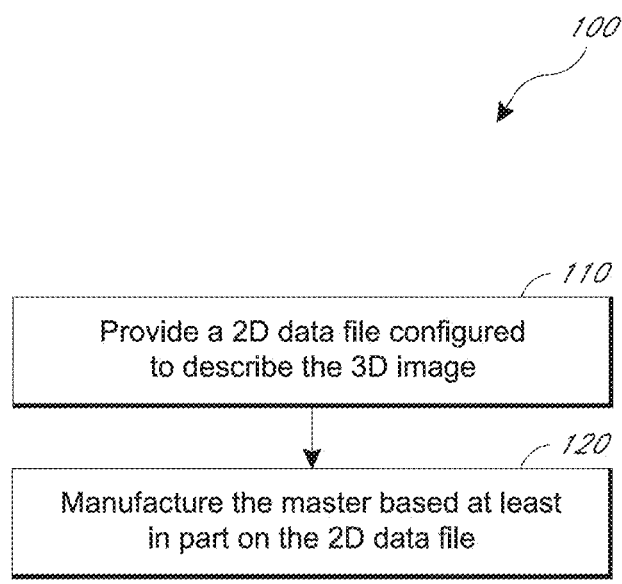
Figure 2A:
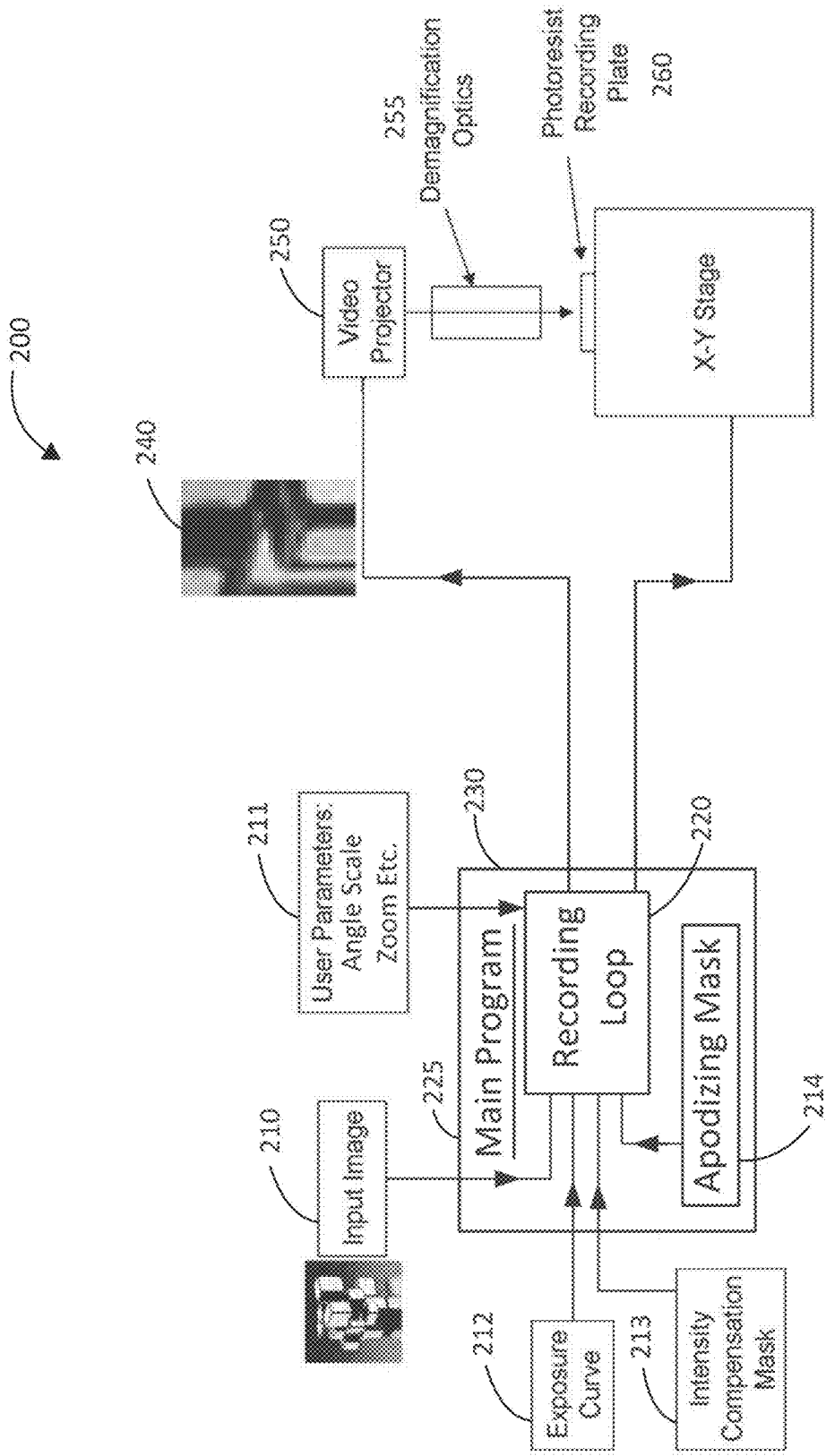
FIG. 2A illustrates an example method that can be used to manufacture a surface relief diffuser.

As described herein, certain embodiments of the optical product 10' can produce a bright, mirror-like image. In some implementations, a matte finish may be desired. FIG. 2A illustrates an example method that can be used to manufacture a surface relief diffuser and also to determine a height displacement file used to manufacture the diffuser. In the method 200 shown in FIG. 2A, an input image 210 of the 3D object 50 (e.g., a 2D photograph of the 3D object) is entered into the recording loop 220 of the main program 225 of the processor 230. Other information, such as user parameters 211 (e.g., angle, scale, zoom, etc.), exposure compensation curve 212, intensity compensation mask 213, and apodizing mask 214 can also be entered into the recording loop 220. The processor 230 can produce a height displacement file 240 that is configured to describe the intensities of the 3D object 50. This height displacement file 240 can be used as a map to generate the pattern of the diffuser. In some examples of the height displacement file 240, the intensities of the 3D object can be correlated to a depth for the diffuser. For example, the black sections of the 3D object 50 can correlate to the surface of the diffuser, white sections of the 3D object 50 can correlate to a lower depth (e.g., down 10 μm), and grey sections of the 3D object 50 can correlate to some depth in between. Other variations are possible.

In the example method 200 shown in FIG. 2A, a digital micromirror device (DMD) video projector 250 can be used along with the photoresist recording plate 260, each receiving the inputted information from the recording loop 220. The DMD video projector 250 includes a DMD chip that includes a plurality of micromirrors that in certain embodiments can correspond to the pixels of the height displacement file 240. The pixels of the height displacement file 240 can also correspond to the regions on the X-Y stage of the photoresist recording plate 260 in some embodiments. Each micromirror of the DMD chip can be used as a spatial light modulator that, for example, reflects light from a light source in the video projector 250 in the on-state, and that does not reflect light in the off-state. Varying the amount of light intensity can be produced by varying the time the micromirror is in the on- and off-states (e.g., pulse width modulation, etc.). As shown in FIG. 2A, demagnification optics 255 can be used to produce the pattern of the diffuser in a light sensitive material, e.g., a photoresist, on the resist recording plate 260. In some embodiments, the resist can be used as the diffuser. As disclosed herein, other techniques, such as electron beam lithography on electron sensitive material and ion beam lithography on ion sensitive material can also be used. Certain embodiments of the diffuser can be used with certain embodiments of the optical product 10' to produce a diffuse or hazy layer over the reflected image 50' to produce an image with a matte finish.

Figure 2B:
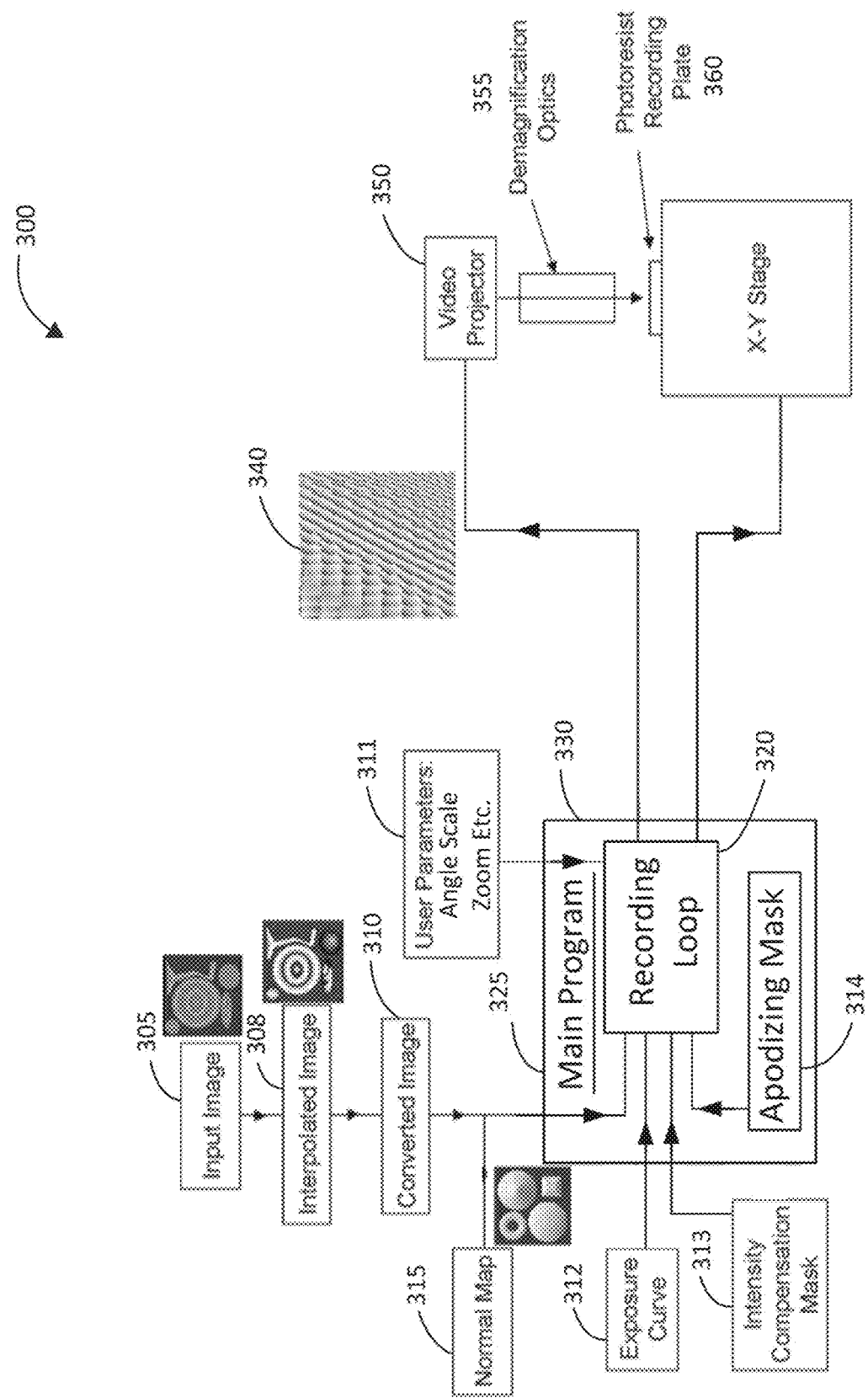
FIGS. 2B-2C illustrate example methods to manufacture a master for fabricating an optical product in accordance with certain embodiments described herein.

FIG. 2B illustrates an example method that can be used to manufacture the master 10 and also to determine the data file to be used to manufacture the master 10, e.g., to determine the pattern of the features $F_1, F_2, \ldots F_n$ on the surface 12 of the master 10. Certain such embodiments can be advantageous as a 3D physical object and/or a 3D model utilizing physical dimensions of the 3D object (e.g., topographical calculations) are not required. For example, in the method 300 shown in FIG. 2B, the input image 305 can be a 2D input image (e.g., a 2D photograph of the 3D object) or 2D image converted from a 3D image. In some embodiments, the input image 305 can be converted into a 2D interpolated image 308 and produced as a 2D converted image 310. The 2D image of the 3D object can be translated into a gray scale image (e.g., a normal map 315 wherein black, white, and gray regions correlate to different heights of the 3D object). In the method 300 shown in FIG. 2B, the converted image 310 (or a normal map 315) is entered into the recording loop 320 of the main program 325 of the processor 330 in accordance with certain embodiments described herein. Similar to the method 200 in FIG. 2A, other information, such as user parameters 311 (e.g., angle, scale, zoom, etc.), exposure compensation curve 312, intensity compensation mask 313, and apodizing mask 314 can also be entered into the recording loop 320. The processor 330 can produce a data file 340, e.g., a 2D data file, that is configured to describe the 3D image 50' of at least a part of the 3D object 50. In some embodiments, the intensities in the data file 340 can be assigned based on gray scale. For example, the data file 340 can comprise a plurality of portions. Each portion can correspond to one or more points on a surface S of the 3D object 50. Each portion can comprise features of intensity corresponding to non-holographic elements on the optical product 10'. A gradient in intensity can correlate to a gradient or an inclination of the surface S of the 3D object 50 at the one or more corresponding points. In addition, an orientation of the features can correlate to an orientation of the surface S of the 3D object 50 at the one or more corresponding points. This data file 340 can be used as a map to generate the pattern of features $F_1, F_2, \ldots F_n$ on the surface 12 of the master 10. An example data file is discussed with respect to FIG. 3A.

Similar to method 200 in FIG. 2A, a digital micromirror device (DMD) video projector 350 can be used along with the photoresist recording plate 360, each receiving the inputted information from the recording loop 320. The plurality of micromirrors in the DMD video projector 350 in certain embodiments can correspond to the pixels of the data file 240. The pixels of the data file 340 can also correspond to one or more portions $P_1, P_2, \ldots P_n$ of the surface 12 of the master 10 in some embodiments. As shown in FIG. 2B, the demagnification optics 355 can be used to produce the pattern of features $F_1, F_2, \ldots F_n$ in a light sensitive material, e.g., a photoresist, on the resist recording plate 360. In some embodiments, the resist can be used as the surface 12 of the master 10. As disclosed herein, other techniques, such as electron beam lithography on electron sensitive material and ion beam lithography on ion sensitive material can also be used.

In some embodiments, the method 300 can further include adding on the master 10 features corresponding to holographic elements on the optical product 10'. For example, an optical recording (e.g., a planar optical recording) for the holographic elements can be superimposed onto the master 10 to add the holographic elements on the master 10. As another example, in some embodiments, the data file 340 can include features corresponding to holographic elements on the optical product 10'. In other embodiments, a separate data file comprising the features of intensity corresponding to holographic elements on the optical product 10' can be provided. Manufacturing the master 10 can be based at least in part on the data file 340 including features corresponding to non-holographic elements and on the data file including features corresponding to holographic elements on. In some such embodiments, the data file 340 including the features corresponding to non-holographic elements and the data file including the features corresponding to holographic elements can be used sequentially or simultaneously to manufacture the master 10. In some other embodiments, a needle, such as from an atomic force microscope, can be used to produce the features corresponding to the holographic elements on the optical product 10'. Other methods can be employed to add holographic features or elements.

Figure 2C:
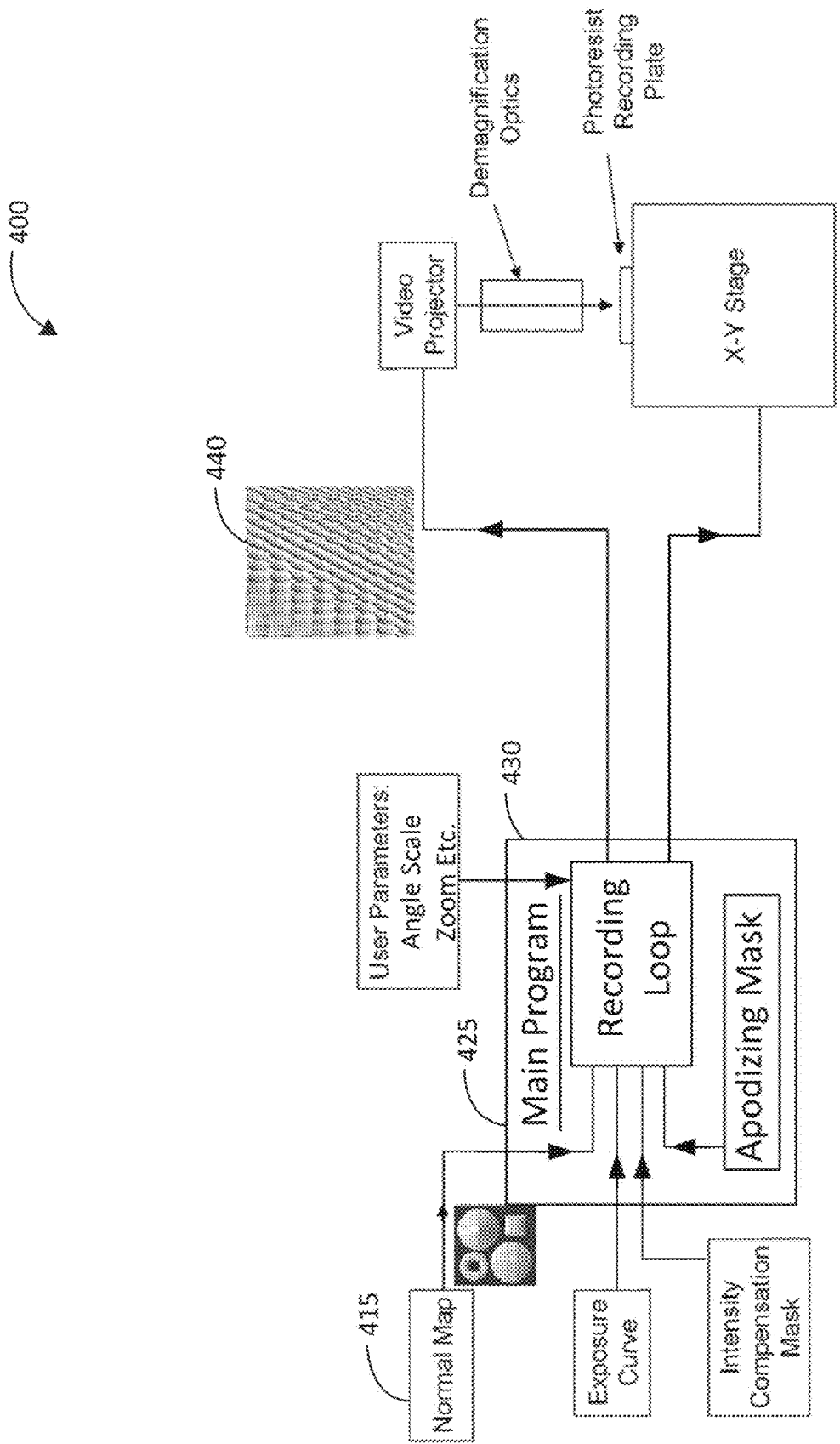

FIG. 2C illustrates yet another example method that can be used to determine the pattern of the features $F_1, F_2, \ldots F_n$ on the surface 12 of the master 10. The method 400 shown in FIG. 2C is similar to the method 300 shown in FIG. 2B except that a normal map 415 can be provided instead of the input image 310. The normal map 415 can be inputted into the main program 425 of the processor 430 to produce the data file 440.

Figure 3A:
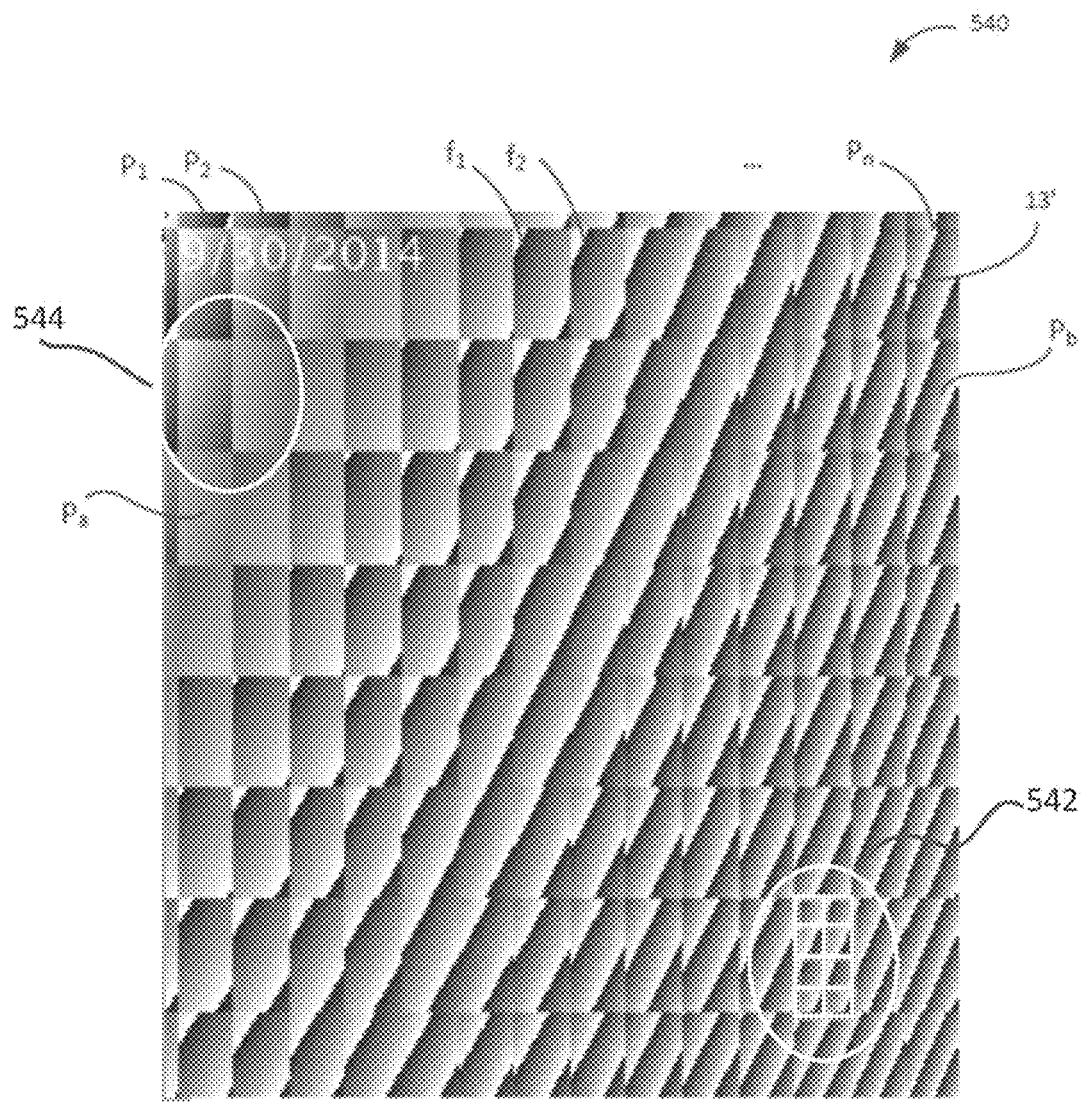
FIGS. 3A-3B illustrate example 2D data files in accordance with certain embodiments disclosed herein.

FIG. 3A illustrates an example 2D data file 540 in accordance with certain embodiments disclosed herein. The data file 540 can include a plurality of portions $p_1, p_2, \ldots p_n$. In some embodiments, the plurality of portions $p_1, p_2, \ldots p_n$ can form a single cell (e.g., a mono-cell). In other embodiments, as shown in FIG. 3A, the plurality of portions $p_1, p_2, \ldots p_n$ can form a plurality of cells. In various embodiments, the portions $p_1, p_2, \ldots p_n$ can form a pixelated surface corresponding to the portions $P_1, P_2, \ldots P_n$ of the surface 12 of the master 10. For example, as shown in FIG. 3A, the portions $p_1, p_2, \ldots p_n$ can include a plurality of rows and columns.

Figure 3B:
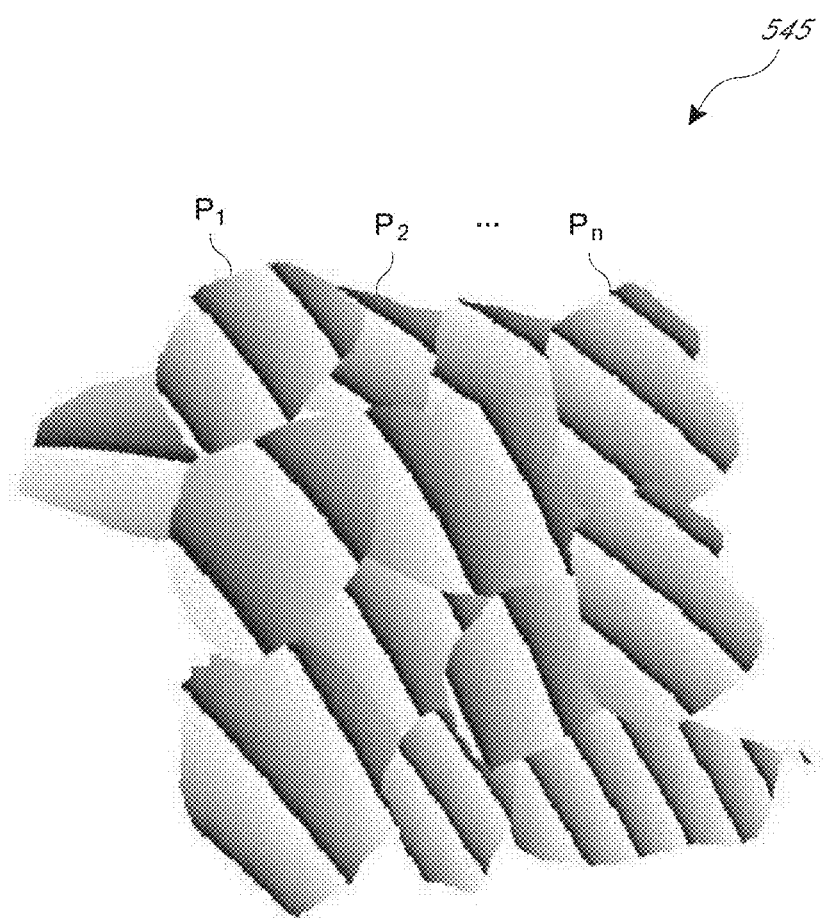

As also shown in FIG. 3A, in some embodiments, borders 13' can surround at least part of the portions $p_1, p_2, \ldots p_n$. The borders 13' can substantially surround a portion $p_n$ or can surround just part of a portion $p_n$. As with the master 10, the size and shape of the portions $p_1, p_2, \ldots p_n$ on the data file 540 are not particularly limited. Some of the portions $p_1, p_2, \ldots p_n$ can comprise a symmetrical shape. For example, the symmetrical shape can include a rectangle, a square, a rhombus, an equilateral triangle, an isosceles triangle, a regular polygon (e.g., a regular pentagon, a regular hexagon, a regular octagon), etc. The shape can also include curvature, e.g., a circle, an ellipse, etc. In other embodiments, some of the portions $p_1, p_2, \ldots p_n$ can comprise a non-symmetrical shape, e.g., a non-rotationally symmetrical shape, and/or an irregular shape. For example, FIG. 3B illustrates an example embodiment of a data file 545 with irregularly shaped portions $p_1, p_2, \ldots p_n$. In some embodiments, some of the portions $p_1, p_2, \ldots p_n$ can have a shape that is substantially the same as other portions $p_1, p_2, \ldots p_n$. In other embodiments, e.g., as shown in FIG. 3B, some of the portions $p_1, p_2, \ldots p_n$ can have a shape that is different from other portions $p_1, p_2, \ldots p_n$.

As with the master 10, the arrangement of the portions $p_1, p_2, \ldots p_n$ in the data file 540 is not particularly limited. For example, whether with or without borders, whether symmetrically shaped or non-symmetrically shaped, or whether regularly or irregularly shaped, the portions $p_1, p_2, \ldots p_n$ can form a periodic array. For example, in FIG. 3A, the portions $p_1, p_2, \ldots p_n$ form a periodic array. In other embodiments, whether with or without borders, whether symmetrically shaped or non-symmetrically shaped, or whether regularly or irregularly shaped, the portions $p_1, p_2, \ldots p_n$ can form an aperiodic array. For example, in FIG. 3B, the portions $p_1, p_2, \ldots p_n$ form an aperiodic array. In yet other embodiments, the portions $p_1, p_2, \ldots p_n$ can form a combination of periodic and aperiodic arrays.

With continued reference to FIG. 3A, each portion $p_n$ can include features $f_1, f_2, \ldots f_n$ that correspond to features $F_1, F_2, \ldots F_n$ on the surface 12 of the master 10. Portion $p_a$ has a single feature $f_1$, while portion $p_b$ has multiple features $f_n$. The features $f_1, f_2, \ldots f_n$ of the data file 540 can include features of intensity (varying dark and light lines). In some embodiments, the intensity can correlate to the height of a feature on the surface S of the 3D object 50.

In various embodiments, a lateral distance between two features can be defined in some embodiments as a pitch. In some embodiments, the pitch between features within a portion $p_n$ can be substantially the same within the portion $p_n$. For example, in various embodiments, in portion $p_1$ of the portions $p_1, p_2, \ldots p_n$, the feature $f_1$ can comprise a plurality of features that form a periodic array such that the pitch is substantially the same within portion $p_1$. In addition, in some embodiments, the features $f_1, f_2, \ldots f_n$ among multiple portions $p_1, p_2, \ldots p_n$, can form a periodic array such that the pitch is substantially the same among multiple portions $p_1, p_2, \ldots p_n$.

In other embodiments, the features can form an aperiodic array such that the pitch may be different among multiple portions $p_1, p_2, \ldots p_n$. However, although the pitch may be different for different portions $p_1, p_2, \ldots p_n$, in some embodiments, the pitch can be slowly varying (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) among the portions $p_1, p_2, \ldots p_n$. In some embodiments, the pitch may uniformly change across multiple portions $p_1, p_2, \ldots p_n$.

In other embodiments, the features could be chirped within a portion $p_n$ such that the pitch may be different within the portion $p_n$. In some such embodiments, the pitch within the portion $p_n$ may slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance).

FIG. 3A shows an example data file 540 with linear features where the pitch is substantially uniform within a portion $p_n$, and FIG. 3B shows an example data file 545 with curved features where the pitch is substantially uniform within a portion $p_n$. FIG. 3A is also an example of features having a pitch that slowly changes (e.g., less than 10% change per lateral distance) across multiple portions $p_1, p_2, \ldots p_n$.

In various embodiments, each feature of intensity can include a slope. Various embodiments can advantageously have a uniform gradient (e.g., uniform slope) within each portion $p_n$ such that the gradient is a single value (e.g., a single polar angle $\theta_n$) at the corresponding point Su on the surface S of the 3D object 50. The gradient in the features $f_1, f_2, \ldots f_n$ can correlate to an inclination of the surface S of the 3D object 50 at the corresponding point $S_1, S_2, \ldots S_n$. In other embodiments, the feature $f_n$ within a portion $p_n$ includes a plurality of features, and the features within the portion $p_n$ may have more than one gradient (e.g., different slopes). In such embodiments, the average gradient (e.g., average slope) of the features within the portion $p_n$ can correlate to the inclination of the surface S of the 3D object 50 at the corresponding point Su.

Various embodiments can also advantageously have a uniform orientation within each portion $p_n$, such that the orientation is a single value (e.g., a single azimuth angle $\varphi_n$) at the corresponding point Su on the surface S of the 3D object 50. In various embodiments, the orientation of features $f_1, f_2, \ldots f_n$ can correlate to an orientation of the surface S of the 3D object 50 at the corresponding point $S_1, S_2, \ldots S_n$. In other embodiments, the feature $f_n$ within a portion $p_n$ includes a plurality of features, and the features within the portion $p_n$ may have more than one orientation (e.g., different orientations). In such embodiments, the average orientation of the features within the portion $p_n$ can correlate to the orientation of the surface S of the 3D object 50 at the corresponding point Su. Furthermore, the orientation of the features within and among the portions $p_1, p_2, \ldots p_n$, can slowly vary (e.g., less than 15% change per lateral distance, less than 12% change per lateral distance, less than 10% change per lateral distance, less than 8% change per lateral distance, less than 5% change per lateral distance, less than 3% change per lateral distance, or less than 1% change per lateral distance) within and among the portions $p_1, p_2, \ldots p_n$.

In various embodiments, the portions $p_1, p_2, \ldots p_n$ can be configured as mesh free cell structures wherein, the size of the portions $p_1, p_2, \ldots p_n$ can be correlated to the gradient of the features in each portion $p_1, p_2, \ldots p_n$ and/or the pitch of the features in each portion $p_1, p_2, \ldots p_n$. For example the size of the portions $p_1, p_2, \ldots p_n$ in the region 542 depicted in FIG. 3A which has features with steeper gradients can be smaller than the size of the portion $p_1, p_2, \ldots p_n$ in the region 544 which has features with shallower gradients. In such embodiments, the characteristics of lens elements that are registered or on average registered with the portions $p_1, p_2, \ldots p_n$ (e.g., the aperture size or width of the lens/mirror/prism elements, height, radius of curvature, surface curvature, center-to-center spacing between adjacent lenses, etc.) can be also be varied such that they lenses/prisms/mirrors are aligned with the respective portions $p_1, p_2, \ldots p_n$. For example, the center-to-center distance between adjacent lenses/prisms/mirrors that are registered or on average registered with portions having optical features with steeper gradients can be smaller than distance between adjacent lenses that are registered with portions having optical features with shallower gradients. The size of the lens/prism/mirror may be related to the size of the portions with which the lens is registered. Consequently the location of the smaller sized lens/prism/mirror may coincide with or track the location of the smaller sized portion. The size of the lens/prism/mirror may be correlated with steepness/shallowness of the recorded object. For example, if the recorded object has a steep surface, then the size of the lens/prism/mirror configured to reproduce an image of the steep surface can be small. As another example, if the recorded object has a shallow surface, then the size of the lens/prism/mirror configured to reproduce an image of the shallow surface can be large.

In some embodiments, where a feature $f_1$ includes multiple features within a portion, the features can appear discontinuous with other features within the portion. In some embodiments where the surface 12 of the master 10 is pixelated (e.g., having a plurality of cells), the features $f_1$, $f_2$, ... $f_n$ can appear discontinuous with features in surrounding adjacent portions. Based on pixel or cell size and/or tolerances in creating the data file 540, some embodiments may include random discontinuities with substantially no (relatively little if any) negative impact in image reproduction. Such discontinuity can reduce iridescence. In other embodiments, the portions $p_1$, $p_2$, ... $p_n$ can form a single cell or a mono-cell. In some such embodiments, the features $f_1$, $f_2$, ... $f_n$ can appear continuous and smoothly varying depending on the shape. In other such embodiments, the features $f_1$, $f_2$, ... $f_n$ can appear discontinuous due to discontinuities in the 3D object 50.

Figure 3C:
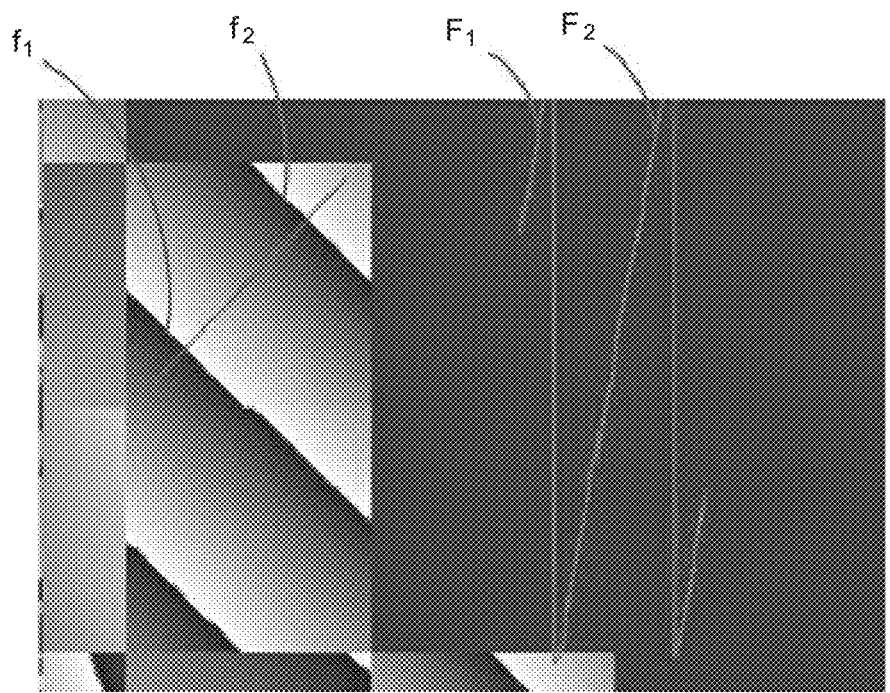
FIGS. 3C-3D illustrate example features on a data file and the corresponding features on the surface of a master for fabricating an optical product in accordance with certain embodiments disclosed herein.

In some embodiments, as shown in FIG. 3C, the features $f_1$, $f_2$, ... $f_n$ can comprise linear features corresponding to a substantially smooth region of the surface S of the 3D object 50. The features $f_1$, $f_2$, ... $f_1$ can be used to produce linear features $F_1$, $F_2$, ... $F_n$ on the surface 12 of the master 10. The features $f_1$, $f_2$, ... $f_n$ can also be used to produce non-linear features $F_1$, $F_2$, ... $F_n$ on the surface 12 of the master 10. In some embodiments, features $f_1$, $f_2$, ... $f_n$ that are linear can be used to correspond to a curved region of the surface S of the 3D object 50. In some such embodiments, linear features $f_1$, $f_2$, ... $f_n$ in the data file can be used to represent a curved region by using a piecewise approximation function.

Figure 3D:
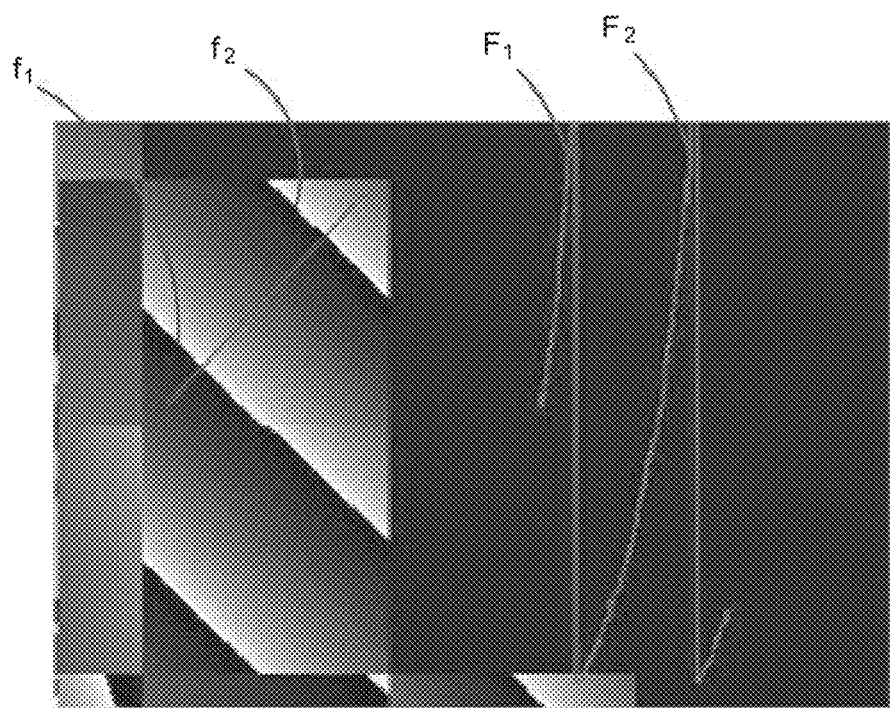

As shown in FIG. 3D, in some embodiments, although linear features $f_1$, $f_2$, ... $f_n$ in the data file can correspond to a substantially smooth region of the surface S of the 3D object 50, non-linear features on the master 10 (e.g., curved facets shown in left profile) can be used. As described herein, in some such embodiments, non-linear features on the master 10 can be used to produce elements $E_1$, $E_2$, ... $E_n$ on an optical product 10' that can appear smooth because the corresponding features on the optical product 10' can be relatively small (e.g., between 1 μm and 100 μm, between 1 μm and 75 μm, between 1 μm and 50 μm, or between 1 μm and 25 μm).

As the features $f_1$, $f_2$, ... $f_1$ of the data file 540 correspond to aspects of the surface S of the 3D object 50, the features $f_1$, $f_2$, ... $f_1$ of the data file 540 can be used to produce the features $F_1$, $F_2$, ... $F_n$ on the surface 12 of the master 10. As described herein, the features $F_1$, $F_2$, ... $F_n$ on the surface 12 of the master 10 can be used to fabricate the elements $E_1$, $E_2$, ... $E_n$ on the surface 12' of the optical product 10'. As described herein, in various embodiments, the elements $E_1$, $E_2$, ... $E_n$ on the optical product 10' can be non-holographic. For example, the elements $E_1$, $E_2$, ... $E_n$ do not need to rely on holography to render a 3D image 50' of the 3D object 50.

Figure 4A:
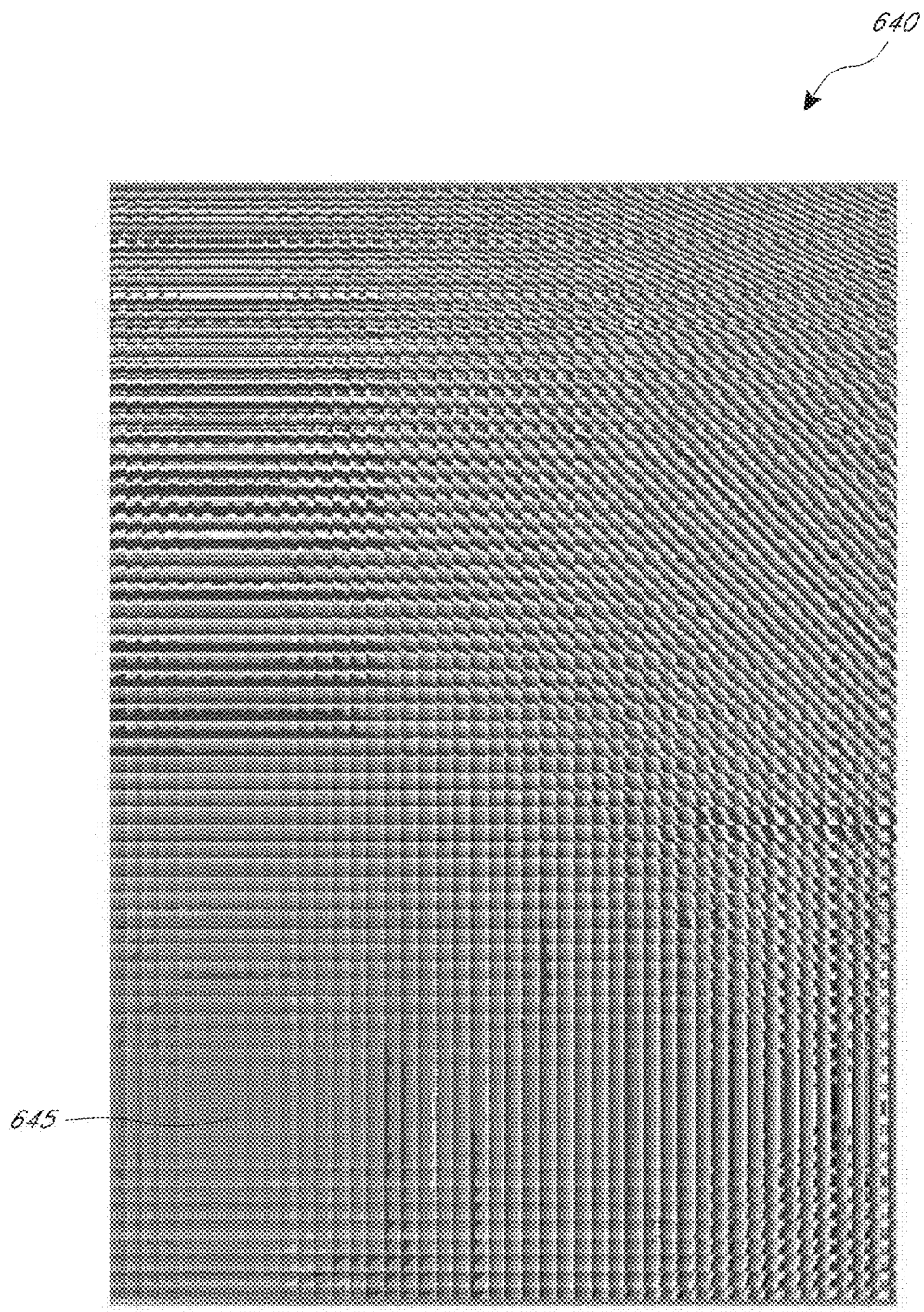
FIG. 4A illustrates another example 2D data file in accordance with certain embodiments disclosed herein.
Figure 4B:
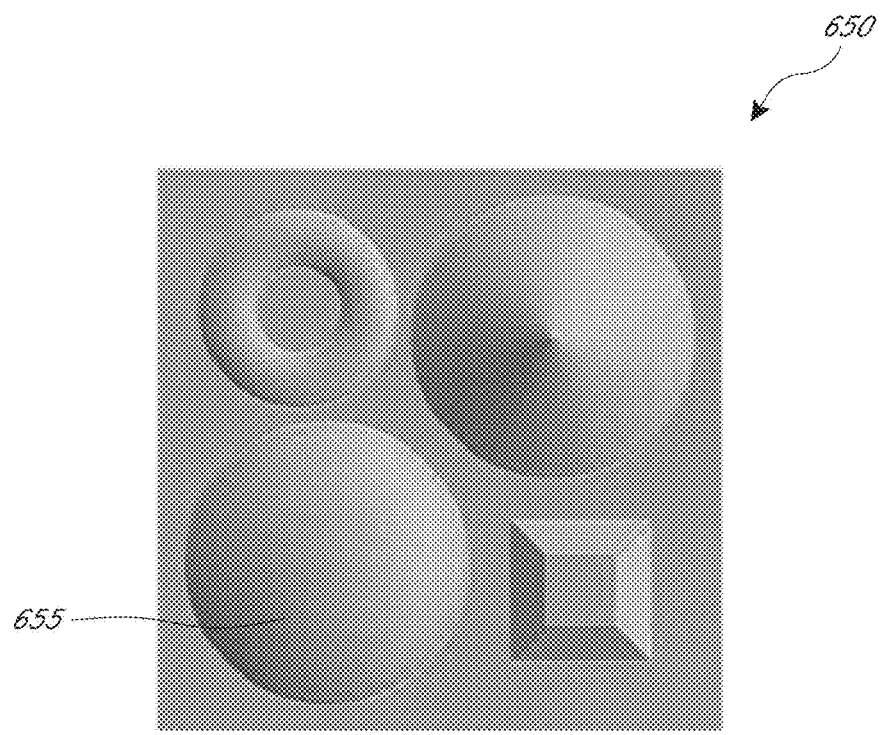
FIG. 4B illustrates an example normal map used to generate the data file shown in FIG. 4A.
Figure 4C:
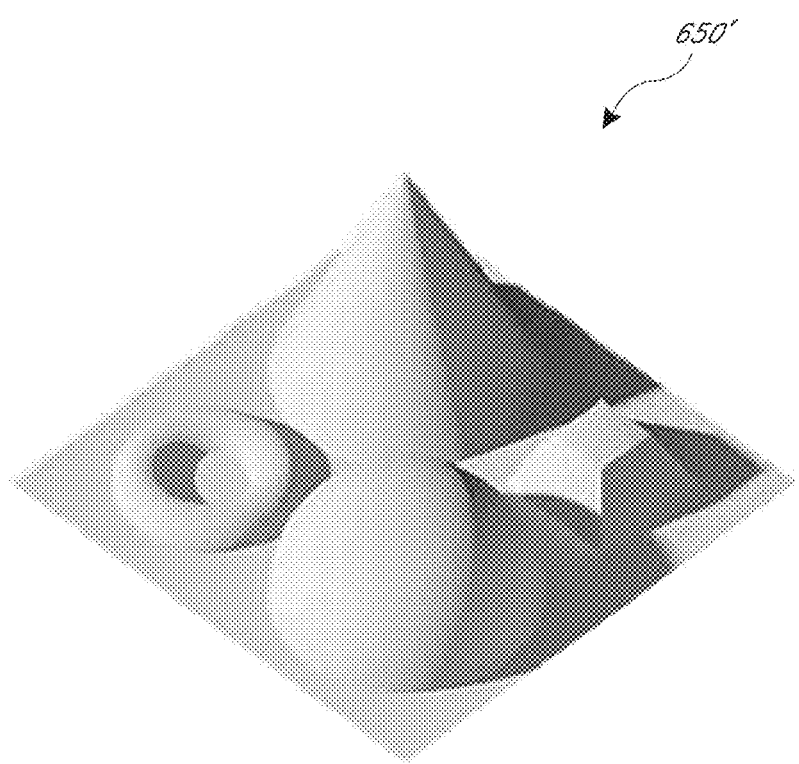
FIG. 4C illustrates the 3D image reproduced by an optical product generated from a master produced using the data file shown in FIG. 4A.
Figure 5:
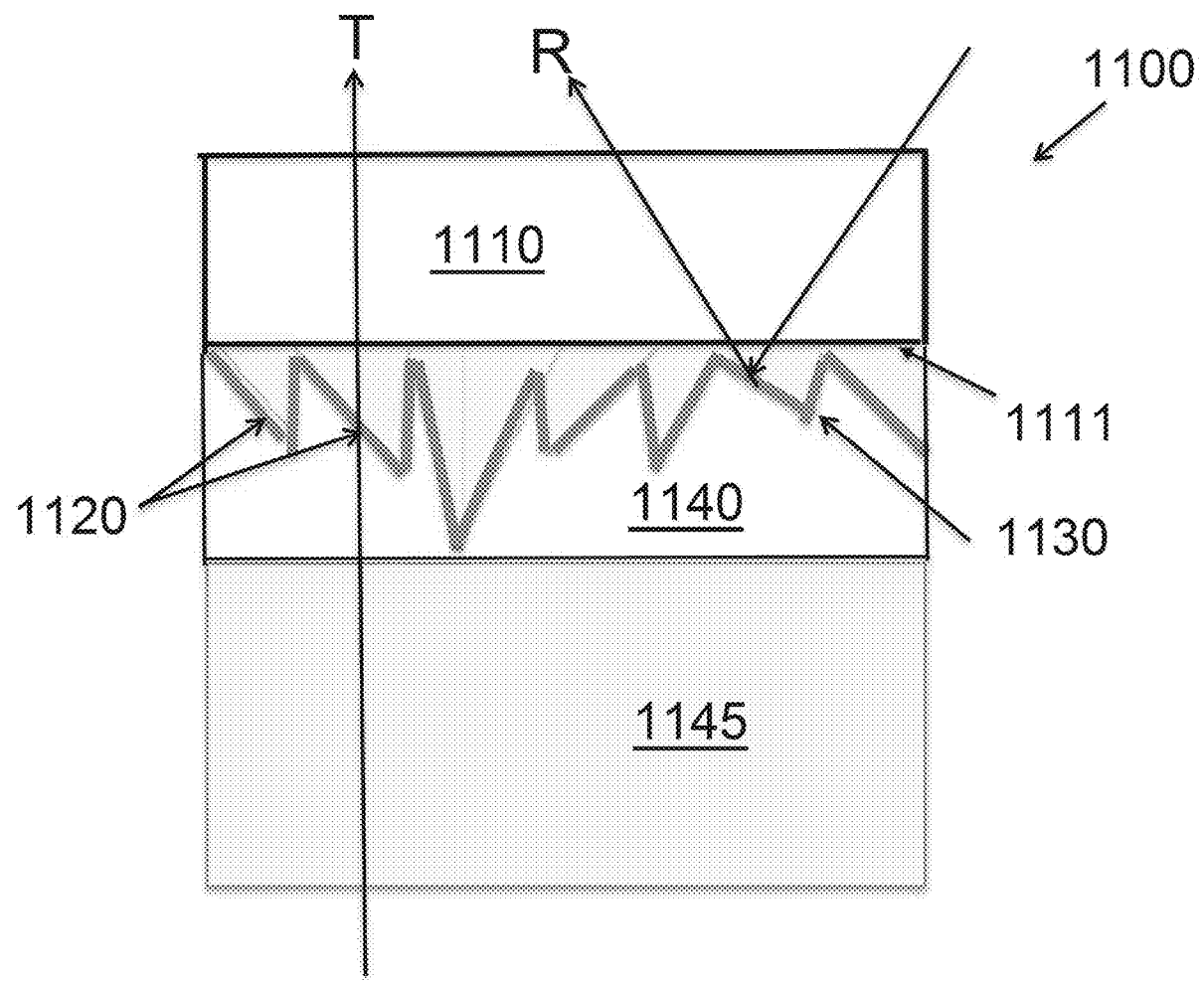
Figure 6:
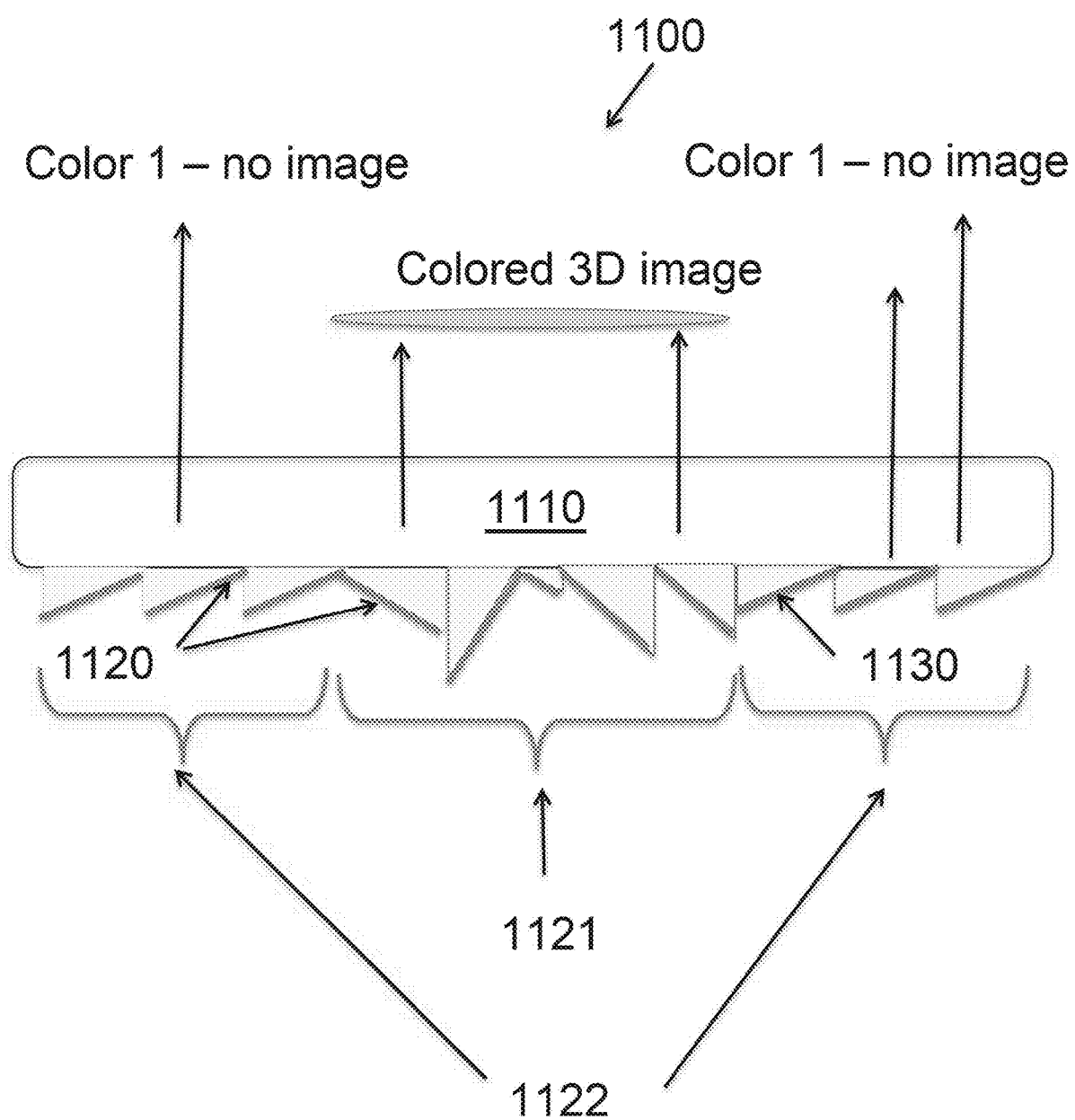

FIG. 4A is another example 2D data file 640 prepared in accordance with certain embodiments described herein. The data file 640 was generated by the normal map 650 shown in FIG. 4B. As an example, the lower left portion 645 of the data file 640 represents the center of the hemispherical object 655 in the lower left portion of the normal map 650. The data file 640 was used to generate the features $F_1$, $F_2$, ... $F_n$ on the surface 12 of a master 10, which was used to fabricate the elements $E_1$, $E_2$, ... $E_n$ on the surface 12' of an optical product 10'. The optical product 10' was configured, when illuminated, to reproduce by reflected light, the 3D image 650' shown in FIG. 4C.

In certain embodiments, an optical product 10' is also disclosed herein. As described herein, the optical product 10' can be configured, when illuminated, to reproduce by reflected light, a 3D image 50' of at least a part of a 3D object 50. As shown in FIG. 1A, similar to the master 10, the optical product 10' can include a surface 12' comprising a plurality of portions $P'_1$, $P'_2$, ... $P'_n$. Each portion $P'_n$ can correspond to a point $S_n$ on a surface S of the 3D object 50. Each portion $P'_n$ can comprise features, e.g., non-holographic elements $E_1$, $E_2$, ... $E_n$. In certain embodiments, the non-holographic elements $E_1$, $E_2$, ... $E_n$ can be configured to produce at least part of the 3D image 50' without relying on diffraction. In various embodiments, the portions $P'_1$, $P'_2$, ... $P'_n$ can form a single cell (e.g., a mono-cell). In other embodiments, the portions $P'_1$, $P'_2$, ... $P'_n$ can form a plurality of cells. Each portion $P'_1$ can form a cell of the plurality of cells. The optical product 10' can include borders surrounding at least part of the portions $P'_1$, $P'_2$, ... $P'_n$.

A gradient (e.g., uniform slope or average slope) in the non-holographic features $E_1$, $E_2$, ... $E_n$ can correlate to an inclination of the surface S of the 3D object 50 at the corresponding point $S_1$, $S_2$, ... $S_n$. In addition, the orientation (e.g., uniform orientation or average orientation) of the non-holographic features $E_1$, $E_2$, ... $E_n$ can correlate to an orientation of the surface S of the 3D object 50 at the corresponding point $S_1$, $S_2$, ... $S_1$.

Furthermore, since the master 10 can be used to fabricate an optical product 10', aspects disclosed herein with reference to the master 10 can apply to certain embodiments of the optical product 10'. For example, disclosure with respect to the shapes (e.g., symmetrical, non-symmetrical, irregular, curved, etc.) and arrangements (e.g., periodic, aperiodic, etc.) of the portions $P_1$, $P_2$, ... $P_n$ for the master 10 can apply to the shapes and arrangements of the portions $P'_1$, $P'_2$, ... $P'_n$ of the optical product 10'. As another example, disclosure with respect to the features $F_1$, $F_2$, ... $F_n$ (e.g., linear, curved, periodic, aperiodic, slowly varying, continuous, discontinuous, non-sinusoidal, etc.) for the master 10 can apply to the features $E_1$, $E_2$, ... $E_n$ of the optical product 10'. Furthermore, as described herein with respect to the master and the method of manufacturing the master, the optical product 10' of certain embodiments can further comprise features corresponding to holographic features.

In addition, small features can be imbedded in the optical product 10' that do not contribute to the formation of the image. Such imbedded features can be used in authenticity and security applications. Furthermore, as described herein, certain embodiments can incorporate intentional variations within one or more portions $P'_1$, $P'_2$, $P'_n$ of the optical product 10' for security applications.

The optical product can be configured to provide authenticity verification on an item for security. The item can be currency, a credit card, a debit card, a stock certificate, a passport, a driver's license, an identification card, a document, a tamper evident container or packaging, consumer packaging, or a bottle of pharmaceuticals. The optical product can be configured to be applied onto a lighting product, such as, for example, a light emitting diode (LED) based lighting system to control the LED based lighting system. The optical product can include portions and/or optical features which do not rely on phase information to generate an image of an object. The portions and/or optical features can be configured to be substantially achromatic. The optical product can include non-holographic features configured to produce images that are achromatic. For example, the non-holographic features can provide no diffractive or interference color (e.g., no wavelength dispersion or rainbows or rainbow effects). In some cases, the non-holographic features can be colored. For example, the non-holographic features can comprise a tint, an ink, dye, or pigment where absorption can provide color.

Optical Products Comprising Non-Holographic Features and Interference Optical Structures Although some implementations described herein include optical products configured, when illuminated, to reproduce by reflected or transmitted light, a 3D image, various implementations can reproduce a 3D image in both reflection and transmission. In particular, some implementations can reproduce the 3D image in a first color in transmission mode and a second color in reflection mode. The second color can be different from the first color. In addition, although some implementations described herein include optical products configured to reduce and/or eliminate color change with angle of tilt (e.g., reducing and/or eliminating iridescence by using non-holographic features), in some instances, it may be desired to provide a color change with viewing angle. Accordingly, various implementations can comprise an interference optical structure disposed on one or more non-holographic features described herein. Various implementations can have color shifting properties. The optical product can be configured to provide authenticity verification on an item for anti-counterfeiting or security. The item can be a banknote, a credit card, a debit card, a stock certificate, a passport, a driver's license, an identification card, a document, a tamper evident container or packaging, consumer packaging, a bottle of pharmaceuticals, etc. The item can be electronics, apparel, jewelry, cosmetics, a handbag, etc.

To curtail counterfeiting, currency, documents (e.g., banknotes) as well as other items such as products and packaging can be provided with security features that can be inspected by the general public to verify authenticity. In many cases, it can be advantageous if the security features can be easily seen under a variety of light conditions and without the need for special lighting conditions. It can also be desirable that the security features have distinct characteristics that can be easily identified by the public within a 1-10 second time frame. In addition, it is advantageous in general, if the security feature is not susceptible to copying by electronic or photographic equipment, such as, for example, printers, copiers, cameras, etc.

One example of a security feature employed in banknotes is the watermark, which has a fairly high degree of awareness among the general public. An example of a watermark can be an image comprising light and dark regions that can be easily seen by holding up the banknote to see the watermark in light transmission. However, watermarks may be susceptible to be copied and thus are not very secure. Other examples of security features may use inks and motion type features that are not readily seen under low light conditions (e.g., at low lit bars, restaurants, etc.), have poor image resolution, and/or have slow optical movement relative to the movement of the banknote. Accordingly, some existing security features tend to be more complicated structures having more complex color changing effects. This approach, however, can be disadvantageous when the complicated security devices are applied to banknotes or currency, as these complicated security devices may confuse an average person who is looking for a distinctive security feature.

Having a security feature (e.g., an anti-counterfeit feature) that has high contrast with respect to the background that can be easily identified by the general public under a variety of light conditions, including low light, can be advantageous. Accordingly, various optical products disclosed can reproduce a 3D image in color in reflection and/or transmission. In various instances, the image can appear to have one color in reflection and another different color in transmission. These security features can be incorporated in a consumer product, packaging, or a document (e.g., banknote). A consumer, merchant, or a bank teller can holdup such a banknote to light to readily verify the authenticity of the banknote. Additionally or alternatively, in some implementations, the security feature can be configured to exhibit color shift and/or movement of identifiable features when the viewing angle is varied to enhance security. These and other features are described in further detail herein.

Accordingly, various security features contemplated herein can comprise optical stacks and/or structures that are at least partially reflective and at least partially transmissive. The security features contemplated herein can be configured as coatings, threads, laminates, foils, films, hot stamps, windows, patches, labels, pigments and/or inks disposed on one or more non-holographic features and incorporated with documents (e.g., banknotes), packaging, or other items. The innovative aspects described in this application also include systems and methods of fabricating optical products comprising one or more non-holographic features with optical structures and/or stacks that are at least partially reflective and at least partially transmissive. In some embodiments, such optical structures may be fabricated on support or base layers or sheets such as webs (e.g., roll coated webs). Processes described herein may also include removing the fabricated optical structures and/or stacks from a support or base layer (e.g., roll or sheet). The innovative aspects described in this application further includes methods and systems for including the optical structures and/or stacks that are at least partially reflective and at least partially transmissive in pigment and inks having a desired amount of durability and mechanical strength to be disposed on one or more non-holographic features and to be further used in or on or incorporated into banknotes and other security devices/documents. The innovative aspects described in this application further include methods and systems for including the optical structures and/or stacks (e.g., in the form of a hot stamp coating, a foil coating, or an ink coating) to be disposed on one or more non-holographic features and to be further used in or on or incorporated into documents or packaging. In some implementations, a document or packaging can include a main body and the optical structure can be disposed on the main body. The main body can comprise cloth, paper, plastic, cardboard, etc.

FIG. 5 schematically illustrates a cross-sectional view of an example optical product 1100 with an interference optical structure 1130 (e.g., a coating, film, pigment, etc.) disposed on non-holographic features 1120. The optical product 1100 can be configured, when illuminated, to reproduce an image that appears 3D of at least a part of a 3D object (e.g., a regularly or irregularly shaped object). The optical product 1100 can include a surface 1111 (e.g., a surface of a substrate 1110 described herein) comprising a plurality of portions, each portion corresponding to a point on a surface of the 3D object (e.g., as described with respect to FIGS. 1A-4C). The optical product 1100 can also include one or more non-holographic features 1120 (e.g., linear and/or curved facets with various angles, orientations, and heights) disposed within each portion configured to produce at least a part of the image without relying on diffraction (e.g., as described with respect to FIGS. 1A-4C). An interference optical structure 1130 (e.g., a coating, film, pigment, etc.) can be disposed on one or more non-holographic features 1120. In various implementations, the interference optical structure 1130 can be disposed with respect to one or more non-holographic features 1120 such that the optical product 1100, when illuminated, reproduces color in transmission mode T and/or reflection mode R. As an example, the interference optical structure 1130 can be disposed with respect to one or more non-holographic features 1120 such that the optical product 1100, when illuminated, reproduces the image in a first color in transmission mode T and a second color in reflection mode R. The second color in reflection mode R can be different from the first color in transmission mode T. In some instances, the first and second colors can be complementary colors. In some instances, the first and second colors are not complementary colors.

In some instances, the optical product 1100 can include a transparent or optically transmissive window 1145 in an item such as a document. The window 1145 can be adhered to the non-holographic features 1120 and interference optical structure 1130 with an adhesive 1140 in various implementations.

FIG. 6 schematically illustrates the non-holographic features 1120 and interference optical structure 1130 of the example optical product 1100 producing colored depth perception in the reproduced image of the object. As described herein, the non-holographic features 1120 can include discontinuities (e.g., discontinuous with other features). In some instances, the discontinuous features can correspond to a continuous region of the object. As described herein, the non-holographic features 1120 with less steep slopes can be configured to reflect light toward an observer's eye, and the non-holographic features 1120 with steeper slopes are configured to reflect light away from the observer's eye. In section 1121, the non-holographic features 1120 include multi-angled facets with different slopes, orientations, and heights. For individual ones of the portions in section 1121, a gradient in the non-holographic features 1120 can correlate to a surface normal of the surface of the 3D object at the corresponding point. For individual ones of the portions in section 1121, an orientation of the non-holographic features 1120 can correlate to an orientation of the surface of the 3D object at the corresponding point. Accordingly, the non-holographic features 1120 can produce the appearance of the 3D image and the interference optical structure 1130 can provide color in the image. In section 1122, the non-holographic features 1120 have the same (e.g., substantially the same) slopes which may produce no image and the interference optical structure 1130 can provide the same (e.g., substantially the same) color to the observer. In section 1122, no image in the same (e.g., substantially the same) color can also be produced with the interference optical structure 1130 disposed on a flat area (e.g., no facets).

Various implementations can create various optical effects utilizing a combination of non-holographic features 1120 with interference optical structures 1130 along with other features described herein (and/or other features known in the art or yet to be developed). For example, some implementations can also utilize reflective structures and/or demetallized structures.

Figure 7A:
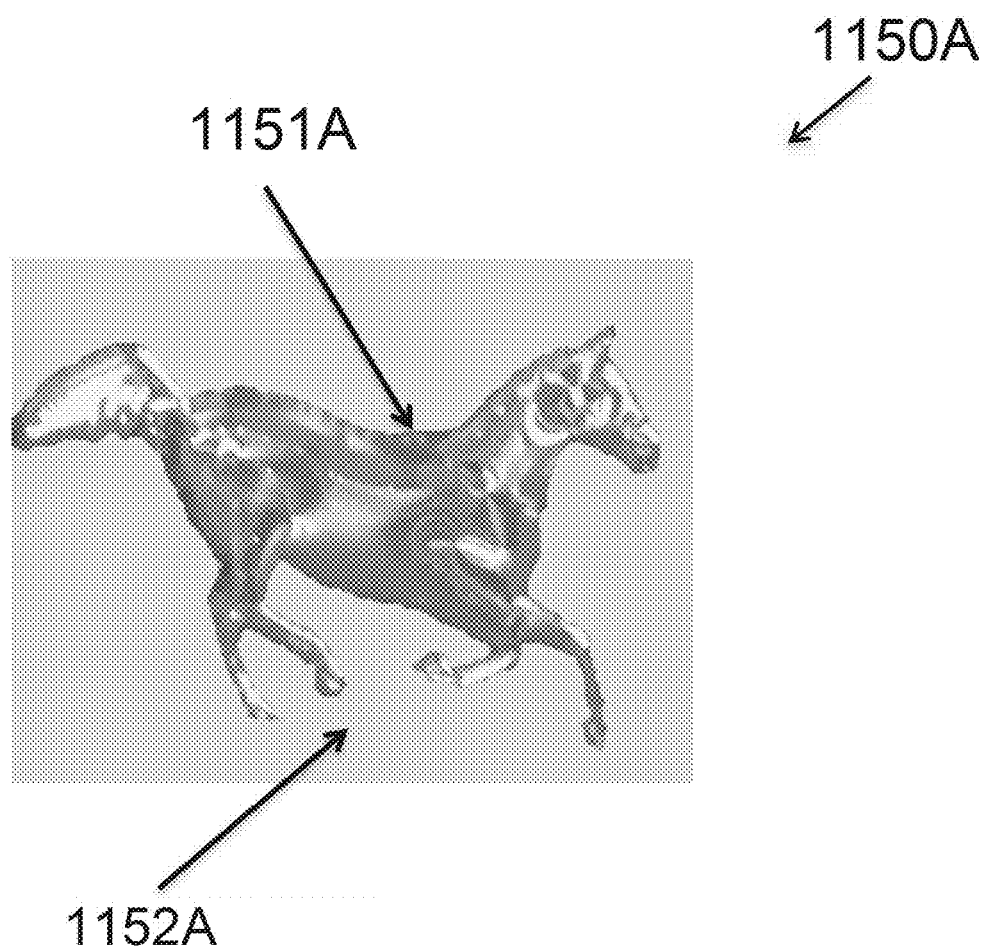
FIG. 7A shows an example planar view of a reproduced object and background.

FIG. 7A shows an example planar view 1150A of a reproduced object 1151A and background 1152A. The image that appears three dimensional can be formed by the non-holographic features 1120 described herein. As described herein, the non-holographic features 1120 can be coated with a reflective material. In this example, the non-holographic features 1120 and surrounding areas were coated with aluminum. The non-holographic features 1120 can be de-metallized (e.g., leaving the surrounding areas metallized) and coated with an interference optical structure 1130. In this example, the non-holographic features 1120 were de-metallized and coated with an interference optical structure 1130. In FIG. 7A, the image of the object 1151A (e.g., a mustang in this example) is produced in color with an aluminum background. In some instances, the interference optical structure 1130 can be partially transmissive and partially reflective such that the object 1151A appears one color in transmission and another color in reflection. For example, when viewing the optical product from the other side, the object 1151A may be produced in a different color. In some implementations, the background 1152A, e.g., instead of the object 1151A, can also be produced with an interference optical structure 1130. In some implementations, the background 1152A, e.g., in addition to the object 1151A, can also be produced with an interference optical structure 1130 (e.g., another interference optical structure).

Figure 7B:
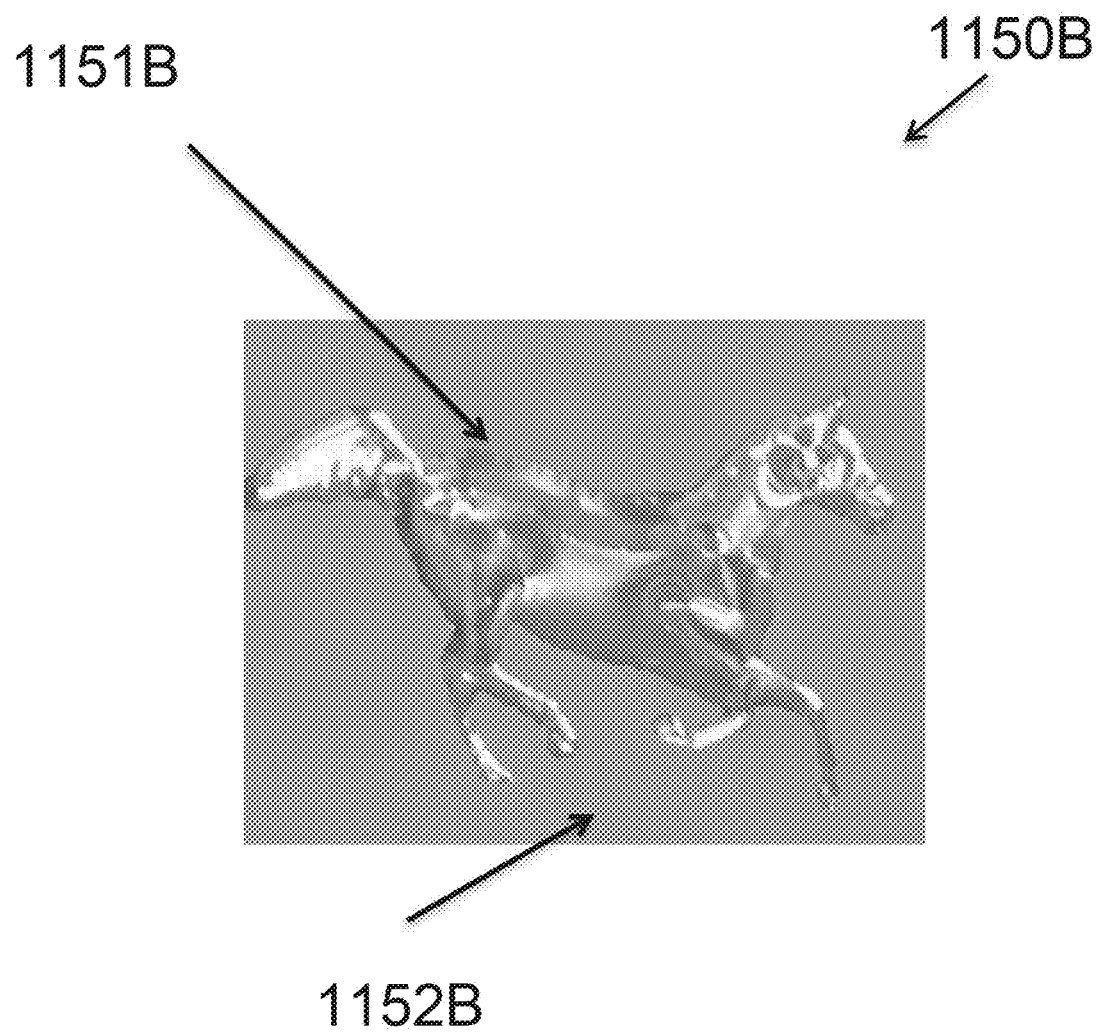
FIG. 7B shows another example planar view of a reproduced object and background.

FIG. 7B shows another example planar view 1150B of a reproduced object 1151B and background 1152B. In this example, the color in the image of the object 1151B (e.g., a mustang in this example) is produced by an aluminum coating and the background 1152B is produced with an interference optical structure 1130 deposited onto flat or non-holographic features 1120 with the same (e.g., substantially the same) slopes, orientations, and heights. In FIG. 7B, the background 1152B is produced in color. In some instances, the interference optical structure 1130 can be partially transmissive and partially reflective such that the background 1152B appears one color in transmission and another color in reflection. For example, when viewing the optical product from the other side, the background 1152B may be produced in a different color.

Figure 7C:
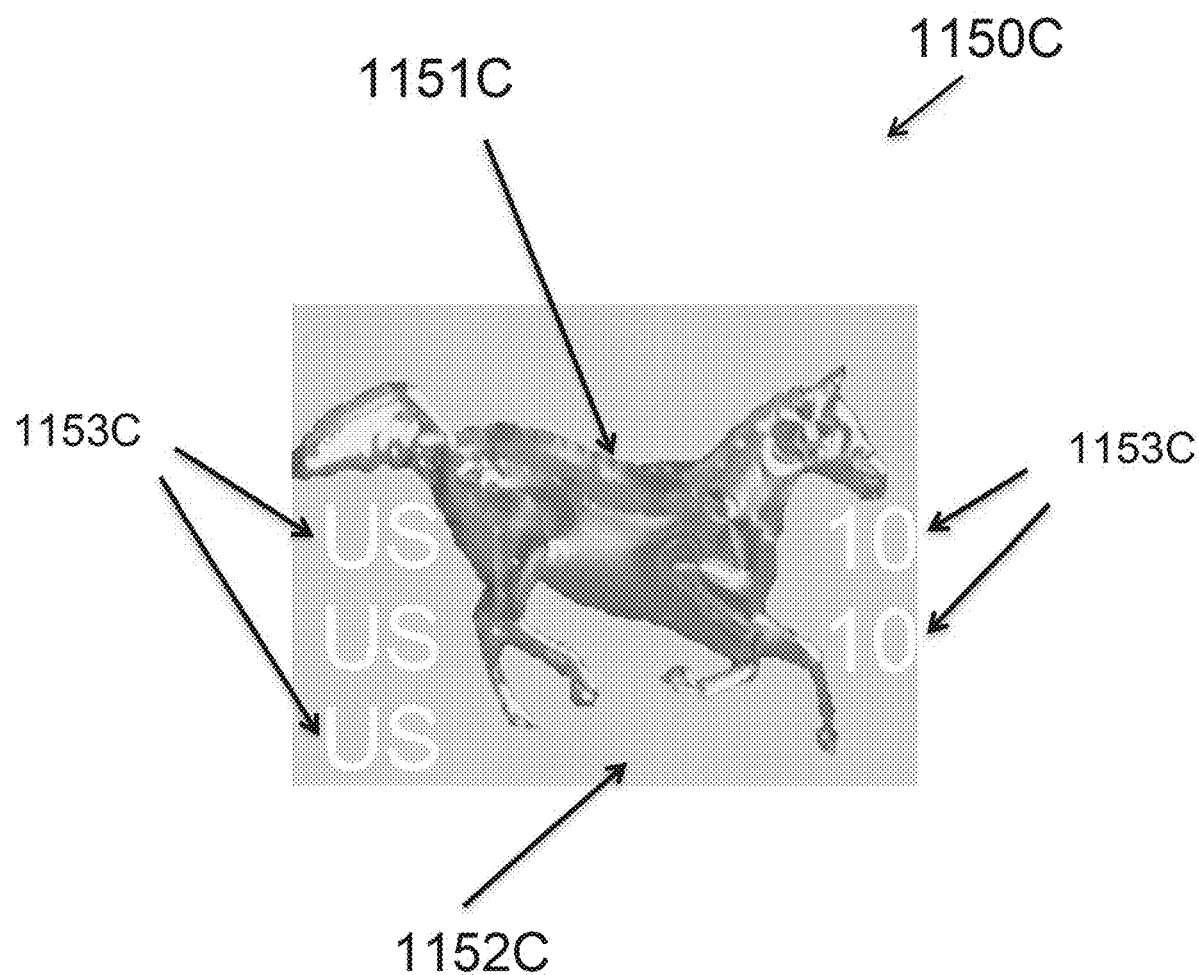
FIG. 7C shows another example planar view of a reproduced object and background.

FIG. 7C shows another example planar view 1150C of a reproduced object 1151C and background 1152C. The color in the image of the object 1151C (e.g., mustang in this example) is produced by an interference optical structure 1130 (e.g., similar to FIG. 7A) and the background 1152C is produced with an aluminum coating deposited onto flat or non-holographic features 1120 with the same (e.g., substantially the same) slopes, orientations, and heights. In addition, portions of the background 1152C can include de-metallized regions 1153C. In this example, portions of the aluminum was de-metallized to produce alphanumeric characters. The de-metallized regions 1153C can also be formed into other objects (regular or irregularly shaped objects), patterns, or images, etc.

Figure 7D:
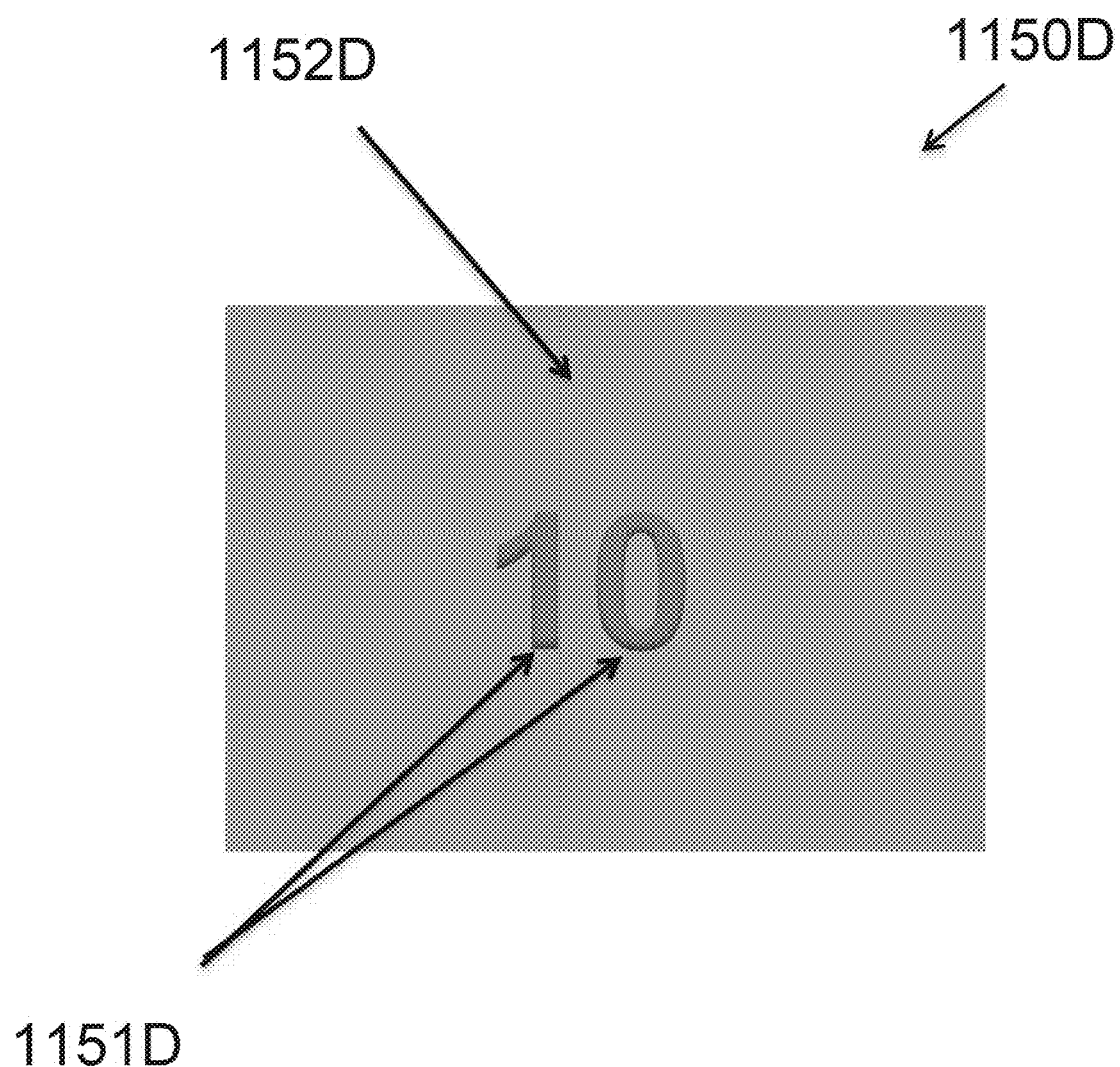
FIG. 7D shows another example planar view of a reproduced object and background.
Figure 8:
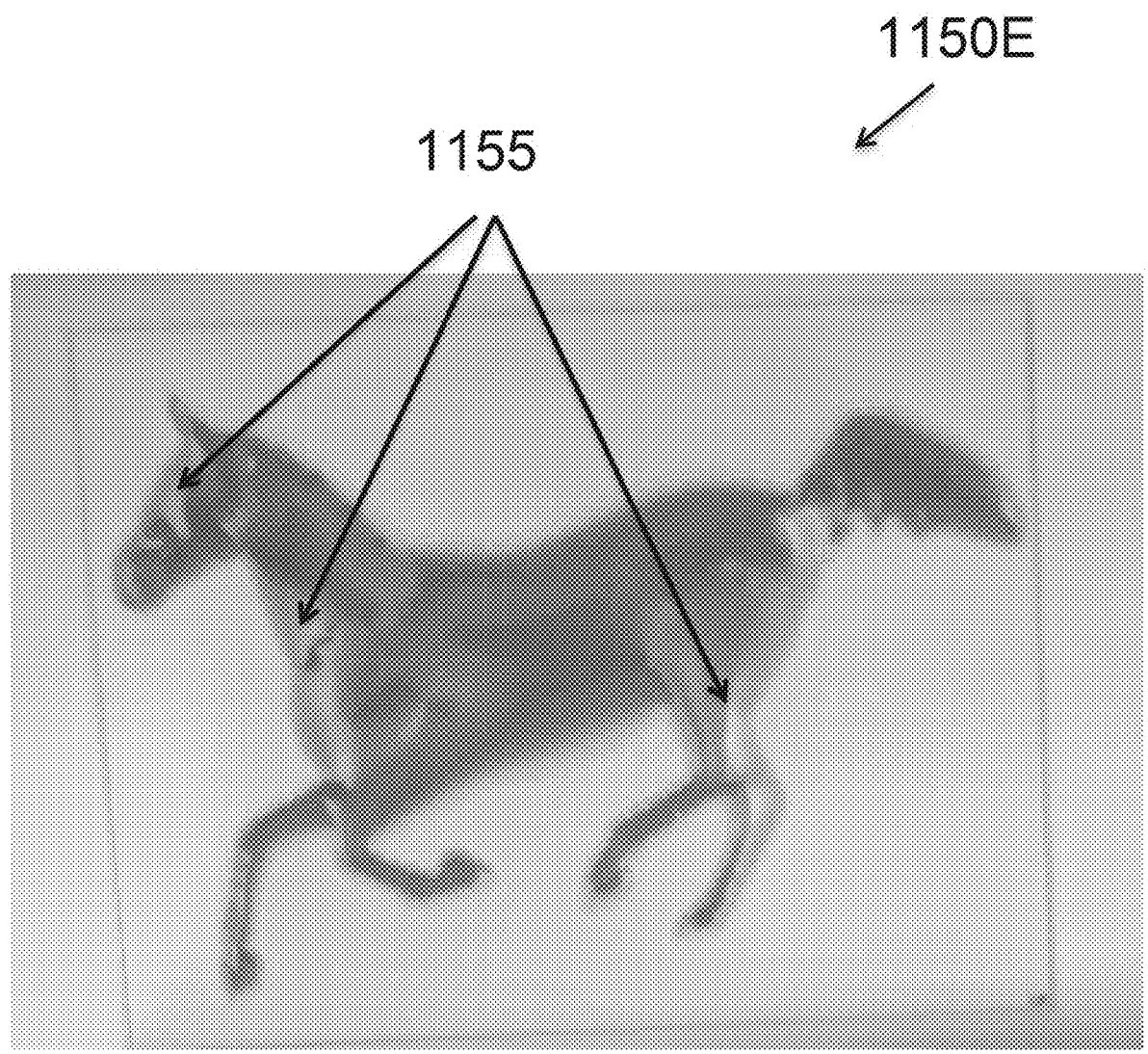
Figure 9:
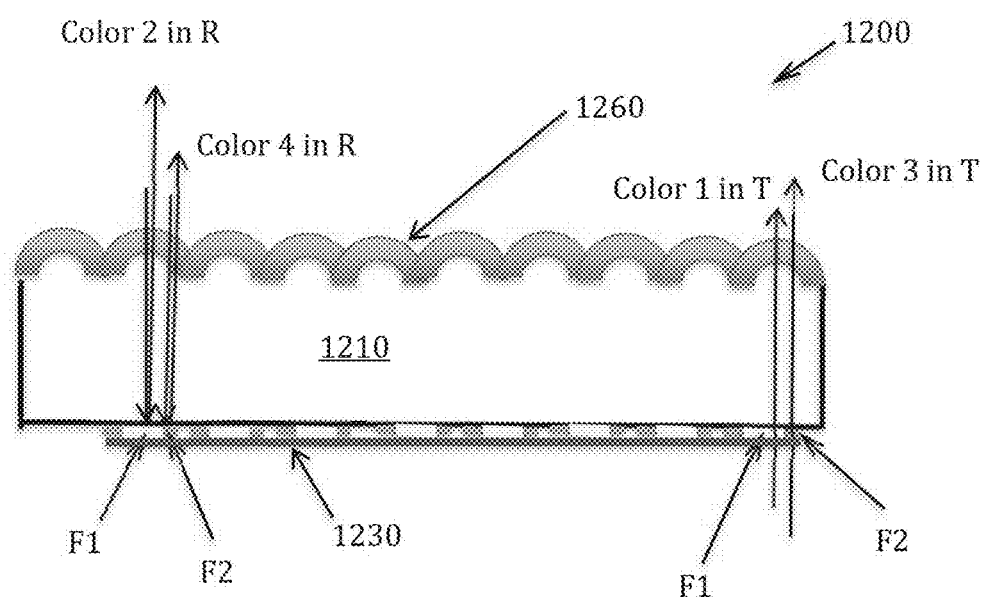
Figure 10:
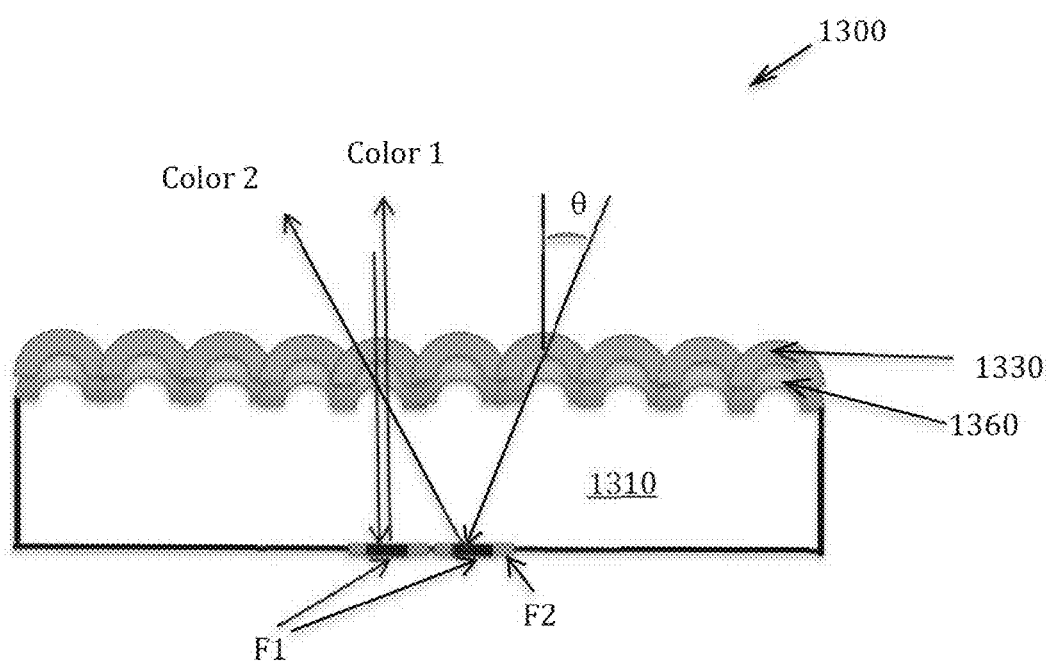
Figure 11:

FIG. 7D shows another example planar view 1150D of a reproduced object 1151D and background 1152D. In this example, the colors in the image of the object 1151D and the background 1152D are produced by one or more interference optical structures (e.g., one or more interference optical structures). As described herein, various interference optical structures 1130 can operate in reflection and/or transmission modes. In some implementations, the optical structure 1130 can produce color in reflection and/or transmission. In some instances, the optical structure 1130 can produce a first color in transmission mode and a second color in reflection mode. In the example shown in FIG. 7D, the color of the image of the object 1151D (e.g., a "10" in this example) is produced by an interference optical structure 1130 in reflection mode, and the color of the background 1152D is produced by the interference optical structure 1130 in transmission mode. In this example, at a certain viewing angle, the color in reflection is different from the color in transmission. In some instances, the interference optical structure 1130 can be partially transmissive and partially reflective such that the object 1151D and the background 1152D appear one color in transmission and another color in reflection. For example, when viewing the optical product from the other side, the object 1151D and the background 1152D may be produced in different colors In some instances, the optical structure 1130 can have color shifting properties. For example, the color in transmission and/or reflection can change with a change in viewing angle. With respect to FIG. 7D, at a different viewing angle, the optical structure can produce another different color in transmission mode and another different color in reflection mode. In some instances, the optical structure 1130 can have non-color shifting properties. For example, the color in transmission and/or reflection might not change with a change in viewing angle.

Figures 2, 11:
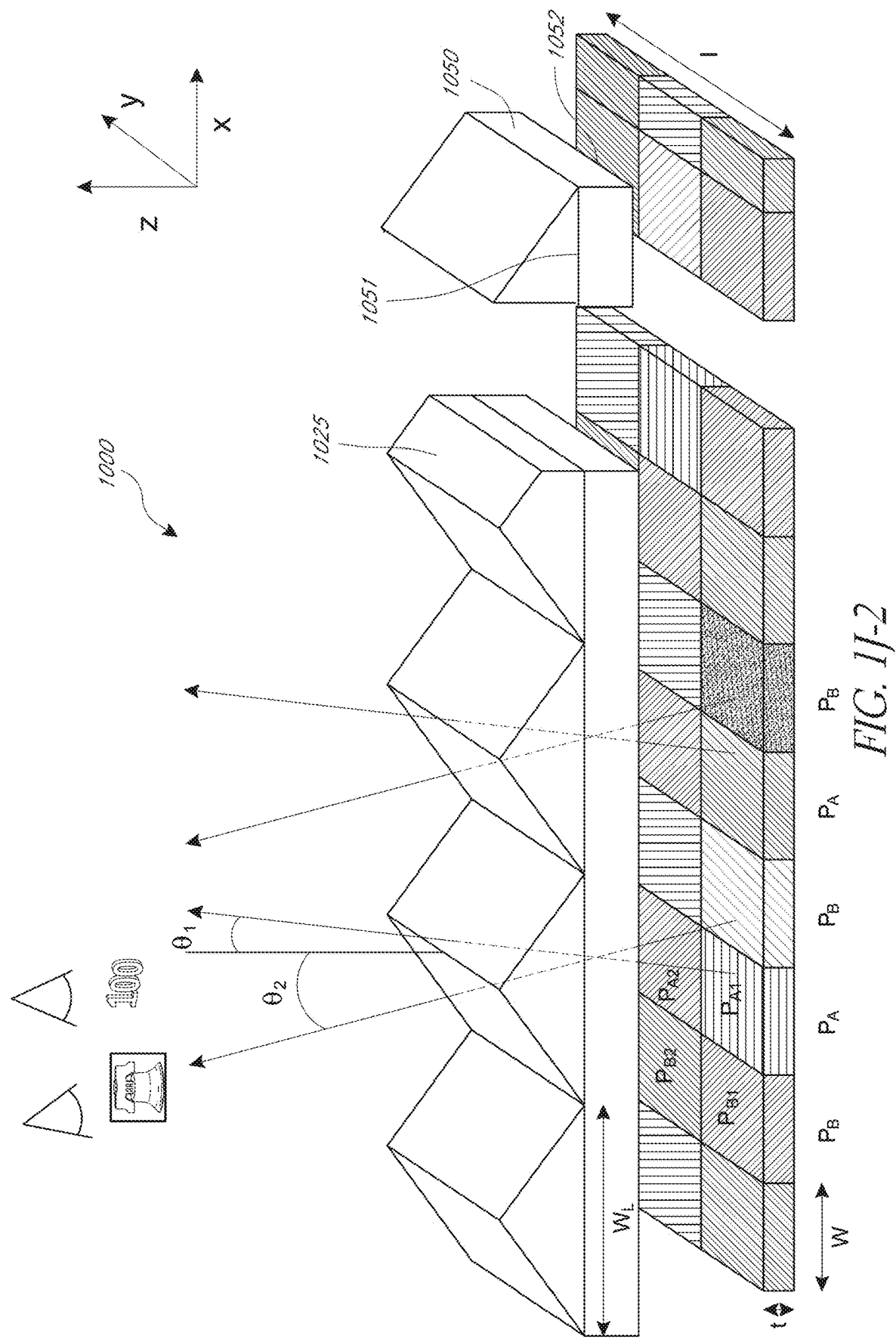
Figures 3, 11:
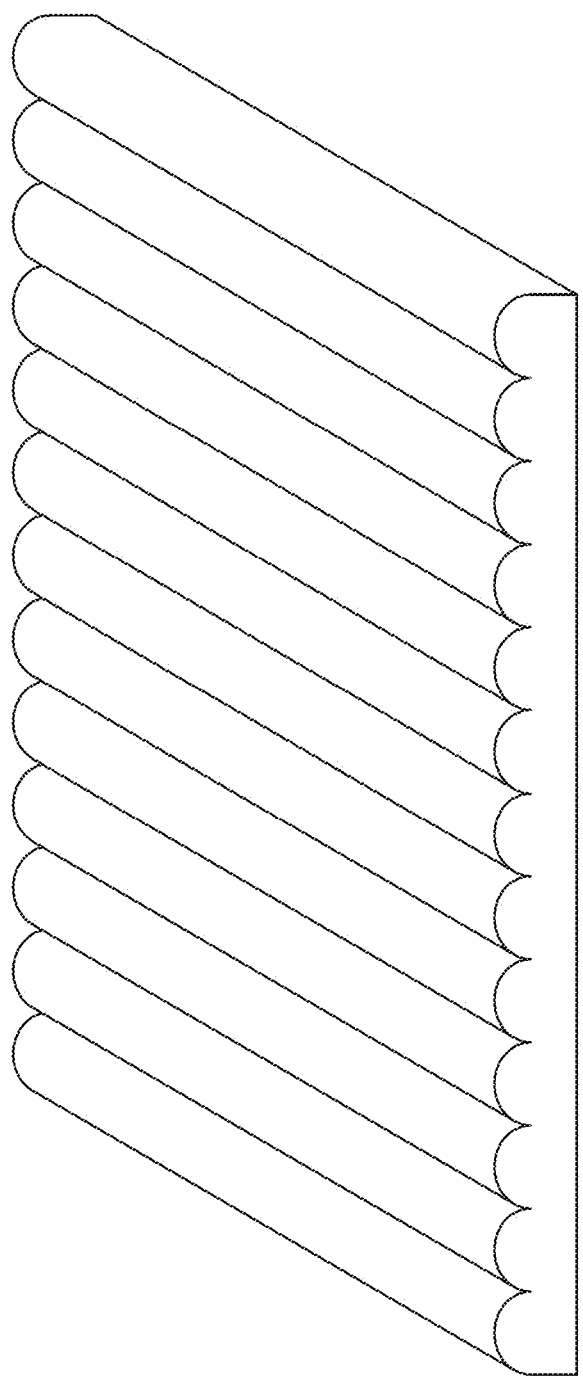
Figures 4, 11:
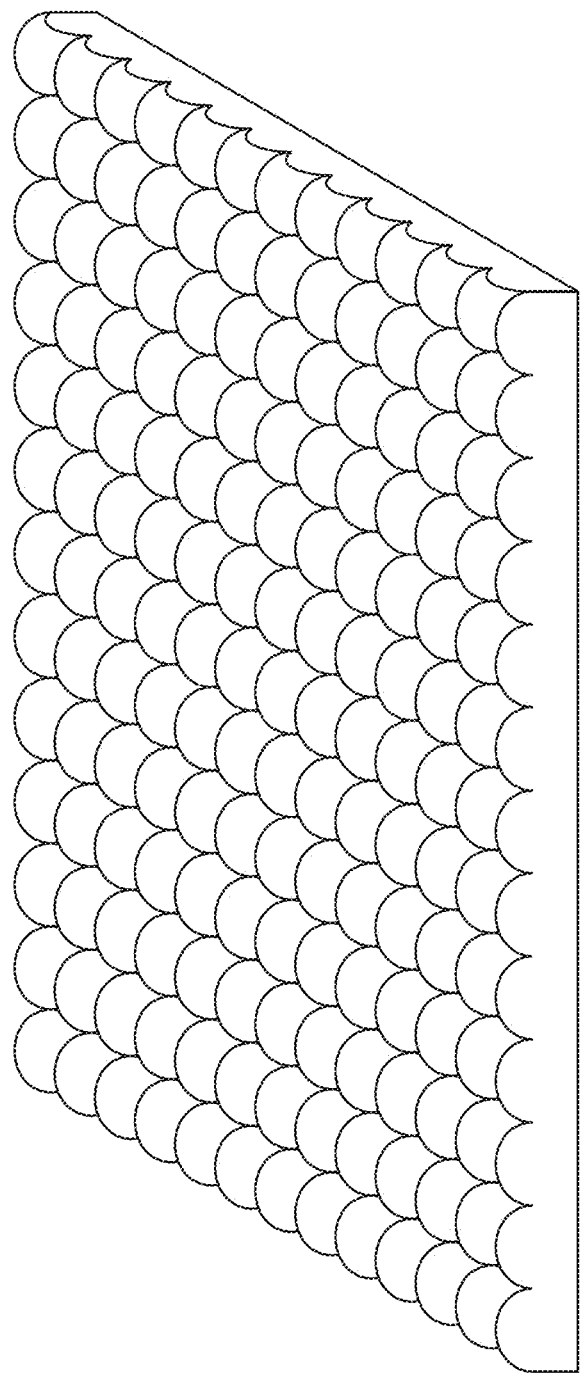
Figures 8, 11:
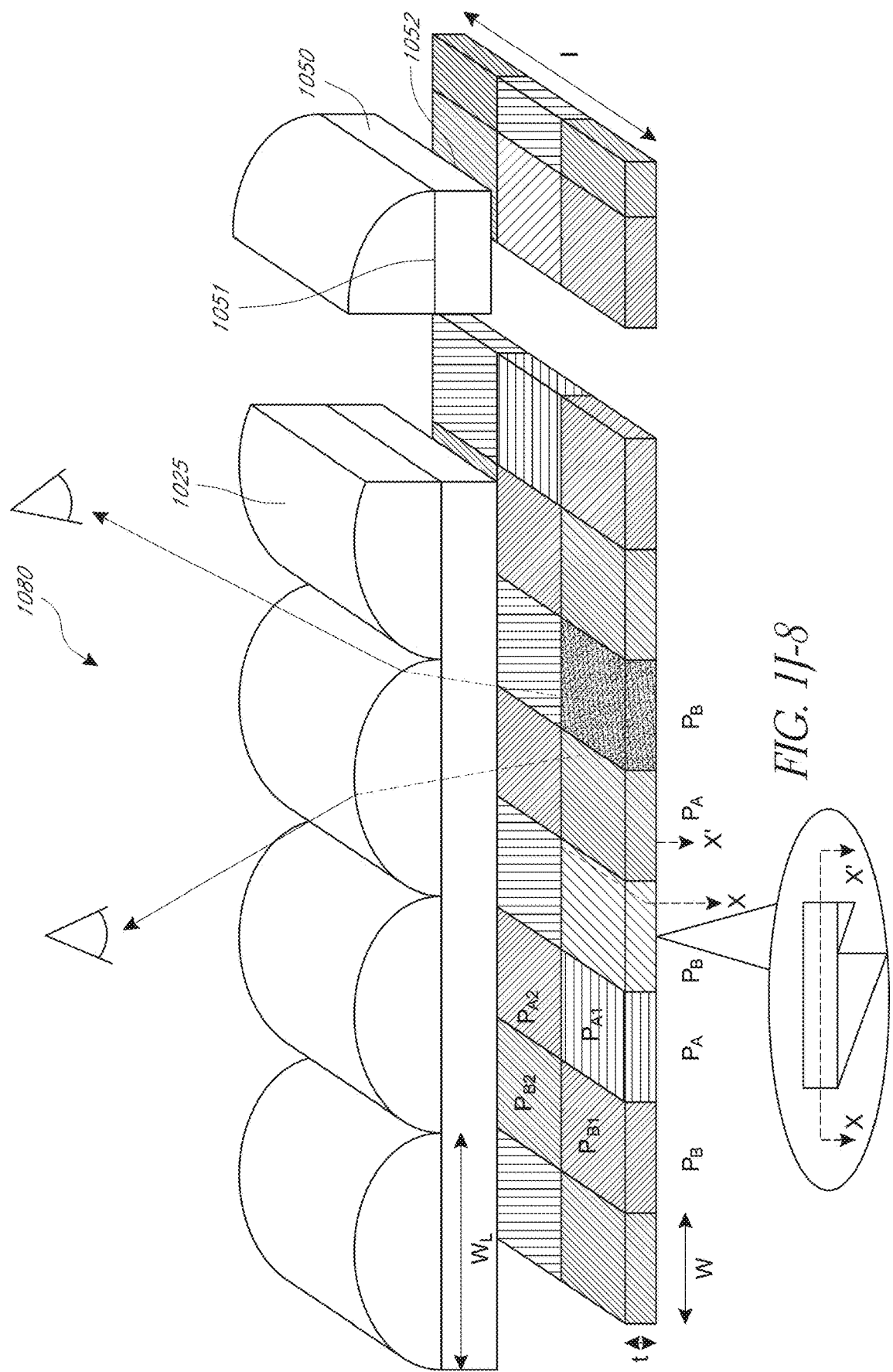

FIG. 8 shows another example view 1150E of a reproduced object and background. This example illustrates the optical effect of a color outline or halo 1155 that appear to be on the surface of the object, which provides another difficulty of being counterfeited. Such effect can be produced by an interference optical structure 1130 disposed on non-holographic features 1120.

Some implementations can utilize reflective structures, demetallized structures, and/or interference optical structures in combination. For example, the non-holographic features and the surrounding areas can be coated with a reflective material (e.g., metallized). Some portions of the non-holographic features and/or surrounding areas can be de-metallized. Portions metallized and de-metallized can then be coated with an interference optical structure.

As described herein, e.g., with respect to FIGS. 1F-1, 1F-2, 1G-1, 1G-2, 1H, and 1I, various implementations of an optical product 10' can include a first plurality of portions $P_{A1}$-$P_{A3}$. Each of the first plurality of portions $P_{A1}$-$P_{A3}$ can correspond to a point on a surface of a first 3D object. The first plurality of portions $P_{A1}$-$P_{A3}$ can comprise first non-holographic features $F_1$ configured to produce at least part of a first 3D image of the first 3D object (e.g., the text "100") when viewed from a first direction. The optical product 10' can also include a second plurality of portions $P_{B1}$-$P_{B3}$. Each of the second plurality of portions $P_{B1}$-$P_{B3}$ can correspond to a point on a surface of a second 3D object. The second plurality of portions $P_{B1}$-$P_{B3}$ can comprise second non-holographic features $F_2$ configured to produce at least part of a second 3D image of the second 3D object (e.g., a bell) when viewed from a second direction.

As described herein, a gradient in the first non-holographic features $F_1$ can correlate to an inclination of the surface of the first 3D object at the corresponding point, and an orientation of the first non-holographic features $F_1$ can correlate to an orientation of the surface of the first 3D object at the corresponding point. As also described herein, a gradient in the second non-holographic features $F_2$ can correlate to an inclination of the surface of the second 3D object at the corresponding point, and an orientation of the second non-holographic features $F_2$ can correlate to an orientation of the surface of the second 3D object at the corresponding point.

In some instances, the inclination of the surface of the first 3D object can comprise a polar angle from a first reference line of the first 3D object, and the orientation of the surface of the first 3D object can comprise an azimuth angle from a second reference line orthogonal to the first reference line of the first 3D object (e.g., as described with reference to FIG. 1C). In some instances, the inclination of the surface of the second 3D object can comprise a polar angle from a first reference line of the second 3D object, and the orientation of the surface of the second 3D object can comprise an azimuth angle from a second reference line orthogonal to the first reference line of the second 3D object (e.g., as described with reference to FIG. 1C).

Various such implementations can also utilize interference optical structures 1130 disposed with respect to the first and/or second non-holographic features $F_1$ and/or $F_2$. For example, with respect to FIG. 1I, instead of a reflective material 1010 disposed over the features $F_1$ and/or $F_2$, an interference optical structure 1130 as shown in FIGS. 5-6 can be disposed over the features $F_1$ and/or $F_2$ to produce the first and/or second 3D image in color in transmission and/or reflection. In some instances, the first and/or second 3D image can be produced in a first color in transmission mode and a second color in reflection mode.

In various instances, at a certain viewing angle, the color in reflection is different from the color in transmission. In some instances, the colors can be complementary colors. In some instances, the colors can be non-complementary colors. As described herein, the optical structure 1130 can have color shifting properties. For example, the color in transmission and/or reflection can change with a change in viewing angle and/or angle of incidence of incident light. For instance, at a different viewing angle, the optical structure can produce another different color in transmission mode and another different color in reflection mode. In some instances, the optical structure 1130 can have non-color shifting properties. For example, the color in transmission and/or reflection might not change with a change in viewing angle.

Figures 1, 1J, 2, 3, 4, 5, 6, 7:
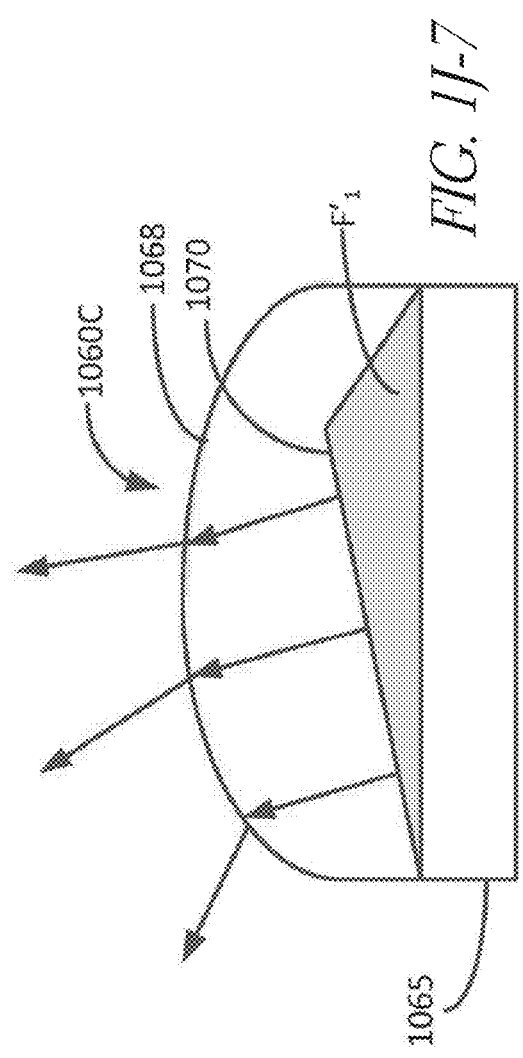

Various implementations can create various optical effects utilizing a combination of non-holographic features $F_1$ and/or $F_2$ with interference optical structures 1130 along with other features described herein (and/or other features known in the art or yet to be developed), e.g., as described with respect to FIGS. 7A-8. For example, some implementations can also utilize reflective structures and/or demetallized structures. In some instances, non-holographic features $F_1$ and/or $F_2$ and the surrounding areas can be coated with a reflective material (e.g., metallized). Some portions of the non-holographic features (some portions of $F_1$ and/or $F_2$) and/or some portions of the surrounding areas can be de-metallized. Portions metallized and de-metallized can then be coated with an interference optical structure.

As described herein, e.g., with respect to FIGS. 1J-1 to 1J-11, various implementations can utilize one or more lenses, prisms, and/or mirrors. As described herein, because lenses, prisms, and/or mirrors can separate the images. Some such designs can also utilize one or more interference optical structures 1130 to provide color in transmission and/or reflection.

Figures 9, 11:
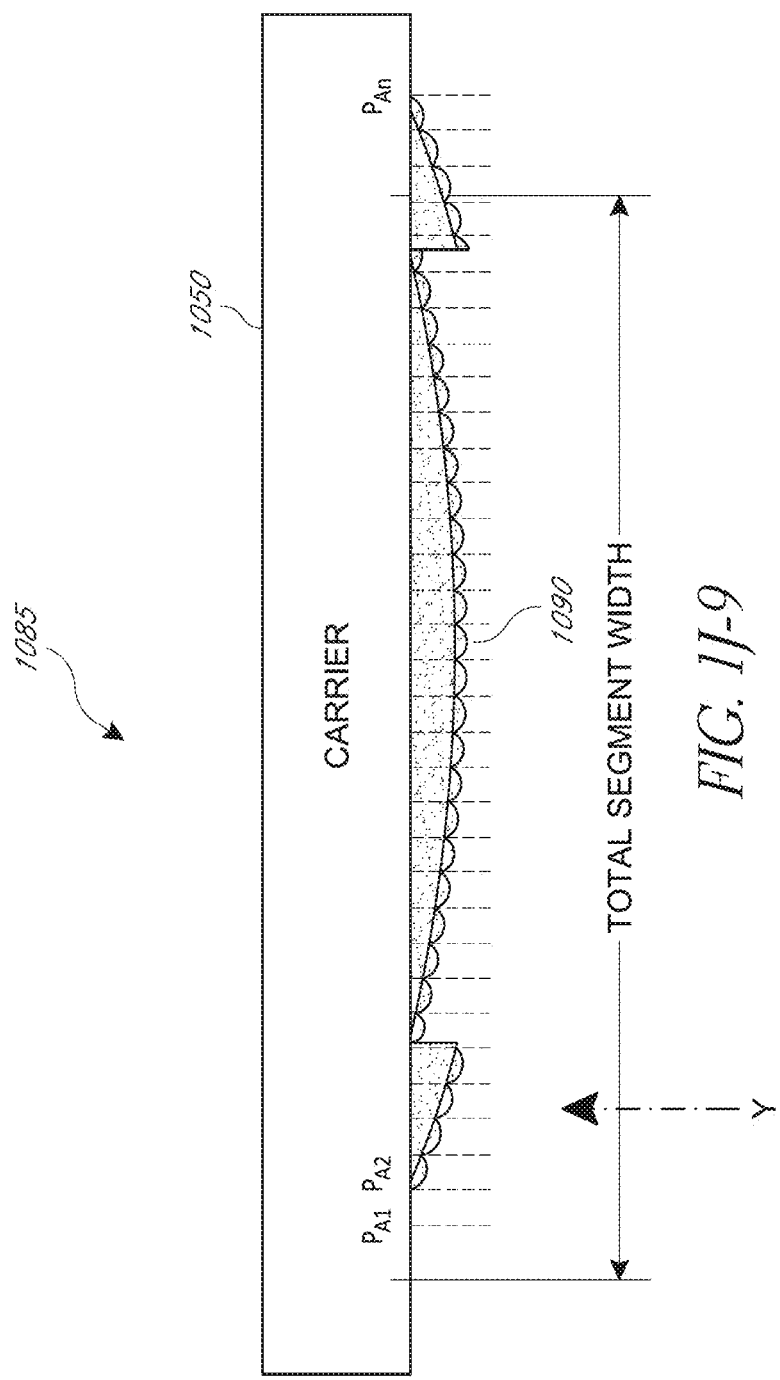

For instance, FIG. 9 schematically illustrates an example optical product 1200 with an array of lenses 1260 disposed on one side of a substrate 1210 and an interference optical structure 1230 (e.g., a coating, film, pigment, etc.) disposed on first and/or second non-holographic features $F_1$ and/or $F_2$ (e.g., linear and/or curved facets with various angles, orientations, and heights). As described herein, the first non-holographic features $F_1$ can be configured to produce at least part of a first 3D image of the first 3D object (e.g., a regularly or irregularly shaped object) when viewed from a first direction (e.g., as shown in FIG. 1J-1). In addition, the second non-holographic features $F_2$ can be configured to produce at least part of a second 3D image of the second 3D object (e.g., a regularly or irregularly shaped object) when viewed from a second direction (e.g., as shown in FIG. 1J-1). With further reference to FIG. 9, the interference optical structure 1230 (e.g., a coating, film, pigment, etc.) can be disposed with respect to the first and/or second non-holographic features $F_1$ and/or $F_2$ to produce the first and/or second 3D image in color in transmission and/or reflection. In some instances, the optical product 1200, when illuminated, reproduces the first and/or second 3D image in a first color in transmission mode T (e.g., Color 1 for $F_1$ and/or Color 3 for $F_2$) and a second color in reflection mode R (e.g., Color 2 for $F_1$ and/or Color 4 for $F_2$). For the first and/or second non-holographic features $F_1$ and/or $F_2$, the second color in reflection mode R can be different from the first color in transmission mode T. The different colors can be produced by the properties of the non-holographic features $F_1$ and/or $F_2$ (e.g., slopes, orientations, heights, etc.) possibly being at different angles and having an interference structure 1230 thereon and/or as a result of the interference optical structure 1230 itself (e.g., materials, refractive indices, thicknesses, etc.), As described herein, the lenses 1260 can be any of the lenses described herein. For example, the lenses can include a 1D or 2D array of lenses. The lenses can include symmetric (e.g., rotationally symmetric or symmetric about a cross-section such as cylindrical lenses), asymmetric (e.g., rotationally asymmetric or asymmetric about a cross-section), and/or freeform lenses. As described herein, at a first viewing angle, the array of lenses 1260 can present the first 3D image for viewing without presenting the second 3D image for viewing, and at a second viewing angle different from the first viewing angle, the array of lenses 1260 can present for viewing the second 3D image without presenting the first 3D image for viewing (e.g., as shown in FIG. 1J-1).

As shown in FIG. 9, the interference optical structure 1230 can be disposed on the non-holographic features $F_1$ and/or $F_2$ on a side opposite the lenses 1260. In some designs, the interference optical structure 1230 can be disposed on the lenses 1260.

Figures 1, 1J, 2, 3, 4, 5, 6, 7, 8, 9, 10, 11:
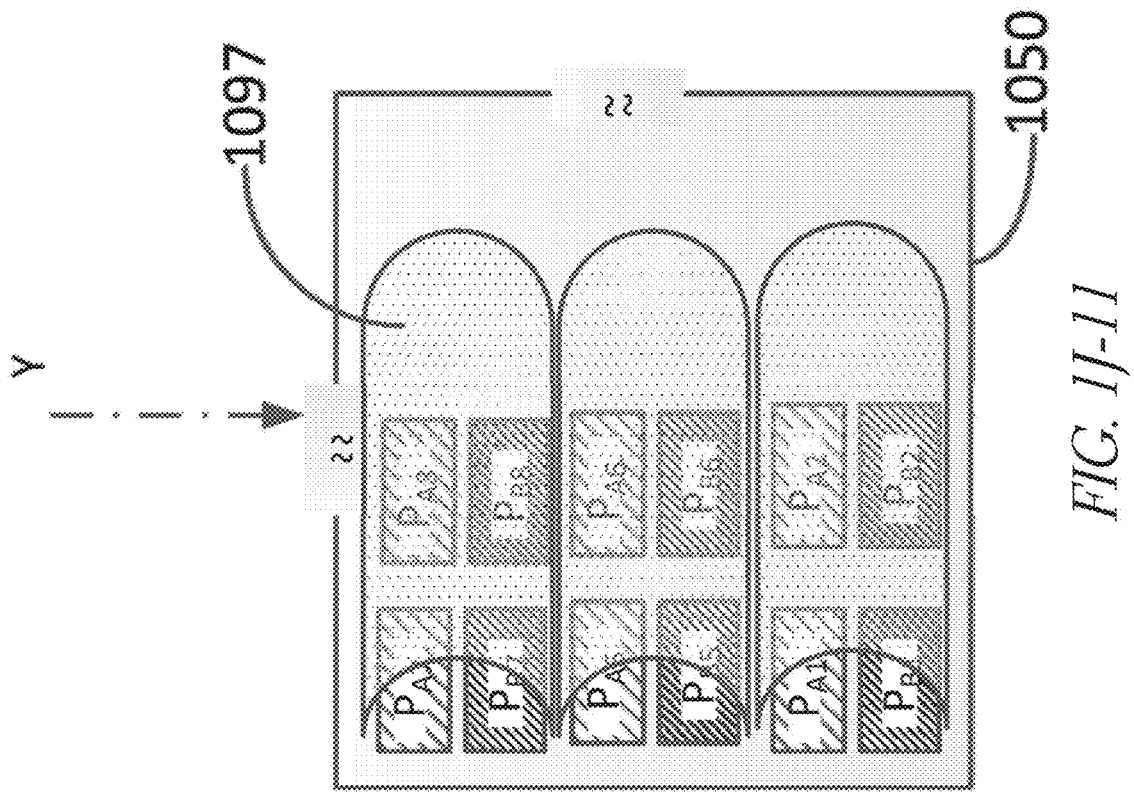
Figures 1, 1J, 2, 3, 4, 5, 6, 7, 8, 9, 10:
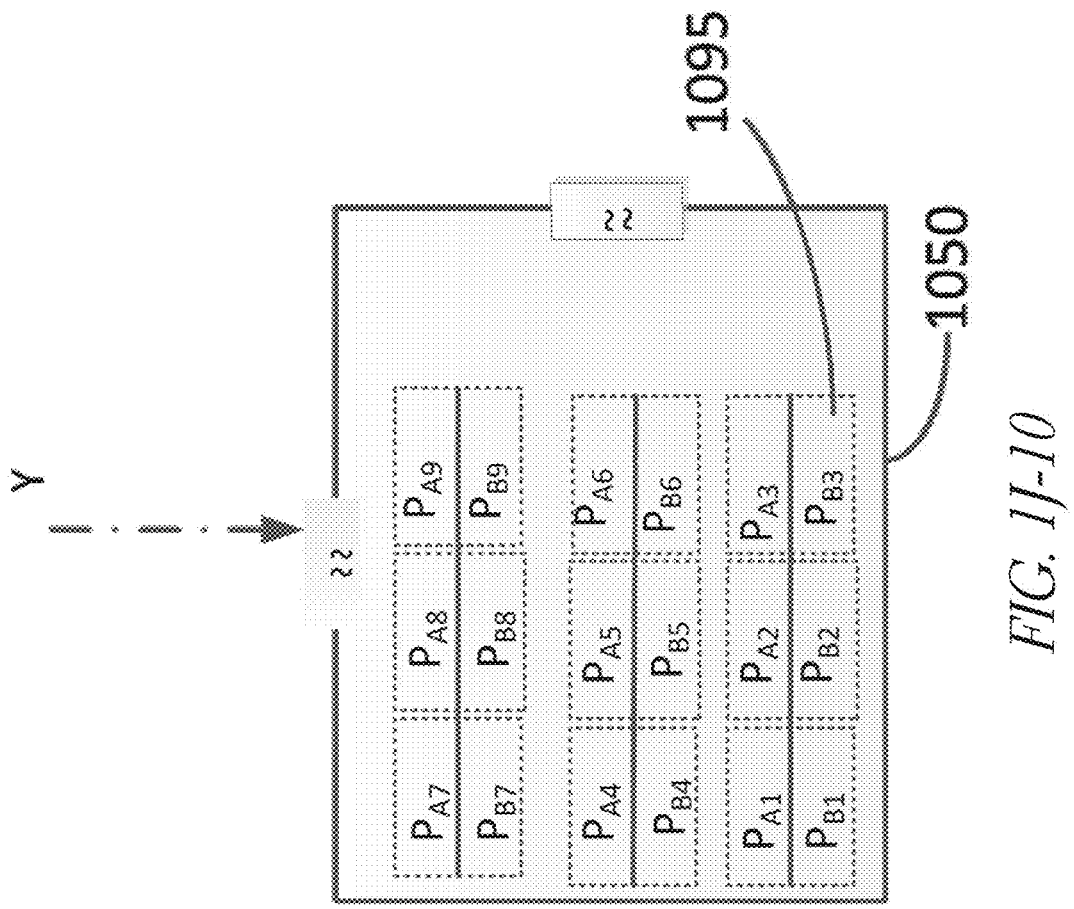

FIG. 10 schematically illustrates an example optical product 1300 with the interference optical structure 1330 disposed on the lenses 1360. In some instances, the interference optical structure 1330 can produce different colors due to different thicknesses around the lenses 1360. Thus, the color in the first and/or second image can change with a change in viewing angle.

As describe herein, the color in transmission and/or reflection can change with a change in viewing angle. For instance, at a different viewing angle, the optical structure 1230 and/or 1330 can produce a third color in transmission mode and a fourth color in reflection mode. In some instances, the optical structure 1230 and/or 1330 can have non-color shifting properties. For example, the color in transmission and/or reflection might not change with a change in viewing angle.

Various implementations can create various optical effects utilizing a combination of non-holographic features $F_1$ and/or $F_2$ with interference optical structures 1230 and/or 1330 along with other features described herein (and/or other features known in the art or yet to be developed), e.g., as described with respect to FIGS. 7A-8. For example, some implementations can also utilize reflective structures and/or demetallized structures.

Various interference optical structures will now be described.

The interference structures described herein may comprise structures that produce optical interference. Such structures may include a plurality of reflective surfaces from which light reflects. Light from one such reflective surface may, for example interfere with light from another such reflective surface and produce optical interference.

In certain implementations, the optical structure 1130 can comprise a Fabry-Perot or an etalon structure. The etalon structure may comprise for example two (e.g., first and second) reflective surfaces separated by a distance. Light incident on the etalon may reflect off the two reflective surfaces. The distance between the first and second reflective surfaces may introduce phase shift between the light reflected from the first reflected surface and light reflected from the second reflective surfaces. This phase shift may produce optical interference. Accordingly, light reflected from the etalon may have properties associated with interference. For example, the light reflected may have a particular wavelength spectrum and may for example be a particular color. In some implementations, the etalon may exhibit color shifting, the color of reflected light changing color with the angle of the incident light and/or the angle of viewing the etalon. Etalons may also produce interference in transmission as well. Likewise the light transmitted through the etalon may have properties associated with interference such as a characteristic wavelength or spectral character (e.g., or a particular spectral band or color), change in color with angle of incidence of light and/or angle of viewing, etc. In some implementations the etalon comprises a plurality of layer stacked on top of each other the for the first and second reflective surfaces spaced apart by a distance (e.g., the thickness of one of the layers).

Light reflected from more than two reflective surfaces can also interfere with each other to produce an optical interference effect. Accordingly, in various implementations, the optical structure may comprise a plurality of layers such as two or more. Without subscribing to any particular scientific theory, in some cases the plurality of layers may provide a plurality of reflective surfaces, for example, at the interface between the layer. Similarly, in various implementations, the optical structure 1130 can comprise an interference optical stack. In some implementations, the optical stack may include pairs of high (H) and low (L) index layers comprising materials having higher and lower reflective index, respectively. In various implementations the different layer have thickness to provide interference and the desired interference effect.

In various implementations, for example, the optical structure 1130, 1230, 1330 can comprise a A/D/M multilayer thin film optical stack, where A is an absorber layer, D is a transparent dielectric layer, and M is a metal layer, for example, that is opaque. In some instances, the absorber layer can have a ratio of the real part (n) of the refractive index to the imaginary part (k) of the refractive index near unity. In some implementations, the optical structure can comprise a A/D/M/D/A multilayer thin film optical stack. As another example, the optical structure can comprise a A/D/M/M*/M/D/A multilayer thin film optical stack, where M* is a magnetic layer. Some such structures can include those described in U.S. Pat. Nos. 4,705,300 and 6,838,166, each of which is incorporated herein by reference in its entirety.

The optical structure 1130, 1230, 1330 can also comprise, for example, a M/D/M or D/M/D/M/D multilayer thin film optical stack, where D is a transparent or optically transmissive dielectric layer and M is a metal layer. In some implementations, the metal layer can have a ratio of the real part (n) of the refractive index to the imaginary part (k) of the refractive index greater than or equal to 0.01 and less than or equal to 0.5, 0.4, or 0.2.

In various implementations, the optical structure 1130, 1230, 1330 can comprise a D/M/D or M/D/M/D/M multilayer thin film optical stack, where D is a transparent or optically transmissive dielectric layer and M is a metal layer. In some instances, the metal layer can have a ratio of the real part (n) of the refractive index to the imaginary part (k) of the refractive index greater than or equal to 0.01 and less than or equal to 0.5, 0.4, or 0.2. In some instances, individual ones of the metal layers can have a thickness of about 20 nm, 30 nm, 40 nm, 50 nm, 60 nm, 70 nm, 80 nm, 90 nm, 100 nm, or any ranges formed by such values, e.g., from about 20 nm to about 100 nm.

The metal layers can, for example, be any of those described herein, e.g., one or more of the metal layer can comprise aluminum, silver, gold, silver alloy, or gold alloy. The dielectric layers can, for example, be any of those described herein, e.g., one or more of the dielectric layers can comprise magnesium fluoride, silicon dioxide, zinc oxide, zinc sulfide, zirconium dioxide, titanium dioxide, tantalum pentoxide, ceric oxide, yttrium oxide, indium oxide, tin oxide, indium tin oxide, aluminum oxide, tungsten trioxide, or combinations thereof. In some instances, one or more of the dielectric layers can comprise an organic layer.

In various implementations, the optical structure 1130, 1230, 1330 can comprise a H/L/H/L/H multilayer thin film optical stack, where H and L are layers with a refractive index and the H layers have a higher refractive index than the L layers. In some designs, the L layers have a refractive index less than 1.65 and the H layers have a refractive index greater than or equal to 1.65. Some such structures can, for example, include those described in U.S. Pat. No. 6,838,166, which is incorporated herein by reference in its entirety.

Some such optical structures 1130, 1230, 1330 will be described further herein.

Optical Structures Comprising Metal Layers Surrounded by Dielectric Layers (e.g., D/M/D/M/D Optical Stack)

FIG. 11 schematically illustrates an optical structure 10 comprising a stack of layers that can be used as a security feature. The optical structure 10 comprises at least two metal layers 13 and 15. The at least two metal layers 13 and 15 can comprise metals having a ratio of the real part (n) of the refractive index to the imaginary part (k) of the refractive index (k) that is less than 1. For example, the at least two metal layers 13 and 15 can comprise metals that have an n/k value between about 0.01 and about 0.6, between about 0.015 and about 0.6, between about 0.01 and about 0.5, between about 0.01 and about 0.2, between about 0.01 and about 0.1, or any value in a range or sub-range defined by these values. Accordingly, the at least two metal layers 13 and 15 can comprise silver, silver alloys, gold, aluminum or copper and their respective alloys. Nickel (Ni) and Palladium (Pd) can be used in some implementations. In some cases, however, the at least two metal layers 13 and 15 do not comprise chromium, titanium, and/or tungsten or any metal having an n/k ratio greater than 0.6. In some cases, the metal layer 13 and 15 can have a thickness greater than or equal to about 3 nm and less than or equal to about 35 nm. For example, thickness of the metal layer 13 and 15 can be greater than or equal to about 10 nm and less than or equal to about 30 nm, greater than or equal to about 15 nm and less than or equal to about 27 nm, greater than or equal to about 20 nm and less than or equal to about 25 nm, or any value in a range or sub-range defined by these values. The thickness of the metal layer 13 can be equal to the thickness of the metal layer 15. Alternately, the thickness of the metal layer 13 can be greater than or less than the thickness of the metal layer 15.

A transparent dielectric layer 14 is sandwiched between the at least two metal layers 13 and 15. The dielectric layer 14 can have a refractive index greater than, less than or equal to 1.65. Materials with an index greater than or equal to 1.65 can be considered as high refractive index materials for the purpose of this application and materials with an index less than 1.65 can be considered as low index materials for the purpose of this application. The transparent dielectric layer 14 can comprise inorganic materials including but not limited to silicon dioxide ($SiO_2$), aluminum oxide ($Al_2O_3$), magnesium fluoride ($MgF_2$), cerium fluoride ($CeF_3$), lanthanum fluoride ($LaF_3$), zinc oxide (ZnO), zinc sulfide (ZnS), zirconium dioxide ($ZrO_2$), titanium dioxide ($TiO_2$), tantalum pentoxide ($Ta_2O_5$), ceric oxide ($CeO_2$), yttrium oxide ($Y_2O_3$), indium oxide ($In_2O_3$), tin oxide ($SnO_2$), indium tin oxide (ITO) and tungsten trioxide ($WO_3$) or combinations thereof. The transparent dielectric layer 14 can comprise polymers including but not limited to parylene, acrylates, and/or methacrylate. Without any loss of generality, the transparent dielectric layer 14 can comprise a material having an index of refraction greater than, less than, or equal to 1.65 and an extinction coefficient between 0 and about 0.5 such that it has low absorption of light in the visible spectral range.

The dielectric layer 14 can have a thickness that is greater than or equal to about 75 nm and less than or equal to about 2 micron. For example, the dielectric layer 14 can have a thickness that is greater than or equal to about 150 nm and less than or equal to about 650 nm, greater than or equal to about 200 nm and less than or equal to about 600 nm, greater than or equal to about 250 nm and less than or equal to about 550 nm, greater than or equal to about 300 nm and less than or equal to about 500 nm, greater than or equal to about 350 nm and less than or equal to about 450 nm, greater than or equal to about 700 nm and less than or equal to about 1 micron, greater than or equal to about 900 nm and less than or equal to about 1.1 micron, greater than or equal to about 1 micron and less than or equal to about 1.2 micron, greater than or equal to about 1.2 micron and less than or equal to about 2.0 microns or any value in a range/sub-range defined by these values. Without subscribing to any particular theory, in various implementations, the thickness of the dielectric layer 14 can be approximately a quarter wavelength of light (e.g., visible light) incident thereon or an integer multiple of a quarter wavelength. In various implementations, the thickness of the dielectric layer 14 may be, for example, 1/4, 3/4, 5/4, 7/4, 9/4, 10/4, etc. of the wavelength of visible light incident on the dielectric layer 14.

The optical structure 10 further comprises a transparent dielectric layer 12 that is disposed on a side of the metal layer 13 that is opposite to the dielectric layer 14 and a transparent dielectric layer 16 that is disposed on a side of the metal layer 15 that is opposite to the dielectric layer 14. In some cases, layers 12 and 16 can comprise materials having a refractive index greater than or equal to 1.65. For example, layers 12 and 16 can comprise $ZrO_2$, $TiO_2$, ZnS, ITO (indium tin oxide), $CeO_2$ or $Ta_2O_3$. Dielectric layers 12 and 16 can have a thickness that is greater than or equal to about 100 nm and less than or equal to about 400 nm, greater than or equal to about 150 nm and less than or equal to about 350 nm, greater than or equal to about 200 nm and less than or equal to about 300 nm, or any value in a range/sub-range defined by these values. The thickness of the dielectric layer 12 can be equal to the thickness of the dielectric layer 16. Alternately, the thickness of the dielectric layer 12 can be greater than or less than the thickness of the dielectric layer 16. The optical structure 10 can have a thickness that is less than or equal to about 2 microns.

Fabricating the optical structure 10 can include providing the layer of dielectric material 12 (or the layer of dielectric material 16) and depositing the metal layer 13 (or the metal layer 15) over the layer of dielectric material 12 (or the layer of dielectric material 16). The metal layer 13 (or the metal layer 15) can be deposited over the layer of dielectric material 12 (or the layer of dielectric material 16) using an electroless method discussed in further detail below. The metal layer 13 (or the metal layer 15) can be deposited as a continuous thin film, as small spheres, metallic clusters or island like structures. The other dielectric layer 14 can be subsequently disposed over the metal layer 13 (or the metal layer 15). The initial layer of dielectric material 12 (or the layer of dielectric material 16) can be disposed and/or formed over a support. The support is also referred to herein as a base layer. The support can comprise a carrier. The support can comprise a sheet such as a web. The support can comprise a substrate. The substrate can be a continuous sheet of PET or other polymeric web structure. The support can comprise a non-woven fabric. Non-woven fabrics can be flat, porous sheets comprising fibers. In some implementations, the non-woven fabric can be configured as a sheet or a web structure that is bonded together by entangling fiber or filaments mechanically, thermally, or chemically. In some implementations, the non-woven fabric can comprise perforated films (e.g., plastic or molten plastic films). In some implementations, the non-woven fabric can comprise synthetic fibers such as polypropylene or polyester or fiber glass.

The support can be coated with a release layer comprising a release agent. The release agent can be soluble in solvent or water. The release layer can be polyvinyl alcohol, which is water soluble or an acrylate which is soluble in a solvent. The release layer can comprise a coating, such as, for example, salt (NaCl) or cryolite ($Na_3AlF_6$) deposited by evaporation before the layers of the optical structure are deposited/formed.

In some implementations of the support configured as a non-woven fabric, the non-woven fabric can be coated with a release layer. Such implementations can be dipped or immersed in a solvent or water that acts as a release agent to dissolve or remove the release layer. The release agent (e.g., the solvent or water) is configured to penetrate from a side of the non-woven fabric opposite the side on which the optical structure is disposed to facilitate release of the optical structure instead of having to penetrate through the optical structure. The optical structure is recovered from the solvent or water after dissolution of the release layer. In some manufacturing approaches, the recovered optical structure can then be processed into a pigment.

In one method of fabrication, the optical structure 10 can be fabricated, for example, deposited or formed on a coated web, a coated base layer, a coated carrier or a coated substrate. The coating on the web, the base layer, the substrate or the carrier can be configured as a release layer to facilitate easy removal of the optical structure 10.

The optical structure 10 can be configured as a film or a foil by disposing over a substrate or other support layer having a thickness, for example, greater than or equal to about 10 microns and less than or equal to about 25 microns. For example, a substrate or support layer such as a polyester substrate or support layer can have a thickness greater than or equal to 12 microns and less than or equal to 22.5 microns, greater than or equal to 15 microns and less than or equal to about 20 microns. The substrate or support layer can comprise materials, such as, for example, polyethylene terphthalate (PET), acrylate, polyester, polyethylene, polypropylene, or polycarbonate. The support or support layer itself can be dissolvable. The support or support layer, for example, can also comprise polyvinyl alcohol, which can be dissolved, for example, in water. Accordingly, instead of using a release layer on a insoluble support web, the support web itself may comprise soluble material. Accordingly, the support or support layer can be dissolved leaving the optical coating remaining. The optical structure 10 configured as a film or a foil can be encapsulated with a polymer, such as, for example a UV cured polymer.

The optical structure 10 can comprises additional layers. For example, a thin protective layer may be disposed between the metal layer 13 and the dielectric layer 12 and/or between the metal layer 15 and the dielectric layer 16. The protective layer can comprise materials, such as, for example, $NiCrO_x$, $Si_3N_4$, $CeSnO_4$ and $ZnSnO_4$. The protective layers can have a thickness between about 3-5 nm. The protective layers can advantageously increase the durability of the metal layers 13 and 15.

Instead of a film, the optical structure, 10, may be removed from the substrate, web, carrier, or support layer on which it is fabricated and divided into platelets having a size that is suitable for a pigment or printing ink. Platelets having a size that is suitable for a pigment or printing ink can have an area, length, and/or width that is about 5-10 times the thickness of the platelet, in some implementations. Accordingly, the platelets having a thickness of about 1 micron, and/or can have a width and/or a length that is between approximately 5 micron and about 50 microns. For example, the width and/or a length can be greater than or equal to about 5 micron and less than or equal to about 15 microns, greater than or equal to about 5 microns and less than or equal to about 10 microns, greater than or equal to about 5 micron and less than or equal to about 40 microns, greater than or equal to about 5 microns and less than or equal to about 20 microns, or any value in the ranges/sub-ranges defined by these values. Platelets having a length and/or width that is less than about 5-10 times the thickness of the platelet, such as, for example having a length and/or width that is equal to the thickness of the platelet can be oriented along their edges in the printing ink or pigment. This can be disadvantageous since pigment or printing ink comprising platelets that are oriented along their edges may not exhibit the desired colors in reflection and transmission modes. Dimensions such as, thicknesses, lengths and/or widths outside these ranges are also possible.

Figures 1, 2, 12A:
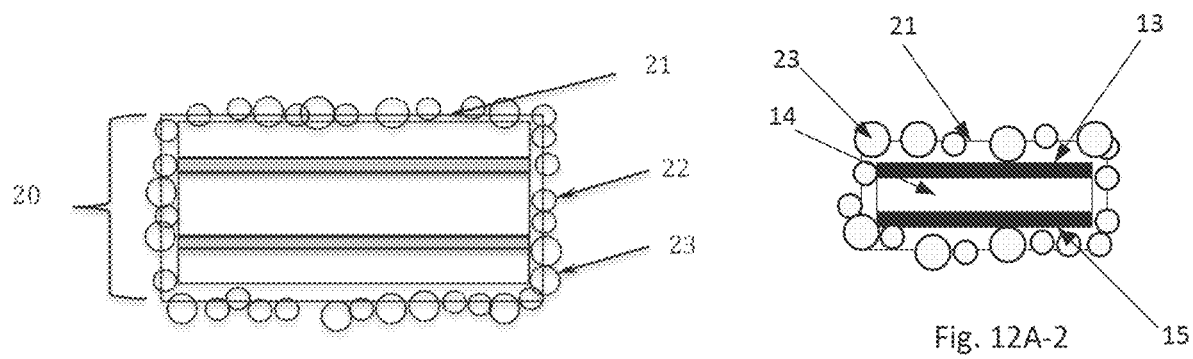

FIG. 12A-1 illustrates an example of a platelet 20. The optical structure, 10 is fractured, cut, diced or otherwise separated to obtain the separate, for example, microns sized, pieces or platelets. In some implementations, the obtained platelets may be surrounded by an encapsulating layer 21. The encapsulating layer 21 can comprise a moisture resistant material, such as, for example silicon dioxide. The encapsulating layer 21 can also comprise silica spheres 22 and 23. The silica spheres 22 and 23 can be of the same size or have different sizes. The encapsulating layer 21 can help protect the at least two metal layers 13 and 15 from corrosion. The encapsulating layer 21 can additionally and/or alternatively reduce the occurrence of delamination of the at least two metal layers 13 and 15 from the other layers of the optical structure 10. The optical structures 10 surrounded by the encapsulating layer 21, and potentially comprising the silica spheres 22 and 23, can be configured as platelets 20 that are suitable for a pigment or printing ink. The silica spheres 22 and 23 of the encapsulating layer 21 can help prevent the platelets from adhering to one another. Without the spheres the platelets may stick together like two microscope slides stick together. The spheres 22 and 23 can also prevent the platelets 20 from sticking to the print rollers in the printing machine. One method of surrounding the optical structure 10 with an encapsulating layer 21 can rely on sol-gel technology using tetraethylorthosilicate (TEOS). In one method of forming the encapsulating layer 21, an alcohol based solution of TEOS can be added in small quantities (e.g., one or more drops at a time) to a dispersion of the platelets in alcohol or water. A catalyst, such as, for example, an acid or sodium hydroxide solution can be added into the a dispersion of the platelets in alcohol or water in small quantities (e.g., one or more drops at a time). The dispersion of the platelets in alcohol or water can be heated to a temperature of about 50-70° C., while stirring to transform TEOS to a silica coating. Other processes, however, may be employed.

In some embodiments, a plurality of platelets 20 can form a pigment. Such a pigment may be color shifting (e.g., the color reflected and/or transmitted changes with angle of view or angle of incidence of light), in some cases. In some embodiments, non-color shifting pigment or dye may be mixed with the pigment. In some embodiments other materials may be included with the platelets 20 to form the pigment. Although some of the pigments discussed herein can provide color shift with change in viewing angle or angle of incidence of light, pigments that do not exhibit color shift with change in viewing angle or angle of incidence of light or that produce very little color shift with change in viewing angle or angle of incidence of light are also contemplated.

Figures 1, 12B:
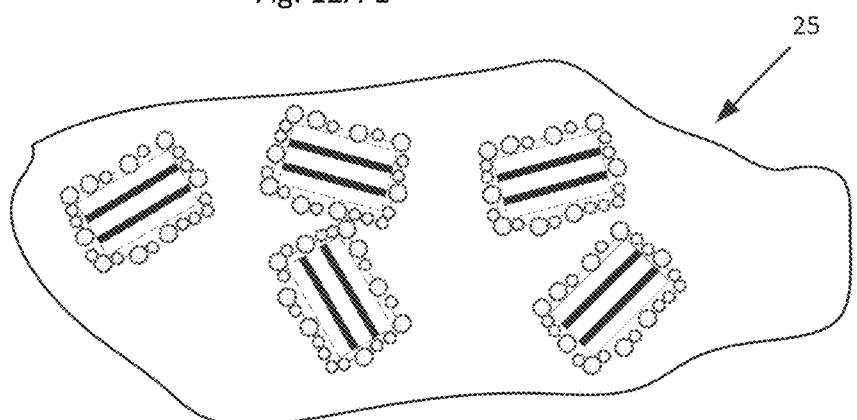
Figures 2, 12B:
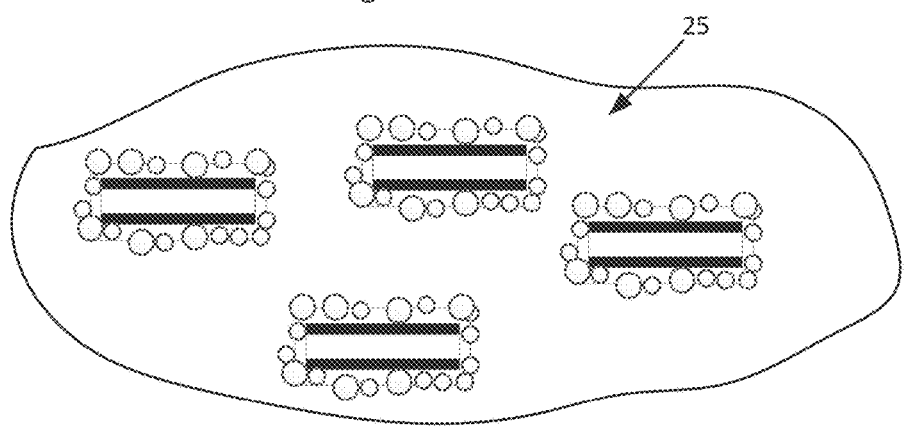

In some embodiments, the platelets 20 can be added to a medium such as a polymer 25 (e.g., a polymeric resin) to form a dichroic ink, a pigment, or paint as shown in FIG. 12B-1. The platelets can be suspended in the medium (e.g., polymer) 25. The platelets can be randomly oriented in the medium (e.g., polymer) 25 as shown in FIG. 12B-1. During the printing process, in some cases, the individual platelets can be oriented parallel to the surface of the object (e.g., paper) to which the pigment, the paint, or the dichroic ink is being applied as a result of, for example, the printing action, gravity, and/or surface tension of the normal drying process of the pigment, the paint, or the dichroic ink as shown in FIG. 12B-2. The medium 25 can comprise material including but not limited to acrylic melamine, urethanes, polyesters, vinyl resins, acrylates, methacrylate, ABS resins, epoxies, styrenes and formulations based on alkyd resins and mixtures thereof. In some implementations, the medium 25, e.g., polymer, can have a refractive index that closely matches the refractive index of the encapsulating silica layer 21 and/or silica balls such that the encapsulating layer and/or the silica balls do not adversely affect the optical performance of the pigment, the paint, or the dichroic ink in the medium.

In various implementations, the platelets 20 need not be surrounded by an encapsulating layer. In such implementations, one or more platelets 20 that are not encapsulated by an encapsulating layer can be added or mixed with an ink or a pigment medium (e.g., varnish, polymeric resin, etc.) to obtain a dichroic ink or pigment as discussed above. In various implementations, the dichroic ink or pigment can comprise a plurality of platelets 20. The optical structures 10 that are configured as the plurality of platelets 20 can have different distributions of shapes, sizes, thicknesses and/or aspect ratios. The optical structures 10 that are configured as the plurality of platelets 20 can also have different optical properties. For example, the optical structures 10 that are configured as the plurality of platelets 20 can also have different color properties.

In some implementations, an optical structure comprising only the metal layers 13 and 15 and the transparent dielectric layer 14 without the high refractive index dielectric layers 12 and 16 as depicted in FIG. 12A-2 can be configured as platelets as discussed above and dispersed in the medium 25 as shown in FIG. 12B-2 to manufacture a dichroic printing ink, paint or pigment as discussed above. In some implementations, the platelets including an optical structure comprising only the metal layers 13 and 15 and the transparent dielectric layer 14 without the high refractive index dielectric layers 12 and 16 need not be encapsulated in an encapsulating layer as discussed above.

Figure 13:
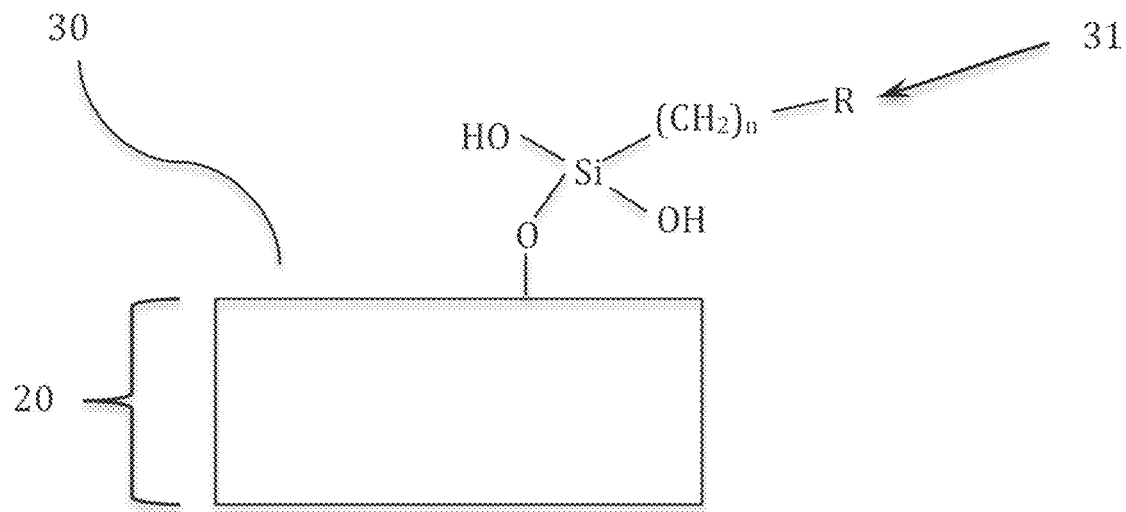
FIG. 13 illustrates the silane coupling agent bonded to an exposed surface of the encapsulation layer of a platelet. Another side of the silane coupling agent can also bond to a medium such as a polymer in which the platelets are dispersed.

A silane coupling agent can be bonded to the encapsulating layer 21 to form a functionalized platelet 30 as shown in FIG. 13. Bonding of the silane coupling agent to the encapsulating layer can occur through a hydrolyzing reaction. The silane coupling agent can bind to the polymer (e.g., polymeric resin) of the printing ink or paint medium so that the heterogeneous mixture of pigment and the polymer do not separate during the printing process and substantially function in much the same way as a homogeneous medium would function. The printing ink or paint medium can comprise material including but not limited to acrylic melamine, urethanes, polyesters, vinyl resins, acrylates, methacrylate, ABS resins, epoxies, styrenes and formulations based on alkyd resins and mixtures thereof. The silane coupling agents used can be similar to the silane coupling agents sold by Gelest Company (Morristown, PA USA). In some implementations, the silane coupling agent can comprise a hydrolyzable group, such as, for example, an alkoxy, an acyloxy, a halogen or an amine. Following a hydrolyzing reaction (e.g., hydrolysis), a reactive silanol group is formed, which can condense with other silanol groups, for example, with the silica spheres of the encapsulating layer 21 or the encapsulating layer of silica to form siloxane linkages. The other end of the silane coupling agent comprises the R-group 31. The R-group 31 can comprise various reactive compounds including but not limited to compounds with double bonds, isocyanate or amino acid moieties. Reaction of the double bond via free radical chemistry can form bonds with the ink polymer(s) such as those based on acrylates, methacrylates or polyesters based resins. For example, isocyanate functional silanes, alkanolamine functional silanes and aminosilanes can form urethane linkages.

Without any loss of generality, in various implementations of the optical structure 10 configured as a platelet that do not comprise the encapsulating layer, the silane coupling agent can be bonded to one or both of the high refractive index dielectric layers 12 and 16 comprising a dielectric material (e.g., $TiO_2$) suitable to be bonded with the silane coupling agent.

Figure 14:
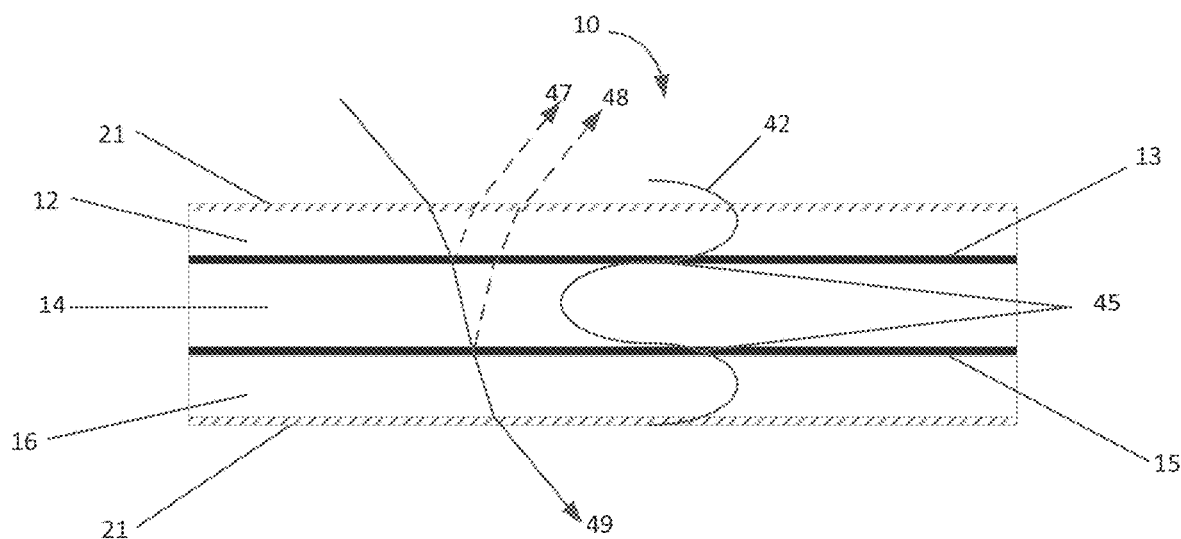
FIG. 14 is a schematic illustration showing propagation light incident on the optical structure and the resultant nodes in field strength at the metal layers.

Without any loss of generality, the optical structure 10 can be considered as an interference stack or cavity. Ambient light incident on the surface of the optical structure 10 is partially reflected from the various layers of the optical structure 10 as shown by rays 47 and 48 in FIG. 14 and partially transmitted through the various layers of the optical structure 10 as shown by ray 49 in FIG. 14. FIG. 14 illustrates an embodiment of an optical structure 10 comprising the high refractive index dielectric layer 12 and 16, metal layers 13 and 15 and a dielectric layer 14 encapsulated in the encapsulating layer 21. Some wavelengths of the ambient light reflected from the various layers may interfere constructively and some other wavelengths of the ambient light reflected from the various layers may interfere destructively. Similarly, some wavelengths of light transmitted through the various layers may interfere constructively and some other wavelengths of the ambient light transmitted through the various layers may interfere destructively. As a result of which, the optical structure 10 appears colored when viewed in transmission and reflection mode. In general, the color and the intensity of light reflected by and transmitted through the optical structure 10 can depend on the thickness and the material of the various layers of the optical structure 10. By changing the material and the thickness of the various layers, the color and intensity of light reflected by and transmitted through the optical structure 10 can be varied. Without subscribing to any particular scientific theory about the operation of the optical structures 10, in general, the material and the thickness of the various layers can be configured such that some or all of the ambient light reflected by the various layers interfere such that a node 45 in the field 42 occurs at the two metal layer 13 and 15. Without subscribing to any particular scientific theory, it is noted that in some cases those wavelengths that are substantially equal to the thickness of the spacer layer (e.g., wavelengths within about ±10% of the thickness of the spacer layer) will interfere such that a node 45 in the field 42 occurs at the two metal layer 13 and 15. For other wavelengths, a node 45 might not occur. Accordingly, in some implementations, the two metal layers 13 and 15 might not be visible in the reflection mode. Again, without subscribing to a particular scientific theory, based on the thickness of the two metal layers 13 and 15 and the transparent dielectric layer 14, a portion of the incident light may be transmitted through the optical structure 10 as a result of the phenomenon of "induced transmittance" or "induced transmission". The reflection and transmission spectral characteristics are discussed below.

Figure 15A:
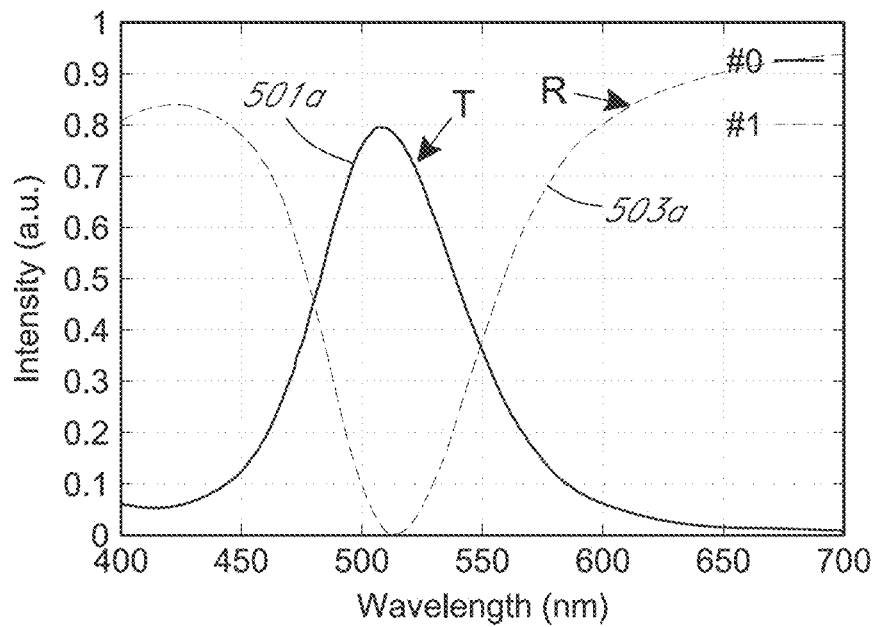
FIGS. 15A and 15B illustrate transmission and reflection spectra of examples of optical structures.

FIG. 15A shows a spectral plot in both transmission (curve 501a) and reflection (curve 503a) for a first example of the optical structure 10. The materials of the various layers of the first example of the optical structure 10 and the thickness of the various layers of the first example of the optical structure 10 are provided in Table 1 below. As indicated in Table 1, the first example of the optical structure 10 comprises two metal layers comprising silver. The two silver layers correspond to the at least two metal layer 13 and 15 of the optical structure 10 shown in FIG. 11. Both the silver layers have the same thickness of 25 nm. A dielectric layer having a thickness of 300 nm is sandwiched between the two silver layers. The dielectric layer comprises $SiO_2$ which has a refractive index of 1.47011. The dielectric layer comprising $SiO_2$ corresponds to the transparent layer 14 having a low refractive index (i.e., refractive index less than 1.65). A layer of $ZrO_2$ is disposed on the side of each of the two silver layers that is opposite the side facing the $SiO_2$ layer. Each of the two layers comprising $ZrO_2$ has a thickness of 150 nm. As noted from Table 1 below, $ZrO_2$ has a refractive index of 2.27413. The two layers comprising $ZrO_2$ corresponds to the transparent layers 12 and 16 having a high refractive index (i.e., refractive index greater than or equal to 1.65). The first example of the optical structure 10 is encapsulated in a $SiO_2$ matrix as indicated in Table 1. The $SiO_2$ matrix is used to simulate the printing medium or ink which has a similar refractive index.

The transmission and reflection of light observed at an angle of 0 degrees with respect to a normal to the first example of the optical structure 10 is shown in FIG. 15A. The reflection spectrum 503a (indicated as curve #1 in FIG. 15A) and the transmission spectrum 501a (indicated as curve #0 in FIG. 15A) in the spectral range between about 400 nm and about 700 nm which includes the visible spectral range were obtained using a simulation software from http://thinfilm.hansteen.net.

TABLE 1

Parameters of a first example of the optical structure that has the reflection and transmission spectra as shown in FIG. 15A.
Parameters

| | | | | | |
|---|---|---|---|---|---|
| Curve #0 | | | | | |
| # | | | | | |
| # | Slab: | | | | |
| # | SIO2 | | N = (1.47011 | , 0) | mynkdb/SIO2.NK |
| # | ZRO2 | d = 1.5e−07 | N = (2.27413 | , 0) | mynkdb/ZRO2.NK |
| # | AG | d-2.5e−08 | N = (0.173038 | , 1.94942) | mynkdb/AG.NK |
| # | SIO2 | d = 3e−07 | N = (1.47011 | , 0) | mynkdb/SIO2.NK |
| # | AG | d = 2.5e−08 | N = (0.173038 | , 1.94942) | mynkdb/AG.NK |
| # | ZRO2 | d = 1.5e−07 | N = (2.27413 | , 0) | mynkdb/ZRO2.NK |
| # | SIO2 | | N = (1.47011 | , 0) | mynkdb/SIO2.NK |
| # | | | | | |
| # | Beam: | | | | |
| # | Wavelength = (4e−07, 0) Angle = 0.0174533 Polarization = 1 N = (1.47011, 0) | | | | |
| # | | | | | |
| # | Supported spectral range: 2.5e−07 m-8.5e−07 m. | | | | |
| # | ------------------------------------------------------------- | | | | |
| # | Lambda[nm] R[ ] | | | | |
| # | ------------------------------------------------------------- | | | | |
| Curve #1 | | | | | |
| # | | | | | |
| # | Slab: | | | | |
| # | SIO2 | | N = (1.47011 | , 0) | mynkdb/SIO2.NK |
| # | ZRO2 | d = 1.5e−07 | N = (2.27413 | , 0) | mynkdb/ZRO2.NK |
| # | AG | d = 2.5e−08 | N = (0.173038 | , 1.94942) | mynkdb/AG.NK |
| # | SIO2 | d = 3e−7 | N = (1.47011 | , 0) | mynkdb/SIO2.NK |
| # | AG | d = 2.5e−08 | N = (0.173038 | , 1.94942) | mynkdb/AG.NK |
| # | ZRO2 | d = 1.5e−07 | N = (2.27413 | , 0) | mynkdb/ZRO2.NK |
| # | SIO2 | | N = (1.47011 | , 0) | mynkdb/SIO2.NK |
| # | | | | | |
| # | Beam: | | | | |
| # | Wavelength = (4e−07, 0) Angle = 0.0174533 Polarization = 1 N = (1.47011, 0) | | | | |
| # | | | | | |
| # | Supported spectral range: 2.5e−07 m-8.5e−07 m. | | | | |
| # | ------------------------------------------------------------- | | | | |
| # | Lambda[nm] T[ ] | | | | |
| # | ------------------------------------------------------------- | | | | |

It can be seen from FIG. 15A that the transmission curve 501a (curve #0) has a peak with a maximum value occurring at a wavelength of about 520 nm and the reflection curve 503a has two peaks with a first maximum value occurring at a wavelength of 420 nm and a second maximum value occurring at a wavelength of about 650 nm. The maximum value of the transmission and reflection peaks is greater than 0.5 which indicates that the transmission and reflection peaks have high intensities. Furthermore, the transmission and reflection peaks have a bandwidth as measured at 50% of the maximum value of the peak greater than about 20 nm. The bandwidth as measured at 50% of the maximum value of the peak is referred to as full width at half maximum (FWHM). It is observed from FIG. 15A that the FWHM of the transmission peak is about 75 nm.

Based on the position of the transmission and reflection peaks and the bandwidth of the transmission and reflection peaks, the optical structure 10 can be perceived as having a first color in the reflection mode and a second color in the transmission mode by an average human eye. In some cases, the first color and the second color can be complimentary colors. In some cases, the transmission and reflection peaks comprising a range of wavelengths of the visible spectral range can have a high intensity and a FWHM greater than 2 nm (e.g., FWHM greater than or equal to about 10 nm, FWHM greater than or equal to about 20 nm, FWHM greater than or equal to about 30 nm, FWHM greater than or equal to about 40 nm, FWHM greater than or equal to about 50 nm, FWHM greater than or equal to about 60 nm, FWHM greater than or equal to about 70 nm, FWHM greater than or equal to about 100 nm, FWHM greater than or equal to about 200 nm, FWHM less than or equal to about 300 nm, FWHM less than or equal to about 250 nm, or any value in a range/sub-range defined by these values).

The one or more reflection peaks can be considered to have a high intensity if the reflectivity or reflectance of the peak in a range of visible wavelengths is greater than or equal to about 50% and less than or equal to about 100%. For example, the one or more reflection peaks can be considered to have a high intensity if the amount of light reflected or reflectivity or reflectance in a range of visible wavelengths is greater than or equal to about 55% and less than or equal to about 99%, greater than or equal to about 60% and less than or equal to about 95%, greater than or equal to about 70% and less than or equal to about 90%, greater than or equal to about 75% and less than or equal to about 85%, or any value in a range/sub-range defined by these values.

The one or more transmission peaks can be considered to have a high intensity if the transmissivity or transmittance of the peak in a range of visible wavelengths is greater than or equal to about 50% and less than or equal to about 100%. For example, the one or more transmission peaks can be considered to have a high intensity if the amount of light transmitted or transmissivity or transmittance in a range of visible wavelengths is greater than or equal to about 55% and less than or equal to about 99%, greater than or equal to about 60% and less than or equal to about 95%, greater than or equal to about 70% and less than or equal to about 90%, greater than or equal to about 75% and less than or equal to about 85%, or any value in a range/sub-range defined by these values.

Figure 15B:
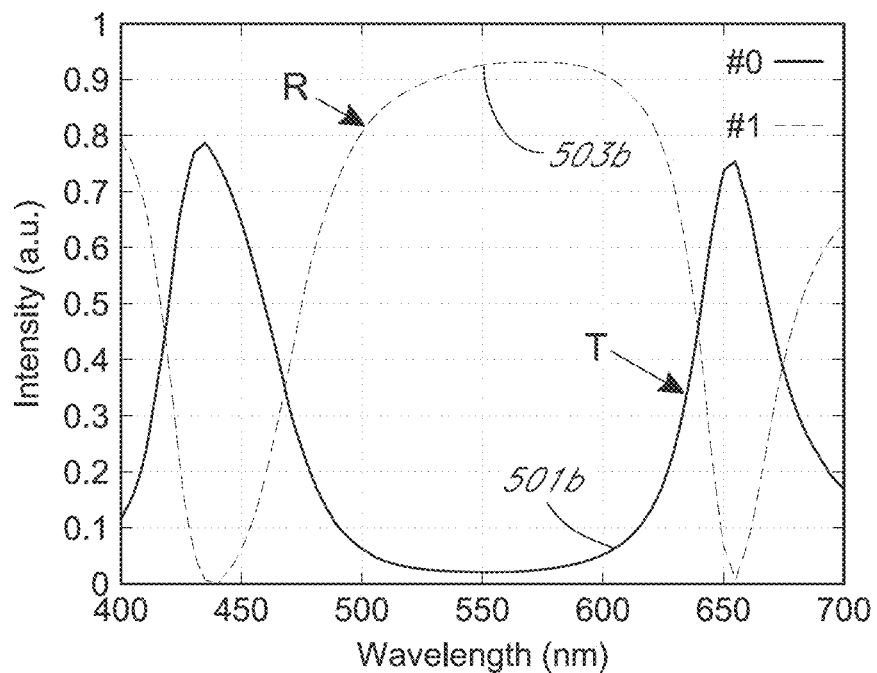

The first example of the optical structure 10 having a design as depicted in Table 1 and having a reflection spectrum and a transmission spectrum as shown in FIG. 15A appears green in transmission mode and as magenta in reflection mode to an average human eye. Without any loss of generality, it can be advantageous, in various implementations, for the peaks in the reflection and transmission spectra to be non-overlapping as shown in FIGS. 15A and 15B such that a reflection peak having a highest possible reflectance or reflectivity can be obtained in one region of the visible spectral range and a transmission peak having a highest possible transmittance or transmissivity can be obtained in a non-overlapping region of the visible spectral range. Accordingly, the reflected color and the transmitted color can be different and potentially complementary to each other, such as, for example, red and green, yellow and violet, blue and orange, green and magenta, etc.

The shape of the transmission and reflection peaks, the position of the maximum of the transmission and reflection peaks, the FWHM of the transmission and reflection peaks, etc. can be varied by varying the materials and/or thickness of the various layers of the optical structure 10. This can be observed from FIG. 15B which depicts the reflection spectrum 503b and transmission spectrum 501b of a second example of the optical structure 10 which has the same material composition as the first example of the optical structure 10 but different thickness for the various layers. The parameters of the second example of the optical structure 10 are provided in Table 2 below. As noted from Table 2, the thickness of the dielectric layer comprising SiO$_2$ and having a refractive index of 1.47011 in the second example of the optical structure 10 is 400 nm instead of 300 nm in the first example of the optical structure 10. Furthermore, the thickness of the two ZrO$_2$ disposed on either side of each of the two silver layers is 225 nm in the second example of the optical structure 10 instead of 150 nm in the first example of the optical structure 10.

TABLE 2

Parameters of a second example of the optical structure that has the reflection and transmission spectra as shown in FIG. 15B.

Parameters

| Curve #0 | | | | | |
|---|---|---|---|---|---|
| # | | | | | |
| # | Slab: | | | | |
| # | SIO2 | | N = (1.47011 | , 0) | mynkdb/SIO2.NK |
| # | ZRO2 | d = 2.25e−07 | N = (2.27413 | , 0) | mynkdb/ZRO2.NK |
| # | AG | d = 2.5e−08 | N = (0.173038 | , 1.94942) | mynkdb/AG.NK |
| # | SIO2 | d = 4e−07 | N = (1.47011 | , 0) | mynkdb/SIO2.NK |
| # | AG | d = 2.5e−08 | N = (0.173038 | , 1.94942) | mynkdb/AG.NK |
| # | ZRO2 | d = 2.25e−07 | N = (2.27413 | , 0) | mynkdb/ZRO2.NK |
| # | SIO2 | | N = (1.47011 | , 0) | mynkdb/SIO2.NK |
| # | | | | | |

TABLE 2-continued

Parameters of a second example of the optical structure that has the reflection and transmission spectra as shown in FIG. 15B.
Parameters

```
#   Beam:
#   Wavelength = (4e-07, 0) Angle = 0.0174533 Polarization = 1 N = (1.47011, 0)

#   Supported spectral range: 2.5e-07 m-8.5e-07 m.
#   ------------------------------------------------------------------------
#   Lambda[nm] R[ ]
#   ------------------------------------------------------------------------
Curve #1

#   Slab:
#   SIO2                              N = (1.47011    , 0)         mynkdb/SIO2.NK
#   ZRO2       d = 2.25e-07           N = (2.27413    , 0)         mynkdb/ZRO2.NK
#   AG         d = 2.5e-08            N = (0.173038   , 1.94942)   mynkdb/AG.NK
#   SIO2       d = 4e-07              N = (1.47011    , 0)         mynkdb/SIO2.NK
#   AG         d = 2.5e-08            N = (0.173038   , 1.94942)   mynkdb/AG.NK
#   ZRO2       d = 2.25e-07           N = (2.27413    , 0)         mynkdb/ZRO2.NK
#   SIO2                              N = (1.47011    , 0)         mynkdb/SIO2.NK

#   Beam:
#   Wavelength = (4e-07, 0) Angle = 0.0174533 Polarization = 1 N = (1.47011, 0)

#   Supported spectral range: 2.5e-07 m-8.5e-07 m.
#   ------------------------------------------------------------------------
#   Lambda[nm] T[ ]
#   ------------------------------------------------------------------------
```

As a result of the change in the thickness of the dielectric layers comprising $SiO_2$ and $ZrO_2$ between the second example of the optical structure and the first example of the optical structure, an average eye would perceive the second example of the optical structure to appear green in reflection mode and a magenta in transmission mode when viewed along a direction normal to the surface of the second example of the optical structure.

The color of the first example and the second example of the optical structure 10 as perceived by the average human eye in reflection mode and transmission mode can shift from the above described magenta and green colors at different viewing angles with respect to the normal to the surface of the first example and the second example of the optical structure 10. For example, the first example of the optical structure 10 can appear yellowish green in reflection mode and blue in transmission mode when viewed at an angle of about 35 degrees with respect to the normal to the surface of the first example of the optical structure 10. As another example, the second example of the optical structure 10 can appear pale purple in reflection mode and yellowish in transmission mode when viewed at an angle of about 35 degrees with respect to the normal to the surface of the second example of the optical structure 10. Without any loss of generality, the reflection and the transmission peaks can exhibit a blue shift towards shorter wavelengths as the viewing angle with respect to the normal to the surface of the first example and the second example of the optical structure 10 increases.

TABLE 3

CIELab values for transmission mode when the first example of the optical structure having parameters as described in Table 1 is viewed at different viewing angles in the presence of a D65 light source.

| Incident Angle | L* | a* | b* | |
|---|---|---|---|---|
| 0.0 | 66.0433 | −91.9989 | 11.4335 | Design: First Example of |
| 5.0 | 65.5578 | −91.5328 | 9.3070 | the Optical Structure |
| 10.0 | 64.0035 | −89.0283 | 2.6936 | Polarization: P |

TABLE 3-continued

CIELab values for transmission mode when the first example of the optical structure having parameters as described in Table 1 is viewed at different viewing angles in the presence of a D65 light source.

| Incident Angle | L* | a* | b* | |
|---|---|---|---|---|
| 15.0 | 61.1497 | −81.1844 | −8.9303 | Source: D65 |
| 20.0 | 56.8304 | −63.3282 | −25.7758 | Observer: CIE 1931 |
| 25.0 | 51.2146 | −32.8229 | −46.6651 | Mode: Transmittance |
| 30.0 | 44.8902 | 5.7777 | −67.7337 | |
| 35.0 | 38.6590 | 39.5335 | −81.9630 | |
| 40.0 | 33.4474 | 53.5162 | −81.6652 | |
| 45.0 | 30.4059 | 43.0007 | −64.1869 | |

TABLE 4

CIELab values for reflection mode when the first example of the optical structure having parameters as described in Table 1 is viewed at different viewing angles in the presence of a D65 light source.

| Incident Angle | L* | a* | b* | |
|---|---|---|---|---|
| 0.0 | 79.2753 | 51.6407 | −11.0765 | Design: First Example of |
| 5.0 | 79.6541 | 50.6966 | −9.6957 | the Optical Structure |
| 10.0 | 80.8290 | 47.4222 | −5.3025 | Polarisation: P |
| 15.0 | 82.8379 | 40.8204 | 2.7687 | Source: D65 |
| 20.0 | 85.5358 | 30.2258 | 15.3945 | Observer: CIE 1931 |
| 25.0 | 88.5026 | 16.2157 | 33.3659 | Mode: Reflectance |
| 30.0 | 91.2316 | 1.0176 | 55.5312 | |
| 35.0 | 93.4068 | −11.0169 | 70.1468 | |
| 40.0 | 94.9289 | −14.7597 | 57.7563 | |
| 45.0 | 95.7892 | −10.6419 | 32.4479 | |

Tables 3 and 4 above provide the CIELa*b* values for transmission mode and reflection mode respectively when the first example of the optical structure having parameters as described in Table 1 is viewed at different viewing angles in the presence of a D65 light source. Tables 5 and 6 below provide the CIELa*b* values for transmission mode and reflection mode respectively when the second example of the optical structure having parameters as described in Table 2 is viewed at different viewing angles in the presence of a D65 light source. The CIELab color closely represent the colors perceived by an average human eye. The CIELab color space mathematically describe various colors perceived by an average human eye in the three dimensions L for lightness, a for the color component green-red, and b for the color component from blue-yellow. The a-axis extends longitudinally in a plane from green (represented by −a) to red (represented by +a). The b-axis extends along a transverse direction in the plane perpendicular to the a-axis from blue (represented by −b) to yellow (represented by +b). The brightness is represented by the L-axis which is perpendicular to the a-b plane. The brightness increases from black represented by L=0 to white represented by L=100. The CIELab values for different viewing angles using a D65 illuminant were calculated using Essential Macleod Thin Film Software.

TABLE 5

CIELab values for transmission mode when the second example of the optical structure having parameters as described in Table 2 is viewed at different viewing angles in the presence of a D65 light source.

| Incident Angle | L* | a* | b* | |
|---|---|---|---|---|
| 0.0 | 35.3624 | 87.7761 | −73.0966 | Design: Second Example of |
| 5.0 | 35.9375 | 88.1214 | −71.4170 | the Optical Structure |
| 10.0 | 37.8504 | 88.3232 | −65.5105 | Polarization: P |
| 15.0 | 41.5481 | 86.2320 | −53.1339 | Source: D65 |
| 20.0 | 47.3489 | 79.0290 | −32.0276 | Observer: CIE 1931 |
| 25.0 | 54.8227 | 62.6584 | −2.6495 | Mode: Transmittance |
| 30.0 | 62.6567 | 31.6730 | 29.2861 | |
| 35.0 | 68.8117 | −13.6155 | 53.1104 | |
| 40.0 | 70.1939 | −60.8762 | 56.3246 | |
| 45.0 | 63.8734 | −83.2865 | 29.4710 | |

TABLE 6

CIELab values for reflection mode when the second example of the optical structure having parameters as described in Table 2 is viewed at different viewing angles in the presence of a D65 light source.

| Incident Angle | L* | a* | b* | |
|---|---|---|---|---|
| 0.0 | 95.0631 | −31.7647 | 48.4548 | Design: Second Example of |
| 5.0 | 94.9402 | −32.7902 | 47.4892 | the Optical Structure |
| 10.0 | 94.5010 | −35.8118 | 43.8268 | Polarisation: P |
| 15.0 | 93.5195 | −40.5801 | 35.7606 | Source: D65 |
| 20.0 | 91.6012 | −45.9635 | 22.4005 | Observer: CIE 1931 |
| 25.0 | 88.3120 | −46.8681 | 5.3389 | Mode: Reflectance |
| 30.0 | 83.5384 | −31.2961 | −12.0407 | |
| 35.0 | 78.2978 | 5.6475 | −26.1375 | |
| 40.0 | 76.3297 | 41.2278 | −30.5320 | |
| 45.0 | 81.1875 | 43.5513 | −17.6926 | |

The optical performance of two additional examples of optical structures having parameters provided in Tables 7 and 8 were analyzed. The additional examples of optical structures were designed using Essential Macleod Thin Film Software. The material composition and the thickness of the various layers for the third example of the optical structure are provided in Table 7 and the material composition and the thickness of the various layers for the fourth example of the optical structure are provided in Table 8.

TABLE 7

Material Composition and thickness of the various layers of the third example of the optical structure 10.

| Layer | Material | Refractive Index | Extinction Coefficient | Optical Physical Thickness (Full Wavelength Optical Thickness) | Thickness (nm) |
|---|---|---|---|---|---|
| | SiO2 | 1.46180 | 0.00000 | | |
| 1 | ZrO2 1.00000 | 2.06577 | 0.00004 | 1.00000000 | 246.88 |
| 2 | Ag 1.00000 | 0.05100 | 2.96000 | 0.00250000 | 25.00 |
| 3 | SiO2 1.00000 | 1.46180 | 0.00000 | 0.50000000 | 174.44 |
| 4 | Ag 1.00000 | 0.05100 | 2.96000 | 0.00250000 | 25.00 |
| 5 | ZrO2 1.00000 | 2.06577 | 0.00004 | 1.00000000 | 246.88 |
| Substrate | Glass | 1.52083 | 0.00000 | | |
| | Total Thickness | | | 2.50500000 | 718.21 |

TABLE 8

Material Composition and thickness of the various layers of the fourth example of the optical structure 10.

| | Medium Material | Refractive Index | Extinction Coefficient | Optical Physical Thickness (Full Wavelength Optical Thickness) | Thickness (nm) |
|---|---|---|---|---|---|
| | SiO2 | 1.46180 | 0.00000 | | |
| 1 | ZrO2 1.00000 | 2.06577 | 0.00004 | 0.50000000 | 123.44 |

TABLE 8-continued

Material Composition and thickness of the various layers
of the fourth example of the optical structure 10.

|  | Medium | Material | Refractive Index | Extinction Coefficient | Optical Physical Thickness (Full Wavelength Optical Thickness) | Thickness (nm) |
|---|---|---|---|---|---|---|
| 2 |  | Ag | 1.00000 | 0.05100 | 2.96000 | 0.00250000 | 25.00 |
| 3 |  | SiO2 | 1.00000 | 1.46180 | 0.00000 | 0.75000000 | 261.66 |
| 4 |  | Ag | 1.00000 | 0.05100 | 2.96000 | 0.00250000 | 25.00 |
| 5 |  | ZrO2 | 1.00000 | 2.06577 | 0.00004 | 0.50000000 | 123.44 |
| Substrate |  | Glass | 1.52083 | 0.00000 |  |  |
|  | Total Thickness |  |  |  | 1.75500000 | 558.55 |

The material composition of the various layers of the third and the fourth example of the optical structure 10 is the same as the material composition of the various layers of the first and the second example of the optical structure 10. For example, similar to the first and the second example of the optical structure 10, the third and the fourth examples of the optical structure 10 comprise a SiO$_2$ layer sandwiched by two silver layers with ZrO$_2$ layers disposed on the side of the two silver layers opposite the side facing the SiO$_2$ layer. However, the thickness of the various layers is different for each of the first, second, third and fourth examples of the optical structure 10.

The third example of the optical structure 10 comprises two silver layers having a thickness of 25 nm each sandwiching a dielectric layer having a thickness of 174.44 nm and comprising SiO$_2$. The third example of the optical structure 10 comprises a layer of ZrO$_2$ on the side of the silver layers opposite the side facing the SiO$_2$ layer. Each ZrO$_2$ layer has a thickness of 246.88 nm. The total thickness of the third example of the optical structure 10 is 718.21 nm.

The fourth example of the optical structure 10 comprises two silver layers having a thickness of 25 nm each sandwiching a dielectric layer having a thickness of 261.66 nm and comprising SiO$_2$. The fourth example of the optical structure 10 comprises a layer of ZrO$_2$ on the side of the silver layers opposite the side facing the SiO$_2$ layer. Each ZrO$_2$ layer has a thickness of 123.44 nm. The total thickness of the fourth example of the optical structure 10 is 558.55 nm.

FIG. 16A illustrates the a*b* values in the CIELa*b* color space for the first example of the optical structure 10 having parameters as described in Table 1 for different viewing angles between 0 degrees and 45 degrees with respect to the normal to the surface of the first example of the optical structure 10 in reflection mode. It is observed from FIG. 16A that at a viewing angle of 0 degrees with respect to the normal to the surface of the first example of the optical structure 10, the first example of the optical structure 10 appears magenta to an average human eye in reflection mode. As the viewing angle increases the color reflected by the first example of the optical structure 10 shifts along the curve 601a in the direction of the arrow towards yellow.

FIG. 16B illustrates the a*b* values in the CIELa*b* color space for the second example of the optical structure 10 having parameters as described in Table 2 for different viewing angles between 0 degrees and 45 degrees with respect to the normal to the surface of the second example of the optical structure 10 in reflection mode. It is observed from FIG. 16B that at a viewing angle of 0 degrees with respect to the normal to the surface of the second example of the optical structure 10, the second example of the optical structure 10 appears yellowish green to an average human eye in reflection mode. As the viewing angle increases the color reflected by the second example of the optical structure 10 shifts along the curve 601b in the direction of the arrow towards magenta.

Figure 16D:
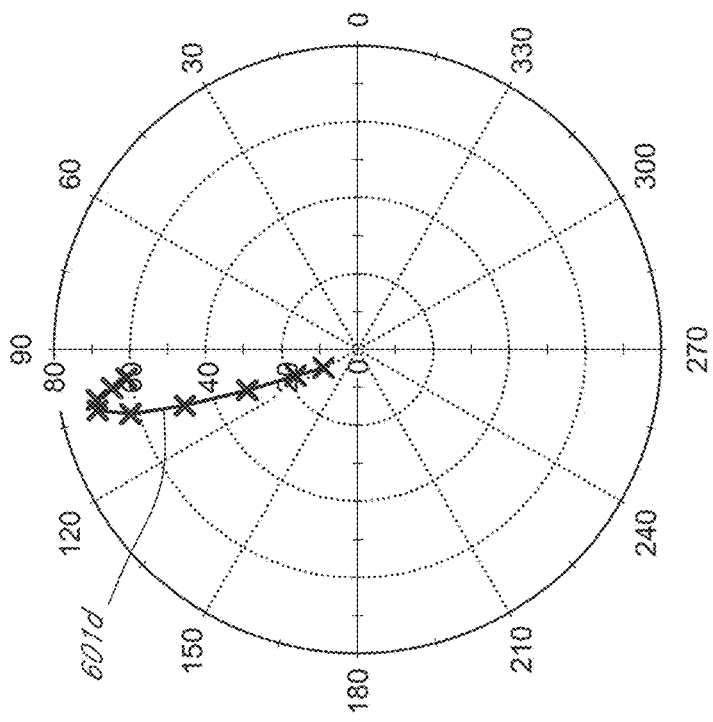
Figure 16C:
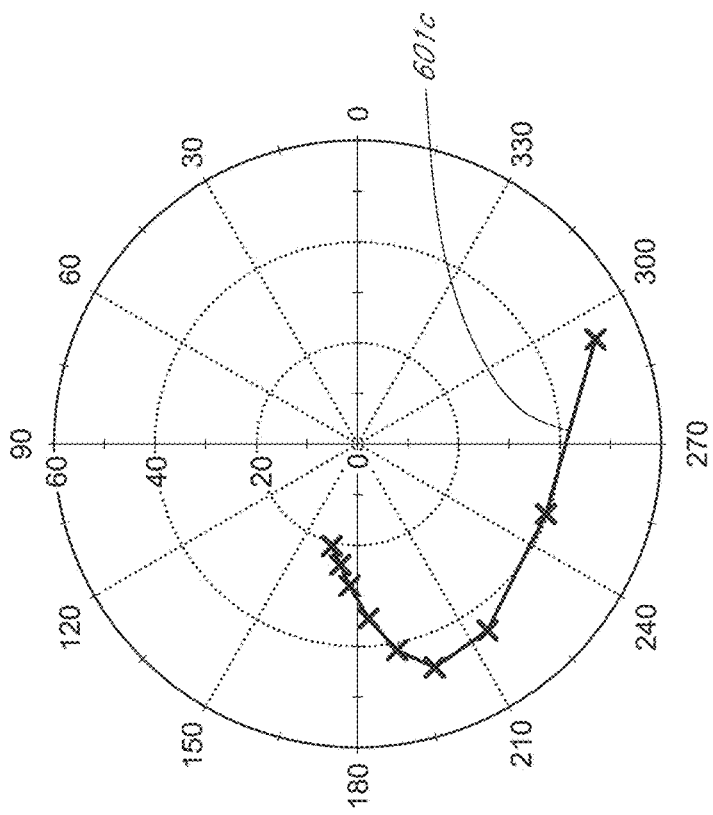

FIG. 16C illustrates the a*b* values in the CIELa*b* color space for the third example of the optical structure 10 having parameters as described in Table 7 for different viewing angles between 0 degrees and 45 degrees with respect to the normal to the surface of the third example of the optical structure 10 in reflection mode. It is observed from FIG. 16C that at a viewing angle of 0 degrees with respect to the normal to the surface of the third example of the optical structure 10, the third example of the optical structure 10 appears green to an average human eye in reflection mode. As the viewing angle increases the color reflected by the third example of the optical structure 10 shifts along the curve 601c in the direction of the arrow towards blue at 35°. The transmission color moves from red to orange as the viewing angle increases to 35°. It is noted that the various reflection and transmission color curves move counterclockwise in the various a* b* plots of FIGS. 16A-16D and 17A-17D.

FIG. 16D illustrates the a*b* values in the CIELa*b* color space for the fourth example of the optical structure 10 having parameters as described in Table 8 for different viewing angles between 0 degrees and 45 degrees with respect to the normal to the surface of the fourth example of the optical structure 10 in reflection mode. It is observed from FIG. 16D that at a viewing angle of 0 degrees with respect to the normal to the surface of the fourth example of the optical structure 10, the fourth example of the optical structure 10 appears yellow to an average human eye in reflection mode. As the viewing angle increases the color reflected by the fourth example of the optical structure 10 shifts along the curve 601d in the direction of the arrow towards grey. In transmission the color seen at zero degrees is blue moving to magenta at 35°. This sample is configured as a dichroic film/pigment that has a very small color shift as the angle of view changes.

Figure 17B:
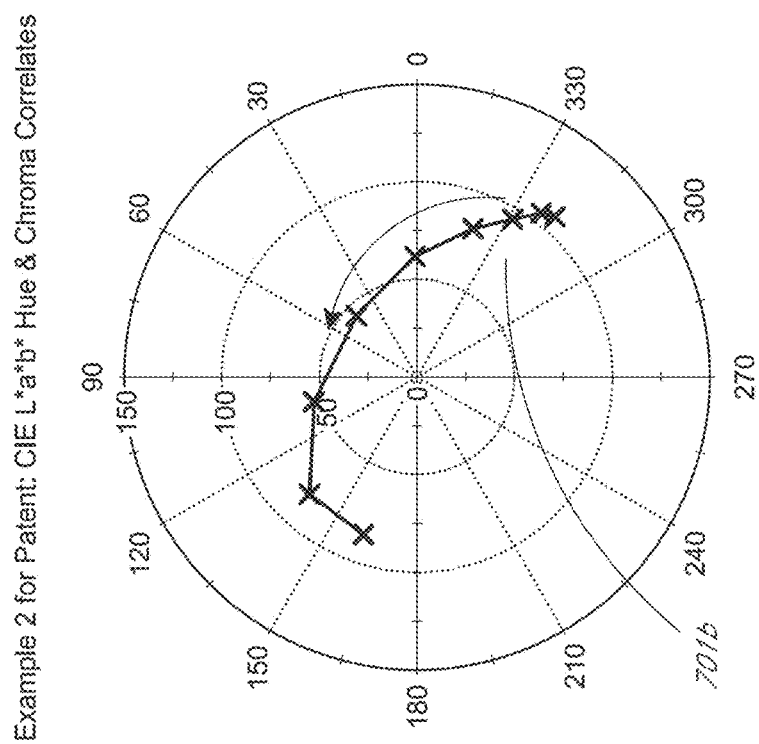
Figure 17A:
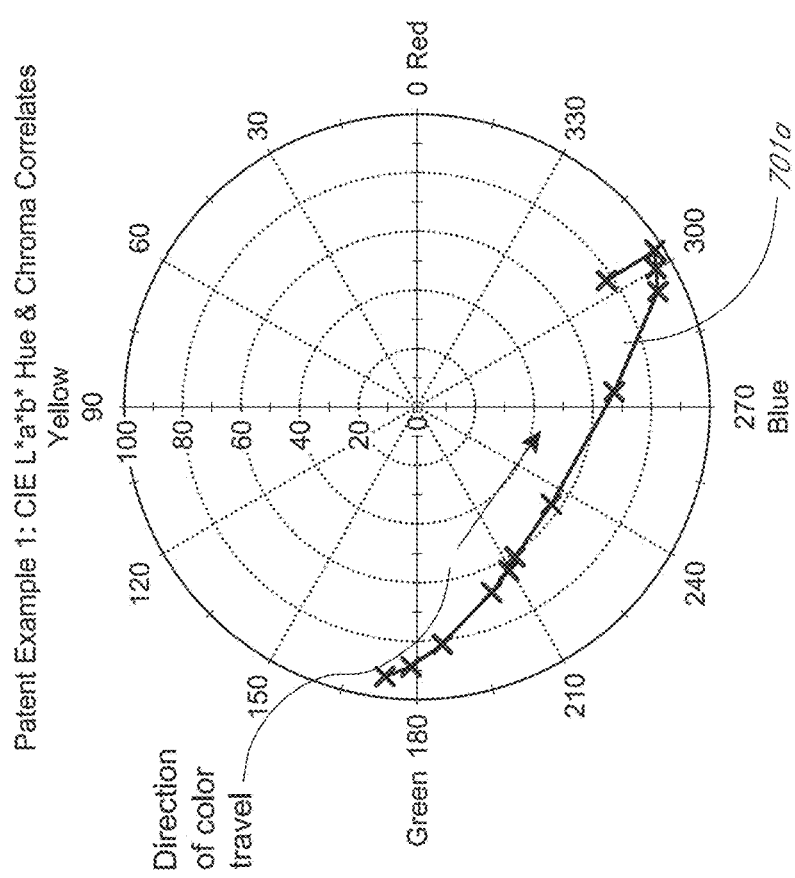

FIG. 17A illustrates the a*b* values in the CIELa*b* color space for the first example of the optical structure 10 having parameters as described in Table 1 for different viewing angles between 0 degrees and 45 degrees with respect to the normal to the surface of the first example of the optical structure 10 in transmission mode. It is observed from FIG. 17A that at a viewing angle of 0 degrees with respect to the normal to the surface of the first example of the optical structure 10, the first example of the optical structure 10 appears green to an average human eye in transmission mode. As the viewing angle increases the color transmitted by the first example of the optical structure 10 shifts along the curve 701*a* in the direction of the arrow towards violet.

FIG. 17B illustrates the a*b* values in the CIELa*b* color space for the second example of the optical structure 10 having parameters as described in Table 2 for different viewing angles between 0 degrees and 45 degrees with respect to the normal to the surface of the second example of the optical structure 10 in transmission mode. It is observed from FIG. 17B that at a viewing angle of 0 degrees with respect to the normal to the surface of the second example of the optical structure 10, the second example of the optical structure 10 appears purple to an average human eye in transmission mode. As the viewing angle increases the color reflected by the second example of the optical structure 10 shifts along the curve 701*b* in the direction of the arrow towards green.

Figure 17D:
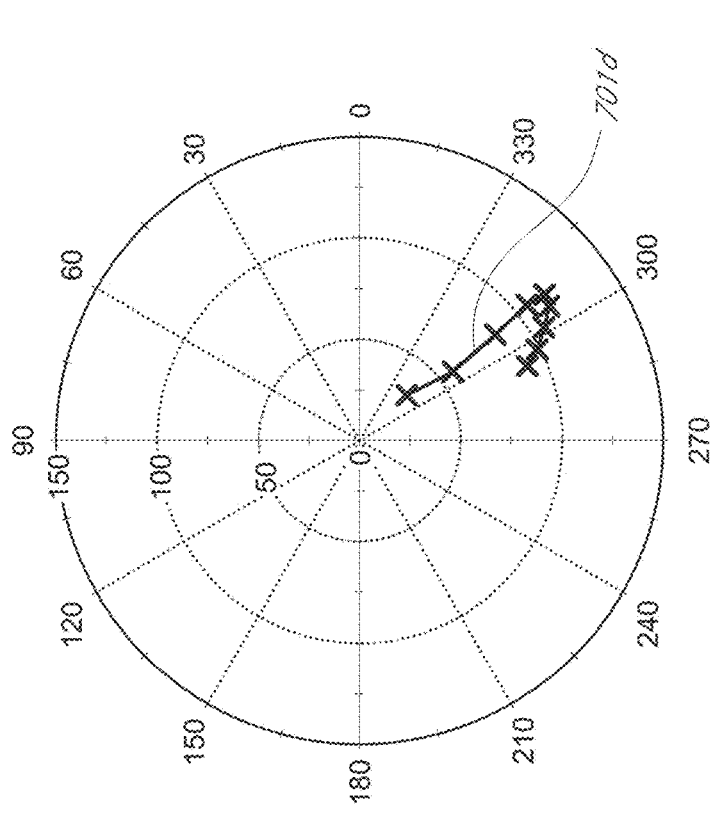
Figure 17C:
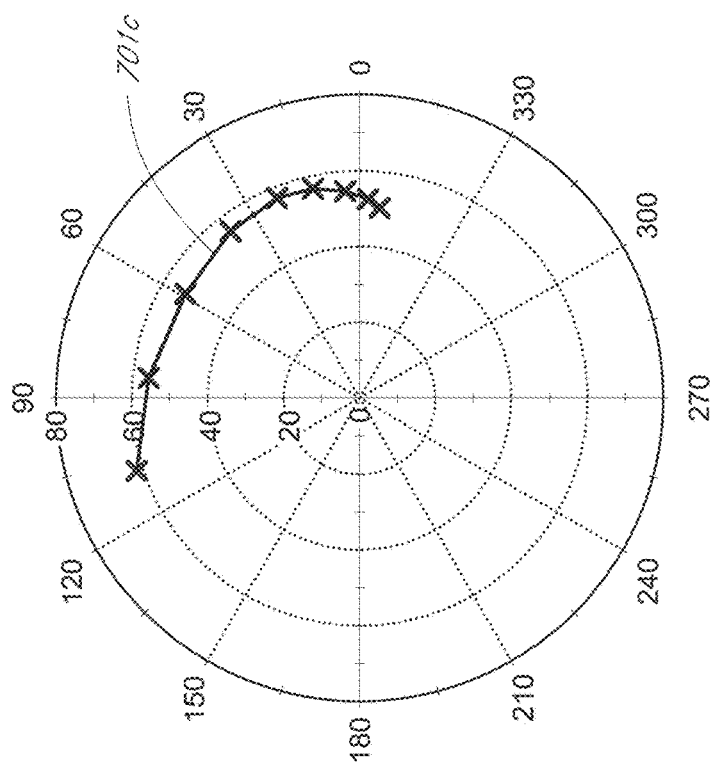

FIG. 17C illustrates the a*b* values in the CIELa*b* color space for the third example of the optical structure 10 having parameters as described in Table 7 for different viewing angles between 0 degrees and 45 degrees with respect to the normal to the surface of the third example of the optical structure 10 in transmission mode. It is observed from FIG. 17C that at a viewing angle of 0 degrees with respect to the normal to the surface of the third example of the optical structure 10, the third example of the optical structure 10 appears red to an average human eye in transmission mode. As the viewing angle increases the color reflected by the third example of the optical structure 10 shifts along the curve 701*c* in the direction of the arrow towards orange.

FIG. 17D illustrates the a*b* values in the CIELa*b* color space for the fourth example of the optical structure 10 having parameters as described in Table 8 for different viewing angles between 0 degrees and 45 degrees with respect to the normal to the surface of the fourth example of the optical structure 10 in transmission mode. It is observed from FIG. 17D that at a viewing angle of 0 degrees with respect to the normal to the surface of the fourth example of the optical structure 10, the fourth example of the optical structure 10 appears blue to an average human eye in transmission mode. As the viewing angle increases the color reflected by the fourth example of the optical structure 10 shifts along the curve 701*d* in the direction of the arrow towards magenta.

The optical structures 10 are considered to be illuminated by D65 illumination for generating the curves of FIGS. 16A-16D and 17A-17D.

Figure 18A:
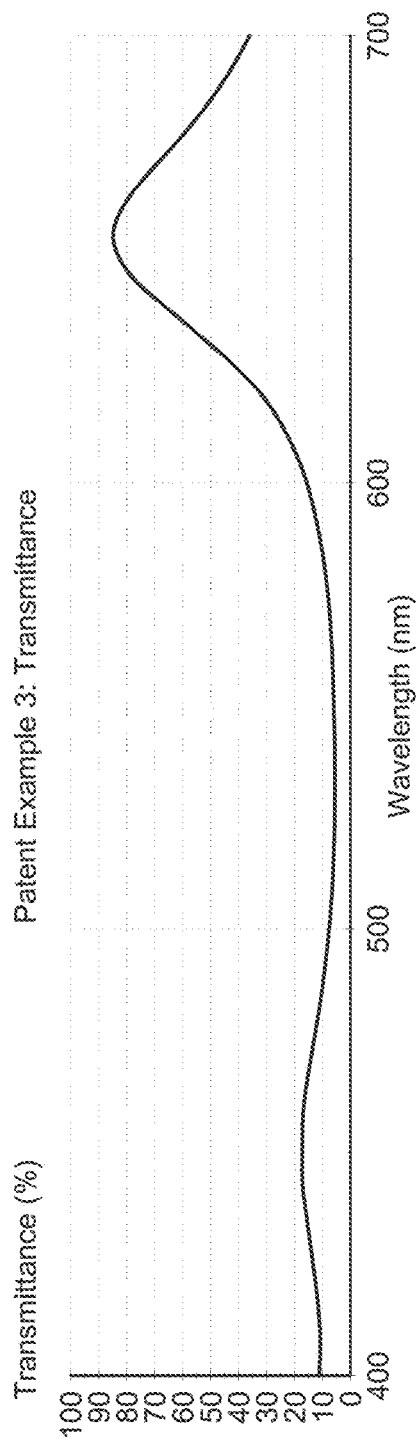
FIGS. 18A and 18B respectively illustrate the transmittance and reflectance spectra for an example of the optical structure.
Figure 18B:
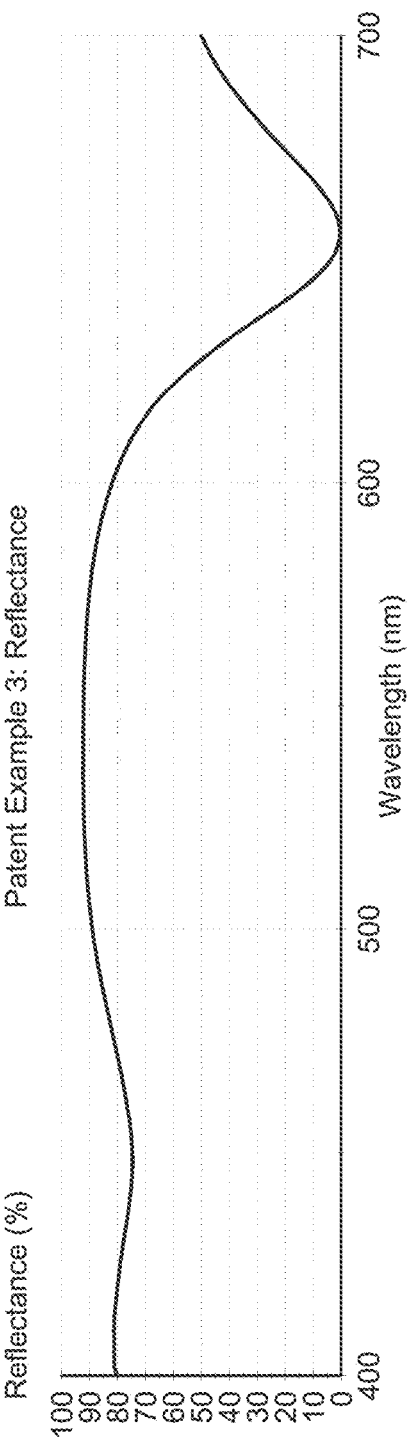

FIGS. 18A and 18B respectively illustrate the transmittance and reflectance spectra for the third example of the optical structure 10 having parameters as described in Table 7. As noted, from FIGS. 18A and 18B, the third example of the optical structure 10 has a peak transmittance at about 650 nm while the reflectance is substantially uniform in the spectral region between about 400 nm and about 600 nm and a dip around 650 nm.

Figure 18C:
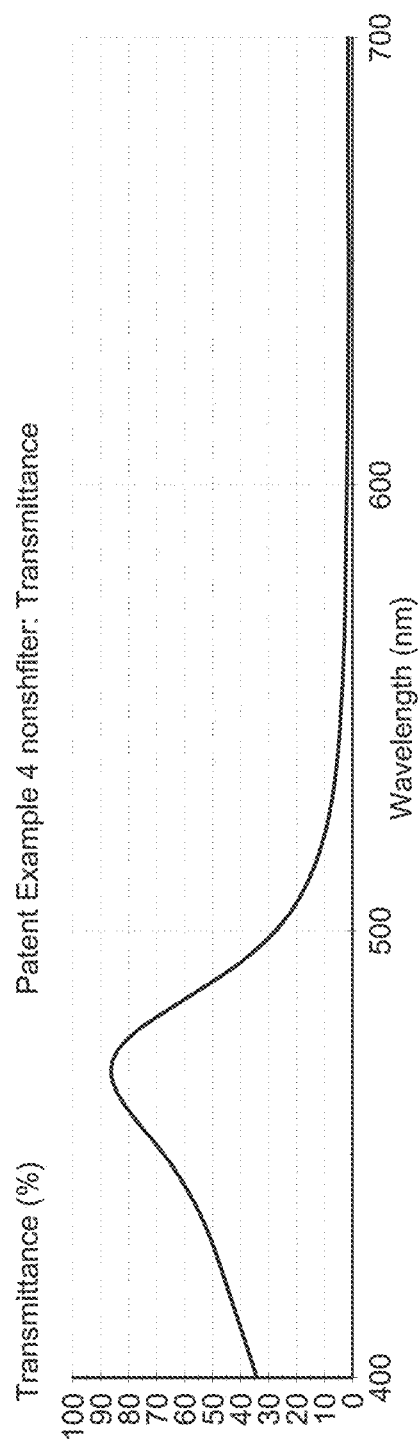
FIGS. 18C and 18D respectively illustrate the transmittance and reflectance spectrum for an example of the optical structure.
Figure 18D:
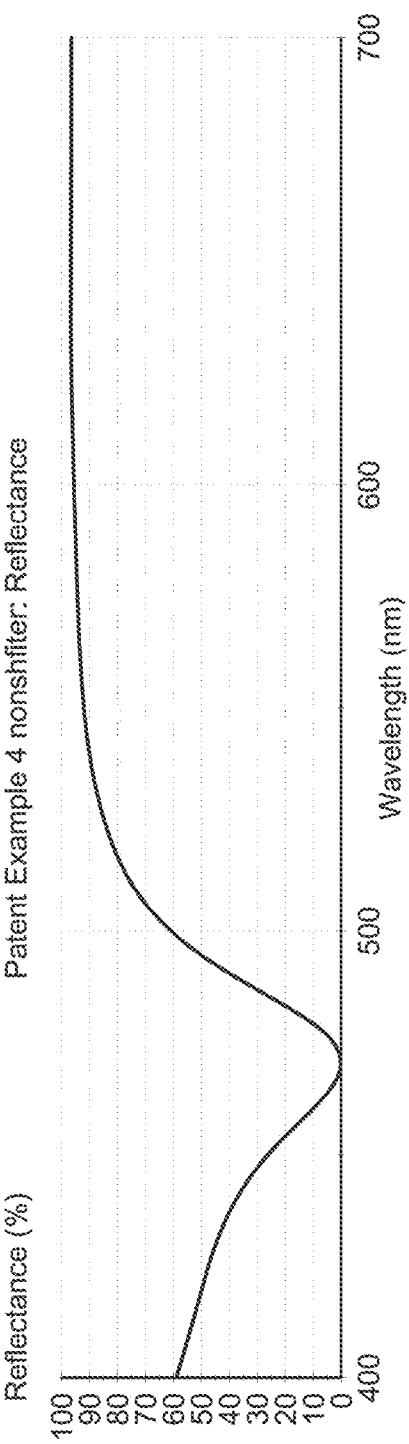

FIGS. 18C and 18D respectively illustrate the transmittance and reflectance spectrum for the fourth example of the optical structure 10 having parameters as described in Table 8. As noted, from FIGS. 18C and 18D, the fourth example of the optical structure 10 has a peak transmittance between about 470 nm and about 480 nm while the reflectance is substantially uniform in the spectral region between about 520 nm and about 700 nm and a dip around 470 nm.

The optical performance of an additional fifth example of the optical structure 10 are analyzed. The fifth example of the optical structure 10 comprised a glass substrate, a first dielectric layer comprising $CeO_2$ over the substrate, a first metal layer comprising aluminum over the first dielectric layer, a second dielectric layer comprising $CeO_2$ over the first metal layer, a second metal layer comprising aluminum over the second dielectric layer, and a third dielectric layer comprising $CeO_2$ over the second metal layer. The thickness of various metal and dielectric layers can be configured to appear blue/violet in transmission at a viewing angle between about 0 degrees and about 40 degrees with respect to a normal to the surface of the fifth example of the optical structure 10 and yellow/green in reflection at viewing angles between 0 degrees and about 40 degrees with respect to a normal to the surface of the fifth example of the optical structure 10.

Figure 18E:
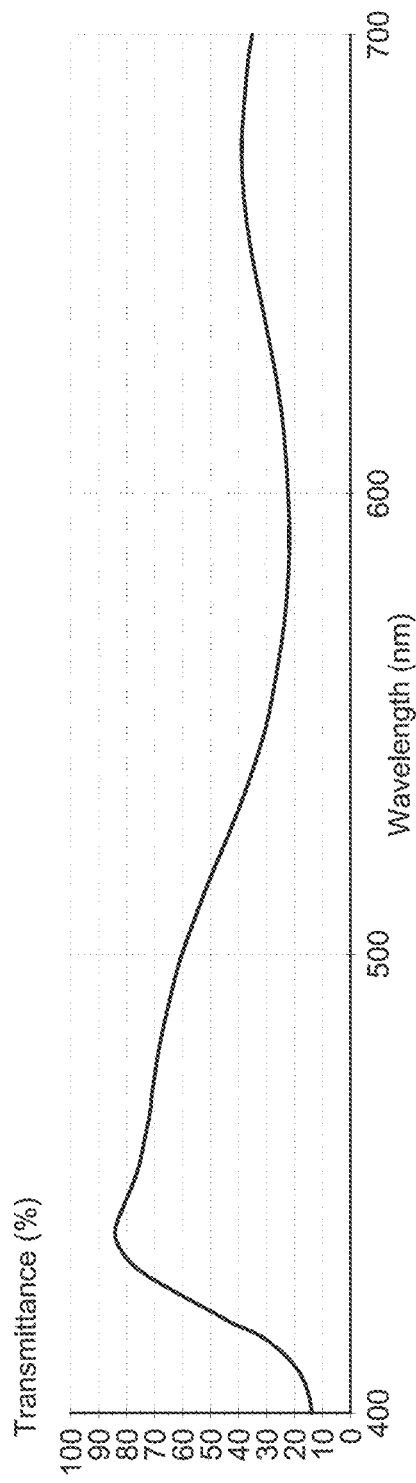
FIGS. 18E and 18F respectively illustrate the transmittance and reflectance spectrum for an example of the optical structure.
Figure 18F:
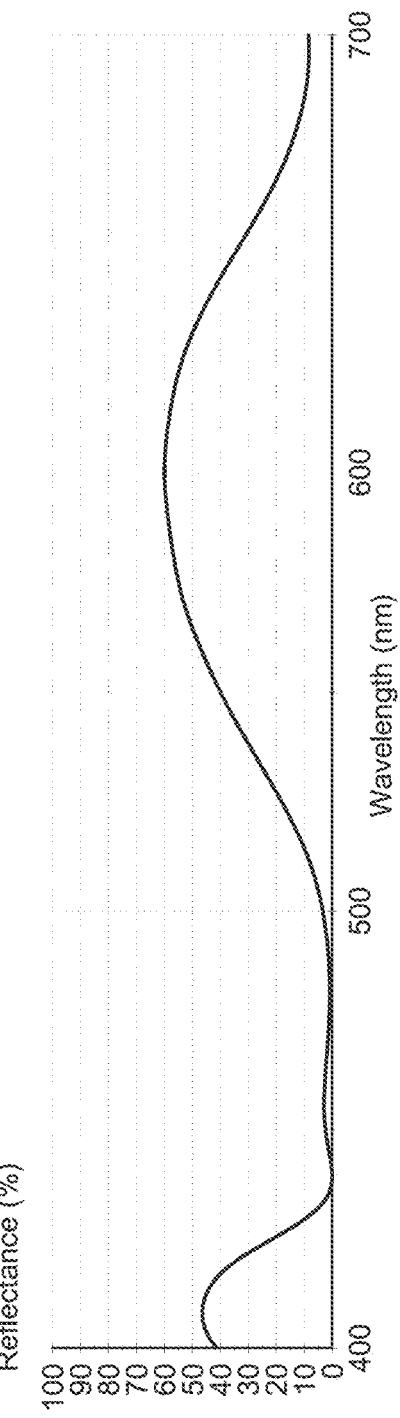
Figure 18G:
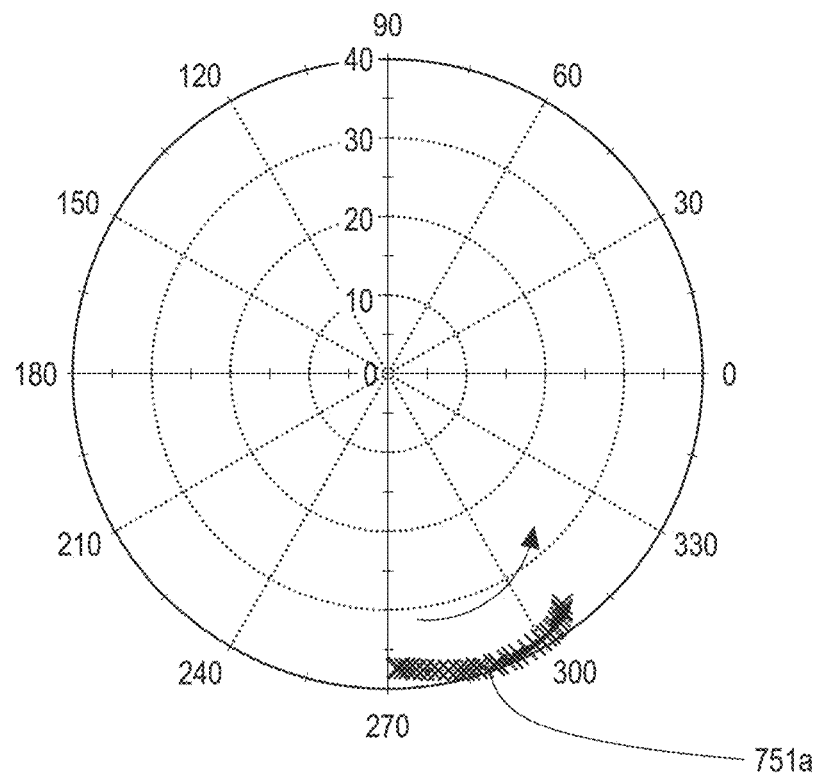
FIG. 18G illustrates the a*b* values in the CIE L*a*b* color space for an example of the optical structure for different viewing angles between 0 degrees and 40 degrees with respect to the normal to the surface of the example of the optical structure in transmission mode.

FIGS. 18E and 18F respectively illustrate the transmittance and reflectance spectrum for the fifth example of the optical structure 10 discussed above. FIG. 18G illustrates the a*b* values in the CIELa*b* color space for the fifth example of the optical structure 10 for different viewing angles between 0 degrees and 40 degrees with respect to the normal to the surface of the fourth example of the optical structure 10 in transmission mode. It is observed from FIG. 18G that at a viewing angle of 0 degrees with respect to the normal to the surface of the fifth example of the optical structure 10, the fifth example of the optical structure 10 appears blue to an average human eye in transmission mode. As the viewing angle increases the color reflected by the fifth example of the optical structure 10 shifts along the curve 751*a* in the direction of the arrow towards violet.

Figure 18H:
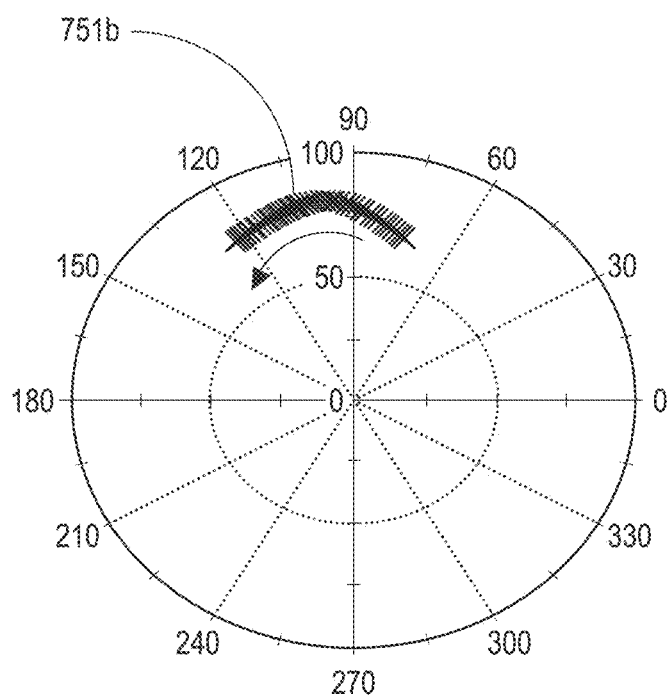
FIG. 18H illustrates the a*b* values in the CIE L*a*b* color space for an example of the optical structure for different viewing angles between 0 degrees and 40 degrees with respect to the normal to the surface of the example of the optical structure in reflection mode.

FIG. 18H illustrates the a*b* values in the CIELa*b* color space for the fifth example of the optical structure 10 for different viewing angles between 0 degrees and 40 degrees with respect to the normal to the surface of the fifth example of the optical structure 10 in reflection mode. It is observed from FIG. 18H that at a viewing angle of 0 degrees with respect to the normal to the surface of the fifth example of the optical structure 10, the fifth example of the optical structure 10 appears yellow to an average human eye in reflection mode. As the viewing angle increases the color reflected by the fifth example of the optical structure 10 shifts along the curve 751*b* in the direction of the arrow towards green.

Various implementations of an optical structure that can be used as a security feature can comprise a dielectric region comprising one or more dielectric materials surrounded by a partially optically transmissive or partially reflective metal layer (e.g., partially reflective and partially transmissive metal layer). For example, the optical structure can comprise a dielectric region having first and second major surfaces (e.g., top and bottom) and edges (or sides) therebetween. The partially reflective and partially transmissive metal layer can be disposed on the edges (or sides) in addition to being disposed on the first and second major surfaces (e.g., top and bottom). In various implementations, the dielectric region comprising the one or more dielectric materials is optical transmissive and in some configurations may be optically transparent. In certain implementations, the region comprising the one or more dielectric materials is surrounded by a partially optically transmissive and partially reflective metal layer. In various implementations, the one or more dielectric materials can comprise polymer, glass, oxides (e.g., $SiO_2$, $TiO_2$) or other dielectric materials. In various implementations, the dielectric region can comprise a dielectric substrate coated with a one or more dielectric materials (e.g., layers) having a refractive index equal to, less than or greater than the refractive index of the dielectric substrate. In various implementations, the dielectric region can comprise a first dielectric material (e.g., first dielectric layer) having a first refractive index surrounded by a second dielectric material (e.g., second dielectric layer) having a second refractive index. The second refractive index can be equal to, less than or greater than the first refractive index.

Figure 19A:
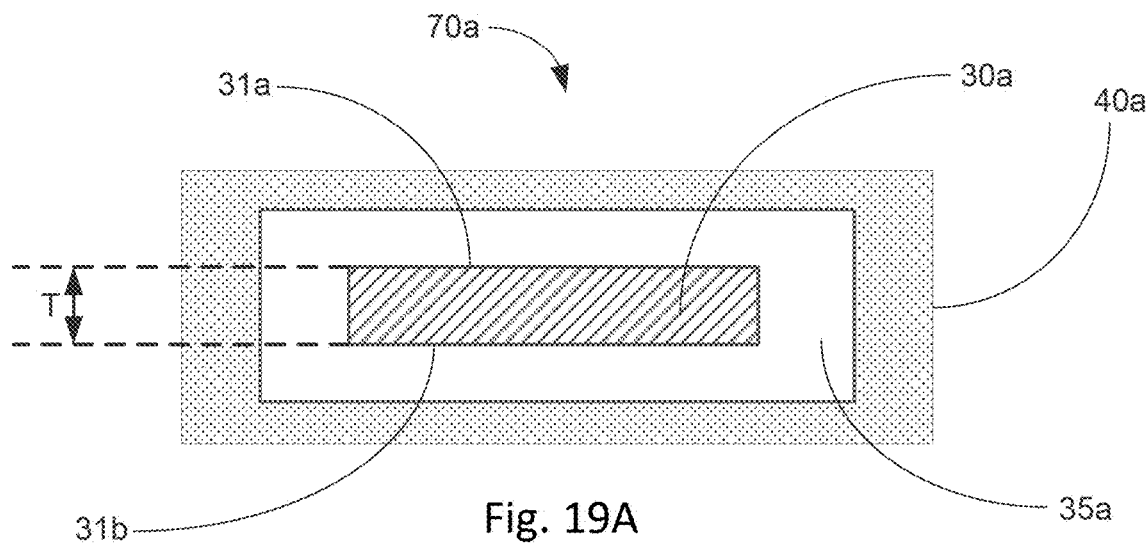
FIG. 19A schematically illustrates a cross-sectional view of an embodiment of an optical structure configured to be used as a security feature.
Figure 19B:
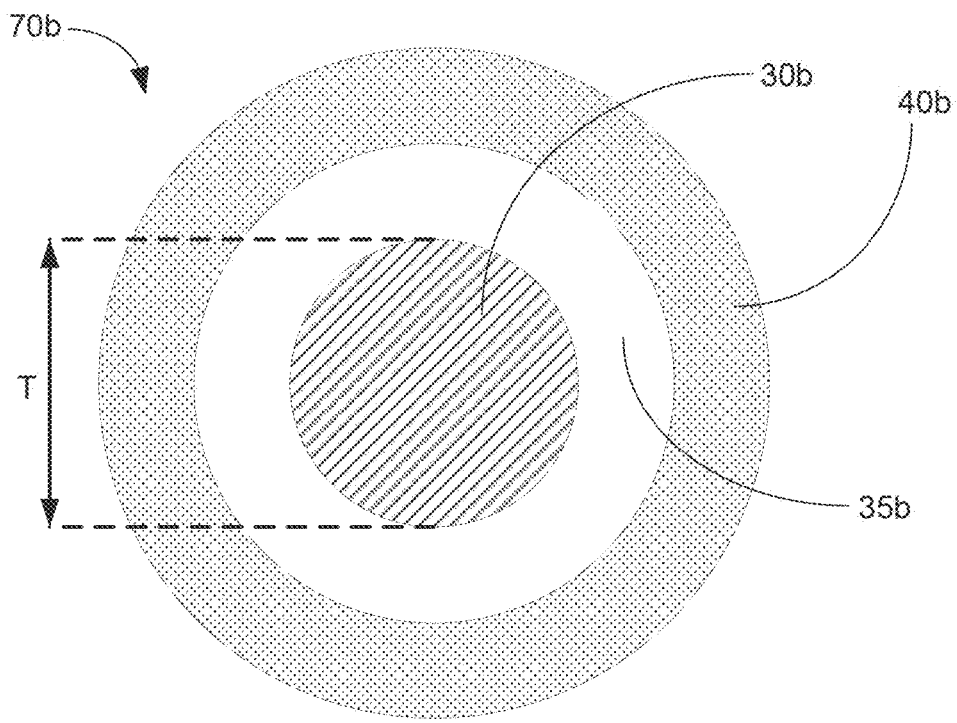
FIG. 19B schematically illustrates a cross-sectional view of another embodiment of an optical structure configured to be used as a security feature.

FIGS. 19A and 19B illustrate different embodiments of such optical structures. FIG. 19A schematically illustrates a cross-sectional view of an embodiment of an optical structure 70a comprising a dielectric region 30a surrounded by a partially reflective and partially transmissive metal layer 35a. The optical structure 70a shown in FIG. 19A has a rectilinear (e.g., rectangular) cross-section. FIG. 19B schematically illustrates a cross-sectional view of another embodiment of an optical structure 70b comprising a dielectric region 30b surrounded by a partially reflective and partially transmissive metal layer 35b. The optical structure 70b shown in FIG. 19B has a circular cross-section.

The dielectric region 30a and/or 30b can comprise one or more dielectric materials such as, for example, polymer, magnesium fluoride, silicon dioxide, aluminum oxide, titanium oxide, cerium oxide, any transparent oxide material, any transparent nitride material, any transparent sulfide material, glass, combinations of any of these materials or any other inorganic or organic material. The refractive index of the one or more dielectric materials in the dielectric region 30a and/or 30b can have a value between about 1.35 and about 2.5. For example, the refractive index of the one or more dielectric materials in the dielectric region 30a and/or 30b can have a value between about 1.38 and 1.48, between about 1.48 and about 1.58, between about 1.58 and about 1.78, between about 1.75 and about 2.0, between about 2.0 and about 2.25, between about 2.25 and about 2.5, or any value in any range/sub-range defined by these values. Values outside these ranges are also possible, in some implementations. The dielectric region 30a and/or 30b can comprise a dielectric substrate coated with a one or more dielectric materials having a refractive index equal to, less than or greater than the refractive index of the dielectric substrate. In various implementations, the dielectric region 30a and/or 30b can comprise a first dielectric material having a first refractive index surrounded by a second dielectric material having a second refractive index. The second refractive index can be equal to, less than or greater than the first refractive index.

In various implementations, the dielectric region 30a and/or 30b can be configured as a slab, flake, a sphere, spheroid, ellipsoid, disc, or any other 3-dimensional shape enclosing a volume. The dielectric region 30a and/or 30b may have a regular or irregular shape. For example, as shown in FIG. 19A, the dielectric region 30a can be configured as a slab having two major surfaces 31a and 31b and one or more edge surfaces disposed between the two major surfaces 31a and 31b. In some implementations, a number of edges surfaces may be disposed between the two major surfaces 31a and 31b. The number of edge surfaces may, for example, be one, two, three, four, five, six, seven, eight, nine, ten, twelve, twenty, thirty, fifty, etc. or in any range between any of these values. Values outside these ranges are also possible. The major surfaces 31a and 31b can have a variety of shapes. For example, one or both of the major surfaces 31a and 31b can have a rectilinear or curvilinear shape in certain implementations. The shape may be regular or irregular in certain implementations. For example, one or both of the major surfaces 31a and 31b can have a square shape, a rectangular shape, a circular shape, an oval shape, an elliptical shape, pentagonal shape, a hexagonal shape, an octagonal shape or any polygonal shape. In various implementations, one or both of the major surface 31a and 31b can have jagged edges such that the lateral dimensions (e.g., length or width) of the one or both of the major surface 31a and 31b varies across the area of the one or both of the major surface 31a and 31b. Other configurations are also possible. Additionally, other shapes are also possible. One or more of the edge surfaces can have a variety of shapes (e.g., as viewed from the side), such as, for example, a square shape, a rectangular shape, an oval shape, an elliptical shape, a pentagonal shape, a hexagonal shape, an octagonal shape or any a polygonal shape.

The shape of the one or more of the edge surfaces (e.g., as viewed from the side) can be rectilinear or curvilinear in certain implementations. The shape may be regular or irregular in certain implementations. Similarly, the cross-section through the dielectric region 30a and/or 30b parallel to one of the major surfaces 31a and 31b, can be rectilinear or curvilinear in certain implementations and can be regular or irregular in certain implementations. For example, the cross-section can have a square shape, a rectangular shape, a circular shape, an oval shape, an elliptical shape, pentagonal shape, a hexagonal shape, an octagonal shape or any a polygonal shape. Other shapes are also possible. Likewise, the cross-section through the dielectric material or region 30a and/or 30b perpendicular to one of the surfaces 31a and 31b, can be rectilinear or curvilinear in certain implementations and can be regular or irregular implementations. For example, the cross-section can have a square shape, a rectangular shape, a circular shape, an oval shape, an elliptical shape, pentagonal shape, a hexagonal shape, an octagonal shape or any a polygonal shape. Other shapes are also possible. In various implementations, an area, a length and/or a width of the major surfaces 31a and 31b of the dielectric region 30a can be greater than or equal to about 2, 3, 4, 5, 6, 8, or 10 times the thickness of the dielectric region 30a and less than or equal to about 50 times the thickness of the dielectric region 30a, or any value in a range/sub-range between any of these values. Accordingly, the dielectric region 30a can have a large aspect ratio.

In some implementations, a thickness (T) of the dielectric region 30a can correspond to the distance between the two major surfaces 31a and 31b along a vertical direction as shown in FIG. 19A. As another example, as shown in FIG. 19B, the dielectric material 30b can be configured as a sphere. A thickness of the dielectric material 30b configured as a sphere can correspond to the diameter of the sphere. In other implementations, the dielectric material 30a and/or 30b can be configured as a cube, a rectangular cuboid, a cylinder, an ellipsoid, an ovoid or any other three-dimensional shape. The shape may be curvilinear or rectilinear in certain implementations. The shape may be regular or irregular in certain implementations. Accordingly, in some implementations, the dielectric region 30a and/or 30b can be configured as an irregularly shaped object enclosing a volume of one or more dielectric materials.

In various implementations, light can be transmitted through the optical structure 70a or 70b and reflected by surfaces of the optical structure 70a or 70b. Moreover, in various implementations, the dielectric region 30a and/or 30b can have a thickness that allows light incident on one side of the metal layer 35a and/or 35b to constructively or destructively interfere. For example, in various implementations, the thickness of the dielectric region 30a and/or 30b can be approximately a quarter wavelength of light (e.g., visible light) incident thereon or an integer multiple of a quarter wavelength. In various implementations, the thickness of the dielectric region 30a and/or 30b may be, for example, 1/4, 3/4, 5/4, 7/4, 9/4, 10/4, etc. of the wavelength of visible light incident on the dielectric material 30a or 30b. As a result various wavelengths of incident light can constructively or destructively interfere as it is transmitted through the optical structure 70a or 70b or reflected by the optical structure 70a or 70b. Accordingly, in some configurations, color light is reflected by and/or transmitted through the optical structure when white light is incident thereon. In some implementations, a first color is reflected and a second different color is transmitted when white light is incident on the optical structure. In some case, the first color and the second color can be complementary.

In various implementations, for example, to obtain constructive interference of incident visible light, a thickness (or lateral dimension) of the dielectric region 30a and/or 30b can have a value between about 90 nm and about 2 microns. In various implementations, a thickness (or lateral dimension) of the dielectric region 30a and/or 30b can be greater than or equal to about 90 nm and less than or equal to about 1 microns, greater than or equal to about 100 nm and less than or equal to about 1.0 microns, greater than or equal to about 300 nm and less than or equal to about 1.0 microns, greater than or equal to about 400 nm and less than or equal to about 900 nm, greater than or equal to about 500 nm and less than or equal to about 800 nm, greater than or equal to about 600 nm and less than or equal to about 700 nm, or any thickness in any range/sub-range defined by these values. Values outside these ranges are also possible, in some implementations.

The dielectric material 30a and/or 30b can be purchased from various suppliers (e.g., Tyndall Institute, Glassflake, Ltd., Sigma Technologies) or custom made by synthesizing in a laboratory or a manufacturing facility. In some implementations, the optical structure 70a (or 70b) and/or the dielectric region 30a (or 30b) can comprise flakes (e.g., glass flakes available from Glassflake, Ltd. http://www.glassflake.com/pages/home). In some implementations, the flakes can comprise glass such as, for example, borosilicate flakes having an average thickness between about 90 nm and about 2 microns (e.g., an average thickness of about 1.2 microns) that may or may not be coated with coatings (e.g., high refractive index metal oxides such as $TiO_2$ and/or silica). In various implementations, lateral dimensions (e.g., length and a width) of the flakes can be between about 5 microns and about 20 microns. Values outside these ranges are also possible, in some implementations.

As discussed above, the dielectric region 30a or 30b can be surrounded by a partially reflective and a partially transmissive metal layer 35a or 35b. In some implementations, the metal layer 35a or 35b can comprise a metal having a ratio of the real part (n) of the refractive index to the imaginary part (k) of the refractive index (k) that is less than 1 as discussed above. For example, the metal layer 35a or 35b can comprise metals that have an n/k value between about 0.01 and about 0.6, between about 0.015 and about 0.6, between about 0.01 and about 0.5, between about 0.01 and about 0.2, between about 0.01 and about 0.1, or any value in a range or sub-range defined by these values. Values outside these ranges are also possible, in some implementations. Accordingly, the metal layer 35a or 35b can comprise silver, silver alloys, gold, aluminum or copper and their respective alloys, nickel (Ni) and palladium (Pd).

In various implementations, a thickness of the metal layer 35a or 35b can be configured such that the metal layer 35a or 35b is at least partially transmissive and partially reflective to light in the visible spectral region between about 400 nm and about 800 nm. For example, the thickness of the metal layer 35 can be configured such that the metal layer 35a or 35b is at least partially transmissive to light in a wavelength range between about 400 nm and about 500 nm, between about 430 nm and about 520 nm, between about 450 nm and about 530 nm, between about 520 nm and about 550 nm, between about 540 nm and about 580 nm, between about 550 nm and about 600 nm, between about 600 nm and about 680 nm, between about 630 nm and about 750 nm, or any wavelength in a range/sub-range defined by any of these values. Values outside these ranges are also possible, in some implementations. Alternatively or in addition, the thickness of the metal layer 35a or 35b can be configured such that the metal layer 35a or 35b is at least partially reflective to light in a wavelength range between about 400 nm and about 500 nm, between about 430 nm and about 520 nm, between about 450 nm and about 530 nm, between about 520 nm and about 550 nm, between about 540 nm and about 580 nm, between about 550 nm and about 600 nm, between about 600 nm and about 680 nm, between about 630 nm and about 750 nm, or any wavelength in a range/sub-range defined by any of these values. Values outside these ranges are also possible, in some implementations.

The thickness of the metal layer 35a or 35b can vary depending on the type of metal. For example, in implementations of the optical structure 70a or 70b comprising a metal (e.g., silver) layer 35a or 35b, the thickness of the metal (e.g., silver) layer 35a or 35b can be greater than or equal to about 10 nm and less than or equal to about 35 nm such that the metal (e.g., silver) layer 35a or 35b can be partially transmissive to light in the visible spectral range. In some implementations, the thickness of the metal layer 35a or 35b can be less than about 10 nm or greater than about 35 nm depending possibly on the type of metal used and the wavelength range in which transmissivity or transmittance is desired. Accordingly, in various implementations, the metal layer 35a or 35b can have a thickness greater than or equal to about 3 nm and less than or equal to about 40 nm. Values outside these ranges are also possible, in some implementations. As discussed above, with reference to FIG. 14, the thickness of the metal layer 35a or 35b and the dielectric region 30a or 30b can be configured such that interference of some or all of the incident light reflected by the metal layer 35a or 35b and the one or more layers of the dielectric region 30a or 30b can produce a node at or in the metal layer 35a or 35b. Accordingly, the transmittance through the metal layer 35a or 35b can be greater than the transmittance expected for a certain thickness of the metal layer 35a or 35b. Without subscribing to any particular scientific theory, this effect is known as induced transmittance. As a result of induced transmittance or induced transmission, the optical structure 70a or 70b may in some implementation, be configured to exhibit a first color in reflection mode and a second color in transmission mode.

Depending on the shape of the dielectric region 30a or 30b, the dielectric region 30a or 30b can have one or more outer surfaces. The metal layer 35a or 35b can cover or substantially cover all the outer surfaces of the dielectric region 30a or 30b or a fraction thereof. Accordingly, in various implementations, the metal layer 35a or 35b can be disposed over at least 50% of the one or more outer surfaces of the dielectric region 30a or 30b. For example, metal layer 35a or 35b can be disposed over at least 50%, over at least 60%, at least 75%, at least 80%, at least 85%, at least 90%, at least 95%, at least 99%, 100%, or any range between any of these values of the one or more outer surfaces of the dielectric region 30a or 30b. In some implementations, the metal layer 35a or 35b can be disposed over the entire area (e.g., 100%) of the one or more outer surfaces of the dielectric region 30a or 30b. Without subscribing to any particular theory, the optical properties of the optical structure 70a or 70b can vary based on the amount of outer surface of the dielectric region 30a or 30b that is covered by the metal layer 35a or 35b. For example, the reflectivity or reflectance and/or the transmissivity or transmittance of the optical structure 70a or 70b can vary based on the amount of outer surface of the dielectric region 30a or 30b that is covered by the metal layer 35a or 35b.

In various implementations, the shape of the metal layer 35a or 35b can conform to the shape of the underlying dielectric material 30a or 30b. For example, in the optical structure 70a shown in FIG. 19A, the dielectric material 30a has a rectangular cross-section. Accordingly, the metal layer 35a which is disposed over the major surfaces 31a and 31b and the edge surfaces also has a rectangular cross-section. As another example, in the optical structure 70b shown in FIG. 19B, the dielectric material 30b has a circular cross-section. Accordingly, the metal layer 35b which is disposed over the circumference of the dielectric material 30b also has a circular cross-section. However, in other implementations, the shape of the metal layer 35a or 35b can be different from the shape of the underlying dielectric material 30a or 30b.

In various implementations, the optical structure 70a or 70b comprising a dielectric region 30a or 30b surrounded by a metal layer 35a or 35b can be configured as particles, slabs, filaments, flakes, beads (e.g., spherical beads) or platelets as discussed above. In some implementations, the optical structure 70a or 70b comprising a dielectric region 30a or 30b surrounded by a metal layer 35a or 35b can have the same shape as the shape of the dielectric region 30a or 30b. For example, the optical structure 70a can be configured as a cube or a rectangular cuboid when the dielectric region 30a is configured as a cube or a rectangular cuboid as shown in FIG. 19A. As another example, the optical structure 70b can be configured as a sphere when the dielectric region 30b is configured as a sphere as shown in FIG. 19B. In some cases, the optical structure 70a or 70b configured as a particle, a slab, a flake, a filament, or a platelet can be suitable for a pigment or a printing ink. In some implementations, the optical structure 70a or 70b configured as a particle, a slab, a flake, a filament, or a platelet can have an area (or a lateral dimension) that is about 5 to 10 times or more the thickness of the optical structure 70a or 70b configured as a particle, a slab, a flake, a filament, or a platelet. Accordingly, an optical structure 70a or 70b configured as a particle, a slab, a flake, a filament, or a platelet can have a thickness between about 100 nm and about 1 micron. In some such implementations, the area (or a lateral dimension) can be greater than or equal to about 500 nm and less than or equal to about 1 micron, greater than or equal to about 1 micron and less than or equal to about 5 microns, greater than or equal to about 5 microns and less than or equal to about 10 microns, greater than or equal to about 5 micron and less than or equal to about 40 microns, greater than or equal to about 5 microns and less than or equal to about 20 microns, or any value in the ranges/sub-ranges defined by these values. In various embodiments, the optical structure 70a or 70b configured as a particle, a slab, a flake, a filament, or a platelet can be configured such that an area, a length and/or a width of a major surface of the optical structure 70a or 70b is greater than or equal to about 2, 3, 4, 5, 6, 8, or 10 times the thickness of the optical structure 70a or 70b and less than or equal to about 50 times the thickness of the optical structure 70a or 70b or any value in any range formed by any of these values.

In various implementations, surrounding the dielectric region 30a or 30b with the metal layer 35a or 35b can advantageously increase the reflectivity or reflectance of the dielectric material 30a or 30b at one or more wavelengths of the visible spectral range in some implementations. In some implementations, surrounding the dielectric material 30a or 30b with the metal layer 35a or 35b can advantageously enhance or change the color appearance of the dielectric material 30a or 30b at one or more wavelengths of the visible spectral range in reflection and transmission mode.

In various implementations, the optical structure 70a or 70b comprising the dielectric region 30a or 30b surrounded by the metal layer 35a or 35b can have a reflection spectrum with one or more reflection peaks in the visible spectral region and a transmission spectrum with one or more transmission peaks in the visible spectral region. Without any loss of generality, the one or more reflection peaks and the one or more transmission peak do not overlap with each other. Accordingly, the optical structure 70a or 70b comprising the dielectric region 30a or 30b surrounded by the metal layer 35a or 35b can have a first color in the reflection mode and a second color different from the first color in the transmission mode. In certain implementations, the first color and the second color can be complementary colors, such as, for example, red and green, yellow and violet, blue and orange, green and magenta, etc.

In various implementations, there may be little to no shift in the first color in the reflection mode for any viewing angle between a first angle with respect to a normal to the surface of the optical structure 70a or 70b and a second angle with respect to a normal to the surface of the optical structure 70a or 70b. Likewise, in some implementations, there may be little to no shift in the second color in the transmission mode for any viewing angle between a first angle with respect to a normal to the surface of the optical structure 70a or 70b and a second angle with respect to a normal to the surface of the optical structure 70a or 70b. In various implementations, the first angle can have a value between 0 degrees and 10 degrees (e.g., 0 degrees, 1 degree, 2 degrees, 3 degrees, 4 degrees, 5 degrees, 6 degrees, 7 degrees, 8 degrees, 9 degrees or 10 degrees). In various implementations, the second angle can have a value between 20 degrees and 90 degrees (e.g., 20 degrees, 30 degrees, 40 degrees, 50 degrees, 60 degrees, 70 degrees, 80 degrees or 90 degrees). Accordingly, for any viewing angle between a first angle (e.g., 0 degrees, 1 degree, 2 degrees, 3 degrees, 4 degrees, 5 degrees, 6 degrees, 7 degrees, 8 degrees, 9 degrees or 10 degrees) with respect to a normal to the surface of the optical structure 70a or 70b and a second angle (e.g., 20 degrees, 30 degrees, 40 degrees, 50 degrees, 60 degrees, 70 degrees, 80 degrees or 90 degrees) with respect to a normal to the surface of the optical structure 70a or 70b, the color of the optical structure 70a or 70b in the reflection mode and/or the transmission mode may remain substantially the same. Likewise, in some implementations, there may be little to no shift color shift in the color of the optical structure 70a or 70b in the reflection mode and/or the transmission mode for tilt of 10 degrees, 20 degrees, 30 degrees, 40 degrees, 50 degrees, 60 degrees, 70 degrees, 80 degrees or 90 degrees or any value in a range/sub-range defined by any of these values.

In some implementations, it may be desirable to have a color shift in the first color in the reflection mode as the viewing angle changes from a first angle with respect to a normal to the surface of the optical structure 70a or 70b to a second angle with respect to a normal to the surface of the optical structure 70a or 70b. Similarly, in various implementations, it may be desirable to have a color shift in the second color in the transmission mode as the viewing angle changes from a first angle with respect to a normal to the surface of the optical structure 70a or 70b to a second angle with respect to a normal to the surface of the optical structure 70a or 70b. In various implementations, the first angle can have a value between 0 degrees and 10 degrees (e.g., 0 degrees, 1 degree, 2 degrees, 3 degrees, 4 degrees, 5 degrees, 6 degrees, 7 degrees, 8 degrees, 9 degrees or 10 degrees). In various implementations, the second angle can have a value between 20 degrees and 90 degrees (e.g., 20 degrees, 30 degrees, 40 degrees, 50 degrees, 60 degrees, 70 degrees, 80 degrees or 90 degrees) depending on the design. Accordingly, as the viewing angle changes from a first angle (e.g., 0 degrees, 1 degree, 2 degrees, 3 degrees, 4 degrees, 5 degrees, 6 degrees, 7 degrees, 8 degrees, 9 degrees or 10 degrees) with respect to a normal to the surface of the optical structure 70a or 70b to a second angle with respect to a normal to the surface of the optical structure 70a or 70b and a second angle (e.g., 20 degrees, 30 degrees, 40 degrees, 50 degrees, 60 degrees, 70 degrees, 80 degrees or 90 degrees) with respect to a normal to the surface of the optical structure 70a or 70b, the color of the optical structure 70a or 70b in the reflection mode and/or the transmission mode may change (e.g., dark blue to light blue, purple to pink, dark green to light green, etc.). Likewise, in some implementations, there may be a shift in the color of the optical structure 70a or 70b in the reflection mode and/or the transmission mode for tilt of 10 degrees, 20 degrees, 30 degrees, 40 degrees, 50 degrees, 60 degrees, 70 degrees, 80 degrees or 90 degrees or any value in a range/sub-range defined by any of these values.

Without subscribing to any particular theory, the one or more reflection peaks of the reflection spectrum of the optical structure 70a or 70b comprising the dielectric region 30a or 30b surrounded by the metal layer 35a or 35b can have high reflectivity or reflectance. For example, the reflectivity or reflectance of the one or more reflection peaks can be greater than or equal to 30%, greater than or equal to 40%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95% and less than or equal to 100%, or a value in any range/sub-range defined by these values.

Without subscribing to any particular theory, the one or more transmission peaks of the transmission spectrum of the optical structure 70a or 70b comprising the dielectric region 30a or 30b surrounded by the metal layer 35a or 35b can have high transmissivity or transmittance. For example, the transmissivity or transmittance of the one or more transmission peaks can be greater than or equal to 30%, greater than or equal to 40%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95% and less than or equal to 100%, or a value in any range/sub-range defined by these values.

The optical structures 70a and 70b comprising the dielectric region 30a or 30b surrounded by the metal layer 35a or 35b can produce many or all the optical effects that are described above with reference to optical structure 10 where the two metal layers 13 and 15 do not surround the dielectric layer 14 (e.g., as shown in FIG. 11).

The metal layer 35a or 35b can be disposed around the dielectric material 30a or 30b using a variety of chemical methods. For example, metal layer 35a or 35b can be disposed around the dielectric region 30a or 30b using electroless method. Various implementations of an electroless method of depositing the metal layer 35a or 35b can comprise depositing the metal layer 35a or 35b without applying electrical current or voltage. Various metals such as, for example, gold, silver, or nickel can be deposited using electroless methods. An example of depositing metal layer 35a or 35b comprising silver around the dielectric region 30a or 30b using an electroless method is discussed below. The electroless method of depositing silver can also be referred to as electroless silver plating. Electroless silver plating comprises immersing the dielectric region 30a or 30b in a silvering bath comprising chemical compounds of silver (e.g., silver nitrate, silver-ammonia compounds, sodium argento cyanide, etc.) and at least one of ammonia, water, potassium hydroxide or sodium hydroxide. The chemical compounds of silver are reduced to metallic silver using a reducing agent which is added to the silvering bath. The metallic silver adheres to the exposed surfaces of the dielectric region 30a or 30b. The reducing agent can comprise glucose, sucrose, invert sugar, stannous chloride, hydrazine, Rochelle salt, formaldehyde, or organic borane (e.g., dimethylamine borane in various implementations). In certain implementations, the silvering bath and the reducing agent can be sprayed on the dielectric region 30a or 30b. In some implementations, the outer surface of the dielectric region 30a or 30b can be activated using stannous chloride ($SnCl_2$) in preparation for the electroless deposition of the metal layer. Other methods of depositing the metal layer 35a or 35b on the outer surface of the dielectric region 30a or 30b can also be used. For example, the metal layer 35a or 35b can be disposed around the dielectric region 30a or 30b using methods such as, for example, chemical vapor deposition (CVD), sputtering or electroplating. In some implementations, the metal layer 35a or 35b can be patterned around the dielectric region 30a or 30b.

In various implementation, a second dielectric region 40a or 40b comprising one or more dielectric materials may be disposed around the metal coated dielectric region 30a or 30b. The second dielectric region 40a or 40b may comprise high refractive index materials such as $ZrO_2$, $TiO_2$, ZnS, ITO (indium tin oxide), $CeO_2$ or $Ta_2O_3$. In various implementations, the second dielectric region 40a or 40b may comprise dielectric materials having refractive index greater than 1.65 and less than or equal to 2.5. For example, the refractive index of the one or more dielectric material in the second dielectric region 40a or 40b can be greater than or equal to 1.65 and less than or equal to 1.75, greater than or equal to 1.75 and less than or equal to 1.85, greater than or equal to 1.85 and less than or equal to 1.95, greater than or equal to 1.95 and less than or equal to 2.05, greater than or equal to 2.0 and less than or equal to 2.2, greater than or equal to 2.1 and less than or equal to 2.3, greater than or equal to 2.25 and less than or equal to 2.5, or any value in any range/sub-range defined by these values. Other values outside these ranges are also possible in some implementations. In various implementations, the refractive index of the one or more materials of the second dielectric region 40a or 40b can be greater than the refractive index of the one or more materials of the dielectric region 30a or 30b. The thickness of the second dielectric region 40a or 40b can be between 75 nm and 700 nm. For example, the thickness of the second dielectric region 40a or 40b can be greater than or equal to 75 nm and less than or equal to 100 nm, greater than or equal to 100 nm and less than or equal to 150 nm, greater than or equal to 150 nm and less than or equal to 200 nm, greater than or equal to 200 nm and less than or equal to 250 nm, greater than or equal to 300 nm and less than or equal to 350 nm, greater than or equal to 400 nm and less than or equal to 450 nm, greater than or equal to 450 nm and less than or equal to 500 nm, greater than or equal to about 500 nm and less than or equal to 650 nm, greater than or equal to 650 nm and less than or equal to 700 nm, or any value in any range/sub-range defined by these values. The second dielectric region 40a or 40b can be disposed to cover at least 50% of the outer surface of the metal layer 35a or 35b. For example, the second dielectric region 40a or 40b can be disposed to cover at least 80%, at least 90%, at least 95%, or 100% of the outer surface of the metal layer 35a or 35b, or any value in a range/sub-range defined by these values.

The reflected color and/or the transmitted color of the optical structure 70a or 70b comprising the second dielectric region 40a or 40b surrounding the metal coated dielectric region 30a or 30b can be different from the reflected color and/or the transmitted color of the optical structure 70a or 70b comprising only the metal coated dielectric region 30a or 30b. For example, the reflected color and/or the transmitted color of the optical structure 70a or 70b comprising the second dielectric region 40a or 40b surrounding the metal coated dielectric region 30a or 30b can be more vibrant than the reflected color and/or the transmitted color of the optical structure 70a or 70b comprising the metal coated dielectric region 30a or 30b without the second dielectric region 40a or 40b having suitable thickness and/or materials with suitable refractive index. The shape of the transmission and/or reflection peaks, the position of the maximum of the transmission and/or reflection peaks and/or the width (e.g., full width at half maximum (FWHM)) of the transmission and/or reflection peaks of the optical structure 70a or 70b comprising the second dielectric region 40a or 40b surrounding the metal coated dielectric region 30a or 30b can be different from the shape of the transmission and/or reflection peaks, the position of the maximum of the transmission and/or reflection peaks and/or the width of the transmission and reflection peaks of the optical structure 70a or 70b comprising the metal coated dielectric region 30a or 30b without the second dielectric region 40a or 40b having suitable thickness and/or materials with suitable refractive index. For example, the width of one or more of the reflection peaks of the optical structure 70a or 70b comprising the second dielectric region 40a or 40b surrounding the metal coated dielectric region 30a or 30b can be broader than the width of a corresponding reflection peak of the optical structure 70a or 70b comprising the metal coated dielectric region 30a or 30b without the second dielectric region 40a or 40b having suitable thickness and/or materials with suitable refractive index. As another example, the width (e.g., FWHM) of one or more of the reflection peaks of the optical structure 70a or 70b comprising the second dielectric region 40a or 40b surrounding the metal coated dielectric region 30a or 30b can be greater than or equal to about 50 nm and less than or equal to about 300 nm, in some implementations.

Various implementations of the of the optical structure 70a or 70b comprising the second dielectric region 40a or 40b surrounding the metal coated dielectric region 30a or 30b can have a reflection spectrum with one or more reflection peaks having a width (e.g., FWHM) greater than or equal to about 10 nm, greater than or equal to about 20 nm, greater than or equal to about 30 nm, greater than or equal to about 40 nm, greater than or equal to about 50 nm, greater than or equal to about 60 nm, greater than or equal to about 70 nm, greater than or equal to about 100 nm, greater than or equal to about 200 nm, less than or equal to about 300 nm, less than or equal to about 250 nm, or any value in a range/sub-range defined by these values. Various implementations of the optical structure 70a or 70b comprising the second dielectric region 40a or 40b surrounding the metal coated dielectric region 30a or 30b can have higher reflectivity or reflectance at one or more wavelengths in the visible spectral range as compared to the reflectivity or reflectance of the optical structure 70a or 70b comprising the metal coated dielectric region 30a or 30b without the second dielectric region 40a or 40b having suitable thickness and/or materials with suitable refractive index at those one or more wavelengths in the visible spectral range.

Various implementations of the of the optical structure 70a or 70b comprising the second dielectric region 40a or 40b surrounding the metal coated dielectric region 30a or 30b can have a transmission spectrum with one or more transmission peaks having a width (e.g., FWHM) greater than or equal to about 10 nm, greater than or equal to about 20 nm, greater than or equal to about 30 nm, greater than or equal to about 40 nm, greater than or equal to about 50 nm, greater than or equal to about 60 nm, greater than or equal to about 70 nm, greater than or equal to about 100 nm, greater than or equal to about 200 nm, less than or equal to about 300 nm, less than or equal to about 250 nm, or any value in a range/sub-range defined by these values.

Without subscribing to any particular theory, the one or more reflection peaks of the reflection spectrum of the optical structure 70a or 70b comprising the second dielectric region 40a or 40b surrounding the metal coated dielectric region 30a or 30b can have high reflectivity or reflectance. For example, the reflectivity or reflectance of the one or more reflection peaks can be greater than or equal to 30%, greater than or equal to 40%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95% and less than or equal to 100%, or a value in any range/sub-range defined by these values.

Without subscribing to any particular theory, the one or more transmission peaks of the transmission spectrum of the optical structure 70a or 70b comprising the second dielectric region 40a or 40b surrounding the metal coated dielectric region 30a or 30b can have high transmissivity or transmittance. For example, the transmissivity or transmittance of the one or more transmission peaks can be greater than or equal to 30%, greater than or equal to 40%, greater than or equal to 50%, greater than or equal to 55%, greater than or equal to 60%, greater than or equal to 65%, greater than or equal to 70%, greater than or equal to 75%, greater than or equal to 80%, greater than or equal to 85%, greater than or equal to 90%, greater than or equal to 95% and less than or equal to 100%, or a value in any range/sub-range defined by these values.

Additionally, the second dielectric region 40a or 40b can advantageously insulate the metal layer 35a or 35b from the ink varnish when the optical structures 70a or 70b are configured as pigments.

In some implementations, the second dielectric region 40a or 40b can be disposed around the metal coated dielectric materials 30a or 30b using a sol-gel process. For example, the metal coated dielectric materials 30a or 30b can be coated with a dielectric material comprising titanium di-oxide (TiO$_2$) using a sol-gel process, involving the hydrolysis of titanium(IV) isopropoxide. As another example, a precursor comprising the dielectric material 40a or 40b is transformed to form a colloidal suspension (or a "sol") by a series of hydrolysis and polymerization reactions. In some implementations, the colloidal suspension comprising the dielectric material of the second dielectric region 40a or 40b can be disposed on the metal coated first dielectric region 30a or 30b by a coating, gelling or precipitation. The metal coated first dielectric region 30a or 30b comprising the colloidal suspension comprising the dielectric material of the second dielectric region 40a or 40b can be heated or dried to obtain the metal coated first dielectric region 30a or 30b coated with second dielectric region 40a or 40b. In some implementations, the one or more materials of the second dielectric region 40a or 40b can be disposed around the metal coated first dielectric region 30a or 30b using deposition methods such as, for example, chemical vapor deposition method, e-beam, sputtering. In some implementations, the various deposition methods can be combined with vibrating the metal coated first dielectric region 30a or 30b.

As discussed above, various embodiments of the optical structures 10, 70a or 70b are configured to partially reflect light and partially transmit light. In various implementations, the reflectivity or reflectance of the optical structures 10, 70a or 70b at one or more wavelengths in the visible spectral range can be greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95% and/or less than or equal to 100%, or any value in any range/sub-range defined by these value. In various implementations, the transmissivity or transmittance of the optical structures 10, 70a or 70b at one or more wavelengths in the visible spectral range can be greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 95% and/or less than or equal to 100%, or any value in any range/sub-range defined by these value. In various implementations, the reflectivity or reflectance of the optical structures 10, 70a or 70b at one or more first set of wavelengths can be approximately equal to the transmissivity or transmittance of the optical structures 10, 70a or 70b at one or more second set of wavelengths different from the first set of wavelengths.

The optical structures 10, 70a or 70b can have a size, such as, for example, a lateral dimension, an area, a length or a width of the optical structure (e.g., a length, a width or an area of a major surface of the optical structure) greater than or equal to about 1 micron and less than or equal to about 50 microns. For example, the size of the optical structures 10, 70a or 70b can be greater than or equal to about 1 micron and less than or equal to 10 microns, greater than or equal to 2 microns and less than or equal to 12 microns, greater than or equal to 3 microns and less than or equal to 15 microns, greater than or equal to 4 microns and less than or equal to 18 microns, greater than or equal to 5 microns and less than or equal to 20 microns, greater than or equal to 10 microns and less than or equal to 20 microns, greater than or equal to 15 microns and less than or equal to 25 microns, greater than or equal to 20 microns and less than or equal to about 30 microns, greater than or equal to 25 microns and less than or equal to 35 microns, greater than or equal to 30 microns and less than or equal to 40 microns, greater than or equal to 35 microns and less than or equal to 45 microns, greater than or equal to 40 microns and less than or equal to 50 microns, or a value in any range/sub-range defined by these values.

The optical structures 10, 70a or 70b can have a size, such as, for example, a lateral dimension, an area, a length or a width of the optical structure (e.g., a length, a width or an area of a major surface of the optical structure) greater than or equal to about 1 micron and less than or equal to about 50 microns can be between 0.1 microns and 2.0 microns. For example, the thickness of the optical structures 10, 70a or 70b having a size, such as, for example, a lateral dimension, an area, a length or a width of the optical structure (e.g., a length, a width or an area of a major surface of the optical structure) greater than or equal to 0.1 micron and less than or equal to 0.3 microns, greater than or equal to 0.2 microns and less than or equal to 0.5 microns, greater than or equal to 0.3 microns and less than or equal to 0.6 microns, greater than or equal to 0.4 microns and less than or equal to 0.7 microns, greater than or equal to 0.5 microns and less than or equal to 0.8 microns, greater than or equal to 0.6 microns and less than or equal to 0.9 microns, greater than or equal to 0.7 microns and less than or equal to 1.0 micron, greater than or equal to 1.0 micron and less than or equal to 1.2 microns, greater than or equal to 1.2 microns and less than or equal to 1.5 microns, greater than or equal to 1.5 microns and less than or equal to 2.0 microns, or a value in any range/sub-range defined by these values.

One or more of the optical structures 10, 70a or 70b discussed above can be incorporated with or in a document (e.g., a banknote), package, product, or other item. Optical products such as a film, a thread, a laminate, a foil, a pigment, or an ink comprising one or more of the optical structures 10, 70a or 70b discussed above can be incorporated with or in documents such as banknotes or other documents to verify authenticity of the documents, packaging materials, etc. For example, the optical structures 70a or 70b can be configured as an ink or a pigment which is disposed on a base comprising at least one of a polymer, a plastic, a paper or a fabric. The base may be flexible in some implementations. The base comprising the ink or a pigment or pigment comprising the optical structures 70a or 70b can be cut or diced to obtain a thread or a foil. A plurality of optical structures 10, 70a or 70b discussed above can be incorporated in a particular optical product (e.g., ink, pigment, thread, filament, paper, security ink, security pigment, security thread, security filament, security paper, etc.). The shapes, sizes and/or aspect ratios of the plurality of optical structures 10, 70a or 70b discussed above that are incorporated in a particular optical product (e.g., ink, pigment, thread, filament, paper, security ink, security pigment, security thread, security filament, security paper, etc.) can vary. Accordingly, a particular optical product (e.g., ink, pigment, thread, filament, paper, security ink, security pigment, security thread, security filament, security paper, etc.) can comprise optical structures 10, 70a or 70b with different distributions of shapes, sizes and/or aspect ratios of the optical structures. For example, a particular optical product (e.g., ink, pigment, thread, filament, paper, security ink, security pigment, security thread, security filament, security paper, etc.) can comprise optical structures 10, 70a or 70b with sizes distributed around one or more mean sizes. As another example, a particular optical product (e.g., ink, pigment, thread, filament, paper, security ink, security pigment, security thread, security filament, security paper, etc.) can comprise optical structures 10, 70a or 70b with aspect ratios distributed around one or more aspect ratios.

Figure 20:
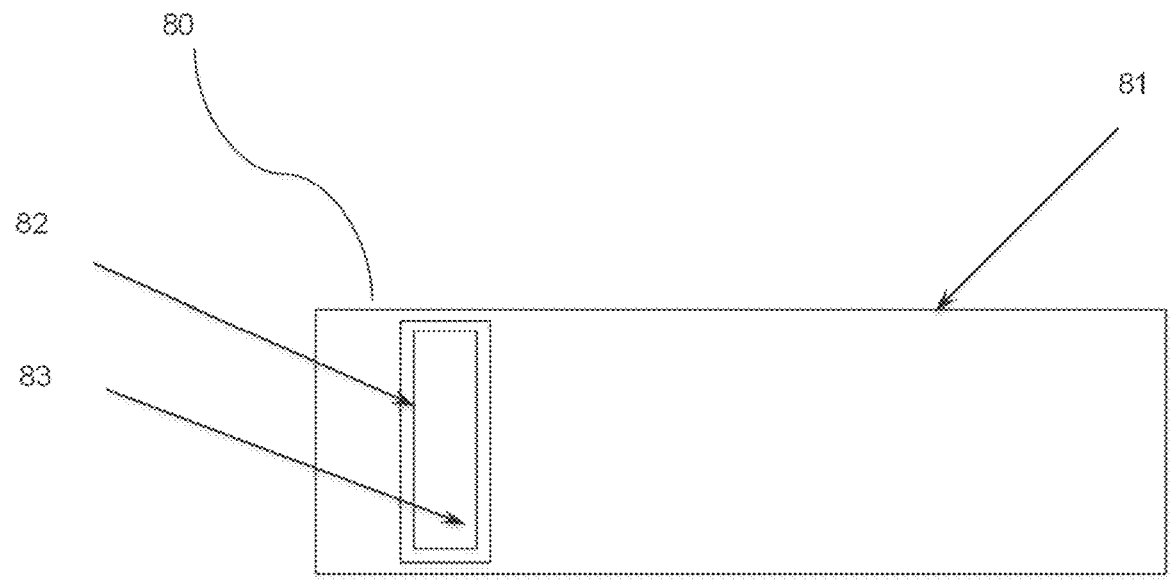
FIG. 20 is a schematic illustration of a laminate structure comprising an optical structure that is affixed to a banknote.

FIG. 20 shows, for example, a banknote 80 comprising a laminated film 83. The laminated film 83 comprises the optical structure 10, 70a or 70b. The laminated film 83 can be fabricated by disposing the optical structure 10, 70a or 70b over a base or support layer or substrate such as polymer base layer (e.g., a polyester film). The optical structure 10, 70a or 70b can be disposed over the polymer base layer by a variety of methods including but not limited to coating methods, vacuum deposition on a surface of the polymer base layer, etc. The optical structure 10, 70a or 70b may be disposed over a first side of the surface of the polymer base layer (e.g., polyester film). The laminated film 83 can be adhered to the "paper" (e.g., cellulose, cotton/linen, polymer or fabric) 81 of the banknote 80, for example, by a transparent and/or an optically clear adhesive. In various cases, a second surface of the polymer base layer opposite the first surface of the base layer is disposed closer to the banknote paper 81 comprising the banknote and may be in contact with the adhesive. In some cases, the adhesive can be a two component adhesive with one component disposed onto the banknote paper and the other component disposed on the second surface of the polymer base layer opposite the first surface of the base layer on which the optical structure 10, 70a or 70b is disposed. The banknote 80 and the laminated film 83 can be brought together for bonding. The laminated film 83 can also be attached to the banknote 80 using a cross-linking thermoset adhesive. A transparent protective barrier coating 82 (e.g., UV curable cross-linked resin) can be disposed over the laminated film 83. The protective barrier coating 82 can extend over the edges of the laminated film 83 onto the paper (e.g., fabric) 81 of the banknote. The protective barrier coating 82 can be configured to protect the laminated film 83 against corrosion, abrasive wear and liquids that may commonly come in contact with the banknote 80 without sacrificing the optical effects provided by the laminated film 83. The optical structure 10 can be disposed facing the protective barrier coating 82 or the adhesive layer between the laminated film 83 and the "paper" 81.

In some embodiments, the optical structure 10, 70a or 70b can be configured as a thread (e.g., a windowed thread) instead of a laminated film. A windowed thread can be manufactured by a variety of methods. For example, the thread can be woven up and down within the paper and to the surface of the paper during the papermaking process. As another example, the windowed thread can be disposed within the paper itself so that no part of the thread reaches the surface of the banknote. As yet another example, open spaces within the paper can be provided in the regions of the paper comprising the thread.

The thread can be fabricated by cutting a strip of the optical structure 10, for example the web, sheet, or base layer on which the layers comprising the optical structure 10 are formed and passing the strip through a bath of UV curable resin. The rate at which the strip is passed through the UV curable resin bath can be controlled to coat the sides and the edges of the strip uniformly. The strip coated with the UV curable resin can be cured to obtain the thread. The obtained thread comprising the optical structure 10 can be inserted (e.g., weaved) in the banknote. In some implementations, any fringe (e.g., the jagged or ragged edge of the thread) of the thread (due to hot stamping or chatter from any cutting operation) can be hidden from an observer by printing an opaque border around the hot stamp patch. Another way to affix the optical structure 10, 70a or 70b to the banknote can include die cutting a portion of the optical structure, for example, the web, sheet, or base layer on which the layers comprising the optical structure 10, 70a or 70b are formed and applying the portion to the banknote using an adhesive. Various implementations of the examples of optical structure described above can be configured as a thread, a hot stamp, or a laminate and incorporated with or in a document (e.g., a banknote), package, product, or other item.

Without any loss of generality, the optical structure 10, 70a or 70b or a material (e.g., an ink, a paint or a pigment, a varnish) comprising the optical structure 10, 70a or 70b can be disposed on a base comprising at least one of a polymer, a plastic, a paper or a fabric. The base comprising the optical structure 10, 70a or 70b or the material comprising the optical structure 10, 70a or 70b can be cut or diced into a smaller portions having a variety of shapes and/or sizes. The smaller portions can be disposed on or inserted into or onto a substrate (e.g., a bank note, paper, packaging material, fabric, etc.) using various methods. For example, the smaller portions can be configured as strips or threads which can be woven into the substrate. As another example, the smaller portions can be configured as foils which can be hot stamped on the substrate. As yet another example, the smaller portions can be laminated to the substrate using adhesives.

Figure 21A:
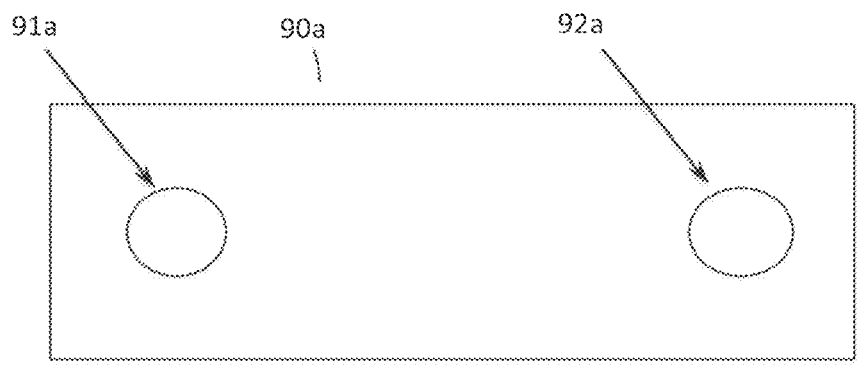
FIG. 21A shows a banknote with two windows, each window including a different optical structure.

FIG. 21A depicts a banknote 90a having two transparent windows 91a and 92a inserted into or attached on the paper (e.g., fabric) of the banknote. Each window comprises the optical structure 10, 70a or 70b. In some implementations, the reflection and/or transmission spectra of the optical structure 10 of the window 91a may be configured to be different from the reflection and/or transmission spectra of the optical structure 10, 70a or 70b of the window 92a. Thus, a person viewing the banknote 90a will perceive a first reflected color when viewing the window 91a along a viewing direction (e.g., normal to the surface of the banknote 90a) and a second reflected color different from the first reflected color when viewing the window 92a along the viewing direction. The person may also perceive a third transmitted color different from the first reflected color when viewing through the window 91a along the viewing direction. The person may additionally perceive a fourth transmitted color different from the first, second and third colors when viewing through the window 92a along the viewing direction. Furthermore, upon folding the banknote 90a over itself so that the two windows 91a and 92a are at least partially aligned with respect to one another, the person will perceive a different color, different from the first, second, third and/or fourth colors in reflection and transmission modes when viewing the banknote 90a along the viewing direction. For example, upon folding the banknote 90a over itself so that the two windows 91a and 92a are at least partially aligned with respect to one another, the person will perceive a reflected color that is a combination of the effects of the reflectivity or reflectance spectrums of the two windows 91a and 92a and a transmitted color that is a combination of the effects of the transmission spectrums of the two windows 91a and 92a. Additionally, the person can perceive color shift of the various colors seen in the reflection and transmission modes as the viewing angle changes. The amount of color shift may be different from the different windows as well as for the combination of the two windows.

Figure 21B:
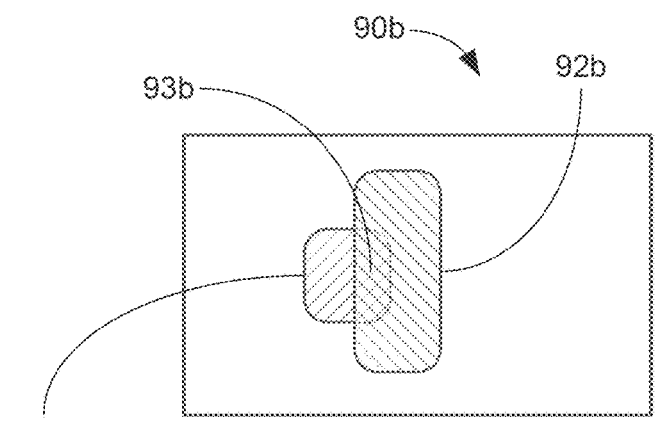
FIG. 21B shows a security device with two at least partially overlapping windows, each window comprising a different optical structure.

FIG. 21B depicts an implementation of a security device 90b (e.g., a banknote) comprising two windows 91b and 92b (a first and a second) inserted into or attached to the surface of the security device 90b. The two windows 91b and 92b at least partially overlap in the overlapping region 93b. The two windows 91b and 92b are transparent and comprise the optical structure 10, 70a or 70b. The configuration (e.g., thickness or other design parameters) of the optical structures 10, 70a or 70b in the respective windows 91a and 91b can be such that the reflection and/or transmission spectra of the optical structure 10, 70a or 70b of the window 91b is different from the reflection and/or transmission spectra of the optical structure 10 of the window 92b.

Thus, a person viewing the security device 90b along a viewing direction (e.g., normal to the surface of the security device 90b) will perceive (i) a first reflected color when viewing the portion of the window 91b that does not overlap with the window 92b, (ii) a second reflected color different from the first color when viewing the portion of the window 92b that does not overlap with the window 91b; and (iii) a third second reflected color that is a combination of the effects of the reflectivity or reflectance spectrums of the two windows 91b and 92b when viewing the overlapping region 93b.

A person viewing the security device 90b along a viewing direction (e.g., normal to the surface of the security device 90b) will perceive (i) a fourth transmitted color different from the first color when viewing through the portion of the window 91b that does not overlap with the window 92b, (ii) a fifth transmitted color different from the second and the fourth color when viewing through the portion of the window 92b that does not overlap with the window 91b; and (iii) a sixth transmitted color that is a combination of the effects of the transmission spectrums of the two windows 91b and 92b when viewing through the overlapping region 93b.

Additionally, in various embodiments, a person viewing the security device 90b can perceive color shift of the various colors seen in the reflection and transmission modes as the viewing angle changes. The amount of color shift may be different from the different windows.

Although, the two windows 91b and 92b are shown as partially overlapping in FIG. 21B, the two windows 91b and 92b can be completely overlapping. Various implementations of the security device 90b can comprise two or more different pigments. The two or more different pigments can comprise optical structures 10. A respective optical structure of one of the two or more different pigments can have reflectance and transmittance characteristics that are different from the respective optical structure of another of the two or more different pigments. The two or more different pigments can partially or completely overlap with each other. As discussed above, the color perceived by a person viewing an overlapping region of the two or more different pigments can depend on a combination of the effects of the reflection/transmission spectra of the different optical structures of the two or more different pigments. Some implementations of the security device 90b can comprise two or more at least partially overlapping foils, films, threads or laminates comprising different optical structures. The color perceived by a person viewing an overlapping region of the two or more at least partially overlapping foils, films, threads or laminates can depend on a combination of the effects of the reflection/transmission spectra of the different optical structures of the two or more foils, films, threads or laminates.

Figure 22:
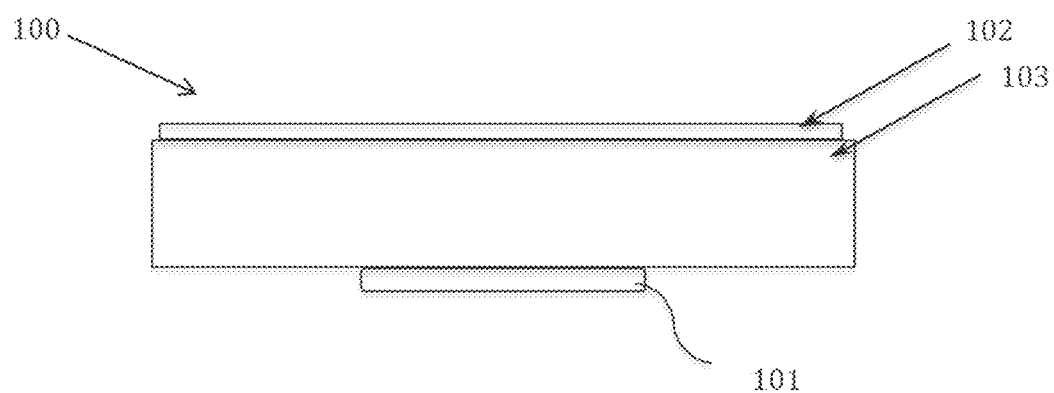
FIGS. 22 and 23 illustrate examples of a security device comprising an optical structure disposed under or over a text, symbol or number. The text, symbol or number becomes visible when the viewing angle is changed.

FIG. 22 illustrates a side view of an object 100 with a security device comprising a main body 103 of the object and a layer 102 comprising the optical structure 10, 70a or 70b. The object can be a banknote. The main body may comprise paper comprising the banknote. The layer 102 can be a laminate, a thread, or a label. When the layer 102 is configured as a label, an adhesive (e.g., a varnish) can be applied to the main body 103 and the layer 102 can be adhered to the adhesive of the main body 103 using a polymeric adhesive. Alternatively, the adhesive can be applied to the layer 102 before being affixed to the main body 103. When the layer 102 is configured as a laminate, the layer 102 can be adhered to the main body 103 using a polymer.

The layer 102 can be adhered to the main body 103 using adhesives, such as, for example optical clear adhesive and/or a cross-linking thermoset adhesive. The security device 100 further comprises a layer 101 comprising a message that is composed using a text, a symbol, a number or any combination thereof that is disposed on the side of the main body (e.g., paper/fabric) 103 of the object (e.g., banknote) opposite the side on which the layer 102 as shown in FIG. 22. Alternately, the layer 101 can be disposed between the main body (e.g., paper/fabric) 103 and the layer 102 or over the layer 102. The layer 101 can comprise, for example, a dye, a pigment or a phosphorescent material that has the same color characteristics as the color reflected or transmitted by the optical structure 10 when viewed along a direction normal to the surface of the layer 102. Accordingly, the message is not visible to an observer (or hidden) when the security device 100 is viewed along a direction normal to the surface of the layer 102. However, when the security device 100 is tilted such that viewing angle changes, the color reflected by and/or transmitted through the optical structure 10 changes such that the message become visible to the observer. In certain cases, the layer 101 comprising a message printed with a phosphorescent material can be made visible when illuminated by UV. The resultant color of the phosphorescent material can be the combined color of the fluoresence and the dichroic color.

Figure 23:
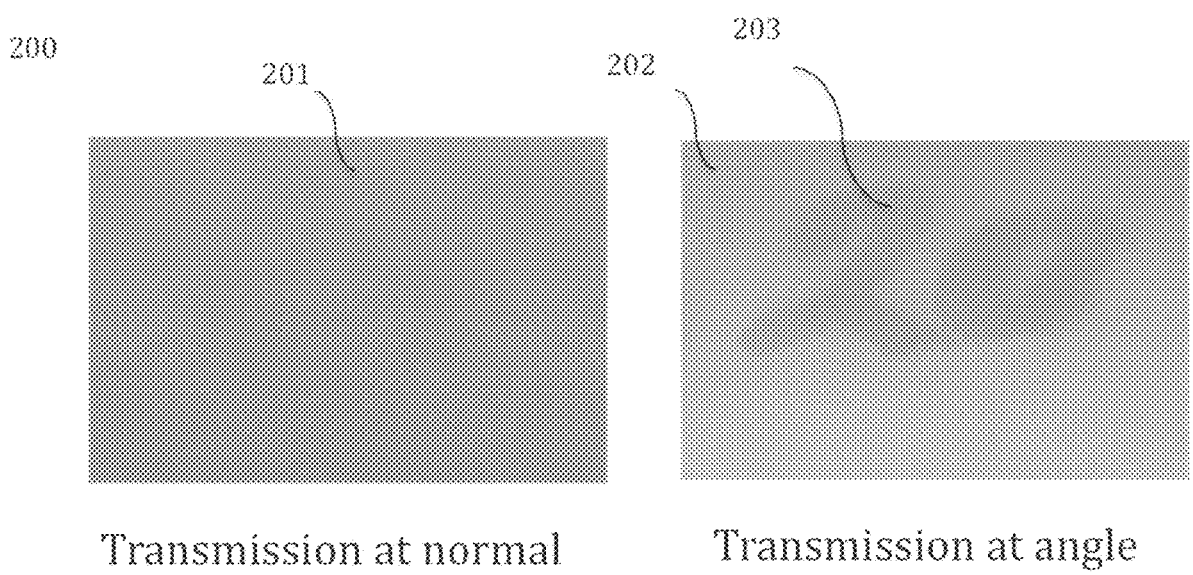

FIG. 23 shows the effect of changing the viewing angle in transmission of the security device 100 from 0 to about 45 degrees. When the viewing angle is 0 degrees, the message comprising a combination of a number, text or a symbol is not visible in the transmission mode because the color of the text is the same as the color of the optical structure in transmission mode (e.g., orange). However, as the viewing angle increases, the color of the optical structure in transmission mode shifts. For example, the message 203 becomes visible as the color of the optical structure in transmission mode shifts from orange to yellow as the angle of observation increases. The color of the message has sufficient contrast with respect to the transmitted color of the optical structure 10 so as to be visible to the observer.

In other embodiments, the security device 100 can be configured to operate in reverse to that described above such that for example the message is visible at normal incidence and not visible when the security device is tilted. Other variations are possible.

As describe above, the optical structures 10, 70a or 70b may be used in different forms, such as a laminate, a foil, a film, a hot stamp, a thread, pigment, ink, or paint. In some implementations, a laminate, a foil, a film, or a thread can comprise a pigment, ink or paint comprising the optical structures 10, 70a or 70b. A laminate may be adhered to a document, product or package using adhesive. A thread may be threaded or woven through an opening, for example, in the document. A foil can be hot stamped on the document, product or package. Pigment, ink, or paint may be deposited on the document, product or package or the material (e.g., paper, cardboard, or fabric) used to form the document, product, or package. For example, the document, product, or package may be exposed to (e.g., contacted with) the pigment, ink, or paint to color the document, product or packages in process similar to those used for non-color shifting pigments, dyes, paints and inks.

A plurality of optical structures 10, 70a or 70b such as described herein collected together as a pigment (as well as inks, and paints) can have similar optical characteristics as the optical structure 10, 70a or 70b configured as a film/laminate. As described above, optical structures 10, 70a or 70b collected together to form a pigments can exhibit as a collection of platelets or separate pieces the same optical characteristics as the bulk optical film from which the platelets were made. An added advantage of the optical structures 10, 70a or 70b configured as a pigment is that color can be blended according to desired specification. The color of the optical structure 10 can be designed by using computer software to calculate the thickness of the various layers of the optical structure 10, 70a or 70b that would provide a desired reflection and/or transmission characteristics. Optical structures 10, 70a or 70b that can provide specific colors can be designed using the computer software and then fabricated. Additionally, different color shifting optical structures 10, 70a or 70b that produce different colors can be included together and/or color shifting optical structures such as described herein can be combined with non-color shifting pigments or dyes to produce different colors.

The optical structure 10, 70a or 70b can be fabricated using a variety of methods including but not limited to vacuum deposition, coating methods, etc. One method of fabrication of the optical structures 10 described herein uses a vacuum coater that employs batch or roll coating. In one method of fabricating the optical structure 10, a first transparent high index layer (e.g., layer 12 or layer 16 of FIG. 11) is deposited onto carrier or base layer such as a sheet or web or other substrate. The carrier, web, base layer or substrate can comprise materials such as, for example, polyester or a polyester with release characteristics such that the optical structure can be readily separated from the web or base layer. A release layer between the base layer and the plurality of other optical layers the form the optical structure may be used to permit separation of the optical layers comprising the optical structure from the base layer or web. A first metal layer (e.g., layer 13 or layer 15), a transparent dielectric layer comprising high or low refractive index material (e.g., layer 14), a second metal layer (e.g., layer 15 or layer 13), and a second transparent high index layer (e.g., layer 16 or layer 12) is deposited over the first transparent high index layer in sequence (e.g., layer 12 or layer 16 of FIG. 11). The various layers can be deposited in sequence in some embodiments. However, in other embodiments, one or more intervening layers can be disposed between any of the first metal layer, the transparent dielectric layer comprising high or low refractive index material, the second metal layer, and the second transparent high index layer. As examples, in some cases the transparent high index layers and the dielectric layer can be deposited using electron gun while the first and the second metal layers can be deposited by using electron gun or sputtering.

Some materials, like ZnS or $MgF_2$, can be evaporated from a resistance source. In instances wherein the transparent dielectric layer comprising high or low refractive index material comprises a polymer, a process known as PML (Polymer Multi-Layer) as described in U.S. Pat. No. 5,877,895 can be used. The disclosure of U.S. Pat. No. 5,877,895 is incorporated by reference herein in its entirety.

Optical Structures Comprising Dielectric Layers Surrounded by Metal Layers (e.g., M/D/M/D/M Optical Stack)

Figure 24A:
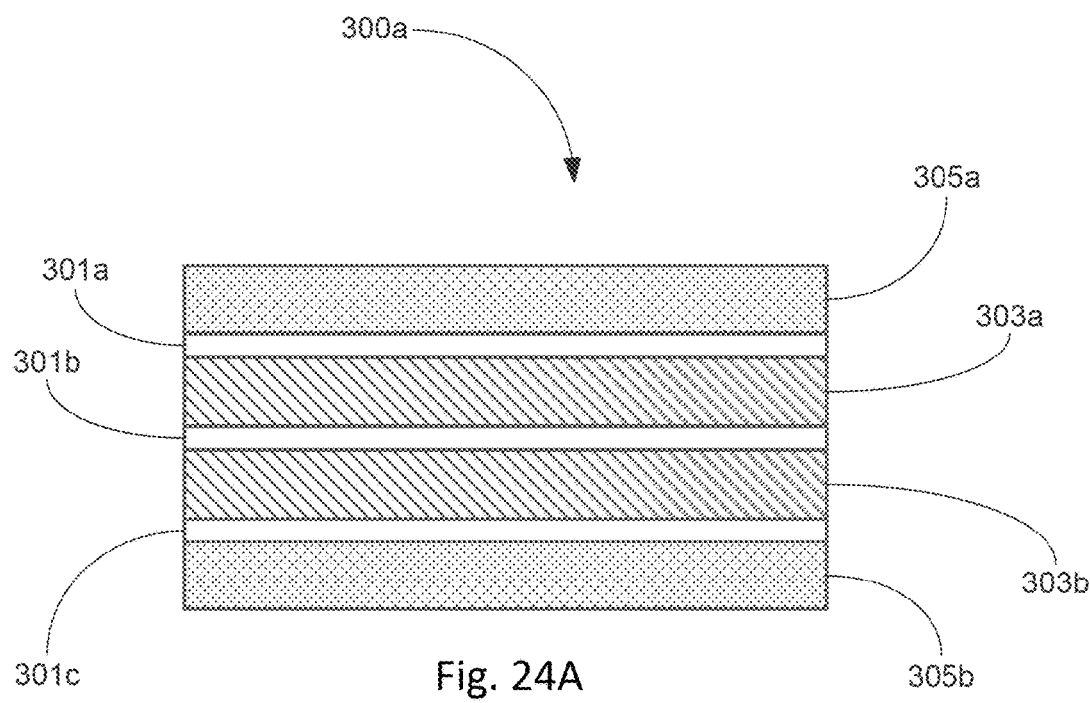
FIG. 24A schematically illustrates a side view of an implementation of an optical structure comprising a stack of layers that can be used as a security feature.

FIG. 24A schematically illustrates an implementation of an optical structure 300a comprising a stack of layers that can be used as a security feature. The optical structure 300a comprises at least two dielectric layers 303a and 303b and at least three metal layers 301a, 301b, and 301c. In various implementations, the at least three metal layers 301a, 301b, and 301c can comprise a material selected from a group consisting of silver (Ag), silver alloys, gold (Au), and gold alloys. In some implementations, the at least three metal layers 301a, 301b, and 301c can comprise palladium (Pd). For example, the at least three metal layers 301a, 301b, and 301c can comprise silver alloys with palladium. The amount of palladium in some such implementations can be less than or equal to about 10% by weight.

In various implementations, different metal layers (e.g. metal layers 301a, 301b, and 301c) can have a thickness in a range between about 3 nm and about 120 nm. For example, the thickness of the different metal layers (e.g. metal layers 301a, 301b, and 301c) can be greater than or equal to about 3 nm and less than or equal to about 20 nm, greater than or equal to about 7.5 nm and less than or equal to about 25 nm, greater than or equal to about 10 nm and less than or equal to about 27.5 nm, greater than or equal to about 12.5 nm and less than or equal to about 30 nm, greater than or equal to about 15 nm and less than or equal to about 35 nm, greater than or equal to about 17.5 nm and less than or equal to about 37.5 nm, greater than or equal to about 20 nm and less than or equal to about 40 nm, greater than or equal to about 25 nm and less than or equal to about 50 nm, greater than or equal to about 30 nm and less than or equal to about 60 nm, greater than or equal to about 35 nm and less than or equal to about 55 nm, greater than or equal to about 45 nm and less than or equal to about 75 nm, greater than or equal to about 60 nm and less than or equal to about 80 nm, greater than or equal to about 75 nm and less than or equal to about 100 nm, greater than or equal to about 90 nm and less than about 120 nm, or any thickness in a range/sub-range defined by any of these values.

In various implementations, the different metal layers 301a, 301b and 301c can have the same thickness. However, in some implementations, the different metal layers 301a, 301b and 301c can have different thickness. In some implementations, two of the three metal layers 301a, 301b and 301c have different thicknesses while in others all three metal layers have different thicknesses. In some implementations, the metal layer 301b can have a thickness greater than the thickness of the metal layer 301a and/or metal layer 301c. For example, the thickness of the metal layer 301b can be in a range between about 1.1 times and about 2 times the thickness of the metal layer 301a and/or the metal layer 301c.

In various implementations, one or more of the metal layers 301a, 301b and 301c can be configured as a continuous layer. However, in some implementations, one or more of the metal layers 301a, 301b and 301c can be discontinuous. Accordingly, any of the metal layers 301a, 301b and 301c can comprise separate regions comprising the metallic material separated by regions comprising a non-metallic material. For example, any of the metal layers 301a, 301b and 301c can comprise one or more islands comprising the metallic material spaced apart by regions comprising dielectric material such as the dielectric material of one or both of the layers 303a and 303b. In various implementations, one or more of the metal layers 301a, 301b and 301c need not be a continuous layer or film. Instead, any of the metal layers 301a, 301b and 301c can be configured in the form of spheres or half-domes. In some implementations, one or more of the metal layers 301a, 301b and 301c configured in the form of spheres or half-domes can coalesce into a continuous film during or following the fabrication process.

In various implementations, the different metal layers 301a, 301b, and 301c can have a ratio of the real part (n) of the refractive index of the different metal layers 301a, 301b, and 301c to the imaginary part (k) of the refractive index that is greater than or equal to about 0.01 and less than or equal to about 0.2. For example, the different metal layers 301a, 301b, and 301c can comprise metals that have an n/k value between about 0.01 and about 0.2, between about 0.015 and about 0.2, between about 0.01 and about 0.15, between about 0.01 and about 0.1, between about 0.1 and about 0.2, or any value in a range or sub-range defined by any these values. As another example, the different metal layers 301a, 301b, and 301c can comprise metals that have an n/k value of about 0.0166. As yet another example, the different metal layers 301a, 301b, and 301c can comprise metals that have an n/k value of about 0.158.

The different dielectric layers 303a and 303b can have a thickness between about 40 nm and about 850 nm. For example, the different dielectric layers 303a and 303b can have a thickness greater than or equal to about 50 nm and less than or equal to about 800 nm, greater than or equal to about 75 nm and less than or equal to about 750 nm, greater than or equal to about 100 nm and less than or equal to about 700 nm, greater than or equal to about 150 nm and less than or equal to about 650 nm, greater than or equal to about 200 nm and less than or equal to about 600 nm, greater than or equal to about 250 nm and less than or equal to about 550 nm, greater than or equal to about 300 nm and less than or equal to about 500 nm, greater than or equal to about 350 nm and less than or equal to about 450 nm, or a thickness having a value in any range/sub-range defined by any of these values.

In various implementations, the different dielectric layers 303a and 303b can have the same thickness. However, in some implementations, the different dielectric layers 303a and 303b can have different thickness. For example, the thickness of one of the dielectric layers 303a or 303b can be in a range between about 1.5 times-10 times the thickness of another one of the dielectric layers 303a or 303b.

The different dielectric layers 303a and 303b can have a refractive index between about 1.38 and about 2.4. For example, the refractive index of the different dielectric layers 303a and 303b can be greater than or equal to about 1.38 and less than or equal to about 2.4, greater than or equal to about 1.5 and less than or equal to about 2.3, greater than or equal to about 1.6 and less than or equal to about 2.2, greater than or equal to about 1.7 and less than or equal to about 2.1, greater than or equal to about 1.8 and less than or equal to about 2.1, greater than or equal to about 1.9 and less than or equal to about 2.0, or any values in a range/sub-range defined by any of these values.

The imaginary part (k) of the refractive index of the different dielectric layers 303a and 303b can be sufficiently low such that the different dielectric layers 303a and 303b are substantially transparent to light in the visible spectral range. For example the imaginary part (k) of the refractive index of the different dielectric layers 303a and 303b can be equal to zero (0) or be close to zero (0). In various implementations, the imaginary part (k) of the refractive index of the different dielectric layers 303a and 303b can be sufficiently low such that very little of the incident visible light is absorbed by the different dielectric layers 303a and 303b. For example, in various implementations the composition and the thickness of the different dielectric layers 303a and 303b can be configured such that less than about 5% of the incident visible light is absorbed by the different dielectric layers 303a and 303b. In various implementations, the different dielectric layers can comprise a material that is water white.

In some implementations, the dielectric layers 303a and 303b can comprise materials including but not limited to silicon dioxide ($SiO_2$), magnesium fluoride ($MgF_2$), zirconium dioxide ($ZrO_2$), ceric oxide ($CeO_2$), titanium dioxide ($TiO_2$), tantalum pentoxide ($Ta_2O_5$), yttrium oxide ($Y_2O_3$), indium oxide ($In_2O_3$), tin oxide ($SnO_2$), indium tin oxide (ITO), aluminum oxide ($Al_2O_3$), or tungsten trioxide ($WO_3$), organic polymer layers or combinations thereof.

Various implementations of the optical structure 300a can comprise optional passivation layers (or protective layers or "flash" layers) 305a and 305b disposed on a side of the metal layers 301a and 301c that is opposite to the side facing the dielectric layers 303a and 303b. Metal surfaces can oxidize and/or corrode, which may affect optical performance. As an example, when exposed silver oxidizes and corrodes, silver sulfide can form and compromise optical performance. Finely divided metal particles, particulates, or pieces may also spontaneously combust under the right conditions. For example, fires may occur in a coating machine when the machine is brought up to atmosphere. Explosions can also occur during the milling process, e.g., when milling is performed in air, using a cyclone type classifier. The passivation layers 305a and 305b can provide protective layers to enhance durability, potentially reduce or prevent oxidation and/or corrosion of the metal layers 301a and 301b, and allow possibly for safer processing.

Various embodiments of the optical structure 300a can be configured as platelets that are suspended in an ink medium to form a pigment. In some such embodiments, the passivation layers 305a and 305b can comprise a material having a refractive index that is matched (e.g., substantially equal or equal) to the refractive index of the ink medium. By choosing the material of the passivation layers 305a and 305b to have a refractive index that is matched (e.g., substantially equal or equal) to the refractive index of the ink medium, the passivation layers 305a and 305b can be configured to reduce or prevent oxidation or corrosion of the metal layers 301a and 301b without affecting or substantially affecting the overall optical properties of the optical structure 300a. For example, silicon dioxide can be used to closely or substantially optically match the ink medium (e.g., a medium comprising resin). Various implementations of the optical structure 300a can be configured as films, foils, threads, laminates, hot stamps, window patches, labels, etc. In some instances, the passivation layers 305a and 305b can comprise a material having a high refractive index (e.g., greater than or equal to about 1.65). In some implementations, zinc sulfide can be used outside of a non-shifting optical stack with negligible effect on the optical performance in either reflection or transmission.

The passivation layers 305a and 305b can have a thickness in a range from about 2 nm to about 500 nm. For example, the thickness of the passivation layers 305a and 305b can be greater than or equal to about 2 nm and less than or equal to about 10 nm, greater than or equal to about 2 nm and less than or equal to about 20 nm, greater than or equal to about 5 nm and less than or equal to about 10 nm, greater than or equal to about 5 nm and less than or equal to about 20 nm, greater than or equal to about 10 nm and less than or equal to about 20 nm, greater than or equal to about 20 nm and less than or equal to about 40 nm, greater than or equal to about 30 nm and less than or equal to about 50 nm, greater than or equal to about 40 nm and less than or equal to about 60 nm, greater than or equal to about 50 nm and less than or equal to about 70 nm, greater than or equal to about 60 nm and less than or equal to about 80 nm, greater than or equal to about 70 nm and less than or equal to about 90 nm, greater than or equal to about 80 nm and less than or equal to about 100 nm, greater than or equal to about 90 nm and less than or equal to about 110 nm, greater than or equal to about 100 nm and less than or equal to about 150 nm. greater than or equal to about 125 nm and less than or equal to about 175 nm, greater than or equal to about 150 nm and less than or equal to about 200 nm, greater than or equal to about 175 nm and less than or equal to about 225 nm, greater than or equal to about 200 nm and less than or equal to about 250 nm, greater than or equal to about 225 nm and less than or equal to about 275 nm, greater than or equal to about 300 nm and less than or equal to about 350 nm, greater than or equal to about 325 nm and less than or equal to about 375 nm, greater than or equal to about 350 nm and less than or equal to about 400 nm, greater than or equal to about 400 nm and less than or equal to about 450 nm, greater than or equal to about 450 nm and less than or equal to about 500 nm, or any thickness in any range/sub-range defined by any of these values.

In some instances, the passivation layers 305a and 305b can comprise a material having a refractive index between about 1.45 and about 1.6. For example, the passivation layers 305a and 305b can comprise a material having a refractive index greater than or equal to about 1.45 and less than or equal to about 1.55, greater than or equal to about 1.48 and less than or equal to about 1.57, greater than or equal to about 1.5 and less than or equal to about 1.58, greater than or equal to about 1.53 and less than or equal to about 1.6, or any value in any range/sub-range defined by any of these values. In various implementations, the passivation layers 305a and 305b can comprise silicon dioxide, a transparent dielectric material or a ultraviolet (UV) curable polymer.

In some instances, the passivation layers 305a and 305b can comprise a material having an refractive index greater than or equal to about 1.65. In various implementations, the passivation layers 305a and 305b can comprise $ZrO_2$, $TiO_2$, ZnS, ITO (indium tin oxide), $CeO_2$ or $Ta_2O_3$.

Many implementations of the optical structure 300a may comprise no more than three metal layers 301a, 301b, and 301c and no more than two dielectric layers 303a and 303b. For example, various implementations of the optical structure 300a may comprise exactly three metal layers 301a, 301b, and 301c and exactly two dielectric layers 303a and 303b. Some such implementations of the optical structure 300a can have a thickness that is less than or equal to about 2.5 microns.

Fabricating the optical structure 300a can include providing a first layer 303a comprising dielectric material and depositing a layer of metal 301b on one side of the first dielectric layer 303a. A second layer 303b comprising dielectric material can be disposed over the metal layer 301b. A layer of metal 301a can be further disposed over the side of the first dielectric layer 303a that is opposite the side of the metal layer 301b. A layer of metal 301c can be further disposed over the side of the second dielectric layer 303b that is opposite the side of the metal layer 301b. The metal layers 301a, 301b, and 301c can be deposited as a continuous thin film, as small spheres, metallic clusters or island like structures. The first dielectric layer 303a can be disposed and/or formed over a support. The support is also referred to herein as a base layer. The support can comprise a carrier. The support can comprise a sheet such as a web. The support can comprise a substrate. The substrate can be a continuous sheet of PET, acrylate, or other polymeric web structure. The support can comprise a non-woven fabric. Non-woven fabrics can be flat, porous sheets comprising fibers. In some implementations, the non-woven fabric can be configured as a sheet or a web structure that is bonded together by entangling fiber or filaments mechanically, thermally, or chemically. In some implementations, the non-woven fabric can comprise perforated films. In some implementations, the non-woven fabric can comprise synthetic fibers such as polypropylene or polyester or fiber glass.

The support can be coated with a release layer comprising a release agent. The release agent can be soluble in solvent or water. The release layer can be polyvinyl alcohol, which is water soluble or an acrylate which is soluble in a solvent. The release layer can comprise a coating, such as, for example, salt (NaCl) or cryolite ($Na_3AlF_6$) deposited by evaporation before the layers of the optical structure are deposited/formed.

In some implementations using a support configured as a non-woven fabric, the non-woven fabric can be coated with a release layer. Such implementations can be dipped or immersed in a solvent or water that acts as a release agent to dissolve or remove the release layer. The release agent (e.g., the solvent or water) is configured to penetrate from a side of the non-woven fabric opposite the side on which the optical structure is disposed to facilitate release of the optical structure instead of having to penetrate through the optical structure.

One method of fabricating the optical structure 300a shown in FIG. 24A utilizes a vacuum roll coater. In this method, the optical structure 300a is fabricated by depositing the metallic and dielectric materials of the various layers on a web using vacuum deposition methods, such as, for example, electron beam (e-beam) deposition, sputtering and/or resistive heating. The web can comprise a polymeric material, such as for example polyethylene terephthalate (PET) or acrylate. If the optical structure is configured to be used as a foil or a film, then the various layers of the optical structure 300a can be deposited directly on a surface of the web. However, in other implementations, a release coating can be applied to the surface of the web prior to the vacuum deposition of the various layers. For example, if the optical structure 300a is configured to be used as a pigment, then the optical structure can be applied on the release coating. In some implementations, the various layers of the optical stack 300a can be deposited in series. For example, in certain implementations, the metal layer 301c can be deposited first followed by the dielectric layer 303b, followed by the metal layer 301b, followed by the dielectric layer 303a, followed by the metal layer 301a. In various implementations of the optical structure can include the passivation layers 305a and 305b, for example, the passivation layer 305b can be deposited prior to the deposition metal layer 301c and the passivation layer 305a can be deposited over the metal layer 301a.

In some implementations, the optical structure 300a fabricated using the vacuum roll coater can be released from the web by immersing the web comprising the release layer and the deposited optical structure in a bath of a solvent comprising salt (NaCl) or cryolite ($Na_3AlF_6$) to remove or dissolve the release layer and release the optical structure 300a. In some cases, the optical structure 300a can break or shatter in pieces having various shapes and sizes when released from the web. The solvent can be removed and the various pieces of the optical structure 300a can be dried and subsequently milled to form platelets having desired size and thickness for use as a pigment (e.g., in Intaglio ink).

Figure 24B:
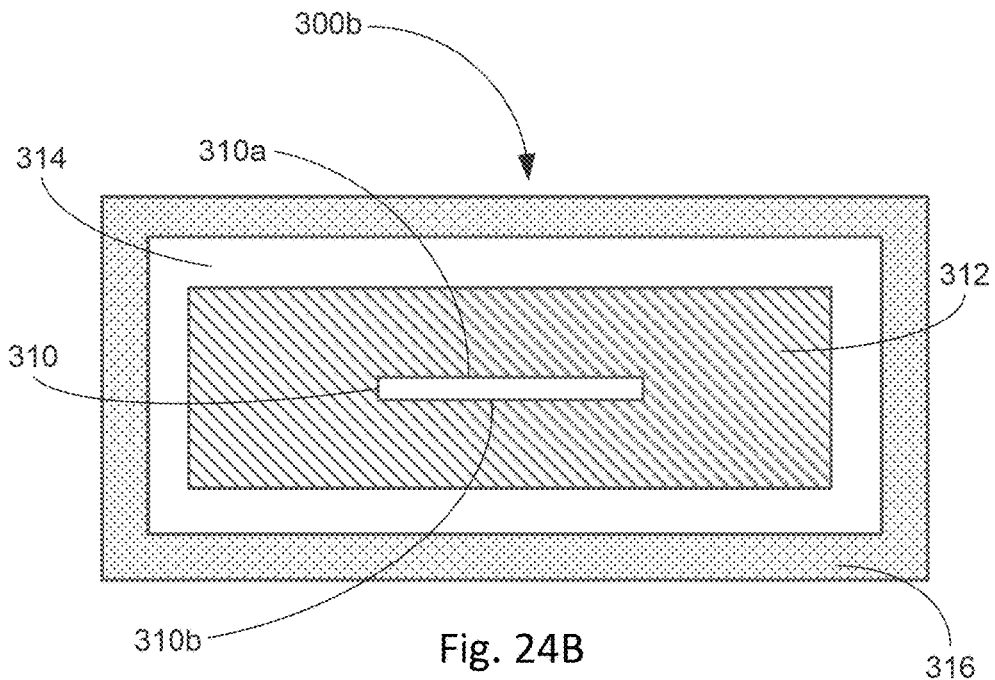
FIG. 24B illustrates a cross-sectional view of an implementation of an optical structure including a first region comprising a first metallic material which is surrounded by a second region comprising a dielectric material which in turn is surrounded by a third region comprising a second metallic material.

FIG. 24B illustrates a cross-sectional view of an implementation of an optical structure 300b including a first region 310 comprising a first metallic material which is surrounded by a second region 312 comprising a dielectric material. The second region 312 comprising the dielectric material can be surrounded by a third region 314 comprising a second metallic material. The third region 314 can be optionally surrounded by a fourth region 316 comprising a dielectric material having a refractive index between about 1.45 and about 1.6 configured as a passivation region to reduce or prevent oxidation of the second metallic material. Such a structure can be considered to have three metal layers, two dielectric layers and two optional passivation layers as noted from the cross-sectional view shown in FIG. 24B. The optical structure 300b can be fabricated by providing a substrate comprising the first metallic material and disposing the dielectric material on the exposed surfaces of the substrate using physical and/or chemical deposition methods. The exposed surfaces of the dielectric material can be covered by the second metallic material using physical and/or chemical deposition methods. For example, the optical structure 300b can be fabricated using various methods described in U.S. Pat. No. 6,524,381 which is incorporated herein by reference in its entirety.

The chemical composition and various physical characteristics (e.g., thickness) of the first region 310 can be similar to the chemical composition and various physical characteristics (e.g., thickness) of the metal layer 301b discussed above. The chemical composition and various physical characteristics (e.g., thickness) of the second region 312 can be similar to the chemical composition and various physical characteristics (e.g., thickness) of the dielectric layers 303a and 303b discussed above. The chemical composition and various physical characteristics (e.g., thickness) of the third region 314 can be similar to the chemical composition and various physical characteristics (e.g., thickness) of the metal layers 301a and 301c discussed above. The chemical composition and various physical characteristics (e.g., thickness) of the fourth region 316 can be similar to the chemical composition and various physical characteristics (e.g., thickness) of the passivation layers 305a and 305b discussed above.

Accordingly, in various implementations, the first region 310 can comprise silver, silver alloys, gold and/or gold alloys. The thickness of the first region 310 can be between about 3 nm and about 100 nm. The second region 312 can comprise materials including but not limited to silicon dioxide ($SiO_2$), magnesium fluoride ($MgF_2$), zirconium dioxide ($ZrO_2$), ceric oxide ($CeO_2$), titanium dioxide ($TiO_2$), tantalum pentoxide ($Ta_2O_5$), yttrium oxide ($Y_2O_3$), indium oxide ($In_2O_3$), tin oxide ($SnO_2$), indium tin oxide (ITO), aluminum oxide ($Al_2O_3$), or tungsten trioxide ($WO_3$), or organic polymer layers. or combinations thereof. The second region 312 can extend to a height between about 50 nm and 800 nm from an outermost surface of the first region 310. The third region 314 can comprise silver, silver alloys, gold and/or gold alloys and extend to a height between about 3 nm and about 100 nm from an outermost surface of the first region 310. The fourth region 316 can comprise a dielectric material having a refractive index between about 1.45 and about 1.6 and extend to a height between about 10 nm and about 100 nm from an outermost surface of the third region 314.

In various implementations, the first region 310 can be configured as a slab, flake, a sphere, spheroid, ellipsoid, disc, or any other 3-dimensional shape enclosing a volume. The first region 310 may have a regular or irregular shape. For example, as shown in FIG. 24B, the first region 310 can be configured as a slab (e.g., a slab having nanometer scale thickness and micrometer scale lateral dimensions) having two major surfaces and one or more edge surfaces disposed between the two major surfaces. In some implementations, a number of edge surfaces may be disposed between the two major surfaces of the slab. The number of edge surfaces may, for example, be one, two, three, four, five, six, seven, eight, nine, ten, twelve, twenty, thirty, fifty, etc. or in any range between any of these values. Values outside these ranges are also possible. The major surfaces of the slab can have a variety of shapes. For example, one or both of the major surfaces 310a and 310b can have a rectilinear or curvilinear shape in certain implementations. The shape may be regular or irregular in certain implementations. For example, one or both of the major surfaces can have a square shape, a rectangular shape, a circular shape, an oval shape, an elliptical shape, pentagonal shape, a hexagonal shape, an octagonal shape or any polygonal shape. In various implementations, one or both of the major surface can have jagged edges such that the lateral dimensions (e.g., length or width) of the one or both of the major surface varies across the area of the one or both of the major surface. Other configurations are also possible. Additionally, other shapes are also possible. One or more of the edge surfaces can have a variety of shapes (e.g., as viewed from the side), such as, for example, a square shape, a rectangular shape, an oval shape, an elliptical shape, a pentagonal shape, a hexagonal shape, an octagonal shape or any a polygonal shape.

The shape of the one or more of the edge surfaces (e.g., as viewed from the side) can be rectilinear or curvilinear in certain implementations. The shape may be regular or irregular in certain implementations. Similarly, the cross-section through the first region 310 parallel to one of the major surfaces, can be rectilinear or curvilinear in certain implementations and can be regular or irregular in certain implementations. For example, the cross-section can have a square shape, a rectangular shape, a circular shape, an oval shape, an elliptical shape, pentagonal shape, a hexagonal shape, an octagonal shape or any a polygonal shape. Other shapes are also possible. Likewise, the cross-section through the first region 310 perpendicular to one of the major surfaces, can be rectilinear or curvilinear in certain implementations and can be regular or irregular implementations. For example, the cross-section can have a square shape, a rectangular shape, a circular shape, an oval shape, an elliptical shape, pentagonal shape, a hexagonal shape, an octagonal shape or any a polygonal shape. Other shapes are also possible. In various implementations, an area, a length and/or a width of the major surfaces of the first region 310 can be greater than or equal to about 2, 3, 4, 5, 6, 8, or 10 times the thickness of the first region 310 and less than or equal to about 50 times the thickness of the first region 310, or any value in a range/sub-range between any of these values. Accordingly, the first region 310 can have a large aspect ratio. Other sizes and shapes, however, are possible.

The optical structure 300a and 300b can be configured as a film or a foil by disposing over a substrate or other support layer having a thickness, for example, greater than or equal to about 10 microns and less than or equal to about 25 microns. For example, a substrate or support layer can have a thickness greater than or equal to 12 microns and less than or equal to 22.5 microns, greater than or equal to 15 microns and less than or equal to about 20 microns. The substrate or support layer can comprise materials, such as, for example, polyethylene terephthalate (PET), acrylate, polyester, polyethylene, polypropylene, or polycarbonate. The support or support layer itself can be dissolvable. The support or support layer, for example, can also comprise polyvinyl alcohol, which can be dissolved, for example, in water. Accordingly, instead of using a release layer on a insoluble support web, the support web itself may comprise soluble material. Accordingly, the support or support layer can be dissolved leaving the optical coating remaining. The optical structure 300a configured as a film or a foil can be encapsulated with a polymer, such as, for example a UV cured polymer.

Instead of a film or a foil, the optical structure 300a or 300b can be divided into platelets having a size that is suitable for a pigment or printing ink. Platelets having a size that is suitable for a pigment or printing ink can have an length, and/or width that is about 5-10 times, 10-20 times or 30-40 times the thickness of the platelet, in some implementations. Accordingly, the platelets can have a thickness of about 1 micron, and/or can have a width and/or a length that is between approximately 5 micron and about 50 microns. For example, the width and/or a length can be greater than or equal to about 5 micron and less than or equal to about 15 microns, greater than or equal to about 5 microns and less than or equal to about 10 microns, greater than or equal to about 5 micron and less than or equal to about 40 microns, greater than or equal to about 5 microns and less than or equal to about 20 microns, or any value in the ranges/sub-ranges defined by these values. Platelets having a length and/or width that is less than about 5-10 times the thickness of the platelet, such as, for example having a length and/or width that is equal to the thickness of the platelet can be oriented along their edges in the printing ink or pigment. This can be disadvantageous in some implementations since pigment or printing ink comprising platelets that are oriented along their edges may not exhibit the desired colors in reflection and transmission modes. Dimensions such as, thicknesses, lengths and/or widths outside these ranges, however, are also possible.

In some implementations, the optical structure 300a or 300b can be fractured, cut, diced or otherwise separated to obtain the separate, for example, pieces or platelets. These pieces or platelets can have micron scale sizes in certain embodiments. In some implementations, the obtained platelets may be surrounded by an encapsulating layer similar to the encapsulating layer 21 discussed above. For example, the optical structures 300a and 300b including the passivation layers 305a and 305b can further comprise an encapsulating layer similar to the encapsulating layer 21 discussed above. In some implementations, the encapsulating layer can comprise a moisture resistant material, such as, for example silicon dioxide. The encapsulating layer can also comprise silica spheres similar to silica spheres 22 and 23 discussed above. The encapsulating layer can additionally and/or alternatively reduce the occurrence of delamination of the different layers of the optical structure 300a/300b. The optical structures 300a/300b with the surrounding encapsulating layer, which may potentially comprise the silica spheres, can be configured as platelets that are suitable for a pigment or printing ink. The silica spheres of the encapsulating layer can help prevent the platelets from adhering to one another. For example, in some cases, without the spheres the platelets may stick together. The silica spheres can also prevent or reduce the likelihood of the platelets sticking to the print rollers in the printing machine. One method of surrounding the optical structure 300a/300b with the encapsulating layer comprising silica spheres can rely on sol-gel technology using tetraethylorthosilicate (TEOS) discussed above. Other processes, however, may be employed.

The pigment can be formed by a plurality of optical structures 300a/300b configured as platelets. Such a pigment may be color shifting (e.g., the color reflected and/or transmitted changes with angle of view or angle of incidence of light), in some cases. In some embodiments, non-color shifting pigment or dye may be mixed with the pigment. In some embodiments other materials may be included with the plurality of optical structures 300a/300b configured as platelets to form the pigment. Although some of the resultant pigments discussed herein can provide color shift with change in viewing angle or angle of incidence of light, pigments that do not exhibit color shift with change in viewing angle or angle of incidence of light or that produce very little color shift with change in viewing angle or angle of incidence of light are also contemplated.

In some embodiments, the plurality of optical structures 300a/300b configured as platelets can be added to a medium such as a polymer (e.g., a polymeric resin) to form a dichroic ink, a pigment, or paint as discussed above with reference to FIG. 12B-1. In some implementations, the medium can be an organic resin. The refractive index of the medium can be in a range between about 1.4 and about 1.6 (e.g. 1.5). The medium can comprise an optical material that is substantially clear. The medium can be substantially transparent to visible light. The platelets can be suspended in the medium (e.g., polymer). The platelets can be randomly oriented in the medium (e.g., polymer) as discussed above with reference to FIG. 12B-1. During the printing process, in some cases, the individual platelets (e.g., the majority of the platelets) can be oriented parallel to the surface of the object (e.g., paper) to which the pigment, the paint, or the dichroic ink is being applied as a result of, for example, the printing action, gravity, and/or surface tension of the normal drying process of the pigment, the paint, or the dichroic ink as discussed above with reference to FIG. 12B-2. The medium can comprise material including but not limited to acrylic melamine, urethanes, polyesters, vinyl resins, acrylates, methacrylate, ABS resins, epoxies, styrenes and formulations based on alkyd resins and mixtures thereof. In some implementations, the passivation layer 305a and 305b, the encapsulating layer and/or the silica balls can have a refractive index that closely matches the refractive index of the medium, e.g., polymer, in which the optical structures 300a/300b configured as platelets are suspended such that the passivation layers 305a/305b, the encapsulating layer and/or the silica balls do not adversely affect the optical performance of the pigment, the paint, or the dichroic ink in the medium.

In various implementations, the optical structures 300a/300b configured as platelets need not be surrounded by an encapsulating layer. In such implementations, one or more platelets that are not encapsulated by an encapsulating layer can be added or mixed with an ink or a pigment medium (e.g., varnish, polymeric resin, etc.) to obtain a dichroic ink or pigment as discussed above. In various implementations, the dichroic ink or pigment can comprise a plurality of platelets. The optical structures 300a/300b that are configured as the plurality of platelets can have different distributions of shapes, sizes, thicknesses and/or aspect ratios. The optical structures 300a/300b that are configured as the plurality of platelets can also have different optical properties. For example, the optical structures 300a/300b that are configured as the plurality of platelets can also have different color properties.

In various implementations, a silane coupling agent can be bonded to the encapsulating layer of the optical structures 300a/300b as discussed above with reference to FIG. 13. As discussed above, bonding of the silane coupling agent to the encapsulating layer can occur through a hydrolyzing reaction. The silane coupling agent can bind to the polymer (e.g., polymeric resin) of the printing ink or paint medium so that the heterogeneous mixture of pigment and the polymer do not separate during the printing process and substantially function in much the same way as a homogeneous medium would function. The printing ink or paint medium can comprise material including but not limited to acrylic melamine, urethanes, polyesters, vinyl resins, acrylates, methacrylate, ABS resins, epoxies, styrenes and formulations based on alkyd resins and mixtures thereof. The silane coupling agents used can be similar to the silane coupling agents sold by Gelest Company (Morristown, PA USA). In some implementations, the silane coupling agent can comprise a hydrolyzable group, such as, for example, an alkoxy, an acyloxy, a halogen or an amine. Following a hydrolyzing reaction (e.g., hydrolysis), a reactive silanol group is formed, which can condense with other silanol groups, for example, with the silica spheres of the encapsulating layer or the encapsulating layer of silica to form siloxane linkages. The other end of the silane coupling agent comprises the R-group. The R-group can comprise various reactive compounds including but not limited to compounds with double bonds, isocyanate or amino acid moieties. Reaction of the double bond via free radical chemistry can form bonds with the ink polymer(s) such as those based on acrylates, methacrylates or polyesters based resins. For example, isocyanate functional silanes, alkanolamine functional silanes and aminosilanes can form urethane linkages.

Without any loss of generality, in various implementations of the optical structure 300a/300b configured as a platelet that do not comprise the encapsulating layer, the silane coupling agent can be bonded to one or both of the passivation layers 305a/305b comprising a dielectric material (e.g., TiO$_2$) suitable to be bonded with the silane coupling agent.

An ink comprising various implementations of the optical structure 300a/300b configured as platelets can be applied to a substrate (e.g., a polyester web) and dried. In some implementations, the substrate comprising the ink can be cut in strips to form a security thread having the optical characteristics of the various implementations of the optical structure 300a/300b. For example, depending on the thickness and composition of the various layers of the various implementations of the optical structure 300a/300b included in the ink, the ink can produce a color in transmission mode and a different color in reflection mode. As discussed above, in some implementations, the color in the transmission mode can be a complementary color of the color in the reflection mode. Additionally, in some implementations, the color in the transmission mode and the reflection mode can vary with viewing angle. The security thread can be integrated with products and/or packaging to improve security of the products and/or packaging. In some implementations, the substrate comprising the ink including various implementations of the optical structure 300a/300b can be configured as a laminate and adhered to a security document (e.g., a banknote). In some implementations, the ink comprising various implementations of the optical structure 300a/300b applied to a releasable carrier web can be configured as a hot stamp having the optical characteristics of the various implementations of the optical structure 300a/300b.

Without any loss of generality, the optical structure 300a/300b can be considered as an interference stack or cavity. Ambient light incident on the surface of the optical structure 300a/300b is partially reflected from the various layers of the optical structure 300a/300b and partially transmitted through the various layers of the optical structure 300a/300b. Some wavelengths of the ambient light reflected from the various layers may interfere constructively and some other wavelengths of the ambient light reflected from the various layers may interfere destructively. Similarly, some wavelengths of light transmitted through the various layers may interfere constructively and some other wavelengths of the ambient light transmitted through the various layers may interfere destructively. As a result of which, the optical structure 300a/300b appears colored when viewed in transmission and reflection mode. In general, the color and the intensity of light reflected by and transmitted through the optical structure 300a/300b can depend on the thickness and the material of the various layers of the optical structure 300a/300b. By changing the material and the thickness of the various layers, the color and intensity of light reflected by and transmitted through the optical structure 300a/300b can be varied.

Without subscribing to any particular scientific theory about the operation of the optical structures 300a/300b, in general, the material and the thickness of the various layers can be configured such that some or all of the ambient light reflected by the various layers interfere such that a node in the field occurs at one or more of the three metal layers 301a, 301b, and 301c for some of the wavelengths of the ambient light. For example, some or all of the ambient light reflected by the various layers interfere such that a node in the field occurs at all the three metal layers 301a, 301b, and 301c for some of the wavelengths of the ambient light. Again, without subscribing to a particular scientific theory, based on the thickness of the three metal layers 301a, 301b, and 301c and the dielectric layers 303a and 303b, a portion of the incident light may be transmitted through the optical structure 300a/300b as a result of the phenomenon of "induced transmittance" or "induced transmission". The reflection and transmission spectral characteristics are discussed below.

Figure 25A:
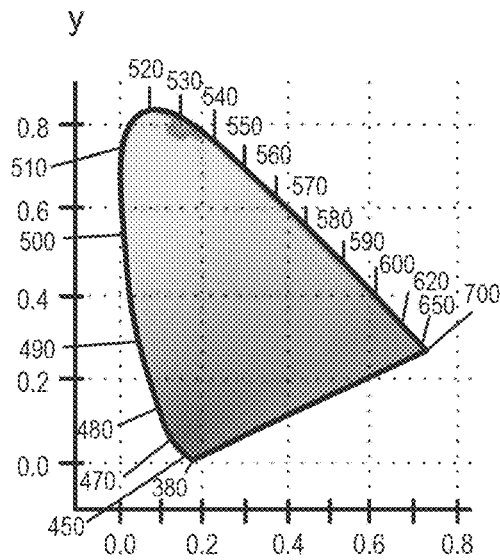
FIG. 25A is a CIE 1931 color space chromaticity diagram showing the x and y chromaticity coordinates of light transmitted through a first example of the optical structure shown in FIG. 24A or 24B for different viewing angles between 0 degrees and 40 degrees with respect to a normal to a surface of the optical structure.
Figure 25B:
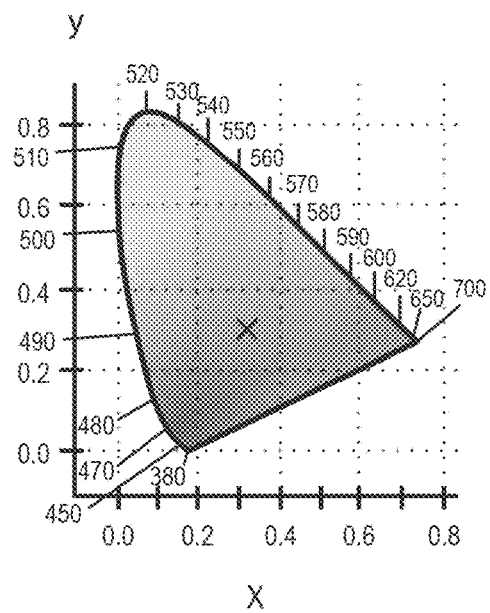
FIG. 25B is a CIE 1931 color space chromaticity diagram showing the x and y chromaticity coordinates of light reflected from the first example of the optical structure shown in FIG. 24A or 24B for different viewing angles between 0 degrees and 40 degrees with respect to a normal to a surface of the optical structure.

FIG. 25A is a CIE 1931 color space chromaticity diagram showing the x and y chromaticity coordinates of light transmitted through a first example of the optical structure 300a or 300b for different viewing angles between 0 degrees and 40 degrees with respect to a normal to a surface of the optical structure 300a or 300b. FIG. 25B is a CIE 1931 color space chromaticity diagram showing the x and y chromaticity coordinates of light reflected from the first example of the optical structure 300a or 300b for different viewing angles between 0 degrees and 40 degrees with respect to a normal to a surface of the optical structure 300a or 300b. The first example of the optical structure 300a or 300b comprises a layer of silver (Ag) (corresponding to the layer 301b of FIG. 24A or the region 310 of FIG. 24B) having a thickness of about 100 nm surrounded by two layers of a dielectric material comprising zinc sulfide (ZnS) (corresponding to the layers 303a and 303b of FIG. 24A or the region 312 of FIG. 24B) having an individual thickness of about 66 nm. The first example further comprises two additional silver layers disposed over the two dielectric layers (corresponding to the layers 301a and 301c of FIG. 24A or the region 314 of FIG. 24B) having an individual thickness of about 50 nm. To obtain the chromaticity of x and y chromaticity coordinates of light reflected from and transmitted through the first example of the optical structure 300a or 300b, the optical structure 300a or 300b is encapsulated in a SiO$_2$ matrix, which is used to simulate the printing medium or ink which has a similar refractive index.

As noted from FIGS. 25A and 25B, the first example of the optical structure 300a or 300b appears in different shades of green when viewed in the transmission mode at different viewing angles between 0 degrees and 40 degrees with respect to a normal to a surface of the optical structure 300a or 300b and appears greyish purple when viewed in the reflection mode at different viewing angles between 0 degrees and 40 degrees with respect to a normal to a surface of the optical structure 300a or 300b. The color in the transmission mode and the color in the reflection mode are complementary to each other. It is observed from FIG. 25B that the color in the reflection mode does not vary significantly when viewed in the reflection mode at different viewing angles between 0 degrees and 40 degrees with respect to a normal to a surface of the optical structure 300a or 300b. It is observed from FIG. 25A that there is a slight variation of the color in the transmission mode when viewed in the transmission mode at different viewing angles between 0 degrees and 40 degrees with respect to a normal to a surface of the optical structure 300a or 300b.

Figure 25C:
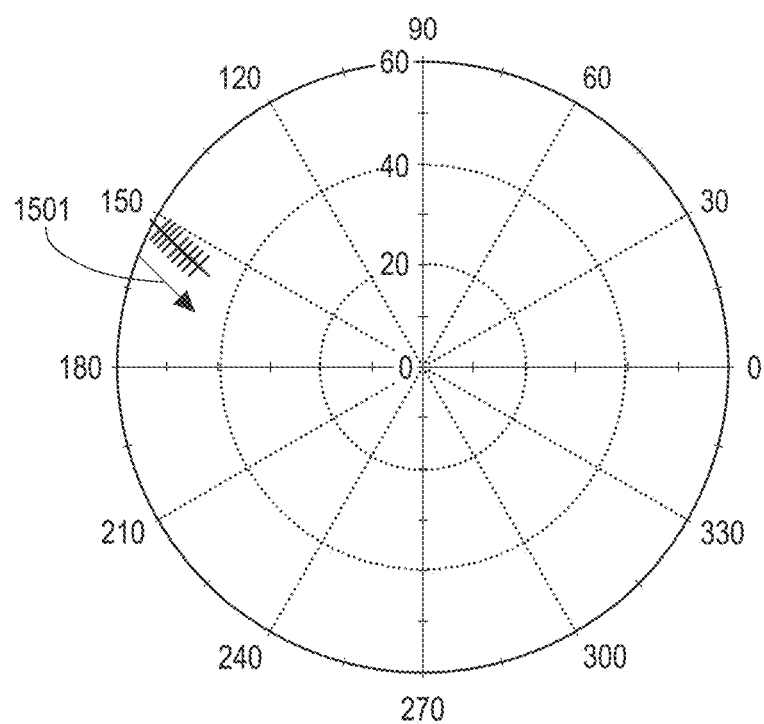
FIG. 25C illustrates the a*b* values in the CIE L*a*b* color space when the first example of the optical structure shown in FIG. 24A or 24B is viewed in the transmission mode at different viewing angles between 0 degrees and 40 degrees with respect to the normal to the surface of the first example of the optical structure.

FIG. 25C illustrates the a*b* values in the CIE L*a*b* color space when the first example of the optical structure 300a/300b is viewed in the transmission mode at different viewing angles between 0 degrees and 40 degrees with respect to the normal to the surface of the first example of the optical structure 300a/300b. As the viewing angle increases the color of the first example of the optical structure 300a/300b in the transmission mode shifts in the direction of the arrow 1501. For example, the color of the first example in the transmission mode can have a lightness (L*) value between approximately 12.5 and approximately 17.0 for different viewing angles between 0 degrees and 40 degrees with respect to the normal to the surface of the first example of the optical structure 300a/300b. The color of the first example in the transmission mode can have an (a*) value between approximately −44.5 and approximately −51.5 for different viewing angles between 0 degrees and 40 degrees with respect to the normal to the surface of the first example of the optical structure 300a/300b. The color of the first example in the transmission mode can have a (b*) value between approximately 20.5 and approximately 27.0 for different viewing angles between 0 degrees and 40 degrees with respect to the normal to the surface of the first example of the optical structure 300a/300b.

Figure 25D:
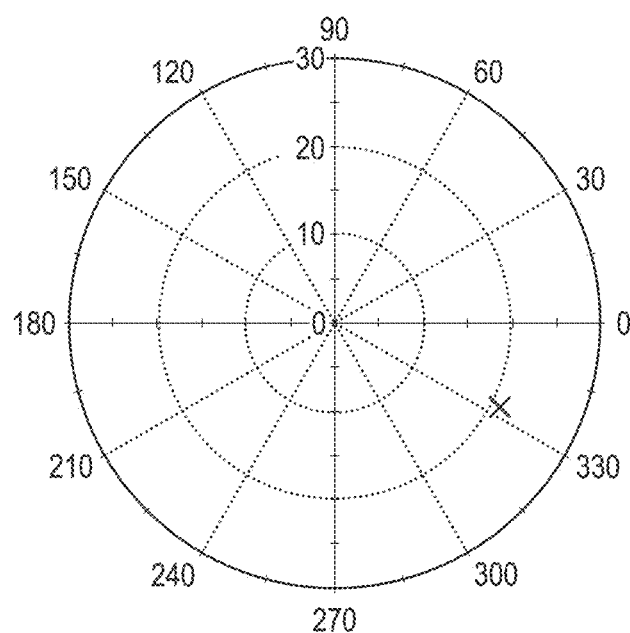
FIG. 25D illustrates the a*b* values in the CIE L*a*b* color space when the first example shown in FIG. 24A or 24B of the optical structure is viewed in the reflection mode at different viewing angles between 0 degrees and 40 degrees with respect to the normal to the surface of the first example of the optical structure.

FIG. 25D illustrates the a*b* values in the CIE L*a*b* color space when the first example of the optical structure 300a/300b is viewed in the reflection mode at different viewing angles between 0 degrees and 40 degrees with respect to the normal to the surface of the first example of the optical structure 300a/300b. It is noted that as the viewing angle increases the color of the first example of the optical structure 300a/300b in the reflection mode does not shift significantly. The color of the first example in the reflection mode can have a lightness (L*) value between approximately 92.7 and approximately 92.8 for different viewing angles between 0 degrees and 40 degrees with respect to the normal to the surface of the first example of the optical structure 300a/300b. The color of the first example in the reflection mode can have an (a*) value between approximately 18.0 and approximately 19.1 for different viewing angles between 0 degrees and 40 degrees with respect to the normal to the surface of the first example of the optical structure 300a/300b. The color of the first example in the reflection mode can have a (b*) value between approximately −8.7 and approximately −9.9 for different viewing angles between 0 degrees and 40 degrees with respect to the normal to the surface of the first example of the optical structure 300a/300b.

Figure 26A:
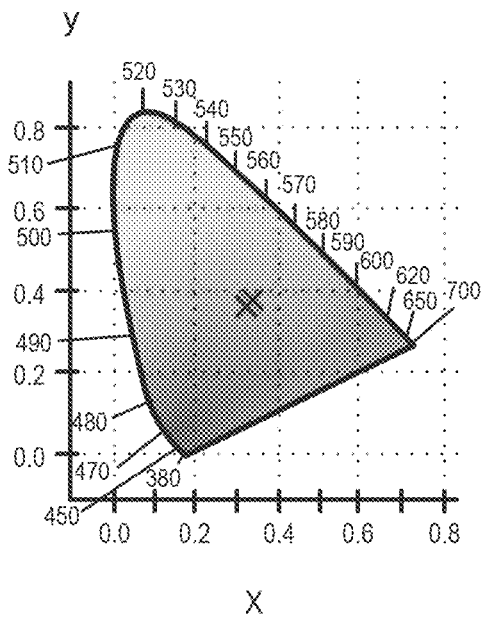
FIG. 26A is a CIE 1931 color space chromaticity diagram showing the x and y chromaticity coordinates of light transmitted through a second example of the optical structure shown in FIG. 24A or 24B for different viewing angles between 0 degrees and 40 degrees with respect to a normal to a surface of the optical structure.
Figure 26B:
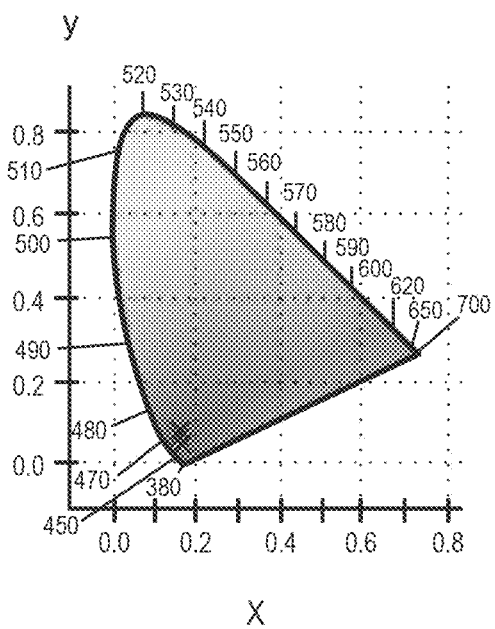
FIG. 26B is a CIE 1931 color space chromaticity diagram showing the x and y chromaticity coordinates of light reflected from the second example of the optical structure shown in FIG. 24A or 24B for different viewing angles between 0 degrees and 40 degrees with respect to a normal to a surface of the optical structure.

FIG. 26A is a CIE 1931 color space chromaticity diagram showing the x and y chromaticity coordinates of light transmitted through a second example of the optical structure 300a or 300b for different viewing angles between 0 degrees and 40 degrees with respect to a normal to a surface of the optical structure 300a or 300b. FIG. 26B is a CIE 1931 color space chromaticity diagram showing the x and y chromaticity coordinates of light reflected from the second example of the optical structure 300a or 300b for different viewing angles between 0 degrees and 40 degrees with respect to a normal to a surface of the optical structure 300a or 300b. The second example of the optical structure 300a or 300b comprises a layer of silver (Ag) (corresponding to the layer 301b of FIG. 24A or the region 310 of FIG. 24B) having a thickness of about 10 nm surrounded by two layers of a dielectric material comprising zinc sulfide (ZnS) (corresponding to the layers 303a and 303b of FIG. 24A or the region 312 of FIG. 24B) having an individual thickness of about 66 nm. The second example further comprises two additional silver layers disposed over the two dielectric layers (corresponding to the layers 301a and 301c of FIG. 24A or the region 314 of FIG. 24B) having an individual thickness of about 5 nm. To obtain the chromaticity of x and y chromaticity coordinates of light reflected from and transmitted through the second example of the optical structure 300a or 300b, the optical structure 300a or 300b is encapsulated in a SiO$_2$ matrix which is used to simulate the printing medium or ink which has a similar refractive index.

As noted from FIGS. 26A and 26B, the second example of the optical structure 300a or 300b appears greenish grey when viewed in the transmission mode at different viewing angles between 0 degrees and 40 degrees with respect to a normal to a surface of the optical structure 300a or 300b and appears blue or deep purple when viewed in the reflection mode at different viewing angles between 0 degrees and 40 degrees with respect to a normal to a surface of the optical structure 300a or 300b.

Figure 26C:
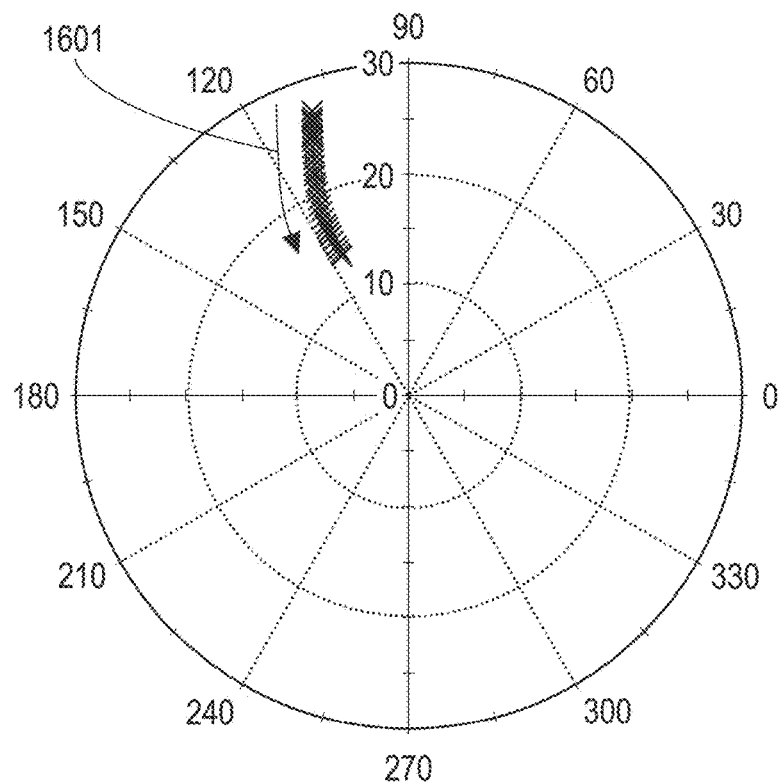
FIG. 26C illustrates the a*b* values in the CIE L*a*b* color space when the second example of the optical structure shown in FIG. 14A or 14B is viewed in the transmission mode at different viewing angles between 0 degrees and 40 degrees with respect to the normal to the surface of the second example of the optical structure.

FIG. 26C illustrates the a*b* values in the CIE L*a*b* color space when the second example of the optical structure 300a/300b is viewed in the transmission mode at different viewing angles between 0 degrees and 40 degrees with respect to the normal to the surface of the second example of the optical structure 300a/300b. As the viewing angle increases the color of the second example of the optical structure 300a/300b in the transmission mode shifts in the direction of the arrow 1601. The color of the second example in the transmission mode can have a lightness (L*) value between approximately 96.0 and approximately 98.5 for different viewing angles between 0 degrees and 40 degrees with respect to the normal to the surface of the second example of the optical structure 300a/300b. The color of the second example in the transmission mode can have an (a*) value between approximately −6.2 and approximately −9.0 for different viewing angles between 0 degrees and 40 degrees with respect to the normal to the surface of the second example of the optical structure 300a/300b. The color of the second example in the transmission mode can have a (b*) value between approximately 12.9 and approximately 25.7 for different viewing angles between 0 degrees and 40 degrees with respect to the normal to the surface of the second example of the optical structure 300a/300b.

Figure 26D:
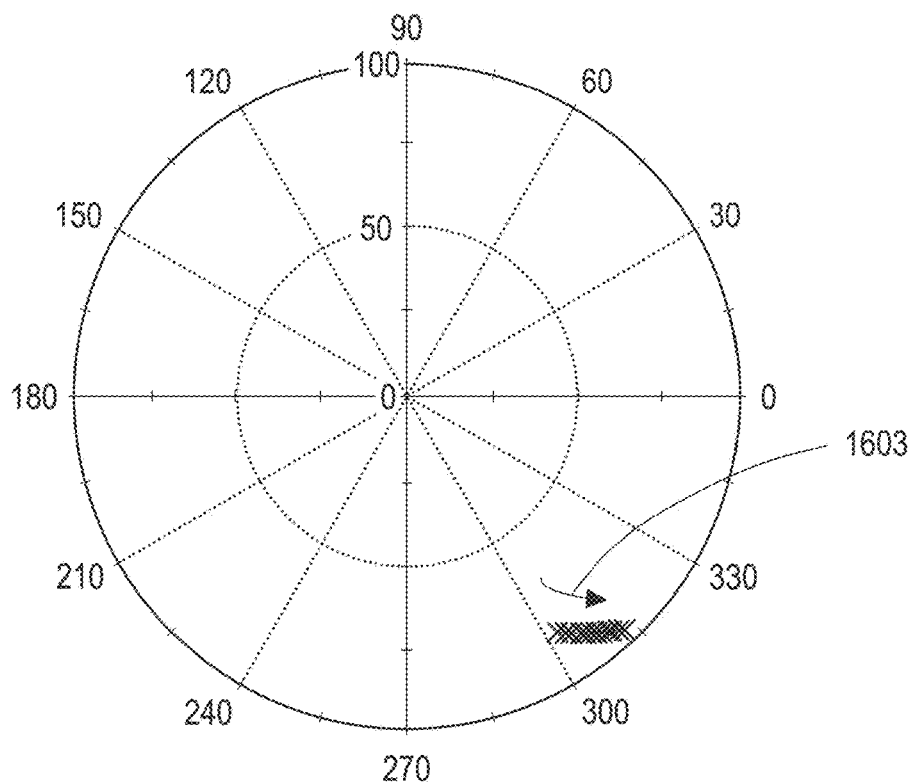
FIG. 26D illustrates the a*b* values in the CIE L*a*b* color space when the second example of the optical structure shown in FIG. 24A or 24B is viewed in the reflection mode at different viewing angles between 0 degrees and 40 degrees with respect to the normal to the surface of the second example of the optical structure.

FIG. 26D illustrates the a*b* values in the CIE L*a*b* color space when the second example of the optical structure 300a/300b is viewed in the reflection mode at different viewing angles between 0 degrees and 40 degrees with respect to the normal to the surface of the second example of the optical structure 300a/300b. As the viewing angle increases the color of the second example of the optical structure 300a/300b in the reflection mode shifts in the direction of the arrow 1603. The color of the second example in the reflection mode can have a lightness (L*) value between approximately 11.0 and approximately 26.5 for different viewing angles between 0 degrees and 40 degrees with respect to the normal to the surface of the second example of the optical structure 300a/300b. The color of the second example in the reflection mode can have an (a*) value between approximately 44.5 and approximately 63.8 for different viewing angles between 0 degrees and 40 degrees with respect to the normal to the surface of the second example of the optical structure 300a/300b. The color of the second example in the reflection mode can have a (b*) value between approximately −69.0 and approximately −72.0 for different viewing angles between 0 degrees and 40 degrees with respect to the normal to the surface of the second example of the optical structure 300a/300b.

Figure 27A:
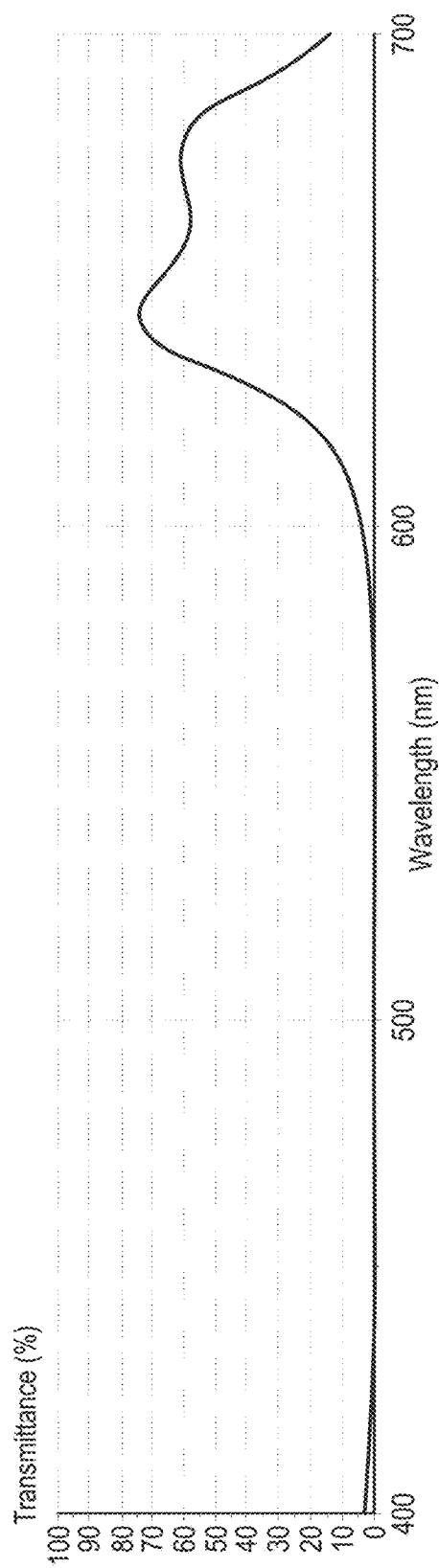
FIG. 27A shows the variation of the transmittance with wavelength for a third example of the optical structure shown in FIG. 24A or 24B at a viewing angle of about 0 degrees with respect to a normal to the surface of the optical structure 300a/300b.
Figure 27B:
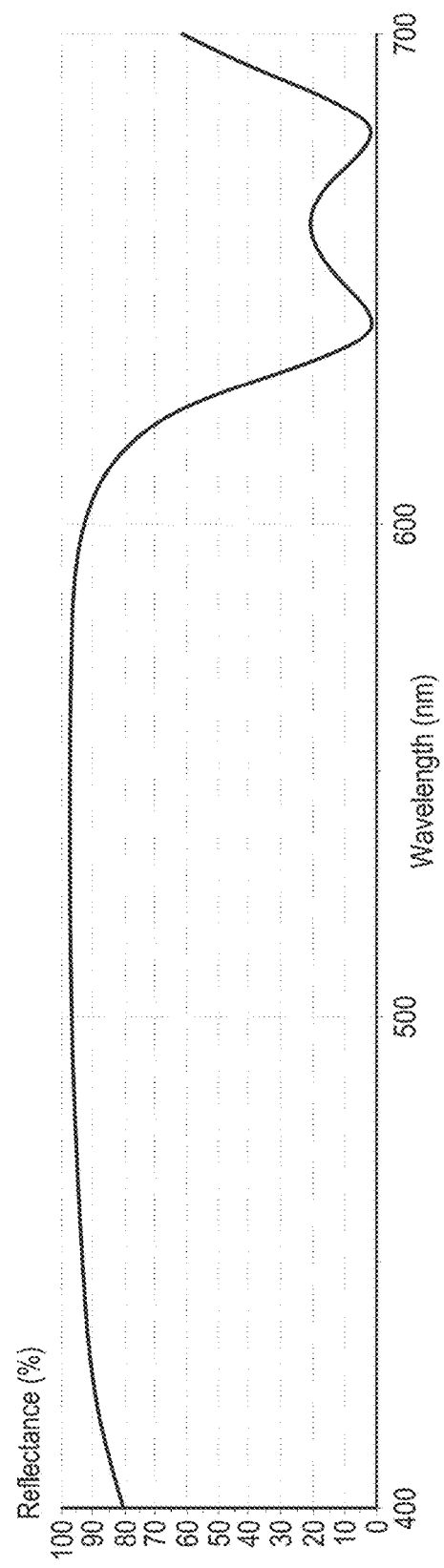
FIG. 27B shows the variation of the reflectance with wavelength for the third example of the optical structure shown in FIG. 24A or 24B at a viewing angle of about 0 degrees with respect to a normal to the surface of the optical structure.

FIG. 27A shows the variation of the transmittance with wavelength for a third example of the optical structure 300a/300b at a viewing angle of 0 degrees with respect to a normal to the surface of the optical structure 300a/300b. FIG. 27B shows the variation of the reflectance with wavelength for the third example of the optical structure 300a/300b at a viewing angle of 0 degrees with respect to a normal to the surface of the optical structure 300a/300b. The third example of the optical structure 300a or 300b comprises a layer of silver (Ag) (corresponding to the layer 301b of FIG. 24A or the region 310 of FIG. 24B) having a thickness of about 40 nm surrounded by two layers of a dielectric material comprising magnesium fluoride ($MgF_2$) (corresponding to the layers 303a and 303b of FIG. 24A or the region 312 of FIG. 24B) having an individual thickness of about 185 nm. The third example further comprises two additional silver layers disposed over the two dielectric layers (corresponding to the layers 301a and 301c of FIG. 24A or the region 314 of FIG. 24B) having an individual thickness of about 23 nm. The third example of the optical structure 300a or 300b is encapsulated in a $SiO_2$ matrix which is used to simulate the printing medium or ink which has a similar refractive index.

It is observed from FIG. 27A that the transmittance through the third example of the optical structure 300a/300b is less than 10% in a wavelength range between about 400 nm and about 600 nm. The transmittance is greater than about 10% for wavelengths greater than about 600 nm and less than about 700 nm. The maximum value of the transmittance occurs at a wavelength between about 630 nm and about 650 nm. It is observed from FIG. 27B that the reflectance from the third example of the optical structure 300a/300b is less than 30% for wavelengths between about 630 nm and about 680 nm. It is observed from the transmittance and the reflectance spectra that the third example of the optical structure 300a/300b will appear red/orange in the transmission mode and grey/blue in the reflection mode.

Figure 27C:
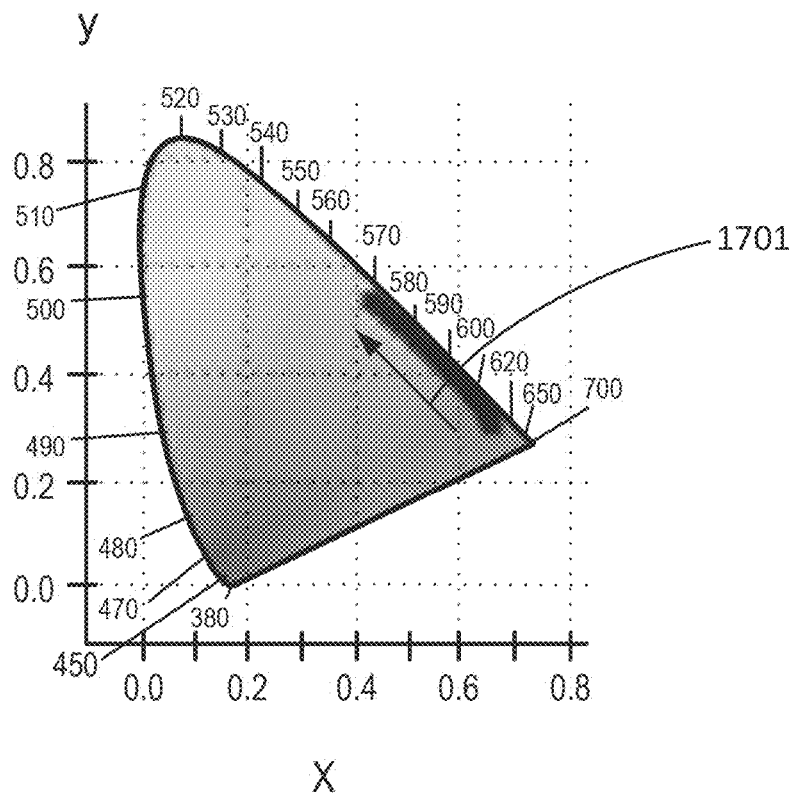
FIG. 27C is a CIE 1931 color space chromaticity diagram showing the x and y chromaticity coordinates of light transmitted through the third example of the optical structure shown in FIG. 24A or 24B for different viewing angles between 0 degrees and 40 degrees with respect to a normal to a surface of the optical structure.
Figure 27D:
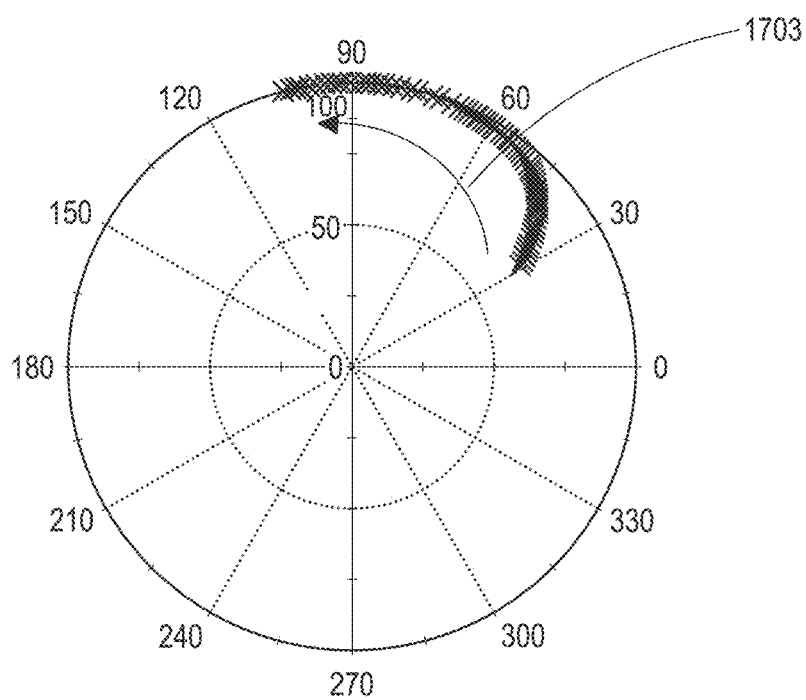
FIG. 27D illustrates the a*b* values in the CIE L*a*b* color space when the third example of the optical structure shown in FIG. 24A or 24B is viewed in the transmission mode at different viewing angles between 0 degrees and 40 degrees with respect to the normal to the surface of the third example of the optical structure.

FIG. 27C is a CIE 1931 color space chromaticity diagram showing the x and y chromaticity coordinates of light transmitted through the third example of the optical structure 300a or 300b for different viewing angles between 0 degrees and 40 degrees with respect to a normal to a surface of the optical structure 300a or 300b. As the viewing angle increases, the color of the optical structure 300a or 300b changes from red towards green in the direction of the arrow 1701. FIG. 27D illustrates the a*b* values in the CIE L*a*b* color space when the third example of the optical structure 300a/300b is viewed in the transmission mode at different viewing angles between 0 degrees and 40 degrees with respect to the normal to the surface of the third example of the optical structure 300a/300b. As the viewing angle increases the color of the third example of the optical structure 300a/300b in the transmission mode shifts in the direction of the arrow 1703. The color of the third example in the transmission mode can have a lightness (L*) value between approximately 26.8 and approximately 77.2 for different viewing angles between 0 degrees and 40 degrees with respect to the normal to the surface of the third example of the optical structure 300a/300b. The color of the third example in the transmission mode can have an (a*) value between approximately −19.2 and approximately 66.0 for different viewing angles between 0 degrees and 40 degrees with respect to the normal to the surface of the third example of the optical structure 300a/300b. The color of the third example in the transmission mode can have a (b*) value between approximately 35.9 and approximately 98.8 for different viewing angles between 0 degrees and 40 degrees with respect to the normal to the surface of the third example of the optical structure 300a/300b.

Figure 27E:
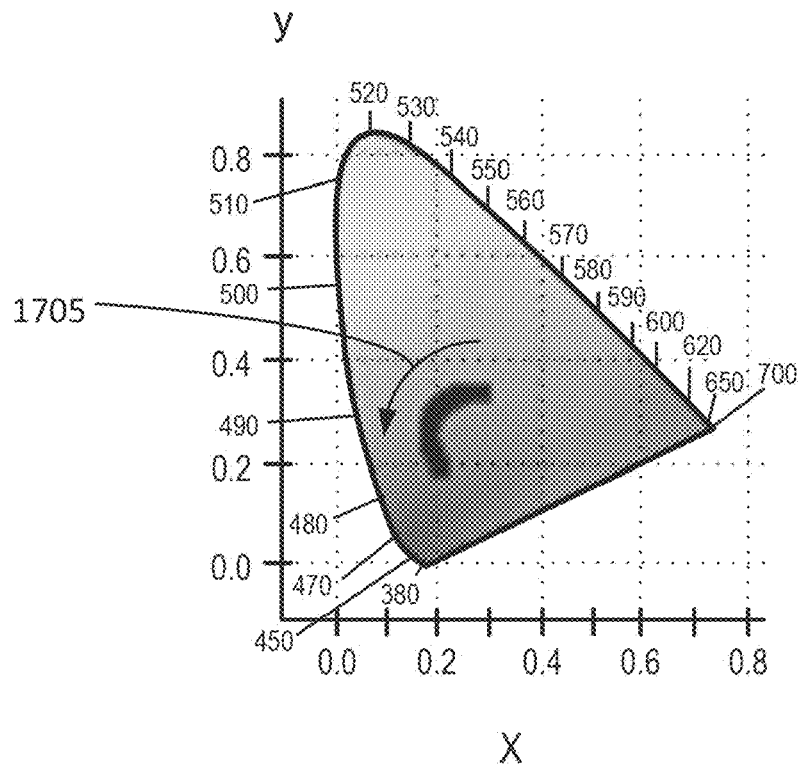
FIG. 27E is a CIE 1931 color space chromaticity diagram showing the x and y chromaticity coordinates of light reflected from the third example of the optical structure shown in FIG. 24A or 24B for different viewing angles between 0 degrees and 40 degrees with respect to a normal to a surface of the optical structure.
Figure 27F:
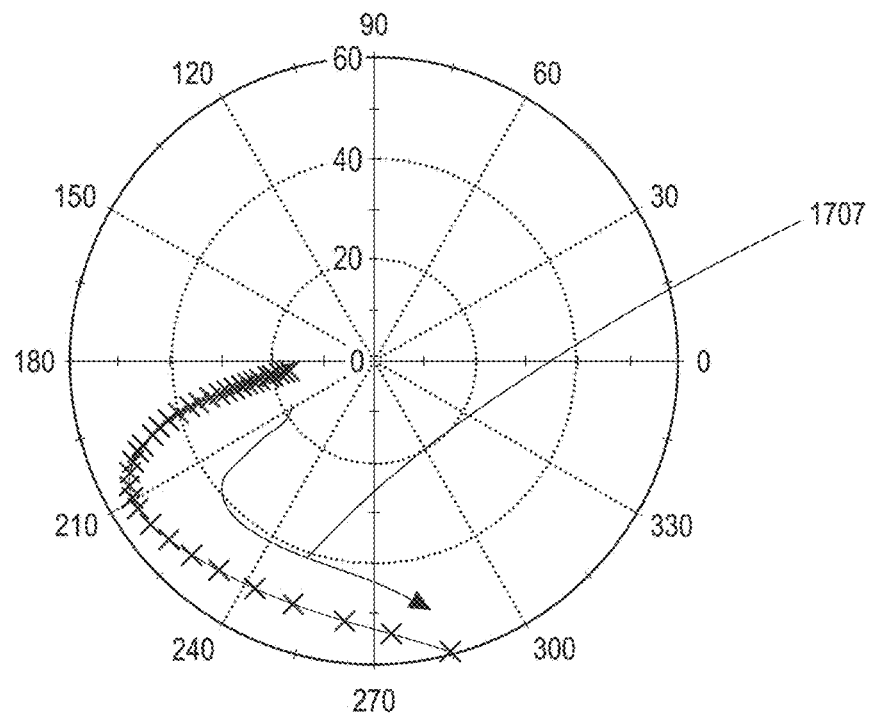
FIG. 27F illustrates the a*b* values in the CIE L*a*b* color space when the third example of the optical structure shown in FIG. 24A or 24B is viewed in the reflection mode at different viewing angles between 0 degrees and 40 degrees with respect to the normal to the surface of the third example of the optical structure.

FIG. 27E is a CIE 1931 color space chromaticity diagram showing the x and y chromaticity coordinates of light reflected from the third example of the optical structure 300a or 300b for different viewing angles between 0 degrees and 40 degrees with respect to a normal to a surface of the third example of the optical structure 300a or 300b. As the viewing angle increases, the color of the optical structure 300a or 300b changes from grey towards blue in the direction of the arrow 1705. FIG. 27F illustrates the a*b* values in the CIE L*a*b* color space when the third example of the optical structure 300a/300b is viewed in the reflection mode at different viewing angles between 0 degrees and 40 degrees with respect to the normal to the surface of the third example of the optical structure 300a/300b. As the viewing angle increases the color of the third example of the optical structure 300a/300b in the reflection mode shifts in the direction of the arrow 1707. The color of the third example in the reflection mode can have a lightness (L*) value between approximately 63.3 and approximately 97.2 for different viewing angles between 0 degrees and 40 degrees with respect to the normal to the surface of the third example of the optical structure 300a/300b. The color of the third example in the reflection mode can have an (a*) value between approximately −48.0 and approximately 15.5 for different viewing angles between 0 degrees and 40 degrees with respect to the normal to the surface of the third example of the optical structure 300a/300b. The color of the third example in the reflection mode can have a (b*) value between approximately −1.0 and approximately −57.9 for different viewing angles between 0 degrees and 40 degrees with respect to the normal to the surface of the third example of the optical structure 300a/300b.

Figure 28A:
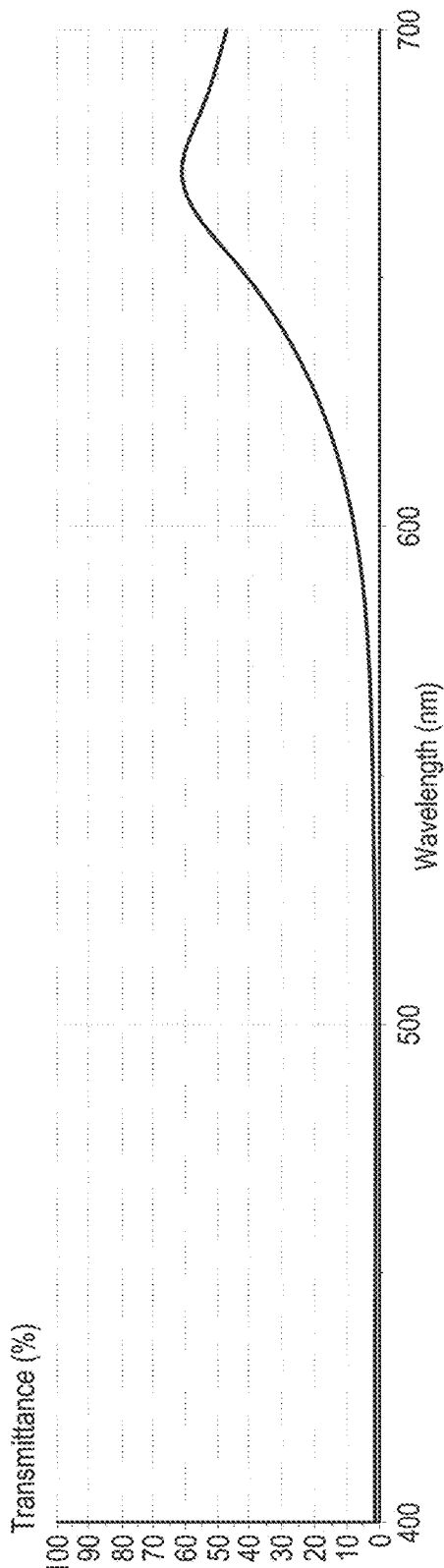
FIG. 28A shows the variation of the transmittance with wavelength for a fourth example of the optical structure shown in FIG. 24A or 24B at a viewing angle of about 0 degrees with respect to a normal to the surface of the optical structure.
Figure 28B:
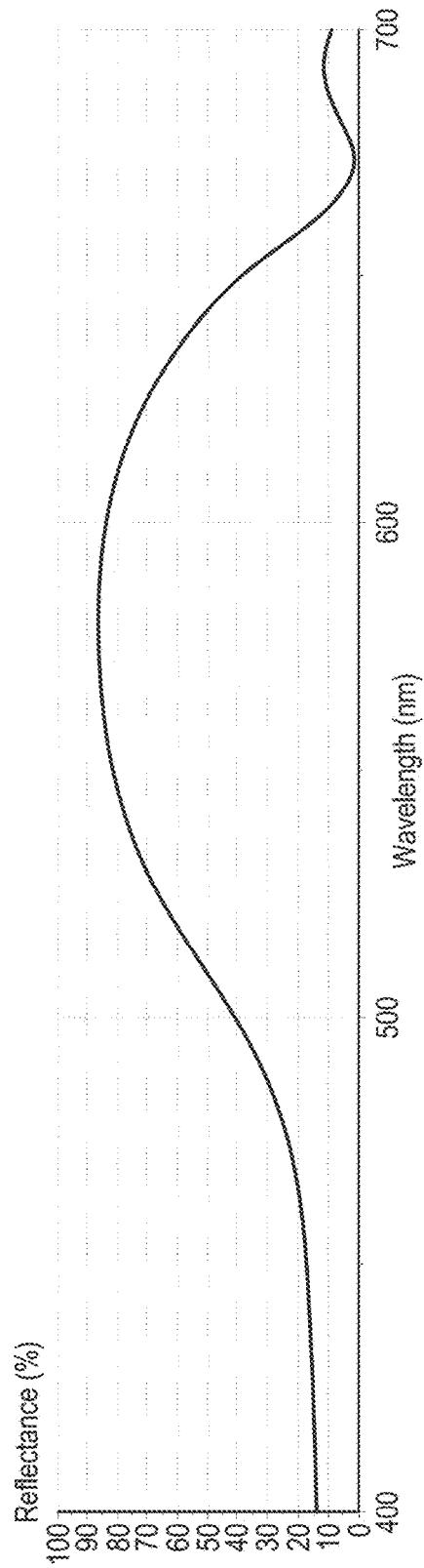
FIG. 28B shows the variation of the reflectance with wavelength for the fourth example of the optical structure shown in FIG. 24A or 24B at a viewing angle of about 0 degrees with respect to a normal to the surface of the optical structure.

FIG. 28A shows the variation of the transmittance with wavelength for a fourth example of the optical structure 300a/300b at a viewing angle of 0 degrees with respect to a normal to the surface of the optical structure 300a/300b. FIG. 28B shows the variation of the reflectance with wavelength for the fourth example of the optical structure 300a/300b at a viewing angle of 0 degrees with respect to a normal to the surface of the optical structure 300a/300b. The fourth example of the optical structure 300a or 300b comprises a layer of gold (Au) (corresponding to the layer 301b of FIG. 24A or the region 310 of FIG. 24B) having a thickness of about 40 nm surrounded by two layers of a dielectric material comprising magnesium fluoride (MgF$_2$) (corresponding to the layers 303a and 303b of FIG. 24A or the region 312 of FIG. 24B) having an individual thickness of about 185 nm. The fourth example further comprises two additional gold layers disposed over the two dielectric layers (corresponding to the layers 301a and 301c of FIG. 24A or the region 314 of FIG. 24B) having an individual thickness of about 23 nm. The fourth example of the optical structure 300a or 300b is encapsulated in a SiO$_2$ matrix which is used to simulate the printing medium or ink which has a similar refractive index.

It is observed from FIG. 28A that the transmittance through the fourth example of the optical structure 300a/300b is less than 10% in a wavelength range between about 400 nm and about 600 nm. The transmittance is greater than about 10% for wavelengths greater than about 600 nm and less than about 700 nm. The maximum value of the transmittance occurs at a wavelength between about 650 nm and about 675 nm. It is observed from FIG. 28B that the reflectance from the fourth example of the optical structure 300a/300b is greater than 30% for wavelengths between about 480 nm and about 650 nm. It is observed from the transmittance and the reflectance spectra that the fourth example of the optical structure 300a/300b will appear red/orange in the transmission mode and yellow-green/aquamarine in the reflection mode.

Figure 28C:
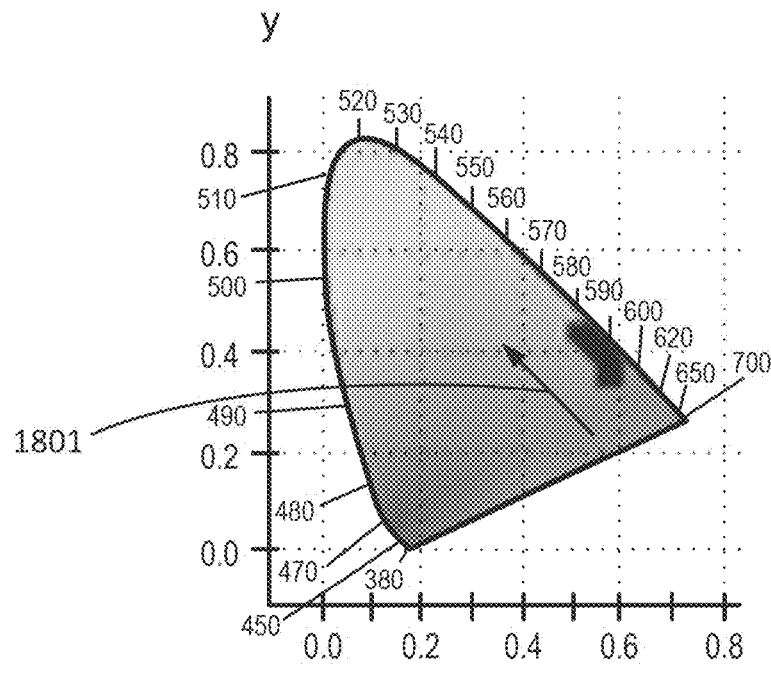
FIG. 28C is a CIE 1931 color space chromaticity diagram showing the x and y chromaticity coordinates of light transmitted through the fourth example of the optical structure for different viewing angles between 0 degrees and 40 degrees with respect to a normal to a surface of the optical structure.
Figure 28D:
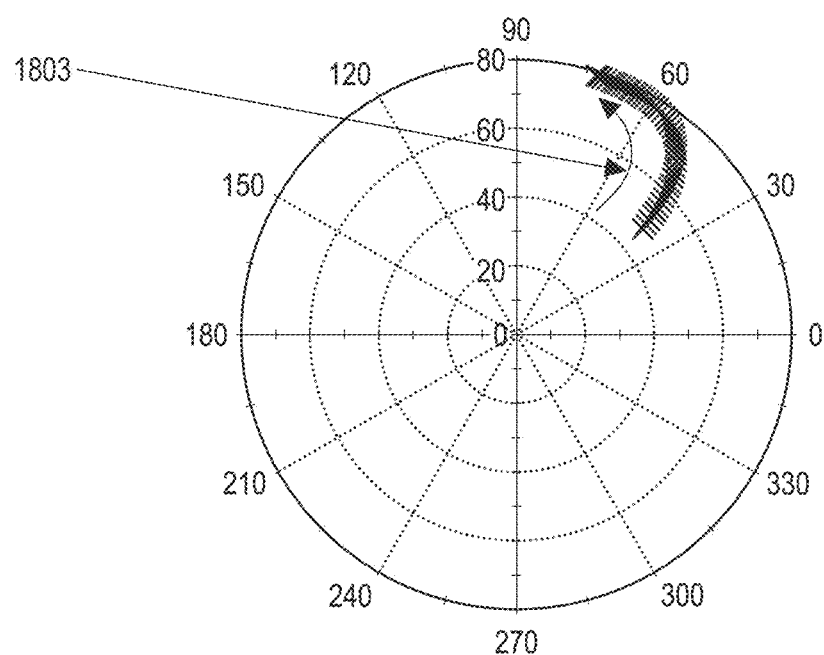
FIG. 28D illustrates the a*b* values in the CIE L*a*b* color space when the fourth example of the optical structure shown in FIG. 24A or 24B is viewed in the transmission mode at different viewing angles between 0 degrees and 40 degrees with respect to the normal to the surface of the fourth example of the optical structure.

FIG. 28C is a CIE 1931 color space chromaticity diagram showing the x and y chromaticity coordinates of light transmitted through the fourth example of the optical structure 300a or 300b for different viewing angles between 0 degrees and 40 degrees with respect to a normal to a surface of the optical structure 300a or 300b. As the viewing angle increases, the color of the optical structure 300a or 300b changes from red towards orange in the direction of the arrow 1801. FIG. 28D illustrates the a*b* values in the CIE L*a*b* color space when the fourth example of the optical structure 300a/300b is viewed in the transmission mode at different viewing angles between 0 degrees and 40 degrees with respect to the normal to the surface of the fourth example of the optical structure 300a/300b. As the viewing angle increases the color of the fourth example of the optical structure 300a/300b in the transmission mode shifts in the direction of the arrow 1803. The color of the fourth example in the transmission mode can have a lightness (L*) value between approximately 27.1 and approximately 62.1 for different viewing angles between 0 degrees and 40 degrees with respect to the normal to the surface of the fourth example of the optical structure 300a/300b. The color of the fourth example in the transmission mode can have an (a*) value between approximately 20.5 and approximately 47.2 for different viewing angles between 0 degrees and 40 degrees with respect to the normal to the surface of the fourth example of the optical structure 300a/300b. The color of the fourth example in the transmission mode can have a (b*) value between approximately 29.5 and approximately 74.3 for different viewing angles between 0 degrees and 40 degrees with respect to the normal to the surface of the fourth example of the optical structure 300a/300b.

Figure 28E:
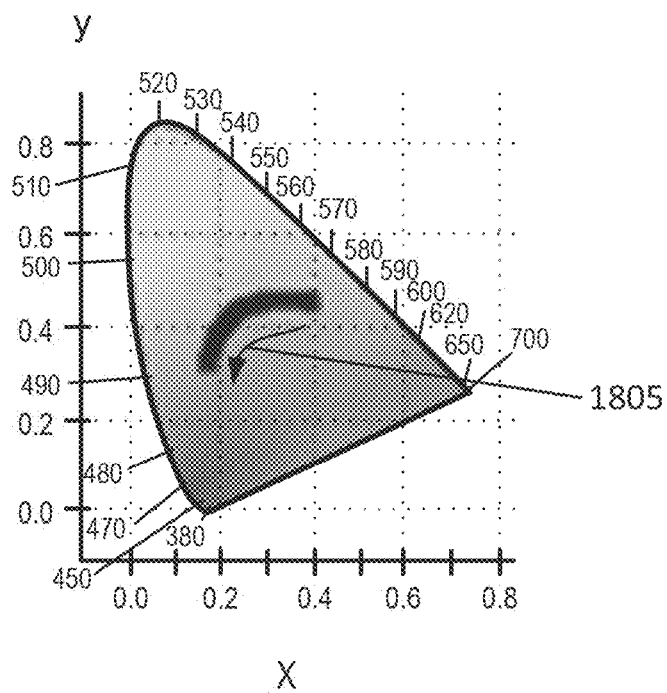
FIG. 28E is a CIE 1931 color space chromaticity diagram showing the x and y chromaticity coordinates of light reflected from the fourth example of the optical structure shown in FIG. 24A or 24B for different viewing angles between 0 degrees and 40 degrees with respect to a normal to a surface of the optical structure.
Figure 28F:
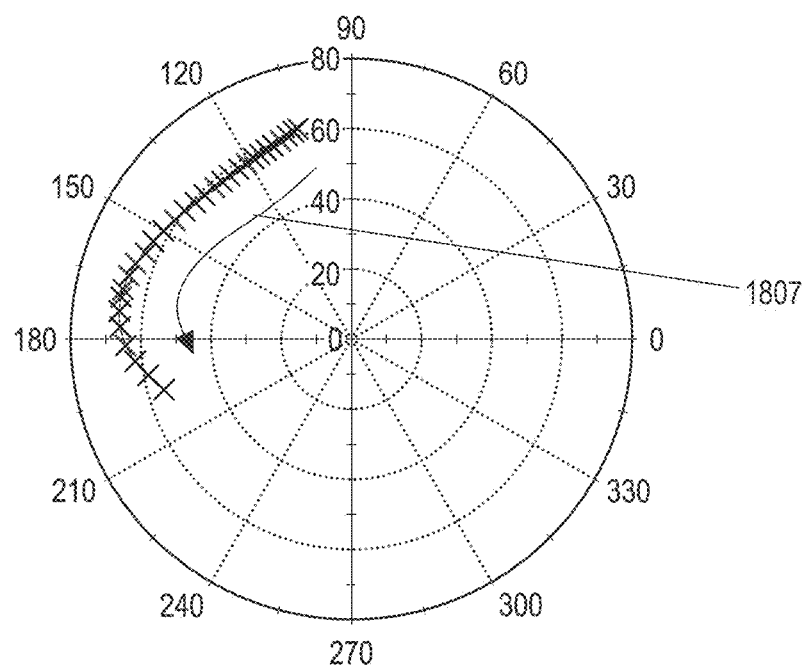
FIG. 28F illustrates the a*b* values in the CIE L*a*b* color space when the fourth example of the optical structure is viewed in the reflection mode at different viewing angles between 0 degrees and 40 degrees with respect to the normal to the surface of the fourth example of the optical structure 300a/300b.

FIG. 28E is a CIE 1931 color space chromaticity diagram showing the x and y chromaticity coordinates of light reflected from the fourth example of the optical structure 300a or 300b for different viewing angles between 0 degrees and 40 degrees with respect to a normal to a surface of the optical structure 300a or 300b. As the viewing angle increases, the color of the optical structure 300a or 300b changes from yellow-green towards aquamarine in the direction of the arrow 1805. FIG. 28F illustrates the a*b* values in the CIE L*a*b* color space when the fourth example of the optical structure 300a/300b is viewed in the reflection mode at different viewing angles between 0 degrees and 40 degrees with respect to the normal to the surface of the fourth example of the optical structure 300a/300b. As the viewing angle increases the color of the fourth example of the optical structure 300a/300b in the reflection mode shifts in the direction of the arrow 1807. The color of the fourth example in the reflection mode can have a lightness (L*) value between approximately 53.3 and approximately 88.5 for different viewing angles between 0 degrees and 40 degrees with respect to the normal to the surface of the fourth example of the optical structure 300a/300b. The color of the fourth example in the reflection mode can have an (a*) value between approximately −13.9 and approximately −65.5 for different viewing angles between 0 degrees and 40 degrees with respect to the normal to the surface of the fourth example of the optical structure 300a/300b. The color of the fourth example in the reflection mode can have a (b*) value between approximately −13.0 and approximately 59.9 for different viewing angles between 0 degrees and 40 degrees with respect to the normal to the surface of the fourth example of the optical structure 300a/300b.

FIG. 29A shows the variation of the transmittance, reflectance and absorptance with wavelength for a fifth example of the optical structure 300a/300b at a viewing angle of 0 degrees with respect to a normal to the surface of the optical structure 300a/300b. In FIG. 29A, curve 1901 shows the variation of transmittance with wavelength, curve 1903 shows the variation of reflectance with wavelength, and curve 1905 shows the variation of absorptance with wavelength. The fifth example of the optical structure 300a or 300b comprises a layer of gold (Au) (corresponding to the layer 301b of FIG. 24A or the region 310 of FIG. 24B) having a thickness of about 40 nm surrounded by two layers of a dielectric material comprising zinc sulfide (ZnS) (corresponding to the layers 303a and 303b of FIG. 24A or the region 312 of FIG. 24B) having an individual thickness of about 80 nm. The fifth example further comprises two additional gold layers disposed over the two dielectric layers (corresponding to the layers 301a and 301c of FIG. 24A or the region 314 of FIG. 24B) having an individual thickness of about 23 nm. The fifth example of the optical structure 300a or 300b is encapsulated in a SiO$_2$ matrix which is used to simulate the printing medium or ink which has a similar refractive index.

It is observed from FIG. 29A that the transmittance through the fifth example of the optical structure 300a/300b is greater than about 10% for wavelengths greater than about 550 nm and less than about 700 nm. The maximum value of the transmittance occurs at a wavelength between about 600 nm and about 650 nm. It is further observed from FIG. 29A that the reflectance from the fifth example of the optical structure 300a/300b is greater than 30% for wavelengths between about 430 nm and about 580 nm. The fifth example of the optical structure 300a/300b has significant absorptance (e.g., greater than about 10%) for wavelengths between about 400 nm and about 700 nm. Accordingly, the color in the transmission mode is not expected to be complementary to the color in the reflection mode.

FIG. 29B is a CIE 1931 color space chromaticity diagram showing the x and y chromaticity coordinates of light transmitted through the fifth example of the optical structure 300a or 300b for different viewing angles between 0 degrees and 40 degrees with respect to a normal to a surface of the optical structure 300a or 300b. FIG. 29C illustrates the a*b* values in the CIE L*a*b* color space when the fifth example of the optical structure 300a/300b is viewed in the transmission mode at different viewing angles between 0 degrees and 40 degrees with respect to the normal to the surface of the fifth example of the optical structure 300a/300b. As the viewing angle increases the color of the fourth example of the optical structure 300a/300b in the transmission mode shifts in the direction of the arrow 1907. The color of the fifth example in the transmission mode can have a lightness (L*) value between approximately 54.0 and approximately 58.5 for different viewing angles between 0 degrees and 40 degrees with respect to the normal to the surface of the fifth example of the optical structure 300a/300b. The color of the fifth example in the transmission mode can have an (a*) value between approximately 35.0 and approximately 40.3 for different viewing angles between 0 degrees and 40 degrees with respect to the normal to the surface of the fifth example of the optical structure 300a/300b. The color of the fifth example in the transmission mode can have a (b*) value between approximately 62.8 and approximately 74.9 for different viewing angles between 0 degrees and 40 degrees with respect to the normal to the surface of the fifth example of the optical structure 300a/300b.

Figure 29D:
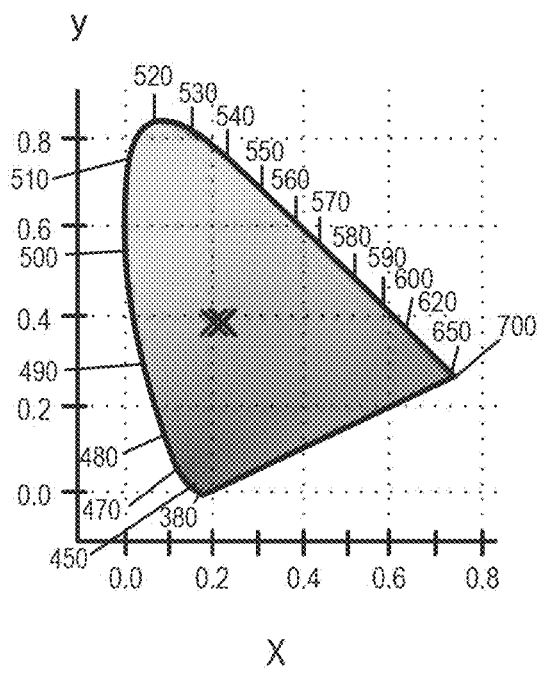
FIG. 29D is a CIE 1931 color space chromaticity diagram showing the x and y chromaticity coordinates of light reflected from the fifth example of the optical structure shown in FIG. 24A or 24B for different viewing angles between 0 degrees and 40 degrees with respect to a normal to a surface of the optical structure.
Figure 29E:
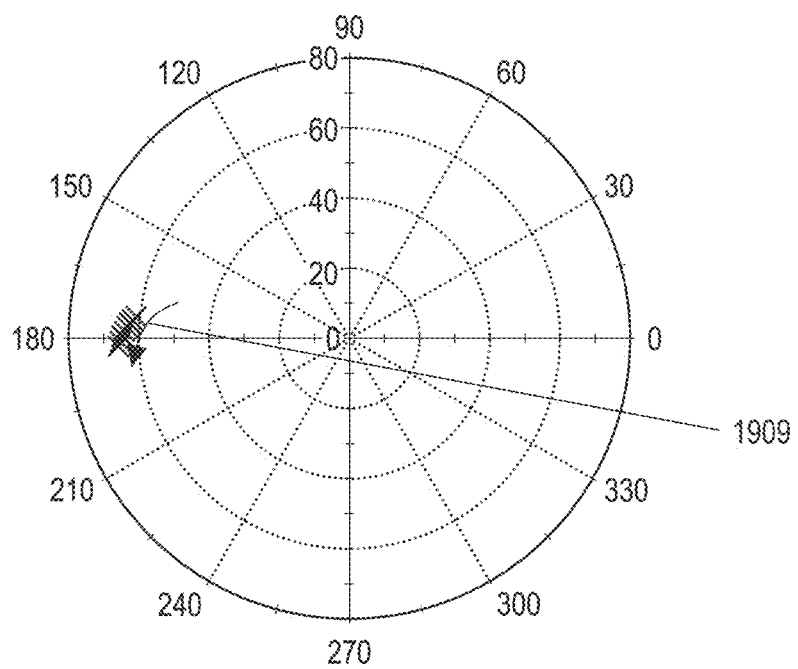
FIG. 29E illustrates the a*b* values in the CIE L*a*b* color space when the fifth example of the optical structure shown in FIG. 24A or 24B is viewed in the reflection mode at different viewing angles between 0 degrees and 40 degrees with respect to the normal to the surface of the fifth example of the optical structure.

FIG. 29D is a CIE 1931 color space chromaticity diagram showing the x and y chromaticity coordinates of light reflected from the fifth example of the optical structure 300a or 300b for different viewing angles between 0 degrees and 40 degrees with respect to a normal to a surface of the optical structure 300a or 300b. FIG. 29E illustrates the a*b* values in the CIE L*a*b* color space when the fifth example of the optical structure 300a/300b is viewed in the reflection mode at different viewing angles between 0 degrees and 40 degrees with respect to the normal to the surface of the fifth example of the optical structure 300a/300b. As the viewing angle increases the color of the fifth example of the optical structure 300a/300b in the reflection mode shifts in the direction of the arrow 1909. The color of the fifth example in the reflection mode can have a lightness (L*) value between approximately 64.5 and approximately 77.3 for different viewing angles between 0 degrees and 40 degrees with respect to the normal to the surface of the fifth example of the optical structure 300a/300b. The color of the fifth example in the reflection mode can have an (a*) value between approximately −60.1 and approximately −63.7 for different viewing angles between 0 degrees and 40 degrees with respect to the normal to the surface of the fifth example of the optical structure 300a/300b. The color of the fifth example in the reflection mode can have a (b*) value between approximately −0.1 and approximately 6.6 for different viewing angles between 0 degrees and 40 degrees with respect to the normal to the surface of the fifth example of the optical structure 300a/300b.

Without relying on any particular theory, the color in the reflection and the transmission mode is dependent on the thickness and the composition of the different layers of the optical structure 300a or 300b. For example, in some implementations little to no light is transmitted through an implementation of an optical structure 300a or 300b in which the dielectric layers 303a and 303b are absent. The brightness of the color in the reflection mode can increase as the thickness of the metal layers 301a, 301b, and 301c increases while the brightness of the color in the transmission mode can decrease as the thickness of the metal layers 301a, 301b, and 301c increases in certain implementations.

Without subscribing on any particular theory, various implementations of the optical structure 300a or 300b can exhibit variation in the reflected and/or transmitted color as the viewing angle changes. The variation in the reflected and/or transmitted color with change in the viewing angle can be large (or significant) if the refractive index of the dielectric material of the layers 303a and 303b has a refractive index less than about 2.0. For example, the variation in the reflected and/or transmitted color with change in the viewing angle can be large (or significant) if the layers 303a and 303b comprises silica ($SiO_2$) having a refractive index of about 1.5 or magnesium fluoride ($MgF_2$) having a refractive index of about 1.39. The variation in the reflected and/or transmitted color with change in the viewing angle can be small (or insignificant) if the refractive index of the dielectric material of the layers 303a and 303b has a refractive index greater than about 2.0. For example, the variation in the reflected and/or transmitted color with change in the viewing angle can be small (or insignificant) if the layers 303a and 303b comprises zinc sulfide (ZnS) having a refractive index of about 2.38 or other high refractive index materials such as, for example, zirconium dioxide ($ZrO_2$) or ceric oxide ($CeO_2$). In various implementations, the variation in the reflected and/or transmitted color with change in the viewing angle can depend on the thickness of the dielectric layers 303a and 303b.

The optical structures 300a/300b configured as foil, film or platelets can be incorporated with or in a document (e.g., a banknote), package, product, or other item. Optical products such as a film, a thread, a laminate, a foil, a pigment, or an ink comprising one or more of the optical structures 300a/300b discussed above can be incorporated with or in documents such as banknotes or other documents to verify authenticity of the documents, packaging materials, etc. For example, the optical structures 300a/300b can be configured as an ink or a pigment which is disposed on a base comprising at least one of a polymer, a plastic, a paper or a fabric. The base may be flexible in some implementations. The base comprising the ink or a pigment or pigment comprising the optical structures 300a or 300b can be cut or diced to obtain a thread or a foil. A plurality of optical structures 300a or 300b discussed above can be incorporated in a particular optical product (e.g., ink, pigment, thread, filament, paper, security ink, security pigment, security thread, security filament, security paper, etc.). The shapes, sizes and/or aspect ratios of the plurality of optical structures 300a or 300b discussed above that are incorporated in a particular optical product (e.g., ink, pigment, thread, filament, paper, security ink, security pigment, security thread, security filament, security paper, etc.) can vary. Accordingly, a particular optical product (e.g., ink, pigment, thread, filament, paper, security ink, security pigment, security thread, security filament, security paper, etc.) can comprise optical structures 300a or 300b with different distributions of shapes, sizes and/or aspect ratios of the optical structures. For example, a particular optical product (e.g., ink, pigment, thread, filament, paper, security ink, security pigment, security thread, security filament, security paper, etc.) can comprise optical structures 300a or 300b with sizes distributed around one or more mean sizes. As another example, a particular optical product (e.g., ink, pigment, thread, filament, paper, security ink, security pigment, security thread, security filament, security paper, etc.) can comprise optical structures 300a or 300b with aspect ratios distributed around one or more aspect ratios.

As discussed above, the color in the reflection mode and the transmission mode of an implementation of an optical structure 300a or 300b depends on the thickness and the composition of the various metal layers and the various dielectric layers that form the implementation of the optical structure 300a or 300b. Accordingly, the reflected and/or transmitted color of a particular optical product (e.g., ink, pigment, thread, filament, paper, security ink, security pigment, security thread, security filament, security paper, etc.) can be tailored by incorporated plurality of optical structures 300a or 300b having different thicknesses and/or compositions of the various constituent layers. By combining plurality of optical structures 300a or 300b having different thicknesses and/or compositions of the various constituent layers, optical products (e.g., ink, pigment, thread, filament, paper, security ink, security pigment, security thread, security filament, security paper, etc.) having different reflected and/or transmitted colors can be manufactured.

Figure 30A:
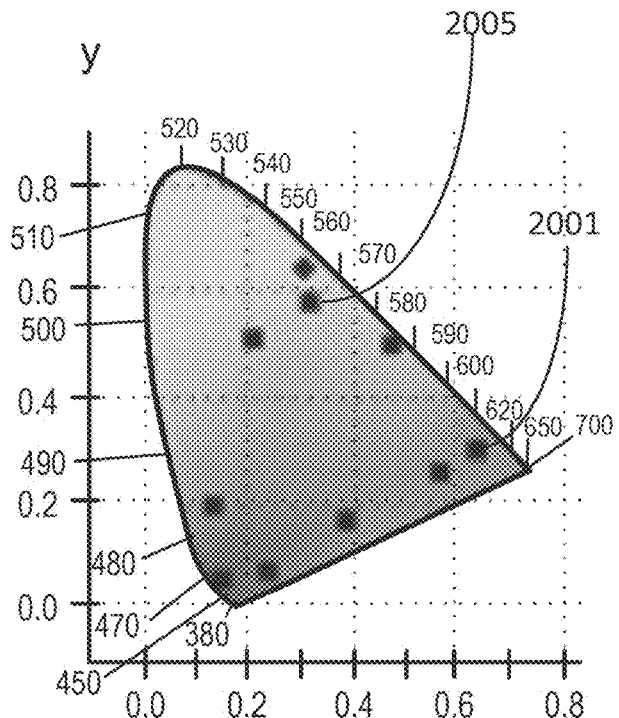
FIGS. 30A and 30B are CIE 1931 color space chromaticity diagrams respectively showing the x and y chromaticity coordinates of light transmitted through and reflected from various implementations of an optical structure having a geometry similar to the geometry of the implementations illustrated in FIGS. 24A and 24B.
Figure 30B:
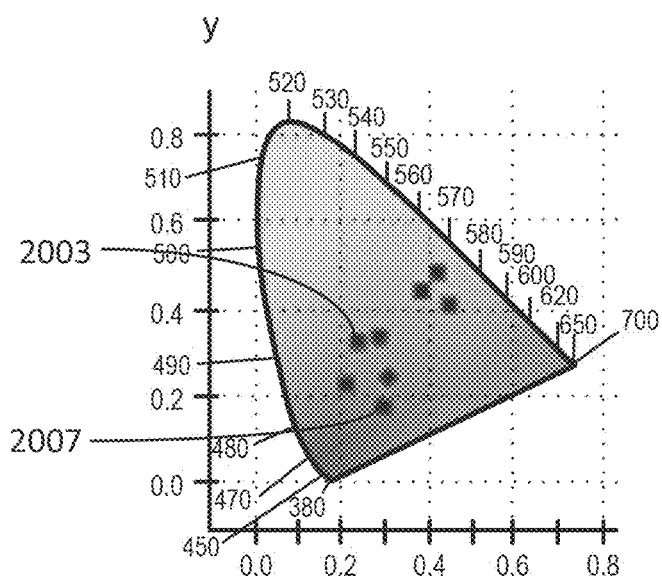

FIGS. 30A and 30B are CIE 1931 color space chromaticity diagrams respectively showing the x and y chromaticity coordinates of light transmitted through and reflected from various implementations of an optical structure having a geometry similar to optical structure 300a or 300b. The various implementations of the optical structure include three metal layers comprising silver (Ag) and two dielectric layers comprising zinc sulfide (ZnS). The thickness of a central metal layer comprising silver (Ag) (e.g., corresponding to layer 301b in FIG. 24A or region 310 in FIG. 24B) can be about 40 nm in the various implementations of the optical structure. The thickness of the surrounding metal layers comprising silver (Ag) (e.g., corresponding to layers 301a and 301c in FIG. 24A or region 314 in FIG. 24B) can be about 25 nm in the various implementations of the optical structure. The thickness of the two dielectric layers (e.g., corresponding to layers 303a and 303b in FIG. 24A or region 312 in FIG. 24B) can be in a range between about 40 nm and about 183 nm in the various implementations of the optical structure.

For example, the region 2001 in FIG. 30A shows the x and y chromaticity coordinates of light transmitted through an implementation of an optical structure with two dielectric layers comprising zinc sulfide (ZnS) having an individual thickness of about 95 nm. The region 2003 in FIG. 30B shows the corresponding x and y chromaticity coordinates of light reflected from the implementation of the optical structure with two dielectric layers comprising zinc sulfide (ZnS) having an individual thickness of about 95 nm. As another example, the region 2005 in FIG. 30A shows the x and y chromaticity coordinates of light transmitted through an implementation of an optical structure with two dielectric layers comprising zinc sulfide (ZnS) having an individual thickness of about 66 nm. The region 2007 in FIG. 30B shows the corresponding x and y chromaticity coordinates of light reflected from the implementation of the optical structure with two dielectric layers comprising zinc sulfide (ZnS) having an individual thickness of about 66 nm.

As noted from FIGS. 30A and 30B implementations of optical structures with different thickness of the dielectric layers produce different colors in the transmission and reflection mode. For example, other regions corresponding to other designs are also shown in the CIE 1931 color space chromaticity diagrams of FIGS. 30A and 30B. Accordingly, pigments and/or inks that are configured to produce a wide variety of colors in a color space can be obtained by varying the thickness of the individual dielectric layers of the constituent optical structures. Other variations, for example, of the material composition and/or thickness of the other layers (metal and/or dielectric) are possible. Such different designs may provide different colors and/or other characteristics such as amount of color shift with angle, etc.

The optical performance of example optical structures with and without protective dielectric layers having parameters provided in Tables 9 and 10 were analyzed. The material composition and the thickness of the various layers for the example optical structure without protective layers are provided in Table 9 and the material composition and the thickness of the various layers for the example optical structure with protective layers are provided in Table 10.

TABLE 9

Material Composition and thickness of the various layers of an example optical structure without protective layers.

| Layer | Material | Refractive Index | Extinction Coefficient | Optical Physical Thickness (Full Wavelength Optical Thickness) | Thickness (nm) |
|---|---|---|---|---|---|
| | SiO2 | 1.46180 | 0.00000 | | |
| 1 | Ag | 0.05100 | 2.96000 | 0.00250000 | 25.00 |
| 2 | ZnS | 2.37920 | 0.00000 | 0.30789645 | 66.00 |
| 3 | Ag | 0.05100 | 2.96000 | 0.00400000 | 40.00 |
| 4 | ZnS | 2.37920 | 0.00000 | 0.30789645 | 66.00 |
| 5 | Ag | 0.05100 | 2.96000 | 0.00250000 | 25.00 |
| Sub-strate | Glass | 1.52083 | 0.00000 | | |

TABLE 10

Material Composition and thickness of the various layers of an example optical structure with protective layers.

| | Medium | Refractive Index | Extinction Coefficient | Optical Physical Thickness (Full Wavelength Optical Thickness) | Thickness (nm) |
|---|---|---|---|---|---|
| | SiO2 | 1.46180 | 0.00000 | | |
| 1 | ZnS | 2.37920 | 0.00000 | 0.04665098 | 10.00 |
| 2 | Ag | 0.05100 | 2.96000 | 0.00250000 | 25.00 |
| 3 | ZnS | 2.37920 | 0.00000 | 0.30789645 | 66.00 |
| 4 | Ag | 0.05100 | 2.96000 | 0.00400000 | 40.00 |
| 5 | ZnS | 2.37920 | 0.00000 | 0.30789645 | 66.00 |
| 6 | Ag | 0.05100 | 2.96000 | 0.00250000 | 25.00 |
| 7 | ZnS | 2.37920 | 0.00000 | 0.04665098 | 10.00 |
| Sub-strate | Glass | 1.52083 | 0.00000 | | |

The material composition of the various layers of the example optical structure with protective layers is the same as the material composition of the various layers of the example optical structure without protective layers but with the additional protective layers. For example, the example optical structures comprise an Ag layer having a thickness of 40 nm sandwiched by two ZnS layers each having a thickness of 66 nm. Two Ag layers each having a thickness of 25 nm are disposed on the side of the two ZnS layers opposite the side facing the Ag layer having a 40 nm thickness. The example optical structure with the protective layers included additional ZnS layers each having a thickness of 10 nm. The $SiO_2$ layer and glass layer represent the medium (e.g., refractive indices of approximately 1.4-1.6) in which the optical stack is immersed (e.g., organic vehicle for pigment). In both examples, when outputting a spectral scan, $SiO_2$ and glass can index match the organic vehicle and in effect disappear with respect to the optical performance of the optical stack.

Table 11 provides the CIELa*b* values for transmission mode when the example optical structure without protective layers (e.g., having parameters as described in Table 9) is viewed at different viewing angles in the presence of a D65 light source. Table 12 provides the CIELa*b* values for transmission mode when the example optical structure with protective layers (e.g., having parameters as described in Table 10) is viewed at different viewing angles in the presence of a D65 light source.

TABLE 11

CIELab values for transmission mode when the example optical structure without protective layers (e.g., having parameters as described in Table 9) is viewed at different viewing angles in the presence of a D65 light source.

Design ZnS with 3 layers of Ag dichroic design

Polarisation P
Source D65
Observer CIE 1931

Mode Transmittance

| Incident Angle | L* | a* | b* |
|---|---|---|---|
| Wht Pt | 100.0000 | 0.0000 | 0.0000 |
| 0.0 | 75.0871 | −72.4036 | 71.2058 |
| 5.0 | 75.0948 | −72.6351 | 71.1003 |
| 10.0 | 75.1162 | −73.3251 | 70.7800 |
| 15.0 | 75.1464 | −74.4601 | 70.2335 |
| 20.0 | 75.1770 | −76.0180 | 69.4423 |
| 25.0 | 75.1956 | −77.9679 | 68.3802 |
| 30.0 | 75.1849 | −80.2708 | 67.0130 |
| 35.0 | 75.1217 | −82.8794 | 65.2976 |
| 40.0 | 74.9748 | −85.7385 | 63.1796 |

TABLE 12

CIELab values for transmission mode when the example optical structure with protective layers (e.g., having parameters as described in Table 10) is viewed at different viewing angles in the presence of a D65 light source.

Design ZnS with 3 layers of Ag dichroic design

Polarisation P
Source D65
Observer CIE 1931

Mode Transmittance

| Incident Angle | L* | a* | b* |
|---|---|---|---|
| Wht Pt | 100.0000 | 0.0000 | 0.0000 |
| 0.0 | 78.6293 | −69.6413 | 69.0996 |
| 5.0 | 78.6168 | −69.9121 | 69.0059 |
| 10.0 | 78.5767 | −70.7180 | 68.7193 |
| 15.0 | 78.5019 | −72.0398 | 68.2237 |
| 20.0 | 78.3805 | −73.8464 | 67.4936 |
| 25.0 | 78.1956 | −76.0948 | 66.4964 |
| 30.0 | 77.9258 | −78.7316 | 65.1949 |
| 35.0 | 77.5441 | −81.6934 | 63.5499 |
| 40.0 | 77.0167 | −84.9067 | 61.5232 |

Figure 31A:
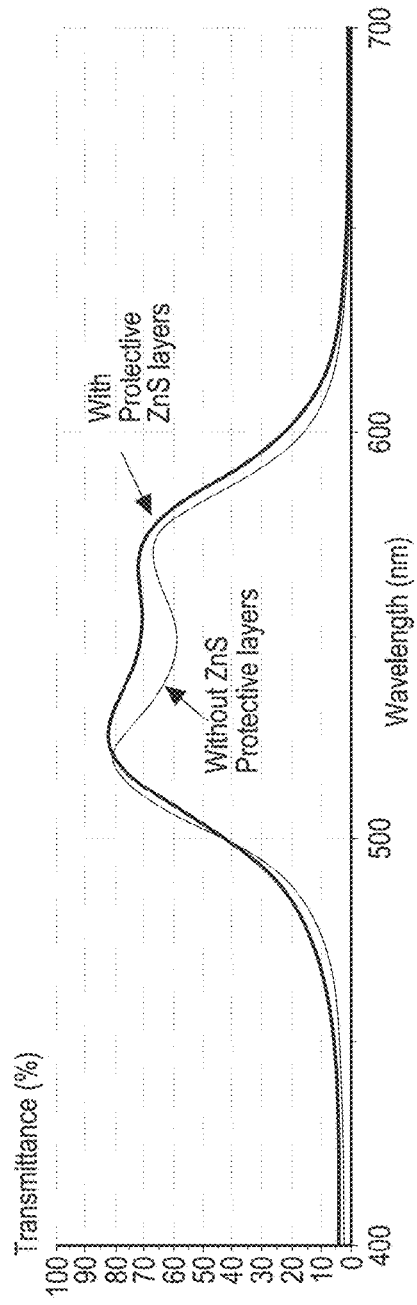
FIGS. 31A and 31B respectively illustrate the transmittance and reflectance spectra for example optical structures with and without protective layers.
Figure 31B:
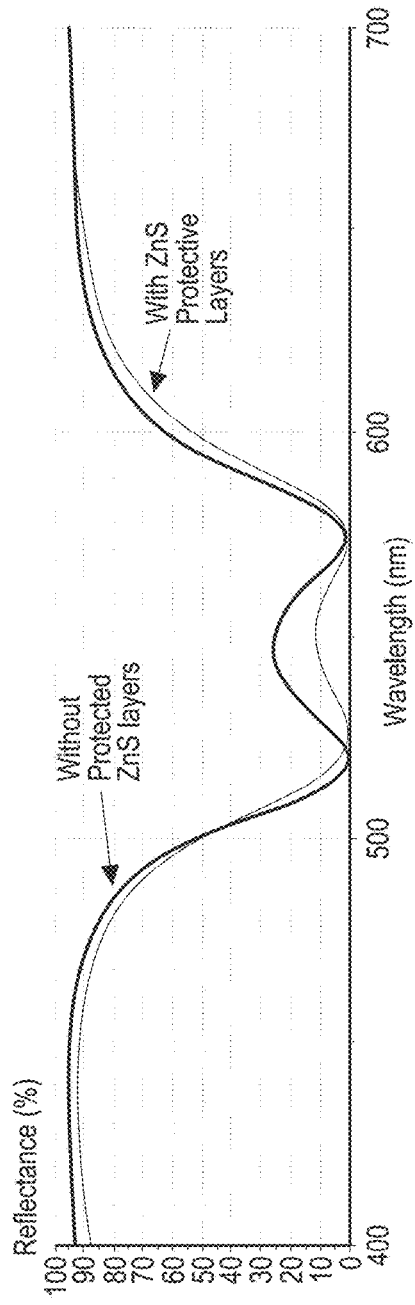

FIGS. 31A and 31B respectively illustrate the transmittance and reflectance spectra for the example optical structures with and without protective layers. With additional protective layers, the color in transmission or reflection (e.g., as indicated by the peaks and dips) is not greatly impacted. Hence, in various implementations, protective layers can be used to enhance durability, allow for safer processing, reduce oxidation and/or corrosion with negligible effect on optical performance in transmission and/or reflection.

The disclosure set forth herein describes a wide variety of structures and methods but should not be considered to be limited to those particular structures or methods. For example, although many of the example optical structures 10, 300a, or 300b are symmetrical, asymmetric structures are also possible. For example, instead of having a pair of similar or identical dielectric layers sandwiching the pair of metallic layers, either dielectric or metal layers having different characteristics (e.g., thickness or material) may be used on opposite sides of the structure or alternatively, maybe only one side of the pair of metal layers has a dielectric layer thereon. Similarly, the metal layers need not be identical and may have different characteristics such as different thicknesses or materials. As described above, intervening layers may also be included. One or more such intervening layer may be include such that the optical structure is not symmetric. For example, one or more intervening layers may be included between the dielectric layer 12 and metal layer 13 (or the dielectric layer 303a and the metal layer 301a) and not between that metal layer 15 and the dielectric layer 16 (or the dielectric layer 303b and the metal layer 301c) or vice versa. Similarly, one or more intervening layers may be included between the metal layer 13 and the dielectric layer 14 and not between the dielectric layer 14 and the metal layer 15, or vice versa. Likewise, one or more intervening layers having different characteristics (e.g., material or thickness) may be included on different sides of the optical structure 10, 300a, or 300b. Or more intervening layers may be included on one side of the optical structure 10, 300a or 300b than on the other side of the optical structure. For example, the metal layer 13, the metal layer 15, the metal layer 301a, the metal layer 301b and/or the metal layer 301c can comprise metal sub-layers. In some implementations, the metal layer 13 and/or the metal layer 15 can comprise a first metal (e.g., silver) facing the high refractive index transparent layers 12 or 16 and a second metal (e.g., gold) facing the dielectric layer 14. In some implementations, the metal layer 301a and the metal layer 301c can comprise a first metal (e.g., gold) and the metal layer 301b can comprise a second metal (e.g., silver). Other variations are possible.

Likewise, although this disclosure describes applications of the structures and method describe herein to include security applications, e.g., countering successful use of counterfeit currency, documents, and products, this disclosure should not be considered to be limited to those particular applications. Alternatively or in addition, such features could, for example, be used for providing an aesthetic effect, to create appealing or attractive features on products or packaging for marketing and advertisement, or for other reasons.

Dimensions, such as, thickness, length, width of various embodiments described herein can be outside the different ranges provided in this disclosure. The values of refractive indices for the various materials discussed herein can be outside the different ranges provided in this disclosure. The values for reflectance and/or transmittance of the different structures can be outside the different ranges provided herein. The values for spectral widths and peak locations for the reflection and transmission spectra can be outside the different ranges provided herein.

The entirety of each application below is incorporated herein by reference: U.S. patent application Ser. No. 16/378,125, entitled "OPTICAL PRODUCTS, MASTERS FOR FABRICATING OPTICAL PRODUCTS, AND METHODS FOR MANUFACTURING MASTERS AND OPTICAL PRODUCTS," filed on Apr. 8, 2019; which is a continuation of U.S. patent application Ser. No. 15/208,551, entitled "OPTICAL PRODUCTS, MASTERS FOR FABRICATING OPTICAL PRODUCTS, AND METHODS FOR MANUFACTURING MASTERS AND OPTICAL PRODUCTS," filed Jul. 12, 2016, which claims the benefit of priority to U.S. Provisional Application No. 62/192,052, entitled "OPTICAL PRODUCTS, MASTERS FOR FABRICATING OPTICAL PRODUCTS, AND METHODS FOR MANUFACTURING MASTERS AND OPTICAL PRODUCTS," filed Jul. 13, 2015, to U.S. Provisional Application No. 62/326,706, entitled "OPTICAL PRODUCTS, MASTERS FOR FABRICATING OPTICAL PRODUCTS, AND METHODS FOR MANUFACTURING MASTERS AND OPTICAL PRODUCTS," filed Apr. 22, 2016, to U.S. Provisional Application No. 62/328,606, entitled "OPTICAL PRODUCTS, MASTERS FOR FABRICATING OPTICAL PRODUCTS, AND METHODS FOR MANUFACTURING MASTERS AND OPTICAL PRODUCTS," filed Apr. 27, 2016, to U.S. Provisional Application No. 62/329,192, entitled "OPTICAL PRODUCTS, MASTERS FOR FABRICATING OPTICAL PRODUCTS, AND METHODS FOR MANUFACTURING MASTERS AND OPTICAL PRODUCTS," filed Apr. 28, 2016, and to U.S. Provisional Application No. 62/326,707, entitled "OPTICAL SWITCH DEVICES," filed Apr. 22, 2016; U.S. patent application Ser. No. 16/054,898, entitled "OPTICAL STRUCTURES PROVIDING DICHROIC EFFECTS," filed on Aug. 3, 2018, which claims the benefit of priority of U.S. Provisional Application No. 62/568,711, entitled "OPTICAL STRUCTURES PROVIDING DICHROIC EFFECTS," filed on Oct. 5, 2017; and U.S. patent application Ser. No. 16/780,777, entitled "OPTICAL STRUCTURES PROVIDING DICHROIC EFFECTS," filed on Feb. 3, 2020, which claims the benefit of priority of U.S. Provisional Application No. 62/829,572, entitled "OPTICAL STRUCTURES PROVIDING DICHROIC EFFECTS," filed on Apr. 4, 2019.

EXAMPLES

The following is a numbered list of example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure.
1. An optical product comprising:
an array of lenses;
a first plurality of portions disposed under the array of lenses, individual ones of the first plurality of portions corresponding to a point on a surface of a first 3D object, and comprising first non-holographic features configured to produce at least part of a first 3D image of the first 3D object;
a second plurality of portions disposed under the array of lenses, individual ones of the second plurality of portions corresponding to a point on a surface of a second 3D object, and comprising second non-holographic features configured to produce at least part of a second 3D image of the second 3D object; and
an interference optical structure disposed with respect to said first and/or second non-holographic features.
2. The optical product of Example 1, wherein at a first viewing angle, the array of lenses presents the first 3D image for viewing without presenting the second 3D image for viewing, and at a second viewing angle different from the first viewing angle, the array of lenses presents for viewing the second 3D image without presenting the first 3D image for viewing.
3. The optical product of any of Examples 1-2, when illuminated, reproduces the first or second 3D image in a first color in transmission mode or a second color in reflection mode 4. The optical product of any of Examples 1-3, when illuminated, reproduces the first or second 3D image in a first color in transmission mode and a second color in reflection mode, wherein the second color is different from the first color
5. The optical product of any of Examples 1-4, wherein the first color and/or the second color changes with a change in a viewing angle.
6. The optical product of any of Examples 1-4, wherein the first color and/or the second color does not change with a change in a viewing angle.
7. The optical product of any of Examples 1-6, wherein said optical structure comprises an interference optical stack.
8. The optical product of any of Examples 1-7, wherein said optical structure comprises a D/M/D/M/D multilayer thin film optical stack, where D is a transparent or optically transmissive dielectric layer and M is a metal layer.
9. The optical product of Example 8, wherein the metal layers have a ratio of the real part (n) of the refractive index to the imaginary part (k) of the refractive index greater than or equal to 0.01 and less than or equal to 0.5.
10. The optical product of any of Examples 1-7, wherein said optical structure comprises a M/D/M/D/M multilayer thin film optical stack, where D is a transparent or optically transmissive dielectric layer and M is a metal layer.
11. The optical product of Example 10, wherein the metal layers have a ratio of the real part (n) of the refractive index to the imaginary part (k) of the refractive index greater than or equal to 0.01 and less than or equal to 0.2.
12. The optical product of any of Examples 10-11, wherein individual ones of the metal layers have a thickness from about 20 nm to about 100 nm.
13. The optical product of any of Examples 8-12, wherein at least one of the metal layers comprises aluminum, silver, gold, silver alloy, or gold alloy.
14. The optical product of any of Examples 8-13, wherein at least one of the dielectric layers comprises magnesium fluoride, silicon dioxide, zinc oxide, zinc sulfide, zirconium dioxide, titanium dioxide, tantalum pentoxide, ceric oxide, yttrium oxide, indium oxide, tin oxide, indium tin oxide, aluminum oxide, tungsten trioxide, or combinations thereof.
15. The optical product of any of Examples 8-13, wherein at least one of the dielectric layers comprises an organic layer.
16. The optical product of any of Examples 1-7, wherein said optical structure comprises a H/L/H/L/H multilayer thin film optical stack, wherein H and L are layers with a refractive index, and wherein the H layers have a higher refractive index than the L layers.
17. The optical product of Example 16, where the L layers have a refractive index less than 1.65 and the H layers have a refractive index greater than or equal to 1.65.
18. The optical product of any of Examples 1-7, wherein said optical structure comprises a A/D/M multilayer thin film optical stack, where A is an absorber layer, D is a transparent dielectric layer, and M is a metal layer that is opaque.
19. The optical product of Example 18, wherein the absorber layer has a ratio of the real part (n) of the refractive index to the imaginary part (k) of the refractive index near unity.
20. The optical product of any of Examples 18-19, wherein said optical structure comprises a A/D/M/D/A multilayer thin film optical stack.

21. The optical product of any of Examples 18-20, wherein said optical structure comprises a A/D/M/M*/M/D/A multilayer thin film optical stack, where M* is a magnetic layer.

22. The optical product of any of Examples 1-7, wherein said optical structure comprises a Fabry-Perot or etalon structure.

23. The optical product of any of the preceding examples, wherein said first and/or second non-holographic features comprise facets.

24. The optical product of any of the preceding examples, wherein said first and/or second non-holographic features comprise linear or curved facets.

25. The optical product of any of the preceding examples, wherein said first and/or second non-holographic features with less steep slopes are configured to reflect light toward an observer's eye, and wherein said first and/or second non-holographic features with steeper slopes are configured to reflect light away from the observer's eye.

26. The optical product of any of the preceding examples, wherein said first and/or second 3D object comprise an irregularly shaped object.

27. The optical product of any of the preceding examples, wherein the optical structure is in the form of a hot stamp coating, a foil coating, or an ink coating.

28. The optical product of any of the preceding examples, wherein the optical product is in the form of a thread, patch, laminate, hot stamp, or window.

29. The optical product of any of the preceding examples, wherein said optical product is configured to provide authenticity verification on an item for anti-counterfeiting or security.

30. The optical product of Example 29, wherein said item is a banknote, a credit card, a debit card, a stock certificate, a passport, a driver's license, an identification card, a document, a tamper evident container or packaging, consumer packaging, or a bottle of pharmaceuticals.

31. The optical product of Example 29, wherein said item is electronics, apparel, jewelry, cosmetics, or a handbag.

32. The optical product of any of the preceding examples, where the array of lenses comprises a 1D or 2D lens array.

33. The optical product of Example 32, wherein the array of lenses comprises freeform lenses.

34. The optical product of Example 32, wherein the array of lenses comprises symmetric lenses.

35. The optical product of any of the preceding examples,
wherein a gradient of said first non-holographic features correlates to an inclination of said surface of said first 3D object at said corresponding point, and
wherein an orientation of said first non-holographic features correlates to an orientation of said surface of said first 3D object at said corresponding point.

36. The optical product of Example 35,
wherein a gradient of said second non-holographic features correlates to an inclination of said surface of said second 3D object at said corresponding point, and
wherein an orientation of said second non-holographic features correlates to an orientation of said surface of said second 3D object at said corresponding point.

37. The optical product of any of the preceding examples,
wherein said inclination of said surface of said first 3D object comprises a polar angle from a first reference line of said first 3D object, and
wherein said orientation of said surface of said first 3D object comprises an azimuth angle from a second reference line orthogonal to said first reference line of said first 3D object.

38. The optical product of Example 37,
wherein said inclination of said surface of said second 3D object comprises a polar angle from a first reference line of said second 3D object, and
wherein said orientation of said surface of said second 3D object comprises an azimuth angle from a second reference line orthogonal to said first reference line of said second 3D object.

39. The optical product of any of the preceding examples, wherein said first 3D image is a substantially similar reproduction of said first 3D object and not scaled up in size.

40. The optical product of any of the preceding examples, wherein said second 3D image is a substantially similar reproduction of said second 3D object and not scaled up in size.

41. The optical product of any of the preceding examples, wherein said first non-holographic features form a shape different from said first 3D object.

42. The optical product of any of the preceding examples, wherein said second non-holographic features form a shape different from said second 3D object.

43. The optical product of any of the preceding examples, wherein a majority of said first plurality of portions comprises first non-holographic features with discontinuities.

44. The optical product of any of the preceding examples, wherein a majority of said second plurality of portions comprises second non-holographic features with discontinuities.

45. The optical product of any of the preceding examples, wherein said portions of said first plurality of portions are defined by borders.

46. The optical product of any of the preceding examples, wherein said portions of said second plurality of portions are defined by borders.

47. The optical product of any of the preceding examples, wherein said portions of said first plurality of portions are defined by linear borders.

48. The optical product of any of the preceding examples, wherein said portions of said second plurality of portions are defined by linear borders.

49. The optical product of any of the preceding examples, wherein a majority of said first and/or second plurality of portions comprises features discontinuous with features in surrounding adjacent portions.

50. The optical product of any of the preceding examples, wherein a majority of said first and/or second non-holographic features is discontinuous at linear boundaries between adjacent portions.

51. The optical product of any of the preceding examples, wherein said first plurality of portions comprises first non-holographic features with discontinuities corresponding to a continuous region of said first 3D object.

52. The optical product of any of the preceding examples, wherein said second plurality of portions comprises second non-holographic features with discontinuities corresponding to a continuous region of said second 3D object.

53. The optical product of any of the preceding examples, further comprising holographic features.

54. The optical product of any of the previous examples, wherein portions of the first and/or second plurality of portions have a length and width between 10 μm and 55 μm.

55. The optical product of any of the preceding examples, wherein portions of the first and/or second plurality of portions have a length and width between 20 μm and 50 μm.

56. The optical product of any of the preceding examples, wherein the array of lenses is disposed on a first surface and the first and second plurality of portions are disposed on a second surface opposite the first surface, wherein the first and/or second non-holographic features comprise one or more non-linear features when viewed in a cross-section orthogonal to said first and second surfaces.

57. The optical product of any of the preceding examples, wherein said first and/or second 3D object comprises a non-symmetrical shaped object.

58. The optical product of any of the preceding examples, wherein said first and/or second 3D object comprises an object in nature.

59. The optical product of any of the preceding examples, wherein said first and/or second 3D object comprises a man-made object.

60. The optical product of any of the preceding examples, wherein the first and/or second plurality of portions comprises specular reflecting and diffusing features.

61. The optical product of any of the preceding examples, wherein the first and/or second non-holographic features comprise specular reflecting features.

62. The optical product of any of the preceding examples, wherein the first and/or second non-holographic features are surrounded by diffusing features.

63. The optical product of any of Examples 1-7, wherein said optical structure comprises a M/D/M multilayer thin film optical stack, where D is a transparent or optically transmissive dielectric layer and M is a metal layer.

64. The optical product of any of Examples 1-7, wherein said optical structure comprises a D/M/D multilayer thin film optical stack, where D is a transparent or optically transmissive dielectric layer and M is a metal layer.

65. An optical product comprising:
a first plurality of portions, individual ones of the first plurality of portions corresponding to a point on a surface of a first 3D object, and comprising first non-holographic features configured to produce at least part of a first 3D image of the first 3D object;
a second plurality of portions, individual ones of the second plurality of portions corresponding to a point on a surface of a second 3D object, and comprising second non-holographic features configured to produce at least part of a second 3D image of the second 3D object; and
an interference optical structure disposed with respect to said first and/or second non-holographic features.

66. The optical product of Example 65, wherein at a first viewing angle, the optical product presents the first 3D image for viewing without presenting the second 3D image for viewing, and at a second viewing angle different from the first viewing angle, the optical product presents for viewing the second 3D image without presenting the first 3D image for viewing.

67. The optical product of any of Examples 65-66, when illuminated, reproduces the first or second 3D image in a first color in transmission mode or a second color in reflection mode 68. The optical product of any of Examples 65-67, when illuminated, reproduces the first or second 3D image in a first color in transmission mode and a second color in reflection mode, wherein the second color is different from the first color 69. The optical product of any of Examples 67-68, wherein the first color and/or the second color changes with a change in a viewing angle.

70. The optical product of any of Examples 67-68, wherein the first color and/or the second color does not change with a change in a viewing angle.

71. The optical product of any of Examples 65-70, wherein said optical structure comprises an interference optical stack.

72. The optical product of any of Examples 65-71, wherein said optical structure comprises a D/M/D/M/D multilayer thin film optical stack, where D is a transparent or optically transmissive dielectric layer and M is a metal layer.

73. The optical product of Example 72, wherein the metal layers have a ratio of the real part (n) of the refractive index to the imaginary part (k) of the refractive index greater than or equal to 0.01 and less than or equal to 0.5.

74. The optical product of any of Examples 65-71, wherein said optical structure comprises a M/D/M/D/M multilayer thin film optical stack, where D is a transparent or optically transmissive dielectric layer and M is a metal layer.

75. The optical product of Example 74, wherein the metal layers have a ratio of the real part (n) of the refractive index to the imaginary part (k) of the refractive index greater than or equal to 0.01 and less than or equal to 0.2.

76. The optical product of any of Examples 74-75, wherein individual ones of the metal layers have a thickness from about 20 nm to about 100 nm.

77. The optical product of any of Examples 72-76, wherein at least one of the metal layers comprises aluminum, silver, gold, silver alloy, or gold alloy.

78. The optical product of any of Examples 72-77, wherein at least one of the dielectric layers comprises magnesium fluoride, silicon dioxide, zinc oxide, zinc sulfide, zirconium dioxide, titanium dioxide, tantalum pentoxide, ceric oxide, yttrium oxide, indium oxide, tin oxide, indium tin oxide, aluminum oxide, tungsten trioxide, or combinations thereof.

79. The optical product of any of Examples 72-77, wherein at least one of the dielectric layers comprises an organic layer.

80. The optical product of any of Examples 65-71, wherein said optical structure comprises a H/L/H/L/H multilayer thin film optical stack, wherein H and L are layers with a refractive index, and wherein the H layers have a higher refractive index than the L layers.

81. The optical product of Example 80, where the L layers have a refractive index less than 1.65 and the H layers have a refractive index greater than or equal to 1.65.

82. The optical product of any of Examples 65-71, wherein said optical structure comprises a A/D/M multilayer thin film optical stack, where A is an absorber layer, D is a transparent dielectric layer, and M is a metal layer that is opaque.

83. The optical product of Example 82, wherein the absorber layer has a ratio of the real part (n) of the refractive index to the imaginary part (k) of the refractive index near unity.

84. The optical product of any of Examples 82-83, wherein said optical structure comprises a A/D/M/D/A multilayer thin film optical stack.

85. The optical product of any of Examples 82-84, wherein said optical structure comprises a A/D/M/M*/M/D/A multilayer thin film optical stack, where M* is a magnetic layer.

86. The optical product of any of Examples 65-71, wherein said optical structure comprises a Fabry-Perot or etalon structure.

87. The optical product of any of the preceding examples, wherein said first and/or second non-holographic features comprise facets.

88. The optical product of any of the preceding examples, wherein said first and/or second non-holographic features comprise linear or curved facets.

89. The optical product of any of the preceding examples, wherein said first and/or second non-holographic features with less steep slopes are configured to reflect light toward an observer's eye, and wherein said first and/or second non-holographic features with steeper slopes are configured to reflect light away from the observer's eye.

90. The optical product of any of the preceding examples, wherein said first and/or second 3D object comprise an irregularly shaped object.

91. The optical product of any of the preceding examples, wherein the optical structure is in the form of a hot stamp coating, a foil coating, or an ink coating.

92. The optical product of any of the preceding examples, wherein the optical product is in the form of a thread, patch, laminate, hot stamp, or window.

93. The optical product of any of the preceding examples, wherein said optical product is configured to provide authenticity verification on an item for anti-counterfeiting or security.

94. The optical product of Example 93, wherein said item is a banknote, a credit card, a debit card, a stock certificate, a passport, a driver's license, an identification card, a document, a tamper evident container or packaging, consumer packaging, or a bottle of pharmaceuticals.

95. The optical product of Example 93, wherein said item is electronics, apparel, jewelry, cosmetics, or a handbag.

96. The optical product of any of the preceding examples, wherein a gradient of said first non-holographic features correlates to an inclination of said surface of said first 3D object at said corresponding point, and wherein an orientation of said first non-holographic features correlates to an orientation of said surface of said first 3D object at said corresponding point.

97. The optical product of Example 96, wherein a gradient of said second non-holographic features correlates to an inclination of said surface of said second 3D object at said corresponding point, and wherein an orientation of said second non-holographic features correlates to an orientation of said surface of said second 3D object at said corresponding point.

98. The optical product of any of the preceding examples, wherein said inclination of said surface of said first 3D object comprises a polar angle from a first reference line of said first 3D object, and wherein said orientation of said surface of said first 3D object comprises an azimuth angle from a second reference line orthogonal to said first reference line of said first 3D object.

99. The optical product of Example 98, wherein said inclination of said surface of said second 3D object comprises a polar angle from a first reference line of said second 3D object, and wherein said orientation of said surface of said second 3D object comprises an azimuth angle from a second reference line orthogonal to said first reference line of said second 3D object.

100. The optical product of any of the preceding examples, wherein said first 3D image is a substantially similar reproduction of said first 3D object and not scaled up in size.

101. The optical product of any of the preceding examples, wherein said second 3D image is a substantially similar reproduction of said second 3D object and not scaled up in size.

102. The optical product of any of the preceding examples, wherein said first non-holographic features form a shape different from said first 3D object.

103. The optical product of any of the preceding examples, wherein said second non-holographic features form a shape different from said second 3D object.

104. The optical product of any of the preceding examples, wherein a majority of said first plurality of portions comprises first non-holographic features with discontinuities.

105. The optical product of any of the preceding examples, wherein a majority of said second plurality of portions comprises second non-holographic features with discontinuities.

106. The optical product of any of the preceding examples, wherein said portions of said first plurality of portions are defined by borders.

107. The optical product of any of the preceding examples, wherein said portions of said second plurality of portions are defined by borders.

108. The optical product of any of the preceding examples, wherein said portions of said first plurality of portions are defined by linear borders.

109. The optical product of any of the preceding examples, wherein said portions of said second plurality of portions are defined by linear borders.

110. The optical product of any of the preceding examples, wherein a majority of said first and/or second plurality of portions comprises features discontinuous with features in surrounding adjacent portions.

111. The optical product of any of the preceding examples, wherein a majority of said first and/or second non-holographic features is discontinuous at linear boundaries between adjacent portions.

112. The optical product of any of the preceding examples, wherein said first plurality of portions comprises first non-holographic features with discontinuities corresponding to a continuous region of said first 3D object.

113. The optical product of any of the preceding examples, wherein said second plurality of portions comprises second non-holographic features with discontinuities corresponding to a continuous region of said second 3D object.

114. The optical product of any of the preceding examples, further comprising holographic features.

115. The optical product of any of the previous examples, wherein portions of the first and/or second plurality of portions have a length and width between 10 μm and 55 μm.

116. The optical product of any of the preceding examples, wherein portions of the first and/or second plurality of portions have a length and width between 20 μm and 50 μm.

117. The optical product of any of the preceding examples, wherein the optical product comprises a first surface and a second surface opposite said first surface, wherein said first and second plurality of portions are disposed on the second surface, wherein the first and/or second non-holographic features comprise one or more non-linear features when viewed in a cross-section orthogonal to said first and second surfaces.

118. The optical product of any of the preceding examples, wherein said first and/or second 3D object comprises a non-symmetrical shaped object.

119. The optical product of any of the preceding examples, wherein said first and/or second 3D object comprises an object in nature.

120. The optical product of any of the preceding examples, wherein said first and/or second 3D object comprises a man-made object.

121. The optical product of any of the preceding examples, wherein the first and/or second plurality of portions comprises specular reflecting and diffusing features.

122. The optical product of any of the preceding examples, wherein the first and/or second non-holographic features comprise specular reflecting features.

123. The optical product of any of the preceding examples, wherein the first and/or second non-holographic features are surrounded by diffusing features.

124. The optical product of any of Examples 65-123, wherein the first and/or second non-holographic features are configured to produce at least part of the first and/or second 3D image without lenses.

125. The optical product of any of Examples 65-124, wherein the optical product comprises a first surface and a second surface opposite said first surface, wherein said first and second plurality of portions are disposed on said second surface, and wherein said first surface is planar.

126. The optical product of any of Examples 65-71, wherein said optical structure comprises a M/D/M multilayer thin film optical stack, where D is a transparent or optically transmissive dielectric layer and M is a metal layer.

127. The optical product of any of Examples 65-71, wherein said optical structure comprises a D/M/D multilayer thin film optical stack, where D is a transparent or optically transmissive dielectric layer and M is a metal layer.

CONCLUSION

Various embodiments of the present invention have been described herein. Although this invention has been described with reference to these specific embodiments, the descriptions are intended to be illustrative of the invention and are not intended to be limiting. Various modifications and applications may occur to those skilled in the art without departing from the true spirit and scope of the invention.

What is claimed is:

1. An optical product comprising:
   a first plurality of portions, individual ones of the first plurality of portions corresponding to a point on a surface of a first 3D object, and comprising first non-holographic features configured to produce at least part of a first 3D image of the first 3D object;
   a second plurality of portions, individual ones of the second plurality of portions corresponding to a point on a surface of a second 3D object, and comprising second non-holographic features configured to produce at least part of a second 3D image of the second 3D object; and
   an interference optical structure disposed with respect to said first and/or second non-holographic features.

2. The optical product of claim 1, wherein at a first viewing angle, the optical product presents the first 3D image for viewing without presenting the second 3D image for viewing, and at a second viewing angle different from the first viewing angle, the optical product presents for viewing the second 3D image without presenting the first 3D image for viewing.

3. The optical product of claim 1, wherein when illuminated, reproduces the first or second 3D image in a first color in transmission mode and a second color in reflection mode, wherein the second color is different from the first color.

4. The optical product of claim 1, wherein said interference optical structure comprises an interference optical stack.

5. The optical product of claim 1, wherein said first and/or second non-holographic features comprise facets.

6. The optical product of claim 1, wherein the interference optical structure is in the form of a hot stamp coating, a foil coating, or an ink coating.

7. The optical product of claim 1, wherein the optical product is in the form of a thread, patch, laminate, hot stamp, or window.

8. The optical product of claim 1, wherein said optical product is configured to provide authenticity verification on an item for anti-counterfeiting or security.

9. The optical product of claim 8, wherein said item is a banknote, a credit card, a debit card, a stock certificate, a passport, a driver's license, an identification card, a document, a tamper evident container or packaging, consumer packaging, or a bottle of pharmaceuticals.

10. The optical product of claim 8, wherein said item is electronics, apparel, jewelry, cosmetics, or a handbag.

11. The optical product of claim 1,
    wherein a gradient of said first non-holographic features correlates to an inclination of said surface of said first 3D object at said corresponding point, and
    wherein an orientation of said first non-holographic features correlates to an orientation of said surface of said first 3D object at said corresponding point.

12. The optical product of claim 11,
    wherein a gradient of said second non-holographic features correlates to an inclination of said surface of said second 3D object at said corresponding point, and
    wherein an orientation of said second non-holographic features correlates to an orientation of said surface of said second 3D object at said corresponding point.

13. The optical product of claim 1, wherein the first and/or second plurality of portions comprises specular reflecting and diffusing features.

14. The optical product of claim 1, wherein the first and/or second non-holographic features comprise specular reflecting features.

15. The optical product of claim 1, wherein the first and/or second non-holographic features are surrounded by diffusing features.

* * * * *